(12) United States Patent
Lee et al.

(10) Patent No.: US 12,218,789 B2
(45) Date of Patent: Feb. 4, 2025

(54) FREQUENCY GRADIENT METASURFACE DEVICE AND METHOD BASED ON FAST BEAM STEERING SYSTEM

(71) Applicant: LG ELECTRONICS INC., Seoul (KR)

(72) Inventors: Hojae Lee, Seoul (KR); Sangrim Lee, Seoul (KR); Bonghoe Kim, Seoul (KR); Sunam Kim, Seoul (KR); Kijun Jeon, Seoul (KR); Byungkyu Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 18/000,352

(22) PCT Filed: Jun. 1, 2020

(86) PCT No.: PCT/KR2020/007077
§ 371 (c)(1),
(2) Date: Nov. 30, 2022

(87) PCT Pub. No.: WO2021/246538
PCT Pub. Date: Dec. 9, 2021

(65) Prior Publication Data
US 2023/0179465 A1    Jun. 8, 2023

(51) Int. Cl.
*H04L 27/26* (2006.01)
*H04B 10/11* (2013.01)
(Continued)

(52) U.S. Cl.
CPC .......... *H04L 27/2662* (2013.01); *H04B 10/11* (2013.01); *H04B 10/40* (2013.01); *H04L 7/0075* (2013.01)

(58) Field of Classification Search
CPC ... H04L 27/2662; H04L 7/0075; H04B 10/11; H04B 10/40; H04B 7/0617; H04B 10/112; H04B 10/114; H04B 7/022
(Continued)

(56) References Cited

U.S. PATENT DOCUMENTS 5,978,148 A * 11/1999 Oono ................. G02B 19/0052
359/668
5,991,102 A * 11/1999 Oono ..................... G02B 27/09
359/822

(Continued)

FOREIGN PATENT DOCUMENTS

| CA | 3047667 A1 * | 6/2018 | .......... H04B 7/0408 |
|---|---|---|---|
| KR | 2019-0110540 | 9/2019 | |
| KR | 2020-0026279 | 3/2020 | |

OTHER PUBLICATIONS

Steerable Pencil beams for multi-Gbps indoor optical wireless communication C.W.Oh et al., (Year: 2014).*
(Continued)

*Primary Examiner* — Abbas H Alagheband
(74) *Attorney, Agent, or Firm* — LEE, HONG, DEGERMAN, KANG & WAIMEY

(57) ABSTRACT

The present specification provides a method, performed by a device, for transmitting information about a pencil beam timing offset in a wireless optical communication system, in which a reference synchronization time is obtained, wherein the reference synchronization time is obtained on the basis of a cell-reference synchronization signal (C-RSS) received from another device, a peak energy time is obtained, the pencil beam timing offset is obtained on the basis of the reference synchronization time and the peak energy time, and information about the pencil beam timing offset is transmitted to the other device.

8 Claims, 122 Drawing Sheets

(51) Int. Cl.
   *H04B 10/40*    (2013.01)
   *H04L 7/00*    (2006.01)
(58) Field of Classification Search
   USPC .......................................................... 398/118
   See application file for complete search history.

(56) References Cited

U.S. PATENT DOCUMENTS

| | | | |
|---|---|---|---|
| 9,581,619 B2* | 2/2017 | Scott | G01R 13/0272 |
| 11,162,789 B2* | 11/2021 | Lodin | G01S 7/4817 |
| 2015/0181544 A1 | 6/2015 | Liu et al. | |
| 2016/0211957 A1 | 7/2016 | Kenney et al. | |
| 2019/0310377 A1* | 10/2019 | Lodin | G01C 15/002 |
| 2019/0361111 A1* | 11/2019 | Sadiq | G01S 5/0215 |
| 2024/0088953 A1* | 3/2024 | He | H04B 7/0456 |

OTHER PUBLICATIONS

European Patent Office Application Serial No. 20939417.0, Search Report dated Feb. 9, 2024, 8 pages.
PCT International Application No. PCT/KR2020/007077, International Search Report dated Feb. 23, 2021, 4 page.
3rd Generation Partnership Project, "Technical Specification Group Radio Access Network; Evolved Universal Terrestrial Radio Access (E-UTRA); Radio Resource Control (RRC); Protocol specification (Release 16)," 3GPP TS 36.331 V16.0.0, Mar. 2020, 346 pages.

* cited by examiner

FIG. 91
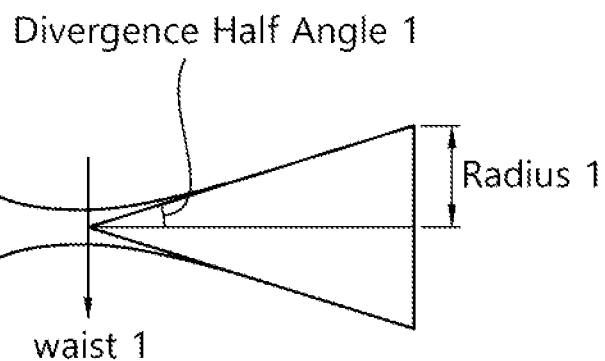
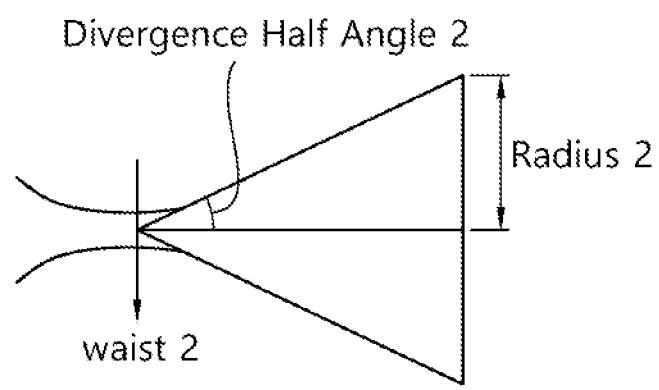

FIG. 92
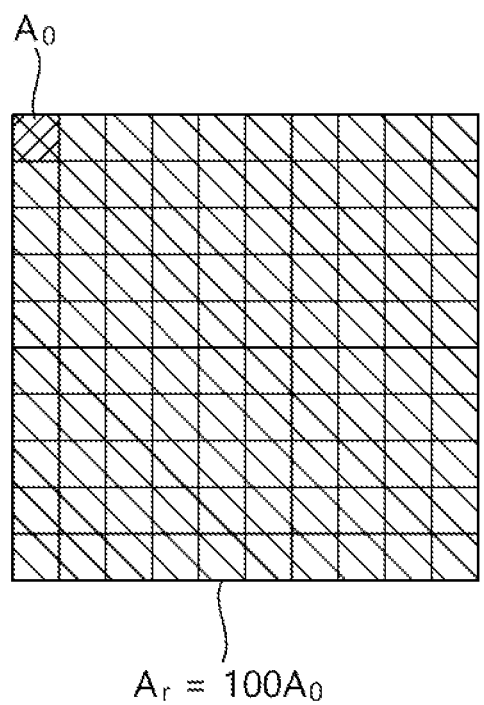
$A_r = 100A_0$
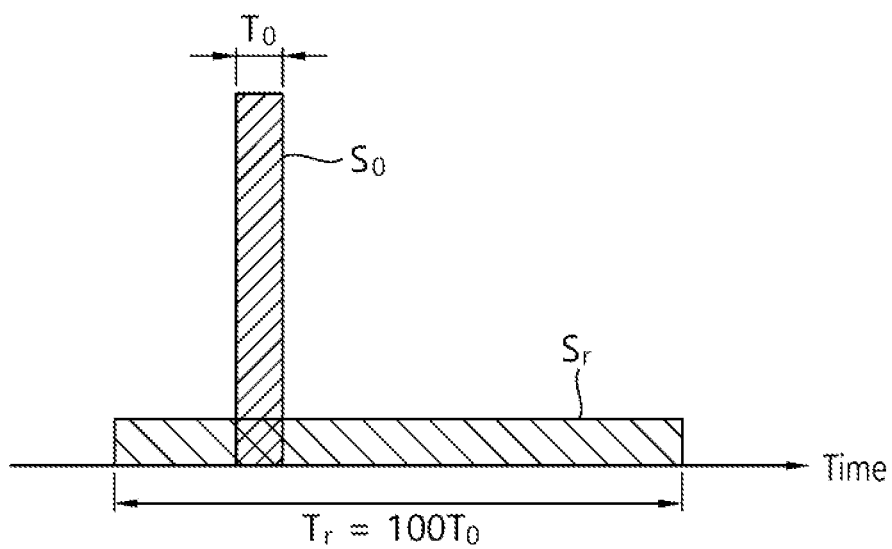
$T_r = 100T_0$

FREQUENCY GRADIENT METASURFACE DEVICE AND METHOD BASED ON FAST BEAM STEERING SYSTEM

CROSS-REFERENCE TO RELATED APPLICATION(S)

This application is the National Stage filing under 35 U.S.C. 371 of International Application No. PCT/KR2020/007077, filed on Jun. 1, 2020, the contents of which is hereby incorporated by reference herein in its entirety.

BACKGROUND OF THE DISCLOSURE

Field of the Disclosure

This specification relates to an optical wireless communication (OWC) system.

Related Art

Optical wireless communication systems can be largely divided into visible light communication (VLC) and free space optical communication (FSO) systems according to the frequency and purpose of photons.

Meanwhile, the present specification intends to provide a method for transmitting and operating a direction of a signal beam recognized in wireless optical communication to a regression loop and a device using the same.

SUMMARY

According to one embodiment of the present specification, a method characterized by obtaining a pencil beam timing offset based on the reference synchronization time and peak energy time, and transmitting information about the pencil beam timing offset to another device may be provided.

According to this specification, a target beam may be selected by acquiring a 4D beam transmitted through a frequency gradient virtual antenna based on reference synchronization and feeding back the 4D beam to a transmitter. In addition, a feature of transmitting data transmission as a 3D beam through a selected target beam may be provided.

An effect which can be obtained through one specific example of the present disclosure is not limited to effects listed above. For example, there can be various technical effects which a person having ordinary skill in the related art can appreciate and derive from the present disclosure. As a result, the specific effect of the present disclosure is not limited to an effect explicitly disclosed in the present disclosure, but may include various effects which can be appreciated or derived from a technical feature of the present disclosure.

BRIEF DESCRIPTION OF THE DRAWINGS

FIG. 91 schematically illustrates an example of a radius according to a beam generation method.

FIG. 92 schematically illustrates an example of a beam area environment.

DESCRIPTION OF EXEMPLARY EMBODIMENTS

In the present disclosure, "A or B" may mean "only A", "only B" or "both A and B". When expressed separately, "A or B" may be interpreted as "A and/or B" in the present disclosure. For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "control information (PDCCH)" is indicated, "PDCCH" may be proposed as an example of "control information". When separately expressed, "control information" in the present disclosure may be not limited to "intra prediction", and "PDCCH" may be proposed as an example of "control information". Further, when "control information (i.e., PDCCH)" is indicated, "PDCCH" may be proposed as an example of "control information".

Technical features that are individually described in one drawing in this specification may be implemented individually or simultaneously.

Hereinafter, new radio access technology (new RAT, NR) will be described.

As more and more communication devices require greater communication capacity, a need for improved mobile broadband communication compared to conventional radio access technology (RAT) has emerged. In addition, massive machine type communications (MTC), which provides various services anytime and anywhere by connecting multiple devices and objects, is also one of the major issues to be considered in next-generation communication. In addition, communication system design considering reliability and latency-sensitive services/terminals is being discussed. The introduction of next-generation wireless access technologies in consideration of such expanded mobile broadband communication, massive MTC, URLLC (Ultra-Reliable and Low Latency Communication) is being discussed, in this specification, for convenience, the corresponding technology is referred to as new RAT or NR.

Figure 1:
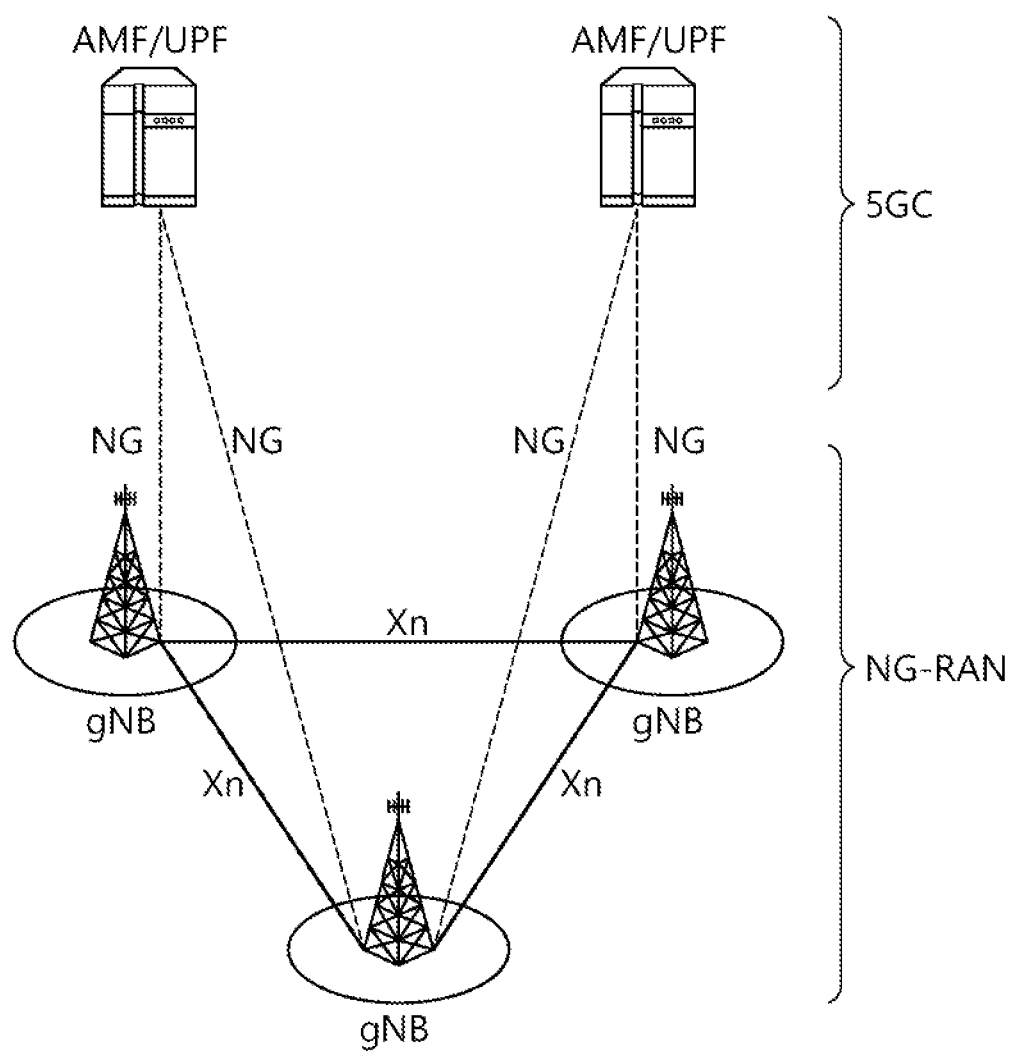
FIG. 1 illustrates a system structure of a New Generation Radio Access Network (NG-RAN) to which NR is applied.

FIG. 1 illustrates a system structure of a New Generation Radio Access Network (NG-RAN) to which NR is applied.

Referring to FIG. 1, a Next Generation-Radio Access Network (NG-RAN) may include a next generation-Node B (gNB) and/or eNB providing a user plane and control plane protocol termination to a user. FIG. 1 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 2:
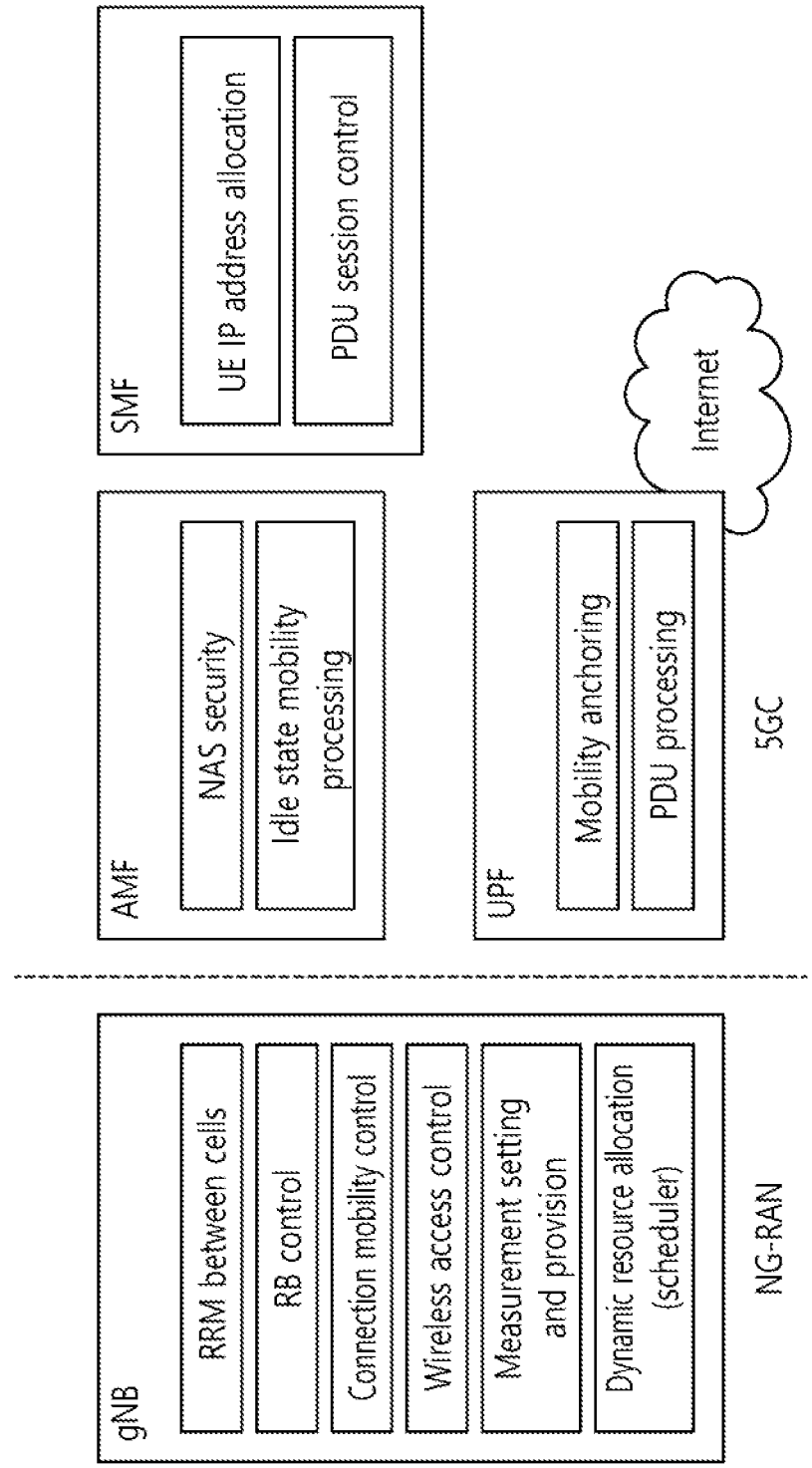
FIG. 2 illustrates the functional split between NG-RAN and 5GC.

FIG. 2 illustrates the functional split between NG-RAN and 5GC.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 3:
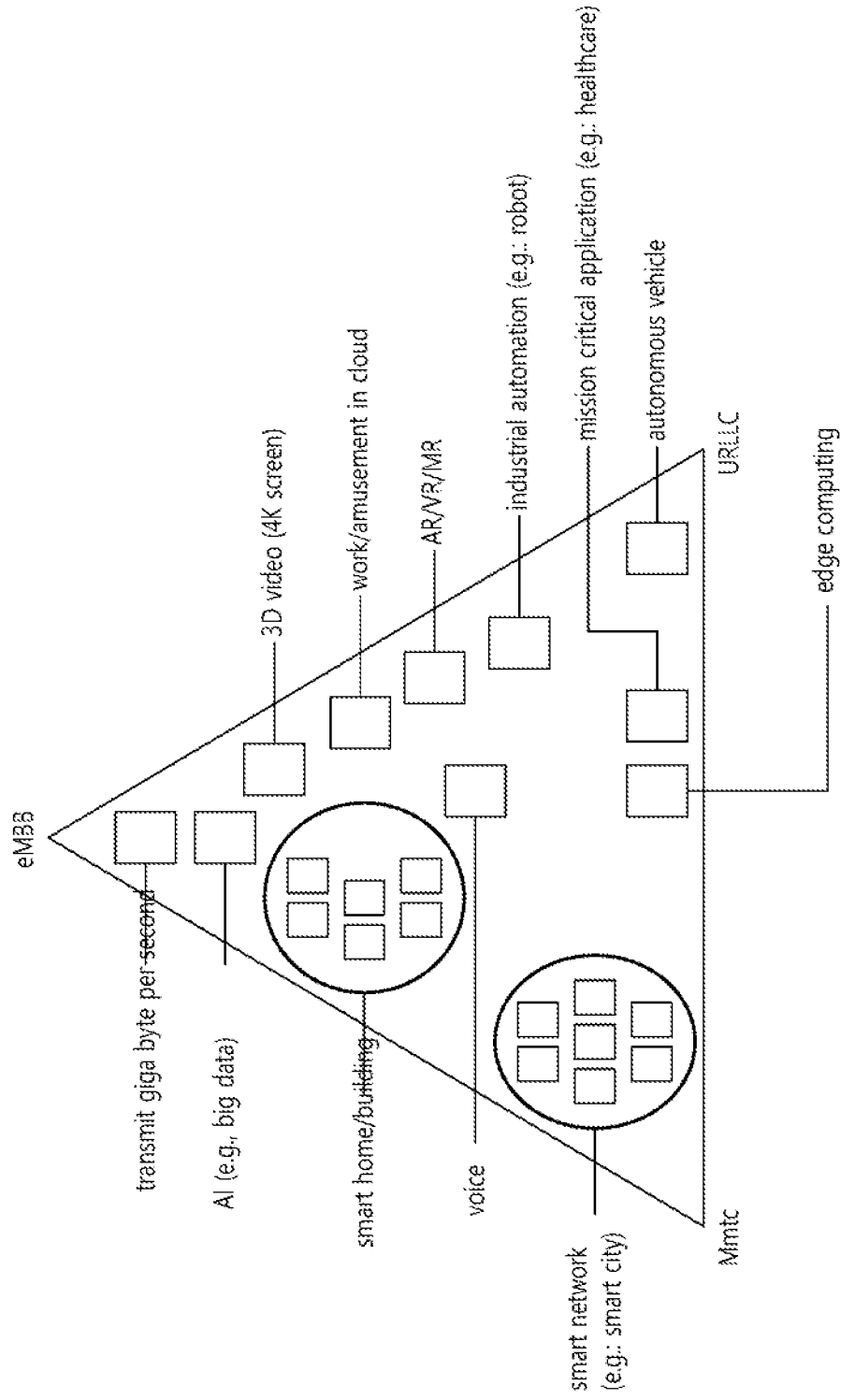
FIG. 3 shows an example of a 5G usage scenario to which the technical features of the present specification can be applied.
Figure 4:
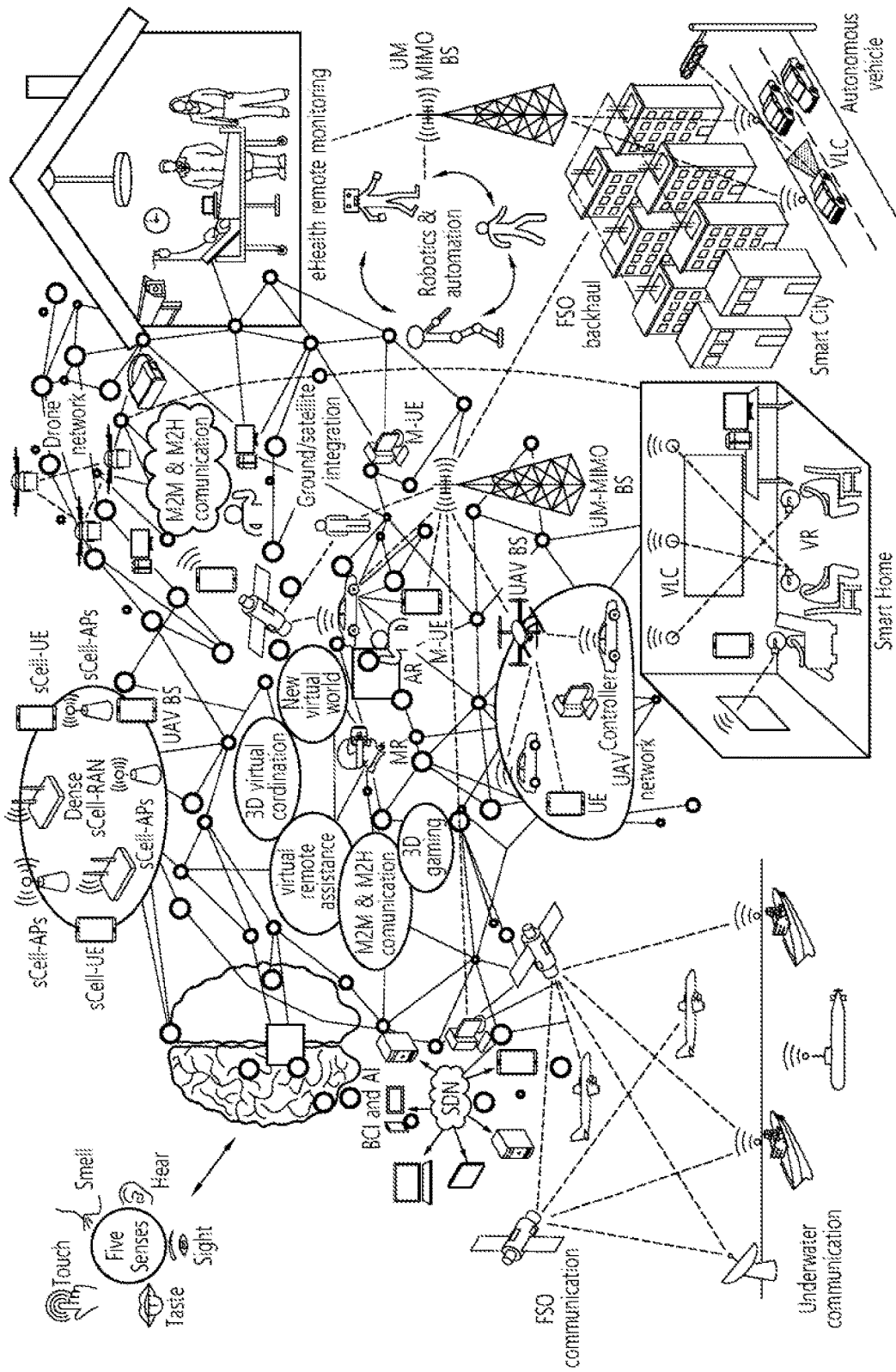
FIG. 4 is a diagram showing an example of a communication structure that can be provided in a 6G system.

FIG. 3 shows examples of 5G usage scenarios to which the technical features of the present specification can be applied. The 5G usage scenarios shown in FIG. 3 are only exemplary, and the technical features of the present specification can be applied to other 5G usage scenarios which are not shown in FIG. 3.

Referring to FIG. 3, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 3 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Hereinafter, examples of next-generation communication (e.g., 6G) that can be applied to the embodiments of the present specification will be described.

<6G System General>

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

The 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimemtion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

<Core Implementation Technology of 6G System>

Artificial Intelligence

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

Figure 5:
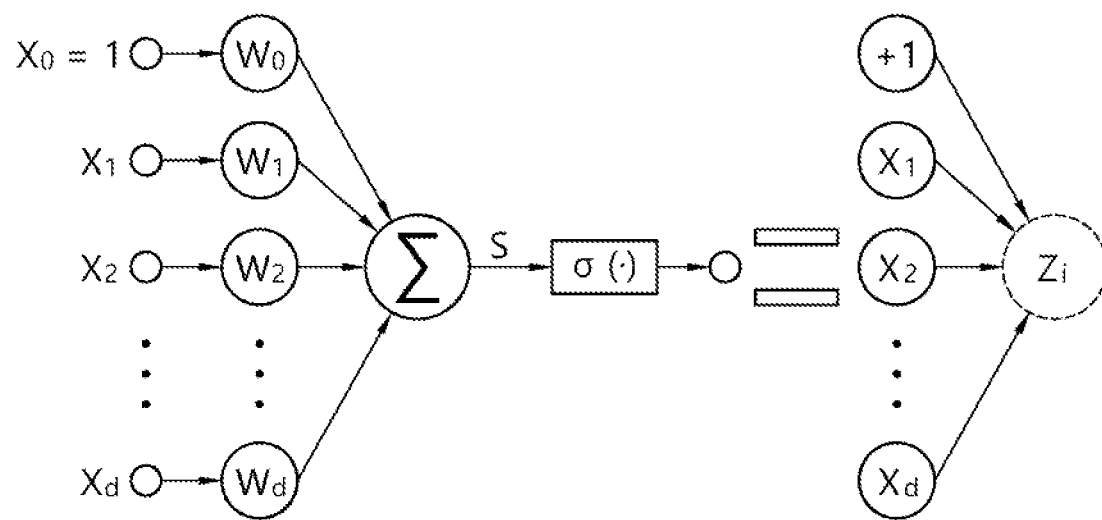
FIG. 5 schematically illustrates an example of a perceptron structure.

FIG. 5 schematically illustrates an example of a perceptron structure.

Referring to FIG. 5, if the input vector $x=(x1, x2, \ldots, xd)$ is input, each component is multiplied by the weight (W1, W2, \ldots, Wd), after summing up all the results, applying the activation function $\sigma(\cdot)$, the entire process above is called a perceptron. The huge artificial neural network structure may extend the simplified perceptron structure shown in FIG. 5 and apply input vectors to different multi-dimensional perceptrons. For convenience of description, an input value or an output value is referred to as a node.

Meanwhile, the perceptron structure shown in FIG. 5 can be described as being composed of a total of three layers based on input values and output values. An artificial neural network in which H number of (d+1) dimensional perceptrons exist between the 1st layer and the 2nd layer and K number of (H+1) dimensional perceptrons between the 2nd layer and the 3rd layer can be expressed as shown in FIG. 6.

Figure 6:
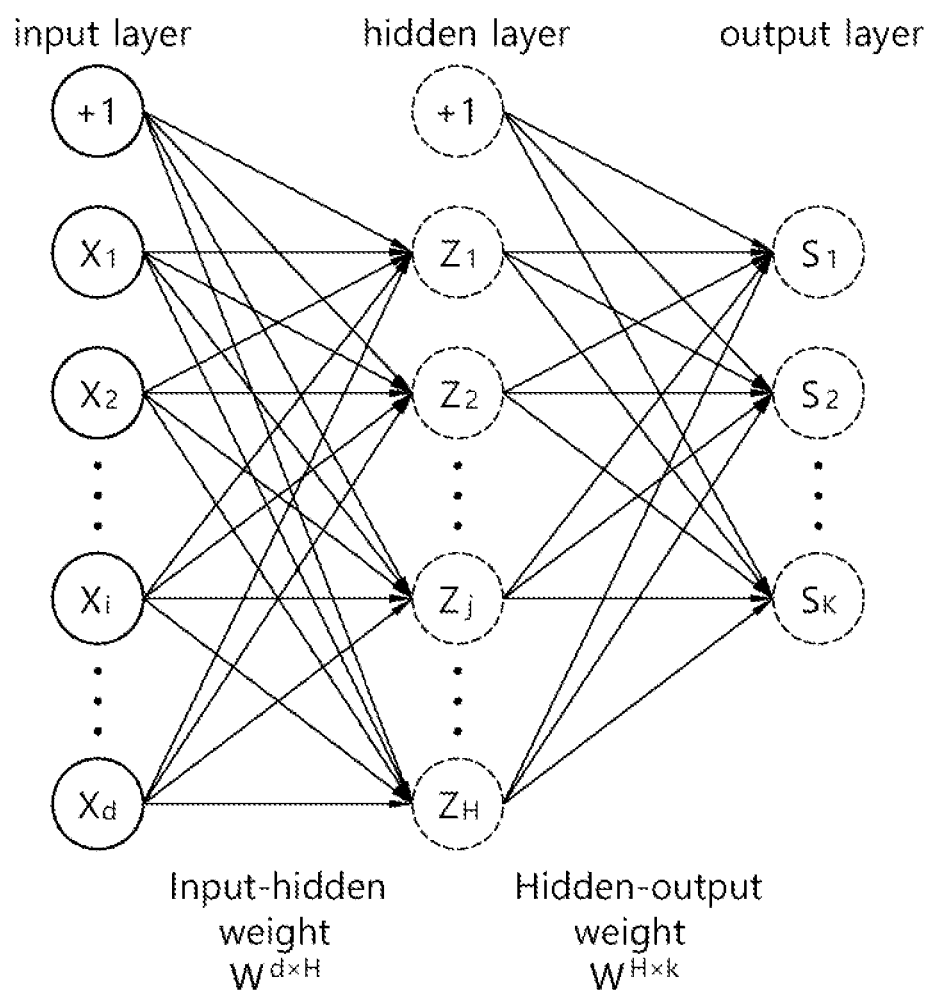
FIG. 6 schematically illustrates an example of a multilayer perceptron structure.

FIG. 6 schematically illustrates an example of a multi-layer perceptron structure.

The layer where the input vector is located is called the input layer, the layer where the final output value is located is called the output layer, and all the layers located between the input layer and the output layer are called hidden layers. In the example of FIG. 6, three layers are disclosed, but when counting the number of layers of an actual artificial neural network, since the count excludes the input layer, it can be regarded as a total of two layers. The artificial neural network is composed of two-dimensionally connected perceptrons of basic blocks.

The above-described input layer, hidden layer, and output layer can be jointly applied to various artificial neural network structures such as CNN and RNN, which will be described later, as well as multi-layer perceptrons. As the number of hidden layers increases, the artificial neural network becomes deeper, and a machine learning paradigm that uses a sufficiently deep artificial neural network as a learning model is called deep learning. In addition, the artificial neural network used for deep learning is called a deep neural network (DNN).

Figure 7:
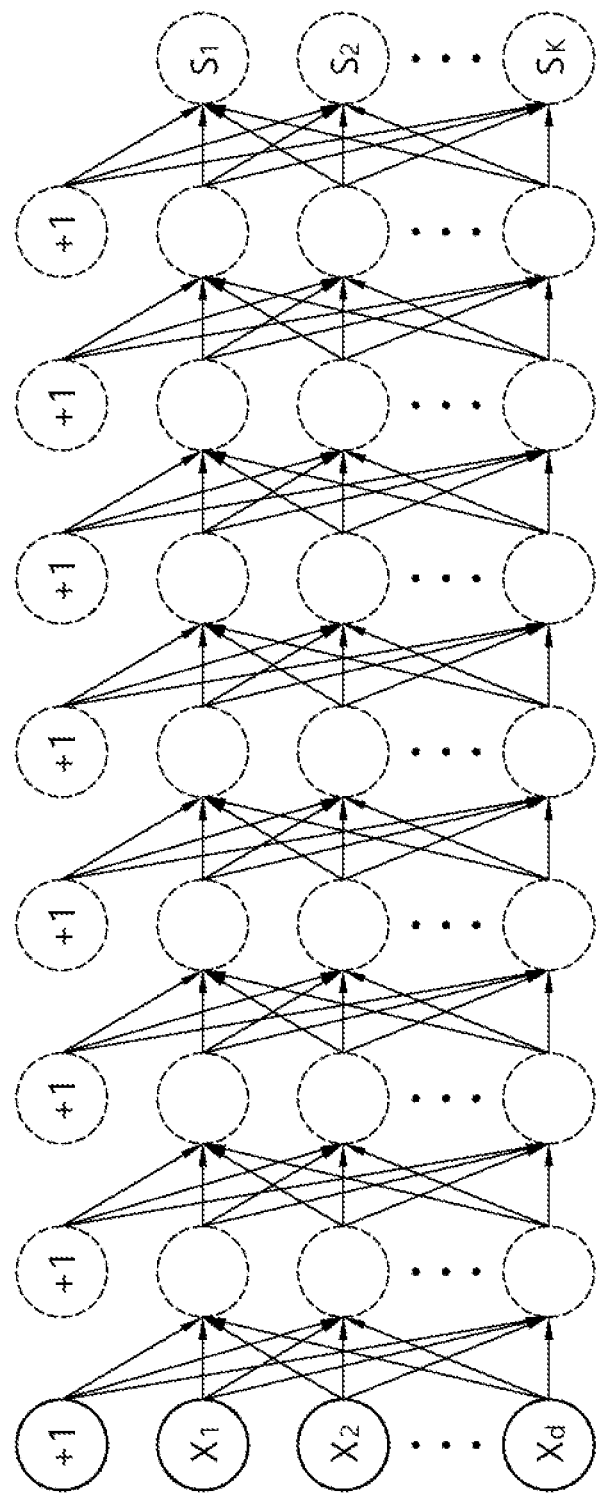
FIG. 7 schematically illustrates a deep neural network example.

FIG. 7 schematically illustrates a deep neural network example.

The deep neural network shown in FIG. 7 is a multi-layer perceptron consisting of 8 hidden layers+8 output layers. The multilayer perceptron structure is expressed as a fully-connected neural network. In a fully-connected neural network, there is no connection relationship between nodes located on the same layer, and there is a connection relationship only between nodes located on adjacent layers. DNN has a fully connected neural network structure and is composed of a combination of multiple hidden layers and activation functions, so it can be usefully applied to identify the correlation characteristics between inputs and outputs. Here, the correlation characteristic may mean a joint probability of input and output.

On the other hand, depending on how a plurality of perceptrons are connected to each other, various artificial neural network structures different from the aforementioned DNN can be formed.

Figure 8:
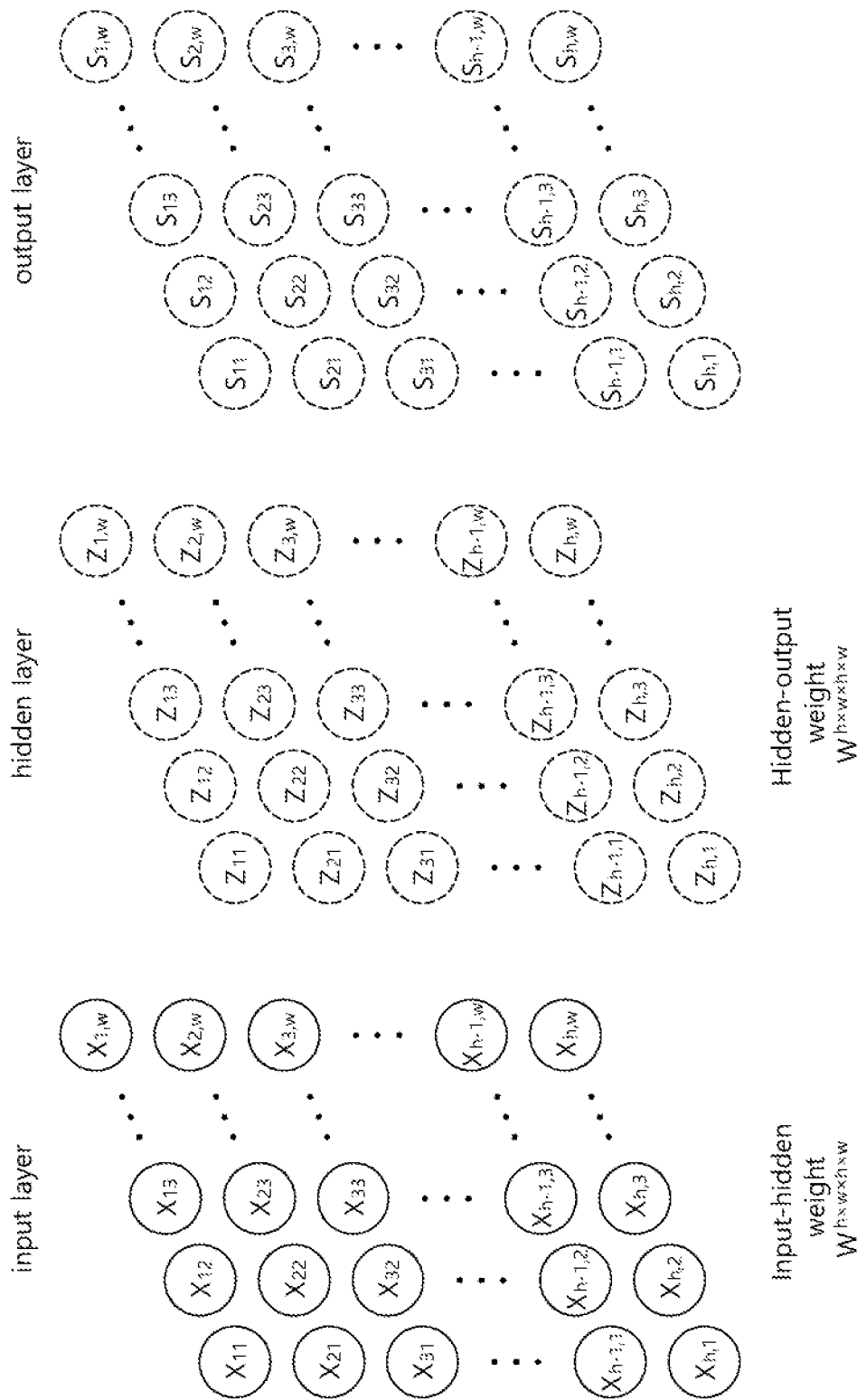
FIG. 8 schematically illustrates an example of a convolutional neural network.

FIG. 8 schematically illustrates an example of a convolutional neural network.

In DNN, nodes located inside one layer are arranged in a one-dimensional vertical direction. However, in FIG. 8, it can be assumed that the nodes are two-dimensionally arranged with w nodes horizontally and h nodes vertically (convolutional neural network structure of FIG. 8). In this case, since a weight is added for each connection in the connection process from one input node to the hidden layer, a total of h×w weights must be considered. Since there are h×w nodes in the input layer, a total of h2w2 weights are required between two adjacent layers.

Figure 9:
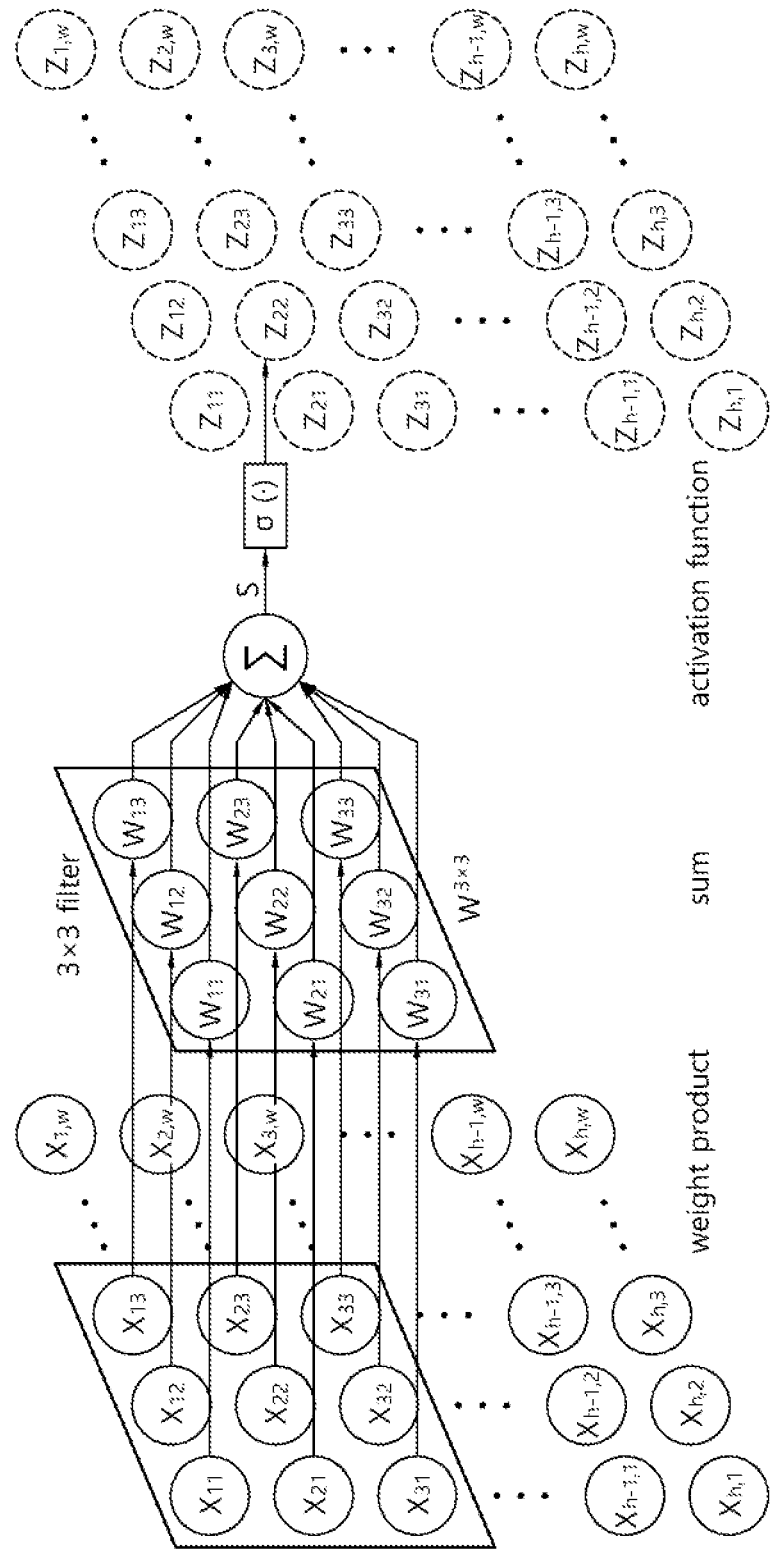
FIG. 9 schematically illustrates an example of a filter operation in a convolutional neural network.

The convolutional neural network of FIG. 8 has a problem that the number of weights increases exponentially according to the number of connections, so instead of considering all mode connections between adjacent layers, assuming that a filter having a small size exists, as shown in FIG. 9, a weighted sum and an activation function operation are performed on a portion where the filters overlap.

FIG. 9 schematically illustrates an example of a filter operation in a convolutional neural network.

One filter has weights corresponding to the number of filters, and learning of weights can be performed so that a specific feature on an image can be extracted as a factor and output. In FIG. 9, a 3×3 size filter is applied to the 3×3 area at the top left of the input layer, and the weighted sum and activation function calculations are performed on the corresponding node, and the resulting output value is stored in z22.

The filter scans the input layer while moving horizontally and vertically at regular intervals, performs weighted sum and activation function calculations, and places the output value at the position of the current filter. This operation method is similar to the convolution operation for images in the field of computer vision, so the deep neural network of this structure is called a convolutional neural network (CNN), a hidden layer generated as a result of the convolution operation is called a convolutional layer. Also, a neural network having a plurality of convolutional layers is referred to as a deep convolutional neural network (DCNN).

In the convolution layer, the number of weights may be reduced by calculating a weighted sum by including only nodes located in a region covered by the filter in the node where the current filter is located. This allows one filter to be used to focus on features for a local area. Accordingly, CNN can be effectively applied to image data processing in which a physical distance in a 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data attributes. Considering the length variability and precedence relationship of these sequence data, input one element on the data sequence at each time step, a structure in which an output vector (hidden vector) of a hidden layer output at a specific point in time is input together with the next element in a sequence to an artificial neural network is called a recurrent neural network structure.

Figure 10:
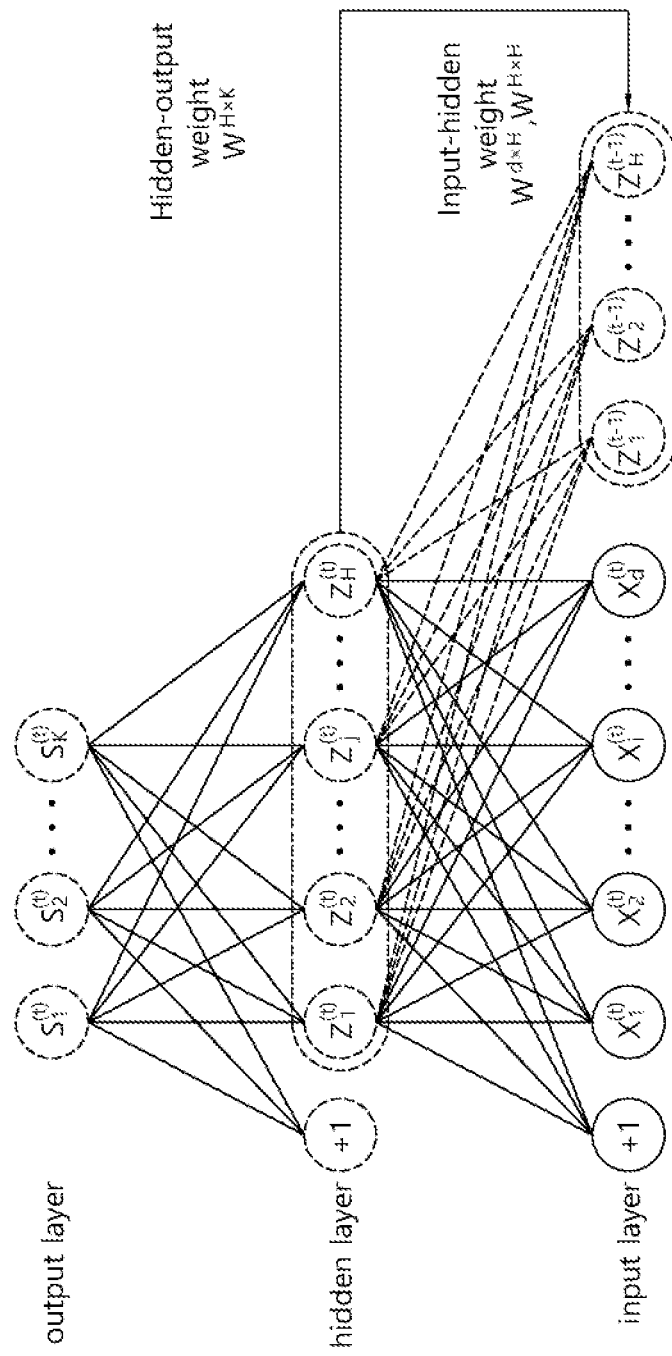
FIG. 10 schematically illustrates an example of a neural network structure in which a cyclic loop exists.

FIG. 10 schematically illustrates an example of a neural network structure in which a cyclic loop exists.

Referring to FIG. 10, a recurrent neural network (RNN) is a structure that applies a weighted sum and an activation function in the process of inputting an element ($x1(t)$, $x2(t)$, ..., $xd(t)$) of any gaze t on the data sequence to the fully connected neural network, by entering together the hidden vector ($z1(t-1)$, $z2(t-1)$, ..., $zH(t-1)$) of the immediately preceding time point t−1. The reason why the hidden vector is transmitted to the next time point in this way is that information in the input vector at previous time points is regarded as being accumulated in the hidden vector of the current time point.

Figure 11:
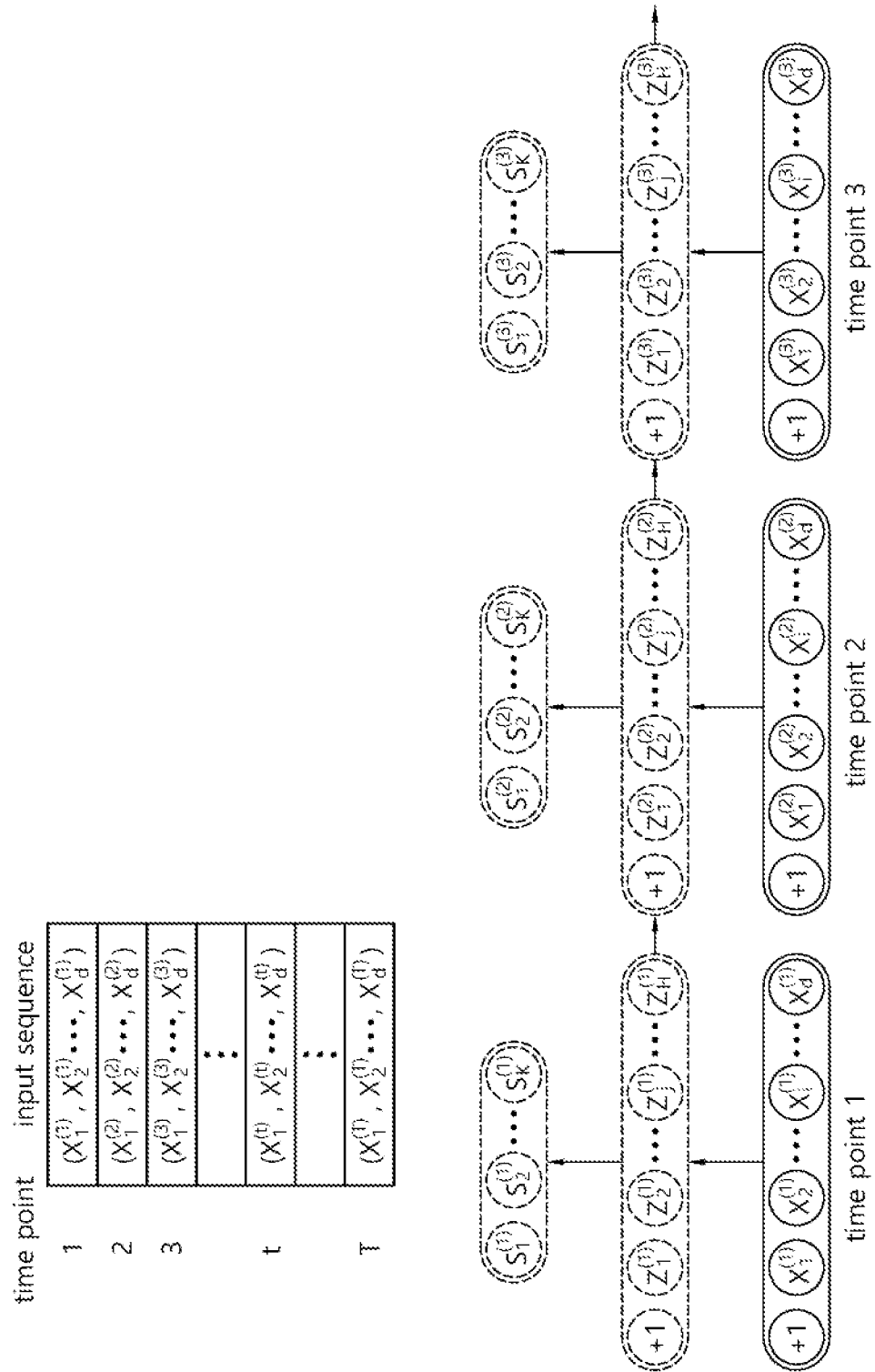
FIG. 11 schematically illustrates an example of an operating structure of a recurrent neural network.

FIG. 11 schematically illustrates an example of an operating structure of a recurrent neural network.

Referring to FIG. 11, the recurrent neural network operates in a sequence of predetermined views with respect to an input data sequence.

The hidden vectors ($z1(1),z2(1)$, ..., $zH(1)$) when the input vectors ($x1(t), x2(t)$, ..., $xd(t)$) at time point 1 are input to the recurrent neural network is input together with the input vector ($x1(2),x2(2)$, ..., $xd(2)$) of time point 2, the vector ($z1(2),z2(2)$, ..., $zH(2)$) of the hidden layer is determined through the weighted sum and activation function. This process is repeatedly performed until time point 2, point 3, , , , point T.

Meanwhile, when a plurality of hidden layers are arranged in a recurrent neural network, it is referred to as a deep recurrent neural network (DRNN). Recurrent neural networks are designed to be usefully applied to sequence data (e.g., natural language processing).

As a neural network core used as a learning method, in addition to DNN, CNN, and RNN, various deep learning techniques such as Restricted Boltzmann Machine (RBM), deep belief networks (DBN), and deep Q-Network may be included. It can be applied to fields such as computer vision, voice recognition, natural language processing, and voice/signal processing.

Recently, there have been attempts to integrate AI with wireless communication systems, but these have been focused on the application layer and network layer, especially deep learning in the field of wireless resource management and allocation. However, these studies are gradually developing into the MAC layer and the physical layer, in particular, attempts are being made to combine deep learning with wireless transmission in the physical layer. AI-based physical layer transmission means applying a signal processing and communication mechanism based on an AI driver rather than a traditional communication framework in fundamental signal processing and communication mechanisms. For example, deep learning-based channel coding and decoding, deep learning-based signal estimation and detection, deep learning-based MIMO mechanism, AI-based resource scheduling and may include allocations, etc.

THz(Terahertz) Communication

A data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

Figure 12:
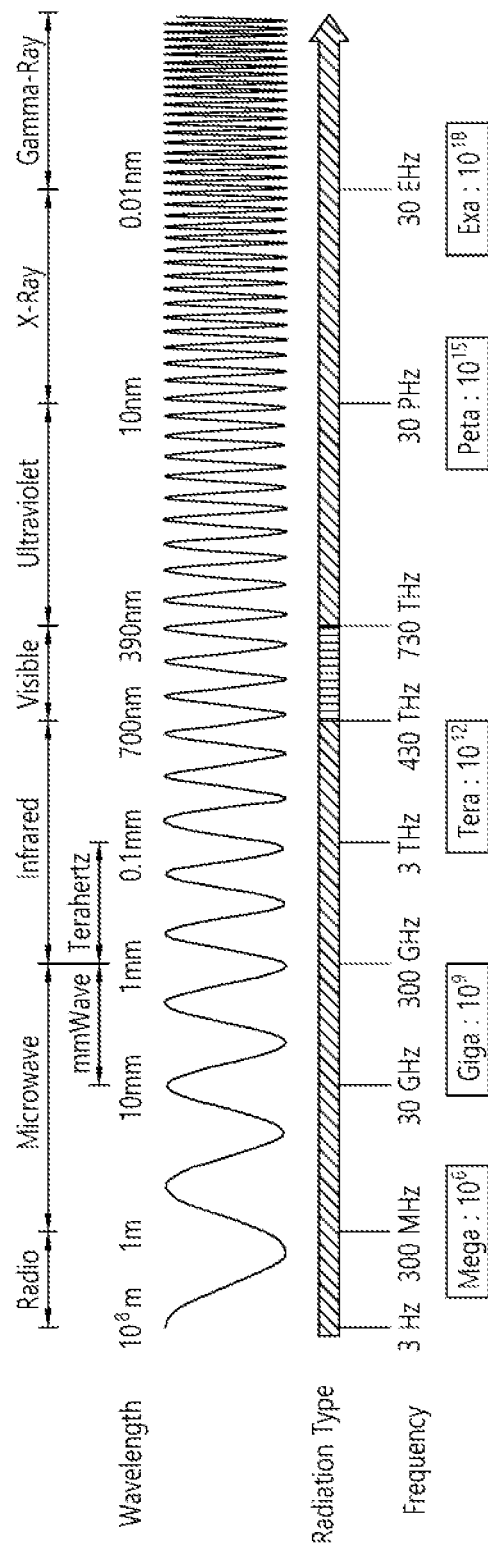
FIG. 12 shows an example of an electromagnetic spectrum.

FIG. 12 shows an example of an electromagnetic spectrum.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Integration of Wireless Information and Energy Transfer

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

<General Terahertz (THz) Wireless Communication>

THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence. In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Figure 13:
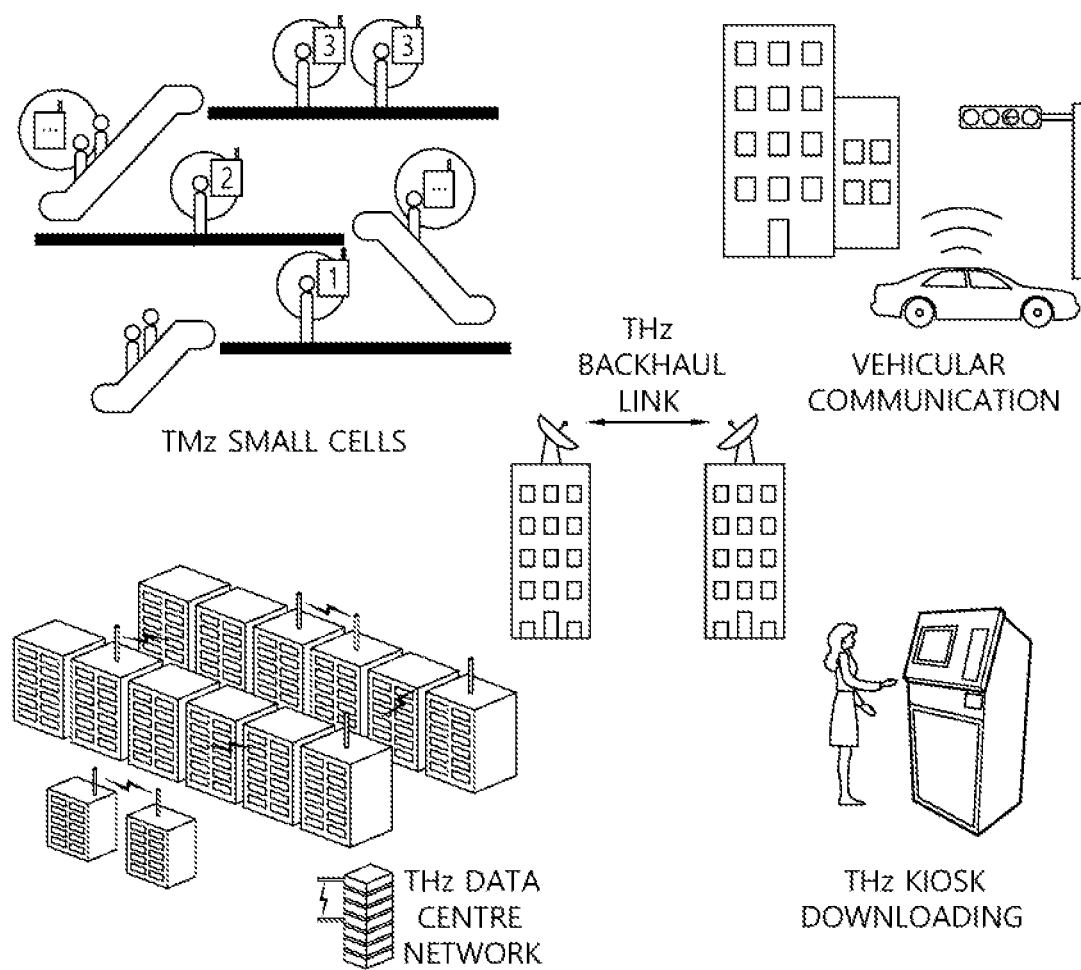
FIG. 13 is a diagram showing an example of a THz communication application.

FIG. 13 is a diagram showing an example of a THz communication application.

As shown in FIG. 13, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading.

Table 2 below is a table showing an example of a technology that can be used in a THz wave.

TABLE 2

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |

TABLE 2-continued

| | |
|---|---|
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 14:
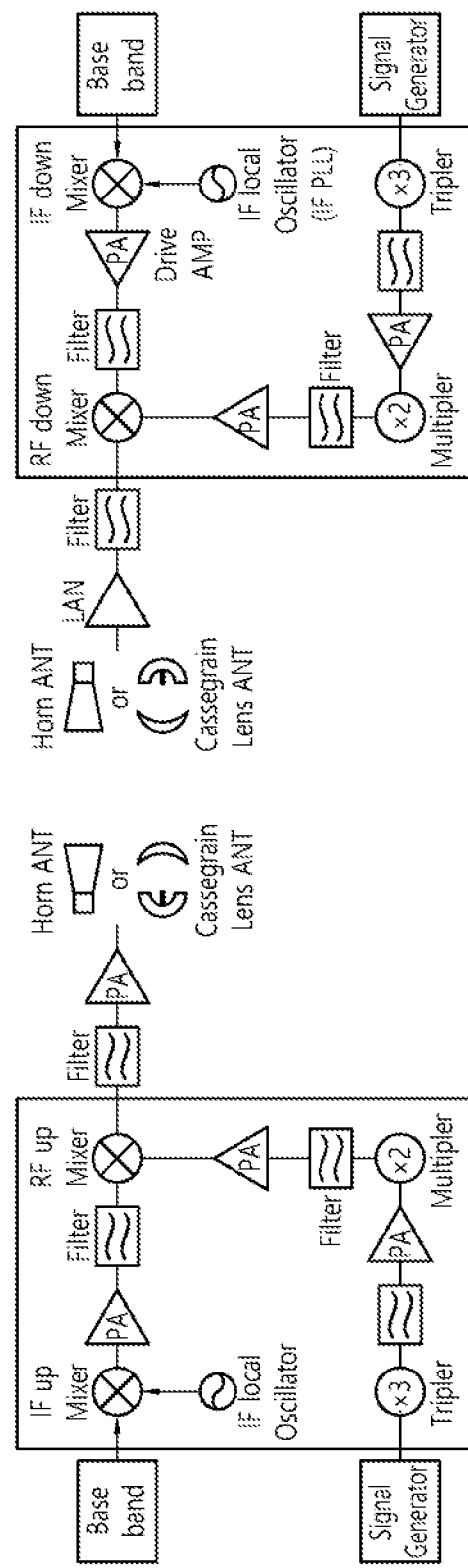
FIG. 14 is a diagram showing an example of an electronic element-based THz wireless communication transceiver.

Hz wireless communication can be classified based on the method for generating and receiving THz. The THz generation method can be classified as an optical device or an electronic device based technology. 14 is a diagram showing an example of an electronic element-based THz wireless communication transceiver.

the method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 14, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 14. In FIG. 14, IF represents an intermediate frequency, a tripler and a multiplier represents a multiplier, PA represents a power amplifier, and LNA represents a low noise amplifier, and PLL represents a phase-locked loop.

Figure 15:
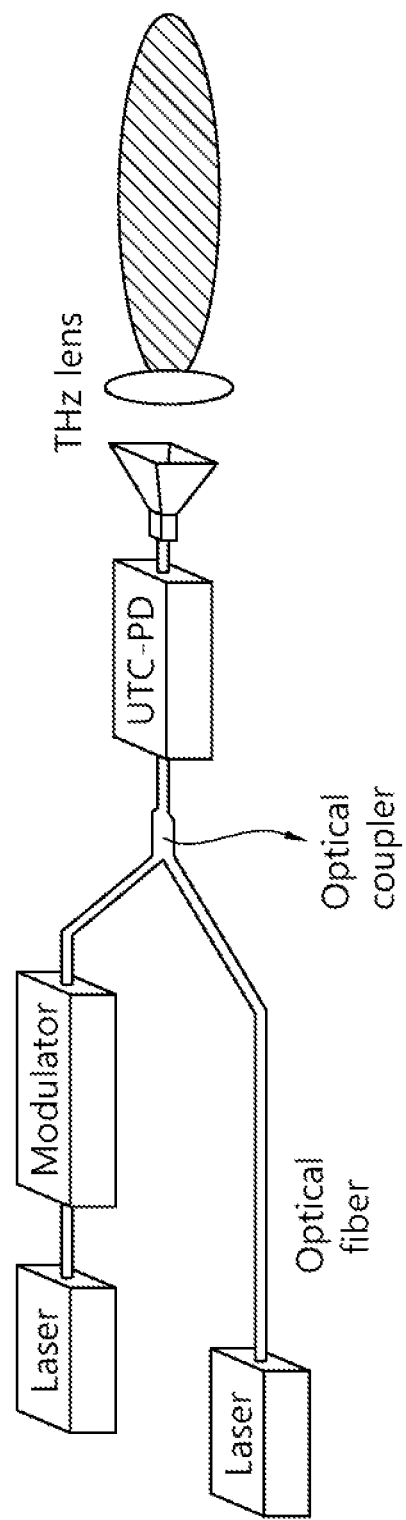
FIG. 15 is a diagram illustrating an example of a method for generating a THz signal based on an optical device.
Figure 16:
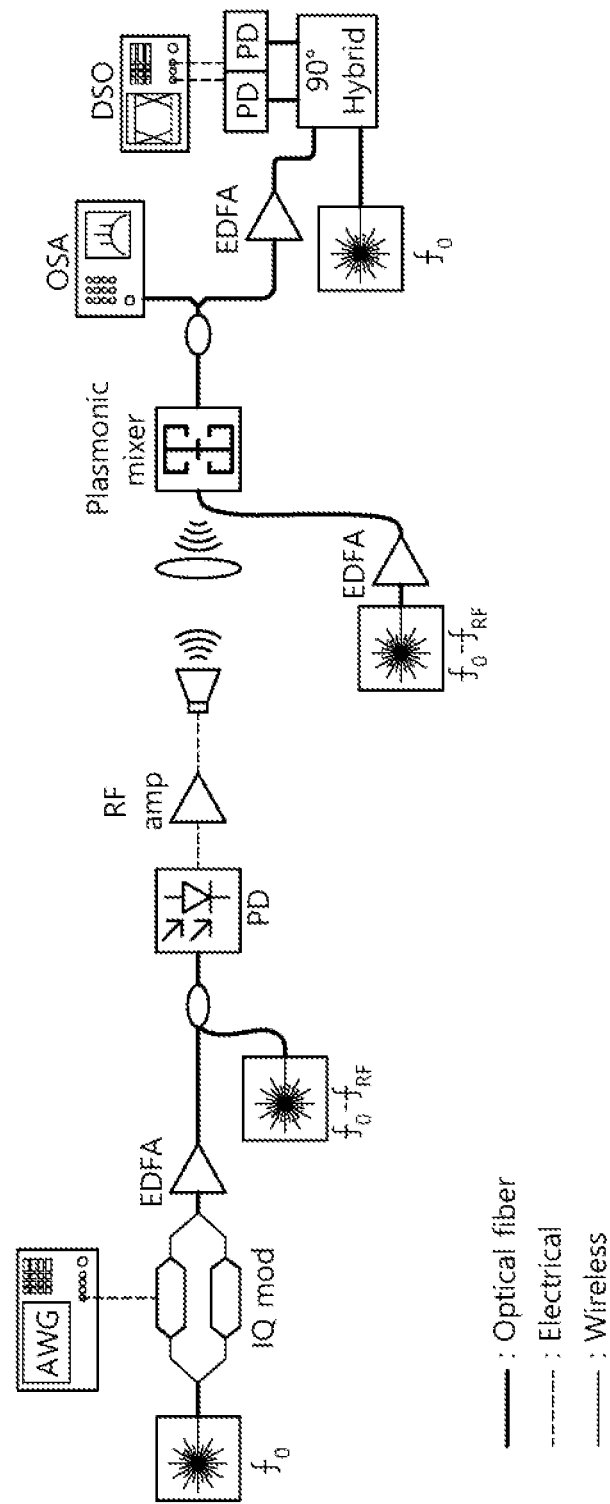
FIG. 16 is a diagram illustrating an example of a THz wireless communication transceiver based on an optical device.

FIG. 15 is a diagram illustrating an example of a method for generating a THz signal based on an optical device, and FIG. 16 is a diagram illustrating an example of a THz wireless communication transceiver based on an optical device.

Figure 19:
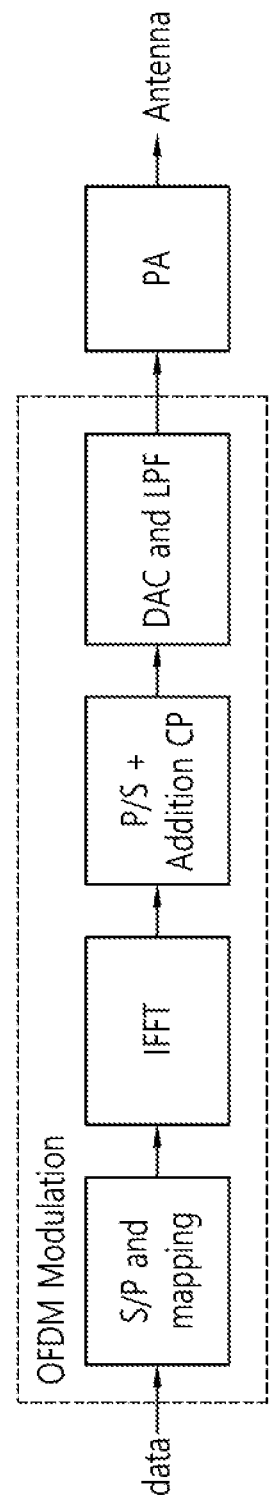
FIG. 19 illustrates an example of an OFDM modulation transmitter structure of a legacy RF communication system.

The optical device-based THz wireless communication technology means a method of generating and modulating a THz signal using an optical device. The optical device-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 19, a laser diode, a broadband optical modulator, and an ultrahigh-speed photodetector are required. In the case of FIG. 15, the light signals of two lasers having different wavelengths are combined to generate a THz signal corresponding to a wavelength difference between the lasers. In FIG. 15, an optical coupler refers to a semiconductor device that transmits an electrical signal using light waves to provide coupling with electrical isolation between circuits or systems, and a unitravelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 16, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 17:
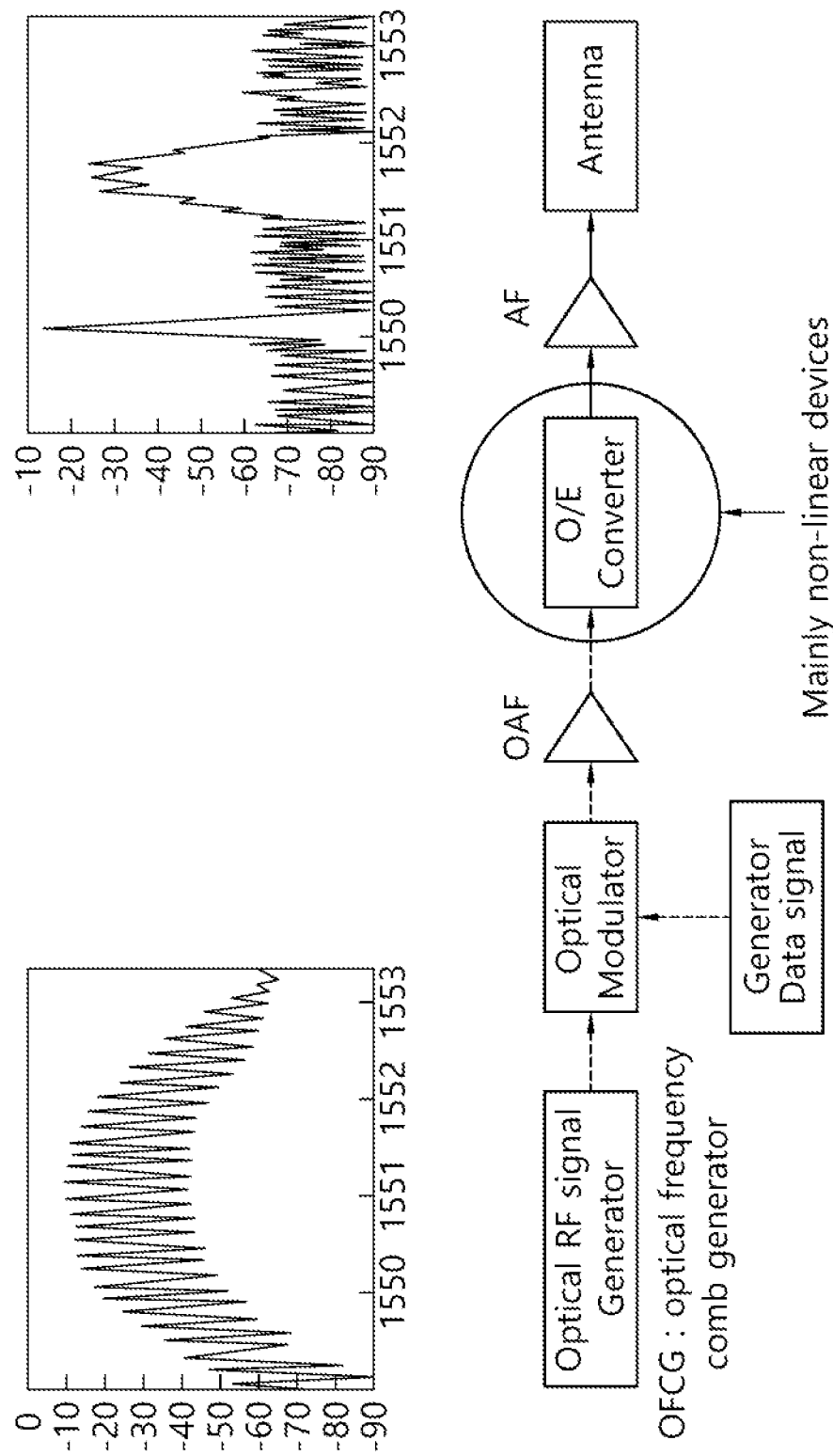
FIG. 17 illustrates a structure of a transmitter based on a photoinc source.
Figure 18:
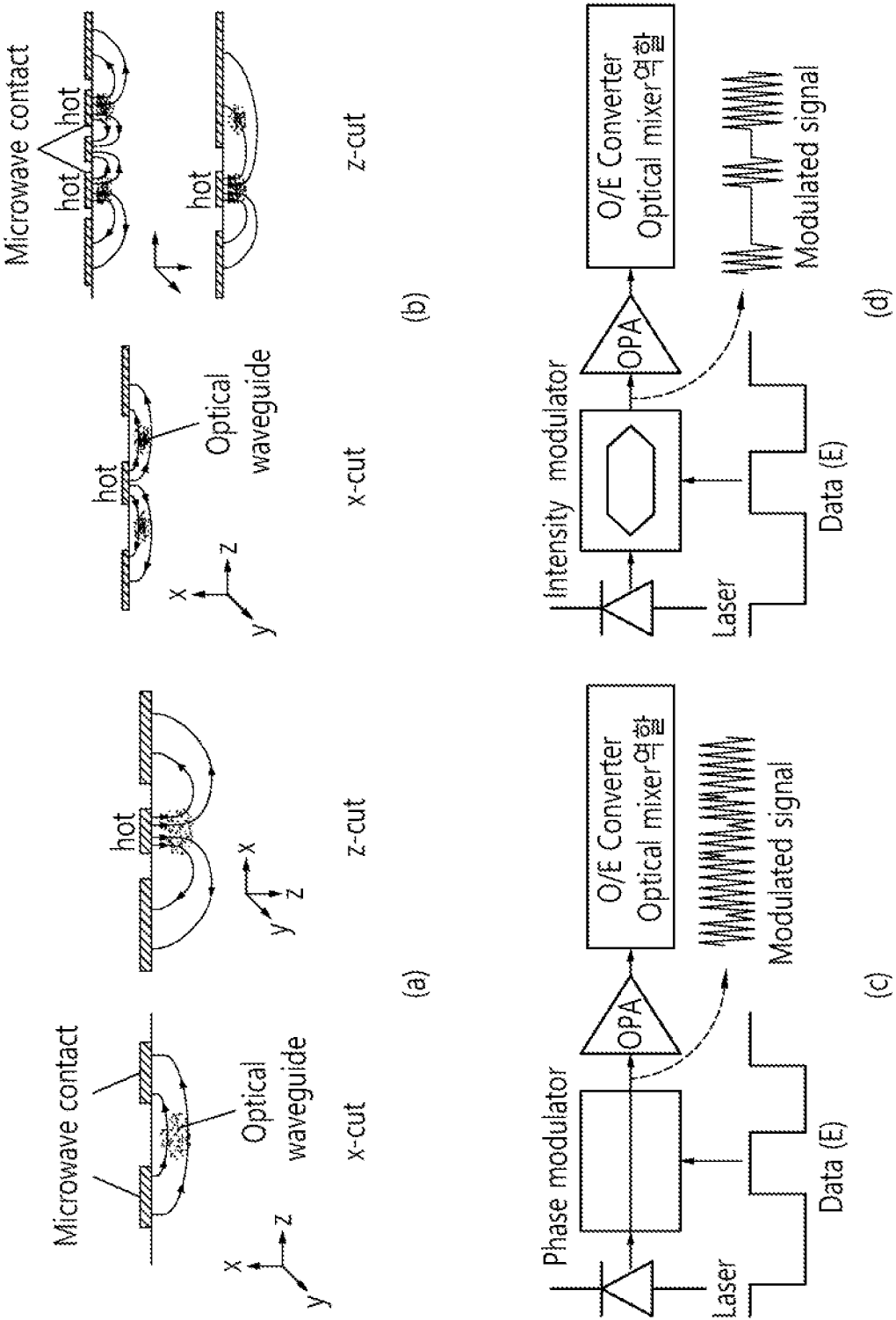
FIG. 18 illustrates a structure of an optical modulator.

The structure of the photoelectric converter (or photoelectric converter) will be described with reference to FIGS. 17 and 18. FIG. 17 illustrates a structure of a transmitter based on a photoinc source, and FIG. 18 illustrates a structure of an optical modulator.

generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation $10^2$ dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

<Optical Wireless Communication System>

Optical wireless communication systems can be largely divided into visible light communication (VLC) and free space optical communication (FSO) systems according to the frequency and purpose of photons.

Visible light communication (VLC) simultaneously plays a role of lighting and communication. Information is transmitted through light having a band corresponding to visible light, and information may be transmitted by light intensity or light flickering (ON/OFF). A commonly used device is a visible light device such as an LED.

Free space optical communication (FSO) mainly plays a role of communication, and is mainly used in a free space or an environment in which straightness of a signal is guaranteed (line of sight (LOS)). In addition to visible light, ultraviolet (UV) and infrared (IR) also fall under the category of FSO. Unlike visible light communication, there is no limiting condition for lighting because it does not function as lighting. Devices that are commonly used are devices that utilize linearity of light, such as LEDs as well as LASERs.

In the case of a wireless optical communication system, there are generally Single Carrier Modulation (SCM) schemes based on On-Off Keying (OOK) that represent signals based on flickering of visible light. OOK modulation is a method of expressing digital signals 1 and 0 according to ON and OFF of the light source, this may be modified by a method such as pulse position modulation (PPM), which is modulated by a pulse position based on a clock.

Recently, research has been conducted on multi carrier modulation (MCM) schemes in a wireless optical communication system. Because they have their advantages 1) robustness to multipath, 2) Single tap equalizer is available, 3) Robustness against DC wandering and flickering interference compared to Single Carrier Modulation Schemes. An MCM-based waveform for a wireless optical communication system must necessarily satisfy the following two characteristics. 1) It must have only one-dimensional (real-value) signals, and 2) it must have unipolar characteristics.

From the viewpoint of the structure of the transmitter, the OFDM modulation structure of the existing RF communication system is as follows.

FIG. 19 illustrates an example of an OFDM modulation transmitter structure of a legacy RF communication system.

That is, an analog signal that has undergone OFDM modulation is amplified through an RF PA (Power Amplifier). At this time, the maximum amplification size of the signal may be limited due to performance limitations of the PA.

On the other hand, the multi-carrier modulation transmission terminal structure of the visible light communication system is as follows.

Figure 20:
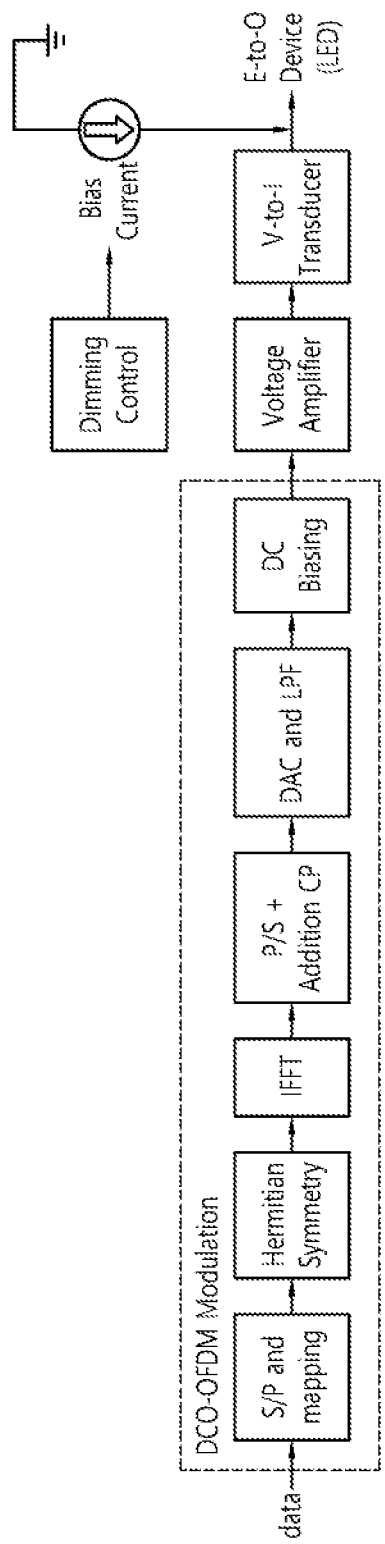
FIG. 20 illustrates an example of a structure of a DCO-OFDM modulation transmitter of a VLC communication system.

FIG. 20 illustrates an example of a structure of a DCO-OFDM modulation transmitter of a VLC communication system. 21 illustrates an example of the ACO-OFDM modulation transmitter structure of the VLC communication system.

Figure 21:
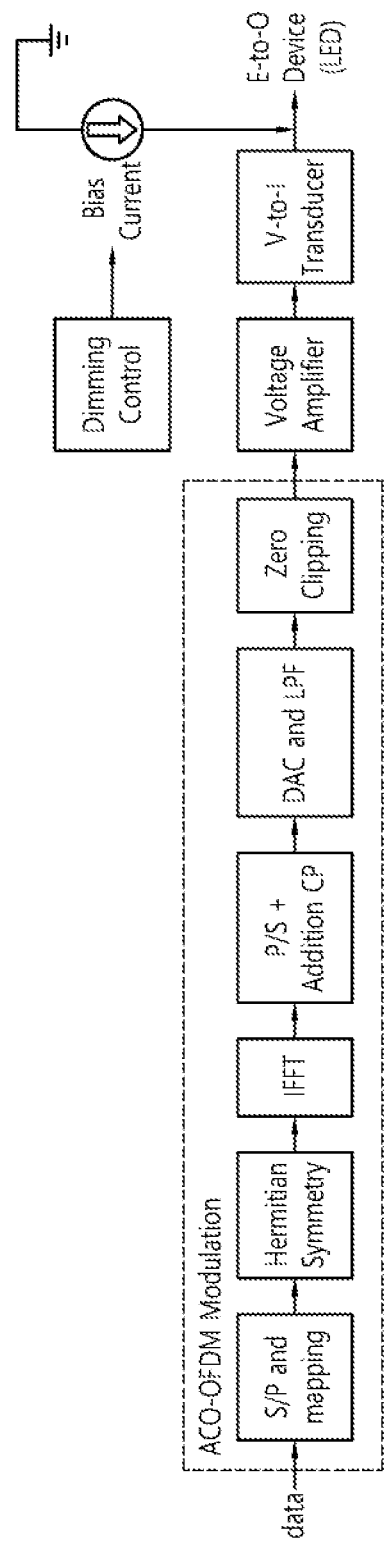
FIG. 21 illustrates an example of the ACO-OFDM modulation transmitter structure of the VLC communication system.

In the FIGS. 20 and 21 above, if the device at the end is an E-to-O device that uses a band other than visible light such as LED to LASER (e.g., infrared), it may fall under the category of FSO.

The wireless optical communication system has a basic structure in which a transmitting end transmits wireless light and a receiving end decodes it. A basic wireless optical communication system may have the following structure.

Figure 22:
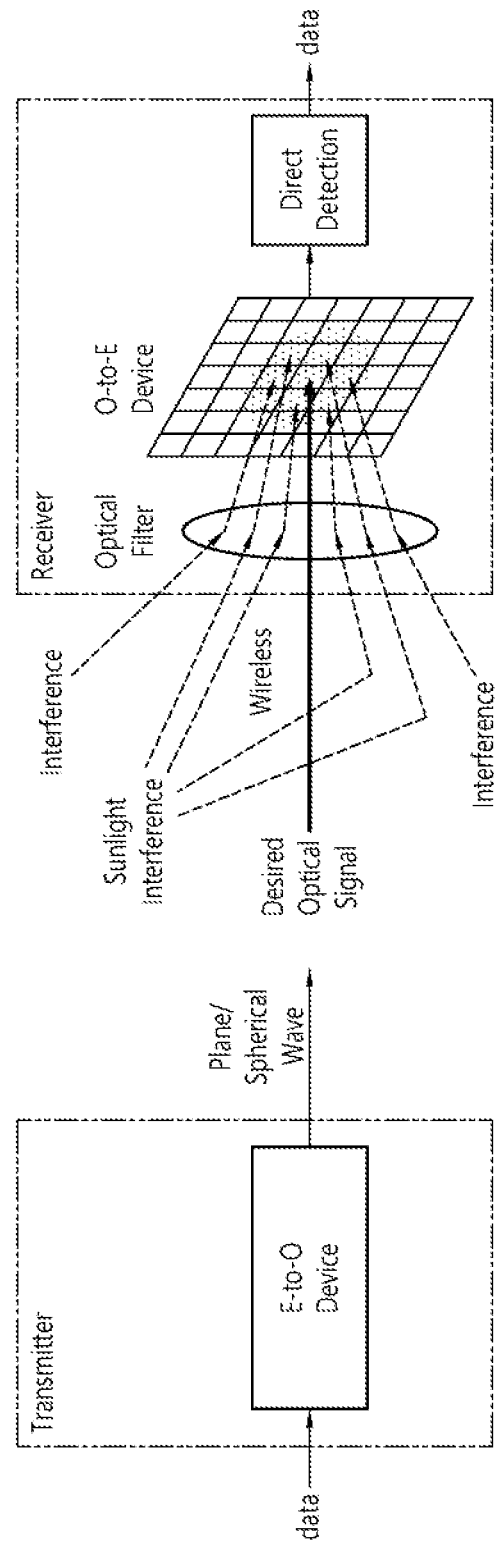
FIG. 22 schematically illustrates an example of a wireless optical communication system.

FIG. 22 schematically illustrates an example of a wireless optical communication system.

The transmitter converts the data (electrical signal) to be transmitted into a photonic source through the E-to-O device and transmits it to the receiver in a wireless environment, which is called wireless light.

Here, radio light can understand a set of photons as a wave from a wave point of view, and can be divided into a plane wave and a spherical wave according to the shape of the wavefront. A plane wave is a wave with a straight or flat wavefront, and can be artificially generated by resonance, typically like a laser beam. A spherical wave is a wave in which the wavefront forms a concentric sphere around the wavesource when the wavesource is a point in space. When a spherical wave propagates far, it can be understood as a plane wave from the point of view of the receiving end because the wavefronts are almost parallel.

Then, the desired optical signal carrying the data is delivered to the receiving end in a wireless environment, the receiving end simultaneously receives the desired optical signal, interference from other sources, and sunlight interference from the sun. The receiving end decodes data through optical filter to select the radio light used for the desired optical signal, O-to-E device that converts wireless light from the receiving end into an electrical signal, and direct detection to interpret the signal.

Figure 23:
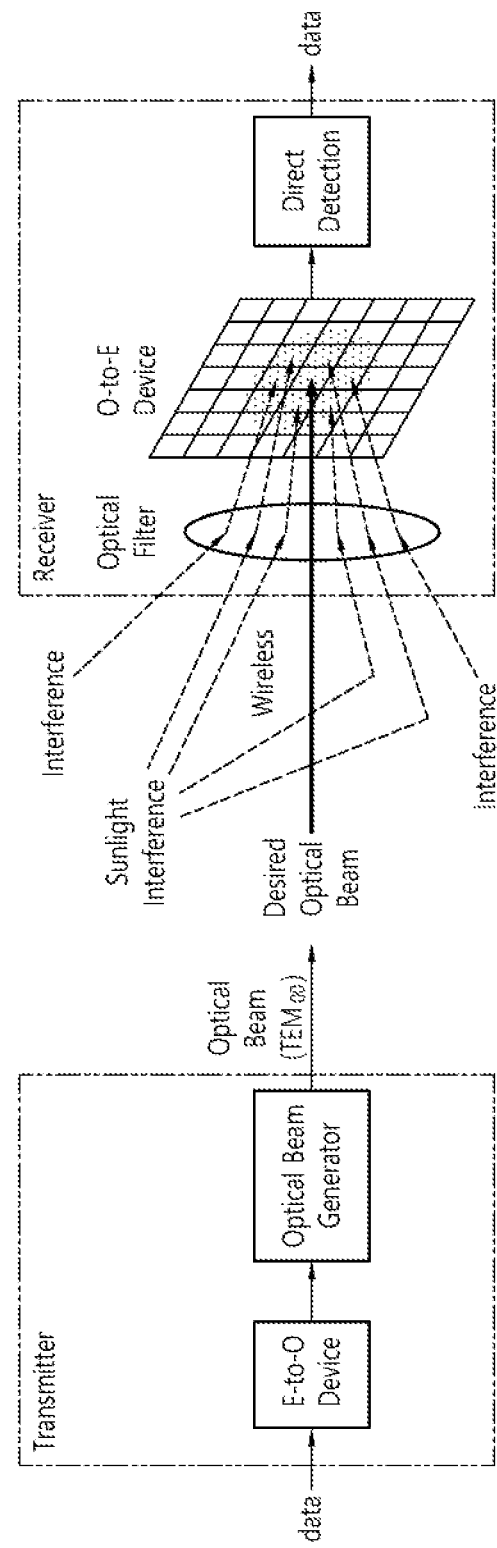
FIG. 23 schematically illustrates another example of a wireless optical communication system.

FIG. 23 schematically illustrates another example of a wireless optical communication system.

The transmitter converts the data (electrical signal) to be transmitted into a photonic source through the E-to-O device, an optical beam is generated through an optical beam generator and transmitted to a receiving end in a wireless environment, which is called wireless light.

Here, wireless light may be expressed as a beam in optics, it refers to a case composed of a Transverse Electromagnetic Field/Wave (TEM mode) corresponding to a resonant mode among transverse modes of electromagnetic radiation.

The TEM mode can be divided into indices 1 and m as TEM1m depending on the beam formation method, the basic form of TEM mode is generally a Gaussian beam, it is expressed as TEM00 and is an optical beam whose distribution of wave amplitude on a cross-section perpendicular to the optical axis is expressed as a Gaussian function.

Then, the desired optical beam carrying data is delivered to the receiving end in a wireless environment, the receiving end simultaneously receives the desired optical beam, interference from other sources, and sunlight interference from the sun. The receiving end decodes data through an optical filter for selecting wireless light used in the desired optical beam, O-to-E device that converts wireless light from the receiving end into an electrical signal, and direct detection/coherent detection to interpret signals.

Method 1. Wireless optical communication transmission and reception procedure based on Photon OAM In this method, a transmission/reception procedure of a wireless optical communication system based on photon OAM is proposed.

Tx-Rx Initial Access Based on Legacy Link

Tx (Transmitter) and Rx (Receiver) share initial information for wireless optical communication through a legacy link (e.g., LTE, LTE-A, NR, WiFi, Bluetooth, etc.). Initial information for wireless optical communication may be as follows.

Band commitment between transmitting and receiving end: frequency band (or wavelength range of light) for data/control transmission and reception Polarization Agreement Between Transmitting and Receiving Ends: Direction of Polarization for Data/Control Transmitting and Receiving For example, data/control transmission/reception may be promised only through vertical polarization for interference control.

OAM (Orbital Angular Momentum) mode appointment between transmitter and receiver: OAM mode index for data/control transmission/reception Baseband Modulation Promise between Transmitter and Receiver: Baseband Modulation Technique for Transmitting and Receiving Data/Control For example, an on/off keying (OOK) method is used as a single carrier modulation method for data modulation/demodulation, an OFDM scheme may be used as a multi-carrier scheme, this can be arranged in advance.

Tx-Rx Initial Access Based on Broadcast Message

Tx (Transmitter) and Rx (Receiver) share initial information for wireless optical communication by broadcasting a broadcast message of a prearranged form through an optical source such as broadcast messages, e.g., PBCH of LTE/LTE-A or a method corresponding to Common Control Channel. Initial information for wireless optical communication may be as follows.

Band commitment between transmitting and receiving end: frequency band (or wavelength range of light) for data/control transmission and reception Polarization Agreement Between Transmitting and Receiving Ends: Direction of Polarization for Data/Control Transmitting and Receiving For example, data/control transmission/reception may be promised only through vertical polarization for interference control.

Orbital Angular Momentum (OAM) mode appointment between transmitter and receiver: OAM mode index for data/control transmission and reception Baseband modulation promise between transmitter and receiver: Baseband modulation technique for data/control transmission/reception For example, an on/off keying (OOK) method may be used as a single carrier modulation method for data modulation/demodulation, or an OFDM method may be used as a multi-carrier method, and this may be promised in advance.

Method 2. Wireless optical communication transceiver based on photon OAM

Figure 24:
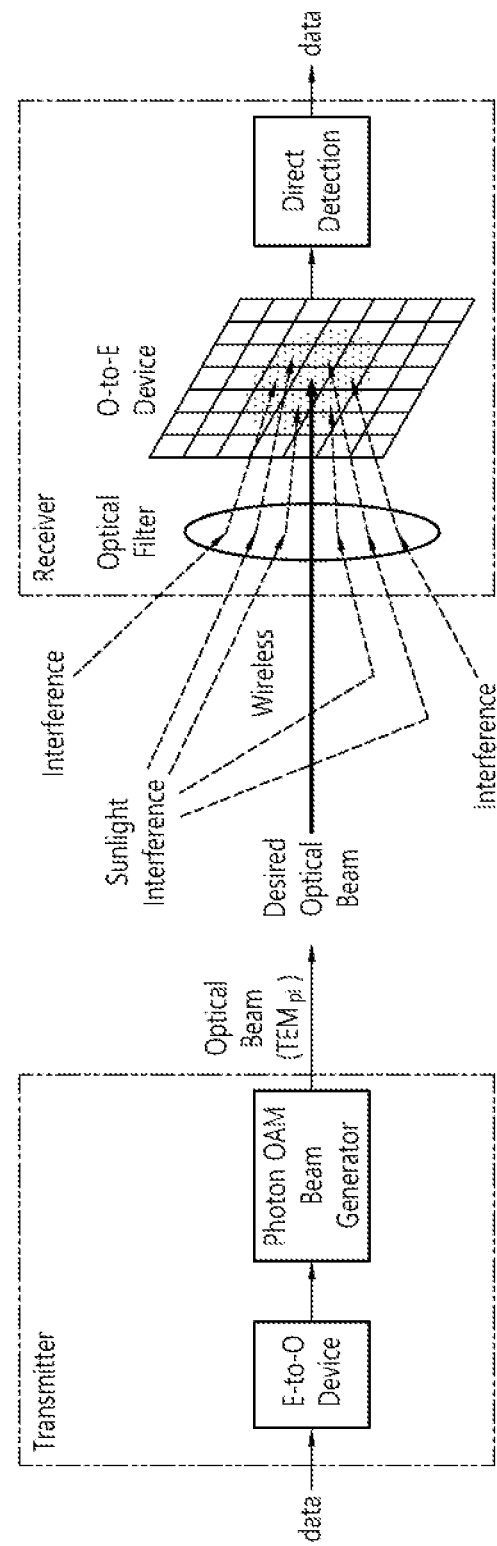
FIG. 24 schematically illustrates another example of a wireless optical communication system.

FIG. 24 schematically illustrates another example of a wireless optical communication system.

In this method, in order to minimize interference from sunlight or other sources having the same polarization and the same band as the desired optical beam, a photon OAM beam generator is used at the transmitting end, this method proposes a system using an optical filter that distinguishes between a desired OAM beam and an optical interference other than the desired OAM beam at a receiving end.

When interpreting radio light as electromagnetic waves, it can be classified into modes according to the shape of the beam, the basic form of the TEM mode is generally a Gaussian beam, expressed as TEM00, the Hermite-Gaussian (HG) mode (s) with the rectangular transverse mode pattern (s) is represented by TEMmn, Laguerre-Gaussian (LG) mode(s) with cylindrical transverse mode pattern(s) are represented by TEMp1. In this specification, the Lager-Gaussian (LG) mode(s) (TEMp1) is expressed as a photon OAM.

The transmitting end converts an electric source of data to be transmitted into an optical source to an E-to-O device. The converted optical source is converted into a photon OAM beam through a photon OAM beam generator as follows.

After passing the optical source through a resonator and converting it into a Gaussian beam (TEM00), conversion to photon OAM beam (TEMp1) through a spiral phase plate After passing the optical source through the resonator and converting it into a Gaussian beam (TEM00), it is reflected on a phase hologram having a spiral phase pattern and converted into a photon OAM beam (TEMp1)

After passing the optical source through the resonator and converting it into a Gaussian beam (TEM00), it is reflected on a phase hologram having a fork diffraction pattern and converted into a photon OAM beam (TEMp1)

After passing the optical source through the resonator and converting it into a Hermite Gaussian beam (TEMmn), it is converted into a photon OAM beam (TEMp1) by passing through a cylindrical lens (Lens) HG-LG mode converter (pi/2 mode converter)

In addition to the above method, a method for generating a photon OAM beam may vary in detail depending on an implementation method.

The optical filter of the receiving end can be subdivided as follows.

General optical filter: An optical element for receiving a band corresponding to a desired optical beam, which is defined as follows. There is also a filter that transmits at a constant transmittance regardless of wavelength, a correction filter that adjusts light intensity in a specific wavelength range, and a light contrast filter. Filters are generally classified into infrared filters, visible/ultraviolet filters, and vacuum ultraviolet filters according to the frequency range used. Filters in each area vary in materials used and structures.

Polarized Light Filter: A filter using polarization characteristics that passes only light vibrating in a specific direction in order to receive only the polarization corresponding to the desired optical beam, which can be defined as follows. Polarization mainly occurs when obliquely projected light is reflected from a uniform surface. Therefore, clear and dark images can be obtained by using a polarizing filter to block light reflected from a window or the surface of an object. The polarization filter of the camera can be adjusted by rotating the polarization direction. When a polarizing filter is used, only wavelengths vibrating in one direction remain, and auto focus (AF) cameras may not recognize light well and lose focus. A solution to this phenomenon is a circular polarization (CPL) filter.

Lens: A device for focusing a received optical/photon source to a focal point through a refraction effect.

A. Wavelength-Based Focus Control

Figure 25:
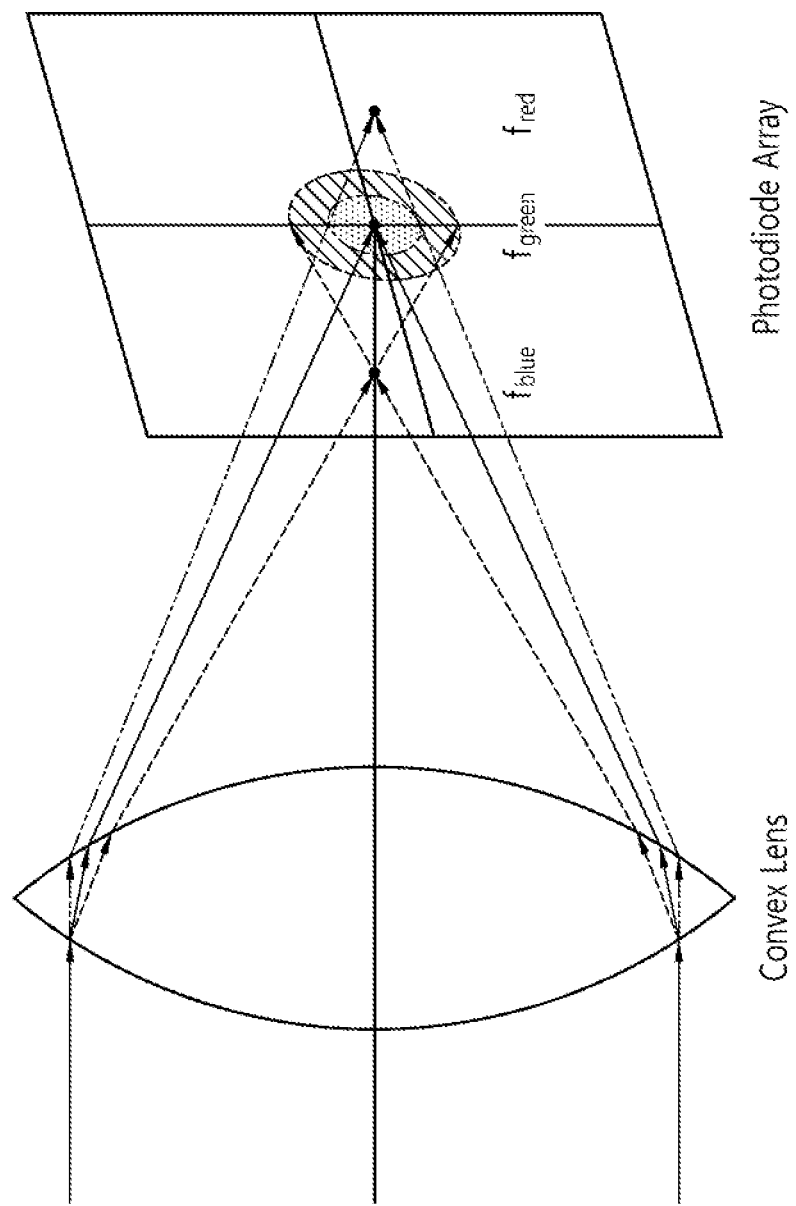
FIG. 25 schematically illustrates an example of focus control.

FIG. 25 schematically illustrates an example of focus control.

Based on the characteristics of different focal points depending on the wavelength of an optical/photon source passing through a convex lens (or a Fresnel lens), intensity concentration of an optical/photon source received by a photodiode array may be controlled.

For example, through the different characteristics of the blue light represented by a dotted line, the green light represented by a solid line, and the red light represented by a dotted line as follows, the green light causes the intensity to gather at the center of the photodiode array, the red light spreads the intensity over a larger area, the blue light can spread the intensity over a larger area.

When the focal point of the green light is f_green, the focal points of the blue light and the red light are f_blue and f_red, respectively.

Through this, reception of the green light signal can be more excellently controlled at the focal point corresponding to the green light.

The focus according to the wavelength may be controlled by controlling the thickness of the convex lens (or Fresnel lens) or the distance between the convex lens and the photodiode array.

B. OAM Mode Based Focus Control

Figure 26:
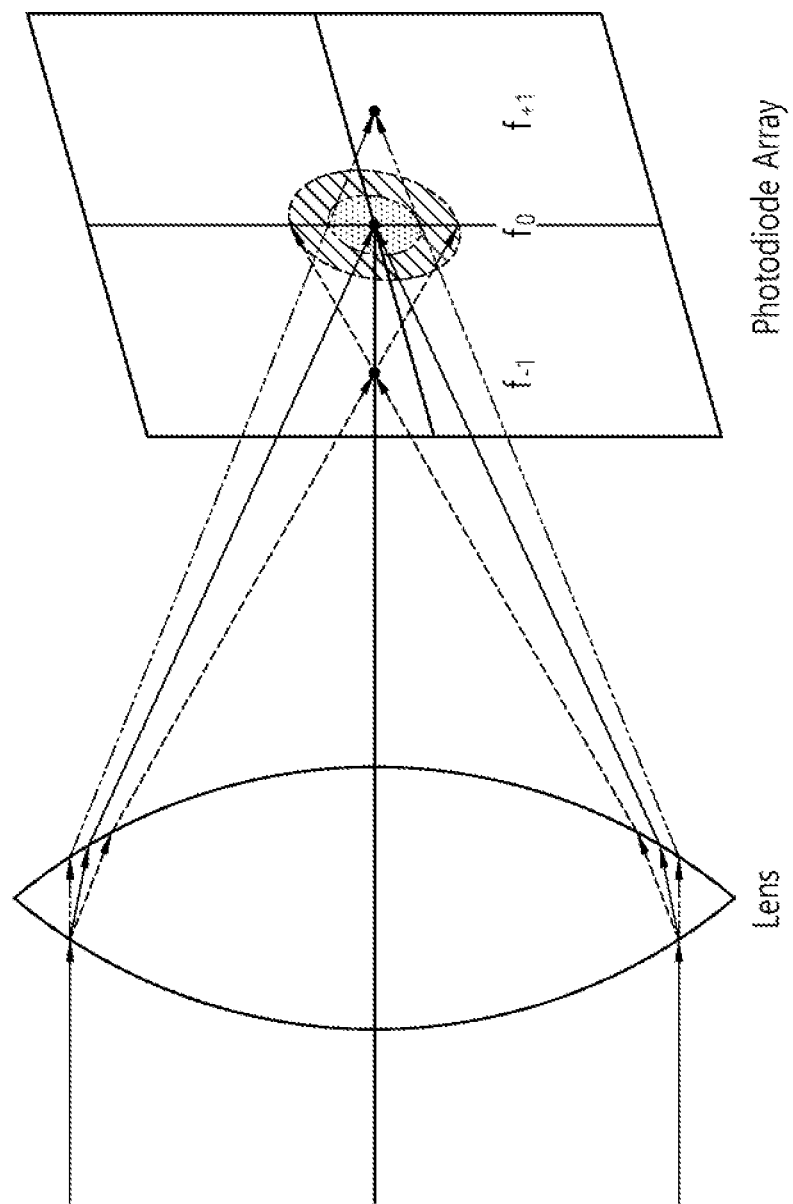
FIG. 26 schematically illustrates another example of focus control.

FIG. 26 schematically illustrates another example of focus control.

Based on the characteristics of different focal points according to the mode index of the OAM optical/photon source passing through a lens (or Fresnel lens) having an arbitrary refraction angle, the intensity concentration of the OAM mode received by the photodiode array can be controlled.

For example, as shown in the drawing, OAM mode+1 represented by a dotted line, OAM mode 0 represented by a solid line, and OAM mode −1 represented by a dotted line have different focal characteristics, OAM mode 0 causes the intensity to gather at the center of the photodiode array, OAM mode −1 spreads the intensity over a larger area, OAM mode+1 can spread the intensity over a larger area.

Assuming that the focus of OAM mode 0 is f_0, the focus for mode index m can be approximated as follows: f_m=f_0*(1+C·m), where C is the OAM dispersion coefficient and is a constant.

The focus according to the OAM mode can be controlled by controlling the thickness of an arbitrary lens (or Fresnel lens) or controlling the distance between an arbitrary lens and a photodiode array.

Figure 27:
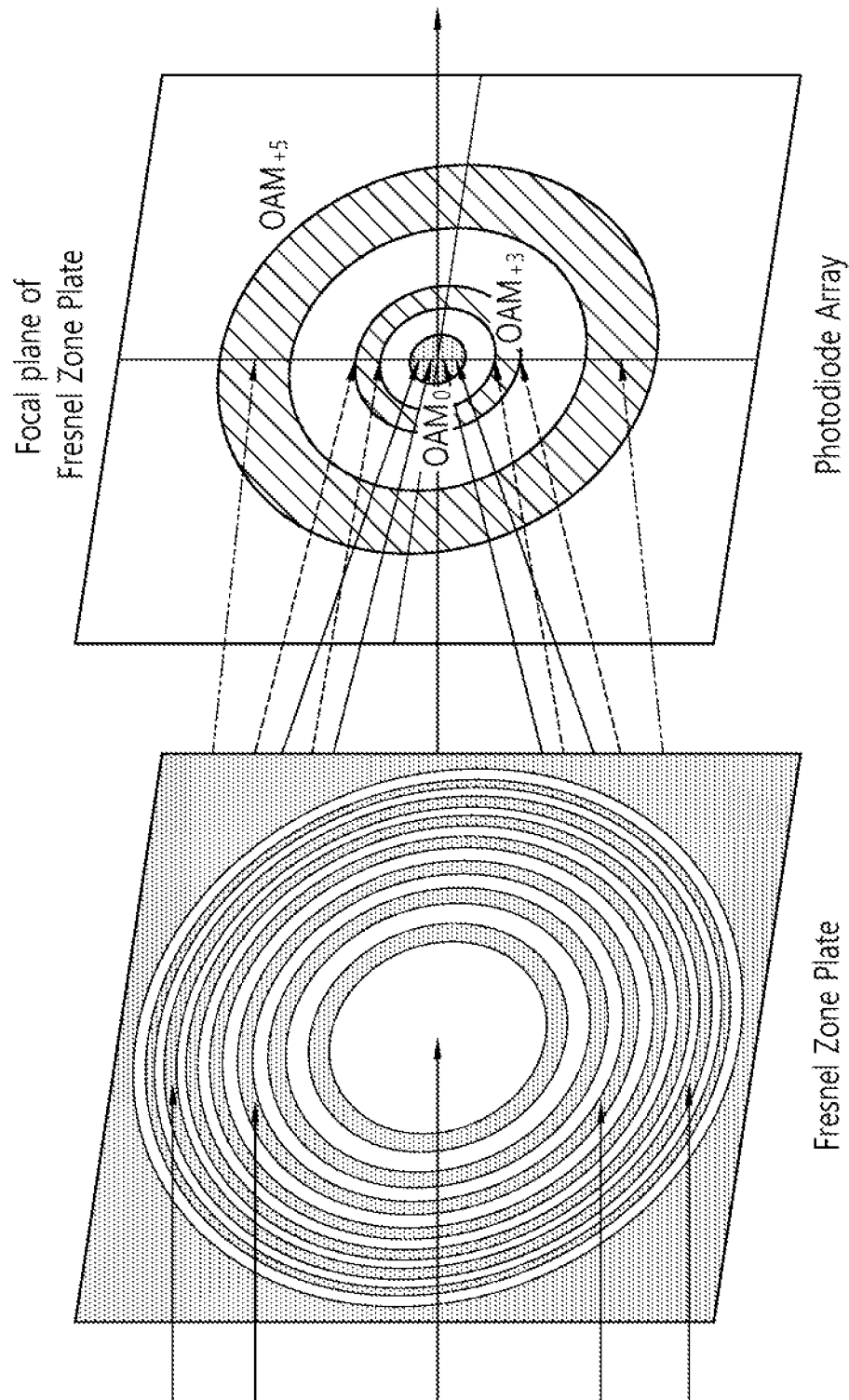
FIG. 27 schematically illustrates an example of a zone plate.

Fresnel zone plate: A device for focusing the received optical/photon source into a focus through a diffraction effect, which can be defined as follows. 'A zone plate is a device used to focus light or other things exhibiting wave character. Unlike lenses or curved mirrors however, zone plates use diffraction instead of refraction or reflection. A zone plate consists of a set of radially symmetric rings, known as Fresnel zones, which alternate between opaque and transparent. Light hitting the zone plate will diffract around the opaque zones. The zones can be spaced so that the diffracted light constructively interferes at the desired focus, creating an image there.'—Zone Plate FIG. 27 schematically illustrates an example of a zone plate.

Based on the wave characteristics of the optical/photon source passing through the Fresnel zone plate or the different intensity distribution in the focal plane according to the OAM mode index, intensity distribution of optical/photon sources received by the photodiode array may be controlled.

If the optical/photon source passing through the Fresnel zone plate is in the form of plane wave light, i.e. natural light (e.g. sunlight) or polarized light (e.g., linear polarization or circular polarization), the intensity of the light source is concentrated at the center of the photodiode array located on the focal plane of the photon sieve.

In case the optical/photon source passing through the Fresnel zone plate is plane wave light and Gaussian beam, intensities are distributed in a Gaussian distribution based on the center of the photodiode array located on the focal plane of the photon sieve.

In the case of an LG beam whose optical/photon source passing through a Fresnel zone plate is helical wave light, based on the center of the photodiode array located on the focal plane of the photon sieve, the characteristics of the OAM state are maintained so that the intensities are distributed in a ring shape.

For example, as shown in the figure, OAM mode 0 represented by a solid line, OAM mode+3 represented by a dotted line, and OAM mode+5 represented by a dotted line have different intensity distributions through characteristics, OAM mode 0 causes intensities to gather in a Gaussian distribution at the center of the photodiode array, OAM mode+3 spreads the intensity in a ring shape over a larger area, OAM mode+5 can spread the intensity in the form of a ring over a larger area.

At this time, in the case of general plane wave light, that is, natural light (e.g., sunlight) or polarization (e.g., linear polarization or circular polarization), the intensity is concentrated in a very small area in the center of the photodiode array. This area has a smaller area than the area where the intensity is distributed in a Gaussian distribution at the center of the photodiode array of OAM mode 0.

Through control of the pattern according to the ring configuration of the Fresnel zone plate or control of the distance between the Fresnel zone plate and the photodiode array, intensity distribution of optical/photon sources received by the photodiode array may be controlled.

Figure 28:
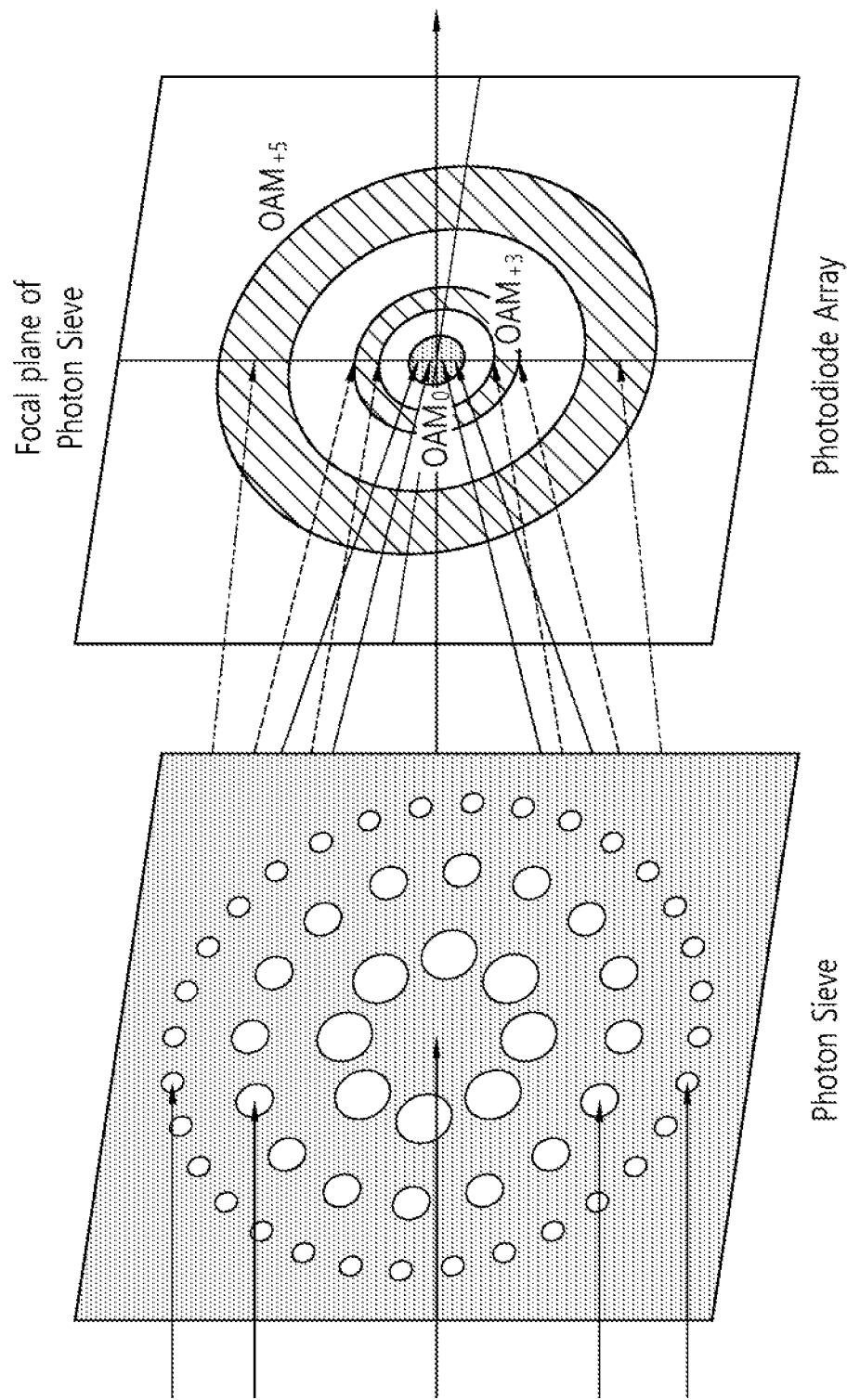
FIG. 28 schematically shows an example of a photon sieve.

Photon sieve: A device for focusing a received optical/photon source into a focus through a diffraction effect, which can be defined as follows. 'A photon sieve is a device for focusing light using diffraction and interference. It consists of a flat sheet of material full of pinholes that are arranged in a pattern which is similar to the rings in a Fresnel zone plate, but a sieve brings light to much sharper focus than a zone plate. The sieve concept is versatile because the characteristics of the focusing behavior can be altered to suit the application by manufacturing a sieve containing holes of several different sizes and different arrangement of the pattern of holes.'—Photon Sieve FIG. 28 schematically shows an example of a photon sieve.

Based on the wave characteristics of the optical/photon source passing through the photon sieve or the characteristics of different intensity distributions in the focal plane according to the OAM mode index, intensity distribution of optical/photon sources received by the photodiode array may be controlled.

When the optical/photon source passing through the photon sieve is in the form of plane wave light, that is, natural light (e.g., sunlight) or polarization (e.g., linear polarization or circular polarization), the intensity of the light source is concentrated at the center of the photodiode array located on the focal plane of the photon sieve.

In the case of a Gaussian beam while the optical/photon source passing through the photon sieve is plain wave light, intensities are distributed in a Gaussian distribution based on the center of the photodiode array located on the focal plane of the photon sieve.

In the case of an LG beam whose optical/photon source passing through a photon sieve is spiral wave light, based on the center of the photodiode array located on the focal plane of the photon sieve, the characteristics of the OAM state are maintained so that the intensities are distributed in a ring shape.

For example, as shown in the figure, OAM mode 0 represented by a solid line, OAM mode+3 represented by a dotted line, and OAM mode+5 represented by a dotted line have different intensity distributions through characteristics, OAM mode 0 causes intensities to gather in a Gaussian distribution at the center of the photodiode array, OAM mode+3 spreads the intensity in a ring shape over a larger area, OAM mode+5 can spread the intensity in the form of a ring over a larger area.

At this time, in the case of general plane wave light, that is, natural light (e.g., sunlight) or polarization (e.g., linear polarization or circular polarization), the intensity is concentrated in a very small area in the center of the photodiode array. This area has a smaller area than the area where the intensity is distributed in a Gaussian distribution at the center of the photodiode array of OAM mode 0.

Through control of the pattern according to the pinhole configuration of the photon sieve or control of the distance between the photon sieve and the photodiode array intensity distribution of optical/photon sources received by the photodiode array may be controlled.

Phase (Pattern) Mask: Through the diffraction effect of the received optical/photon source, it consists of an optical element as a device for controlling the direction of propagation according to the characteristics of the source.

Figure 29:
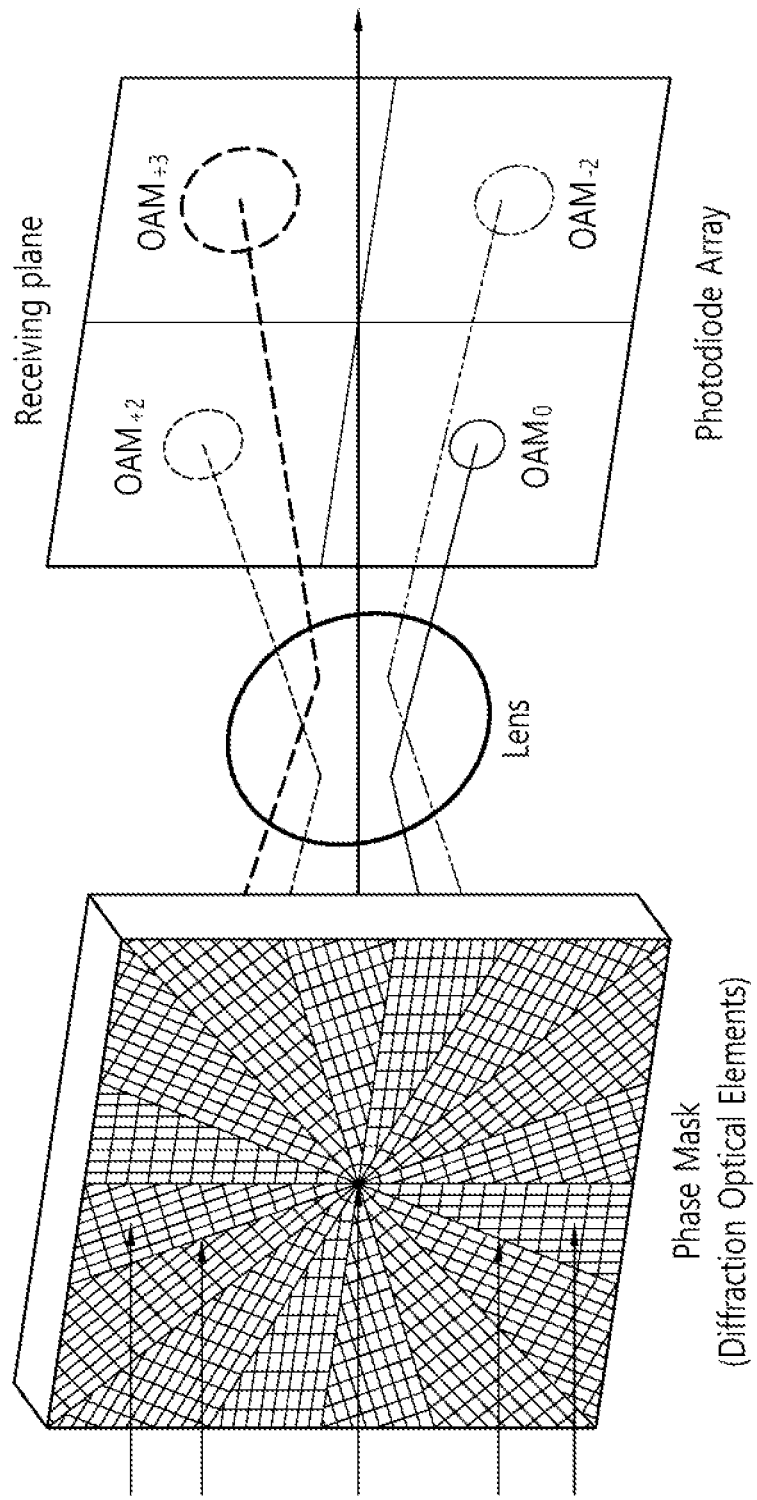
FIG. 29 schematically illustrates an example of a phase mask.

FIG. 29 schematically illustrates an example of a phase mask.

Based on the wave characteristics of the optical/photon source passing through the phase (pattern) mask or the propagation direction change characteristics of the beam according to the OAM mode index, intensity distribution positions of optical/photon sources received by the photodiode array may be controlled.

For example, the intensity distribution position of may be different as OAM mode 0 indicated by solid lines as shown in the drawing, OAM mode+2, represented by a dotted line, OAM mode −2 represented by dashed dotted line, OAM mode+3 represented by a small dotted line.

At this time, in the case of general plane wave light, that is, natural light (e.g., sunlight) or polarization (e.g., linear polarization or circular polarization), since the phase characteristics are the same as those of the plane wave of OAM mode 0, the intensity may be distributed in the third quadrant of the receiving plane where the intensity distribution of OAM mode 0 is located.

At this time, the lens serves to focus the optical/photon source that has passed through the phase (pattern) mask on the receiving plane.

Through control of the phase element(s) of the phase (pattern) mask or control of the distance between the phase (pattern) mask and the photodiode array, the phase (pattern) mask and the lens, and the lens and the photodiode array, the position of the intensity distribution of the optical/photon source received by the photodiode array can be controlled.

Two or more optical filters may be used at the same time in order to obtain the above-listed optical filters in a complex manner. For example, after receiving a specific wavelength with a general optical filter for controlling the received wavelength, through a polarization filter, target polarization is received, plane wave and spiral wave modes can be distinguished according to light wave characteristics through a photon sieve.

Meanwhile, wireless light has beam divergence according to characteristics of an optical/photon source.

Divergence angle of Gaussian beam (Far-field case)

Figure 30:
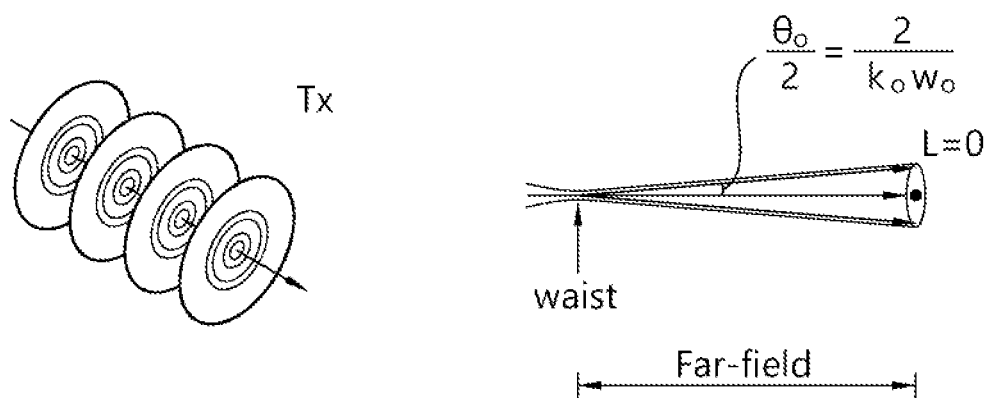
FIG. 30 schematically illustrates an example of a divergence angle in a far field case.

FIG. 30 schematically illustrates an example of a divergence angle in afar field case.

$$\frac{\theta_o}{2} = \frac{2}{k_o w_o} = \frac{\lambda}{\pi w}$$

Here, k0 is a wave vector and is 2pi/lambda, and w0 is a minimum beam waist and is different depending on a beam forming method.

For example, when M2=1 by optimally designing the M2 factor during beam formation,
When waist=658 um, wavelength=700 nm, angle=338.6 urad (0.0194 degree)
When waist=375 um, wavelength=400 nm, angle=338.6 urad (0.0194 degree)
Then, at Distance=10 n, beam Radius=3.4 mm.

Divergence Angle of LG Beam (Far-Field Case)

Figure 31:
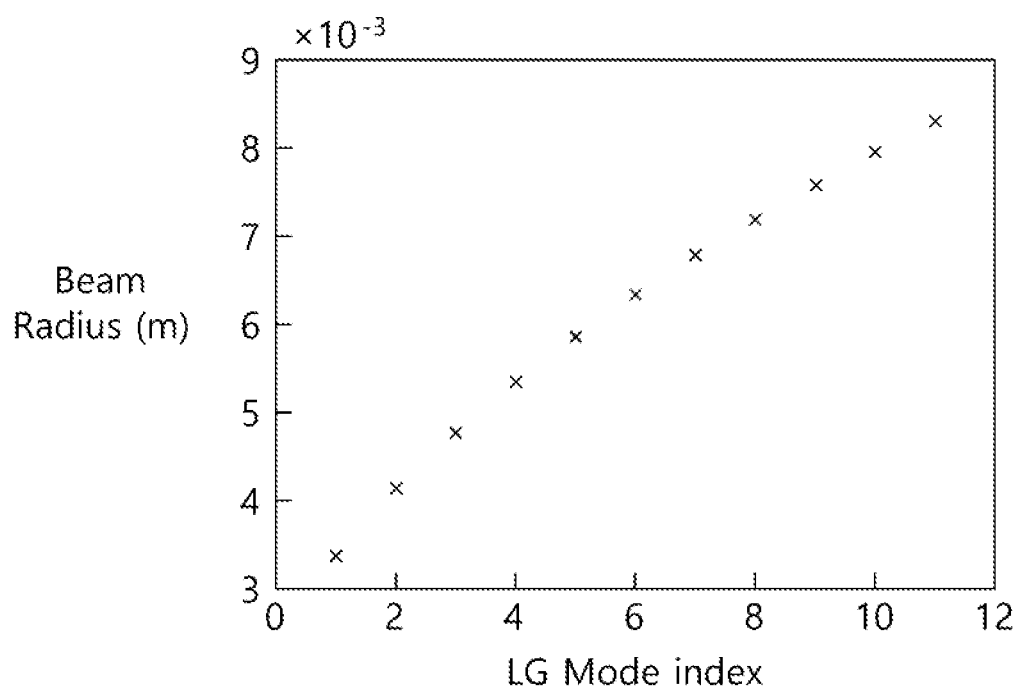
FIGS. 31 and 32 schematically show another example of a divergence angle in a far field case.
Figure 32:
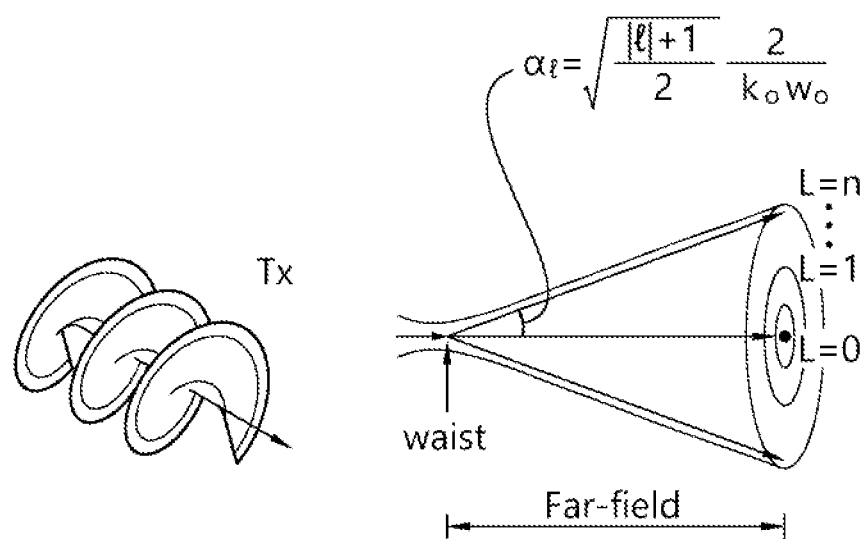

FIGS. 31 and 32 schematically show another example of a divergence angle in a far field case.

If w0 is fixed, $$\alpha_l = \sqrt{\frac{|l|+1}{2}} \frac{2}{k_0 w_0}$$

If r_rms(0) is fixed, $$\alpha_l = \frac{|l|+1}{k_0 r_{rms}(0)}$$

where k0 is a wave vector and is 2pi/lambda, and w0 is a minimum beam waist and depends on the beam forming method, $$r_{rms}(0) = \sqrt{\frac{|l|+1}{2}} w_0.$$

For example, when M2=1 by optimally designing the M2 factor during beam formation, Depending on |l|, it is possible to have a beam radius as shown in the drawing at a distance=10 m.

Meanwhile, in the case of the OAM beam, the beam radius is different according to the OAM order l. In addition, the beam size of the receiving unit is different according to the distance between the transmitting and receiving terminals. In addition, the phase characteristics of the received wavefront are different according to the OAM order l. For example, as shown in the following figure, a phase difference occurs for an E-field according to an OAM order (=mode).

Figure 33:
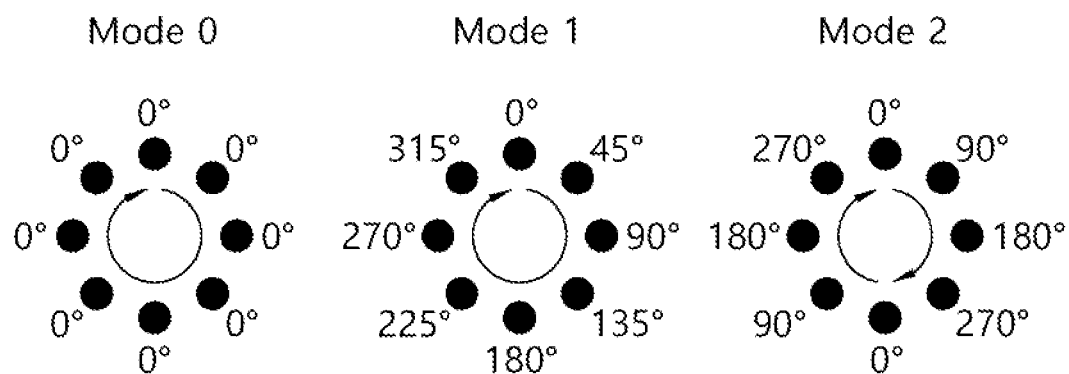
FIG. 33 schematically illustrates an example of a phase difference according to modes.

FIG. 33 schematically illustrates an example of a phase difference according to modes.

Here, the phase is a change over time in the traveling direction of the light source when the E-field is expressed as a sine wave.

Figure 34:
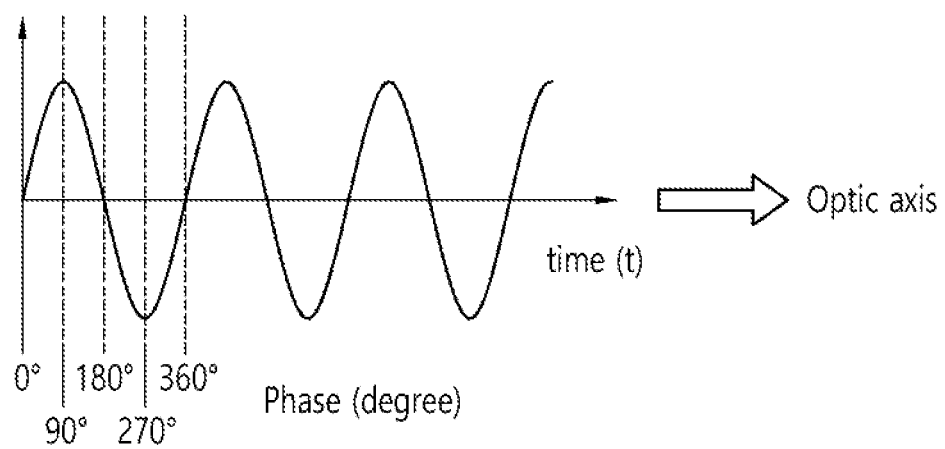
FIG. 34 schematically shows an example of oscillation of the E-field.

FIG. 34 schematically shows an example of oscillation of the E-field.

When the y-axis in the above figure means the direction of vibration of the E-field, if the vibration of the E-field is drawn over time, it can be expressed as the above graph. In the above graph, the graph of the vibration of the E-field over time is the same as the moving direction of light (=optic axis), and can represent a phase change over time. The change of the phase is determined by the wavelength λ corresponding to one cycle, time t is a unit for the time light travels, and is the time t=λ/c (c=2.99792458*10^8 m/s, the speed of light) to travel a distance of one wavelength.

Accordingly, for properties having different phase characteristics of wavefronts received according to the OAM order 1, the receiving end must perform coherent combining while performing phase compensation. In addition, the reception/decoding performance can be increased by the design of the receiving end.

In the above-mentioned wireless optical communication system, beam divergence can be controlled by optical characteristics of a signal source. In the case of a wireless optical communication system, a very small beam width can be expected, unlike RF communication of LTE or NR. In a mobile OWC system environment that considers mobility, unlike OWC in a fixed point environment, fixed beams cannot be used, so a beam steering and tracking technology for a predefined cell area is required.

Figure 35:
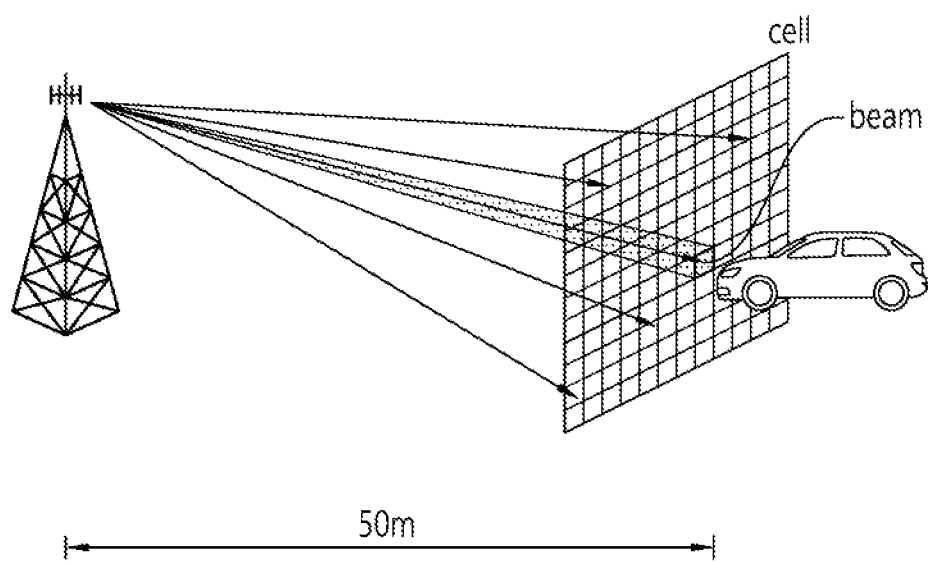
FIG. 35 schematically illustrates an example of a pencil beam according to an example of the present specification.

FIG. 35 schematically illustrates an example of a pencil beam according to an example of the present specification.

For example, if the distance between the transmitter and the receiver is 50m, assuming that a fine beam (pencil beam) with a half angle of beam divergence of about 100 microradians (beam waist is about 5 mm) is transmitted, the expected receiving end beam diameter is 5 mm to 3.5 cm. For example, as shown in the drawing, for a 1m×1m cell area near the location of the receiving end, considering an aperture of 1 cm^2, there are 10,000 beams.

As described above, in a system utilizing pencil beams (e.g., mobile OWC, Terahertz Communication, etc.), a large number of Tx/Rx beams may exist in a single cell. In order to form a link between Tx and Rx, a beam tracking procedure for ensuring beam alignment is required for an initial access step or maintenance of a link connection.

When the number of beams is very large, a very long beam search time is required to check the degree of alignment of each beam. In the case of performing a beam search through an SSB block in 3GPP NR, a symbol level beam search may be performed through the number of symbols equal to the number of beams.

According to the above example, a beam search must be performed for a time of 10,000 symbols, resulting in a very large resource loss. The multi-stage beam search method, which first searches for a broad beam and then finds a narrow beam within the beam, requires hand shaking between Tx and Rx, a delay according to handshaking is required. That is, in a system using pencil beams, a method for solving resource loss and delay due to the large number of beams is required.

In addition, by utilizing a phased array antenna based on a phase shifter, in the beam steering method, a beam steering resolution is determined according to a quantized level of a phase shifter to be used. That is, in the case of a system using a pencil beam, since the beam width is very narrow and the phase must be finely adjusted, it may be difficult to satisfy the demand. In addition, the phase shifter-based method has disadvantages in terms of size and cost because a phase shifter must be installed for each antenna, and a heating problem may also occur. Therefore, an alternative method capable of solving the disadvantages of a method using multiple phase shifters is required.

This specification relates to an optical wireless communication (OWC) system. Specifically, it relates to a device for rapidly rotating the direction of a signal beam in a wireless optical communication system. This specification includes an antenna design based on a frequency progressive metasurface.

Hereinafter, for a better understanding of the examples of the present specification, the disclosure of the present specification will be described through drawings. The following drawings are made to explain a specific example of the present specification. Since the names of specific devices or names of specific signals/messages/fields described in the drawings are provided as examples, the technical features of the present specification are not limited to the specific names used in the drawings below.

Figure 36:
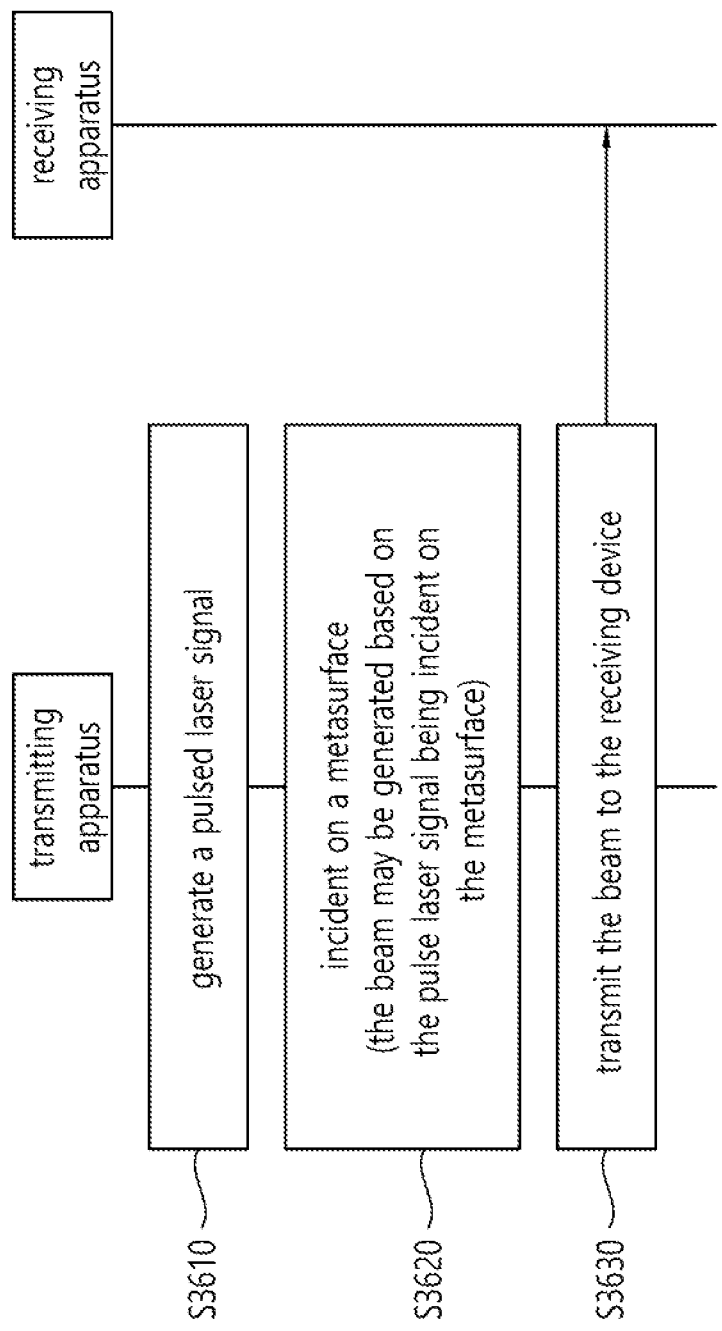
FIG. 36 is a flowchart of a method of transmitting a beam to a receiving device according to an embodiment of the present specification.

FIG. 36 is a flowchart of a method of transmitting a beam to a receiving device according to an embodiment of the present specification.

According to FIG. 36, the device may generate a pulsed laser signal (S3610).

The device may make the pulse laser signal incident on a metasurface (S3620). Here, the beam may be generated based on the pulse laser signal being incident on the metasurface. A more specific example of this will be described later.

As an example, the metasurface is determined based on $\omega\_0$, d, $\Delta\omega$ and N, $\omega\_0$ is a value for the center frequency, the d is a value for the virtual antenna spacing, $\Delta\omega$ is a value for the interval of a frequency comb, and the N may be a value related to the number of frequency combs existing within a gain bandwidth based on the center frequency. A more specific example of this will be described later.

The device may transmit the beam to the receiving device (S3630). A more specific example of this will be described later.

For example, the metaphase may include a substrate and at least one nano pin, and the at least one nano pin may be coupled to one surface of the substrate. For example, the length of the at least one nanofin, the width of the at least one nanofin, the height of the at least one nanofin, and the relative angle between the at least one nanofin and the substrate may be configured based on the $\omega\_0$, the d, the $\Delta\omega$, and the N.

For example, the beam may be focused for each wavelength.

For example, the direction of the beam may change over time.

As an example, the device may include a laser source generating the pulsed laser signal and the metasurface.

For example, the device further includes at least one phase shifter, when the pulsed laser signal is incident on the metasurface, the pulsed laser signal passes through the at least one phase shifter, and the at least one phase shifter may change an incident angle of the pulse laser signal incident on the metasurface. For example, the device further includes a beam splitter, the at least one phase shifter is composed of a first phase shifter and a second phase shifter, the pulse laser signal passes through the beam splitter and is divided into a first pulse laser signal and a second pulse laser signal, the first pulse laser signal passes through the first phase shifter, the second pulsed laser signal may pass through the second phase shifter. For example, the first pulse laser signal passes through the first phase shifter and is incident to the metaphase, the incident angle of the first pulse laser signal to the metaphase is the x-axis, the second pulse laser signal passes through the second phase shifter and is incident to the metaphase, an incident angle of the second pulse laser signal to the metaphase may be a y-axis.

Meanwhile, the device in FIG. 36 may mean a device in a wireless communication system (of course, the embodiment of the present specification does not exclude an example in a wired communication system from the scope of rights). In addition, the device in FIG. 36 may correspond to the previously described (and described later) terminal, and the device in FIG. 36 may correspond to the previously described (and described later) base station.

Hereinafter, for the understanding of FIG. 36, the proposal in this specification will be described in more detail.

In this specification, a method of designing a transmitter device using a metasurface as a transmission antenna in wireless optical communication is proposed.

1. Frequency Gradient Metasurface

First, the operating principle and design structure of the frequency gradient metasurface designed in this specification will be described.

1.1. Features of the Metasurface

A metasurface is a device that changes the wavelength, phase, polarization, and amplitude of an incident signal through the interaction (scattering, absorption, luminescence, heat generation) of an arbitrary microstructure (Meta Building Block, MBB) composed of a 2D dense array structure and incident electromagnetic waves. At this time, the spacing and size of each microstructure is smaller than the wavelength of the incident electromagnetic wave. Each microstructure can be divided into a passive structure whose function is determined in a process step and an active structure whose function changes according to the method or degree of application of an electric field even after the process.

1.2. Diffraction Grating (Meta Grating)

Figure 37:
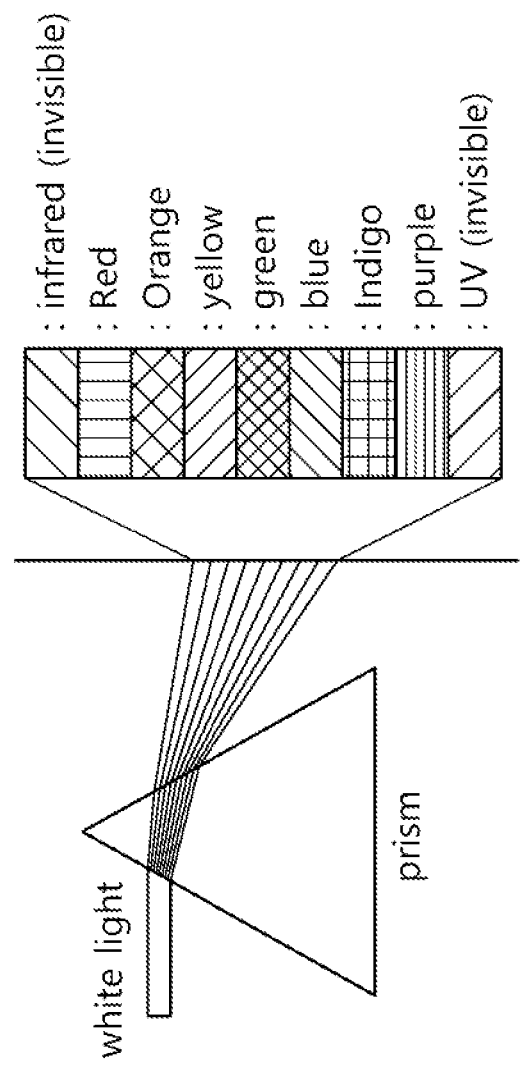
FIG. 37 schematically illustrates an example of a diffraction grating.

FIG. 37 schematically illustrates an example of a diffraction grating.

A diffraction grating is a device that separates incident electromagnetic waves according to wavelengths like a prism. When signals of various wavelengths are superimposed on the incident electromagnetic wave, due to the difference in refractive index of each wavelength, the shorter the wavelength, the higher the refractive index. The longer the wavelength, the lower the refractive index. As a result, after the components of the incident electromagnetic wave pass through the diffraction grating, the radiation directions are different for each wavelength.

Figure 38:
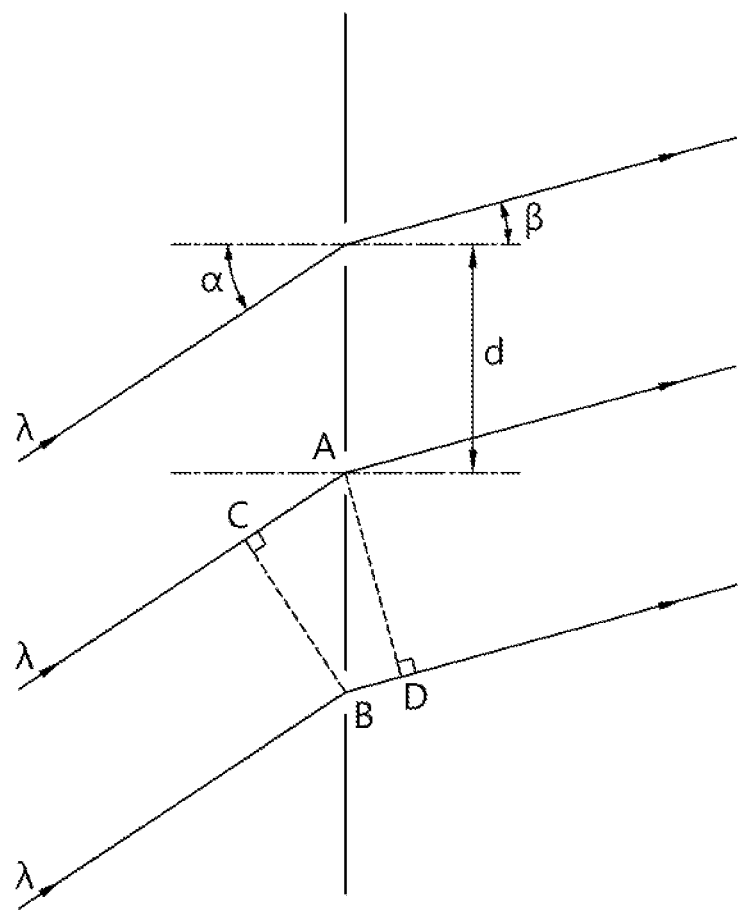
FIGS. 38 and 39 schematically illustrate an example of controlling an incident angle and a reflection angle according to a wavelength.
Figure 39:
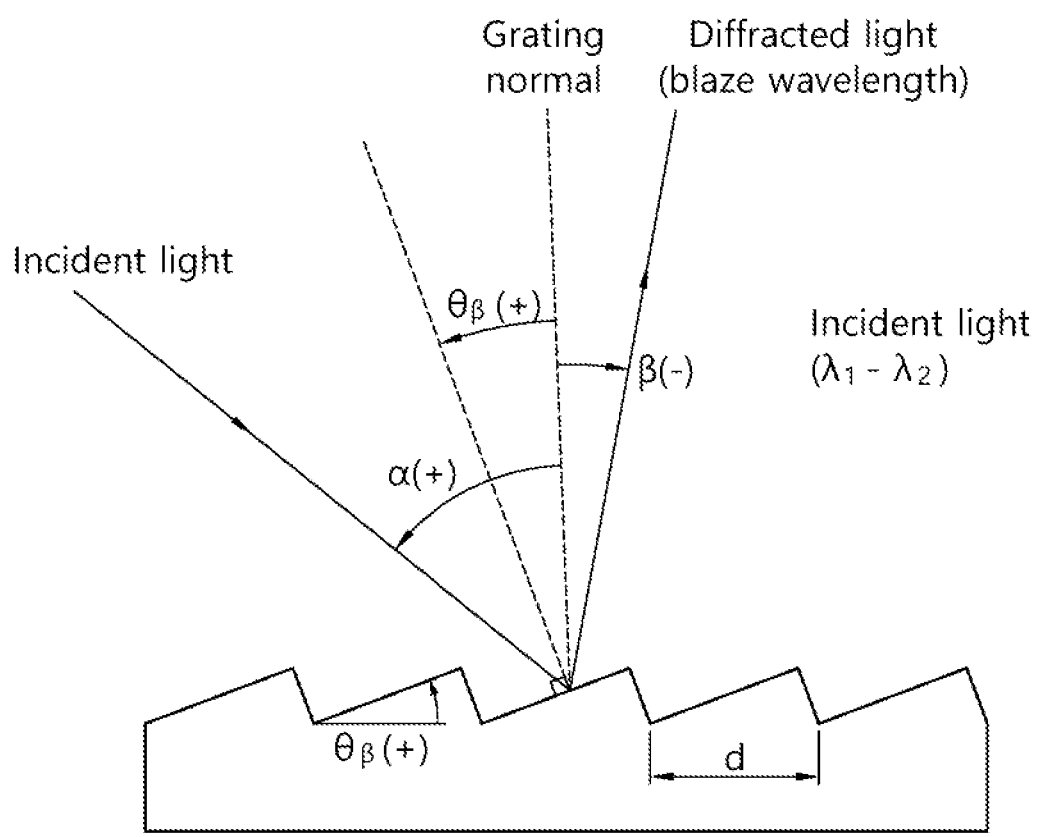

FIGS. 38 and 39 schematically illustrate an example of controlling an incident angle and a reflection angle according to a wavelength.

In the case of a slit-based diffraction grating, the angle of incidence and reflection can be controlled according to the wavelength, either slit-based (left) or blaze-based (right). Grating Equation: $d(\sin\alpha - \sin\beta) = m\lambda$, $d(\sin\alpha + \sin\beta) = m\lambda$ follow. Here, d: Spacing between the slits (Grating period), m: Order of diffraction (m=0, ±1, ±2, . . . ), λ: wavelength.

Blaze-based diffraction gratings can be designed to collect energy in a specific order/wavelength. It can be controlled by designing the blaze angle and blaze wavelength. Meta Grating refers to a metasurface that functions as a diffraction grating. It can be implemented on a slit-based or blaze-based basis.

1.3. Meta Lens

Among the optical elements, the half-wave plate (HWP) is a birefringent material and has different refractive indices along two polarization axes. Assume that among the two polarization axes, the x-axis is a fast axis (f) and the y-axis is a slow axis (s). At this time, when the beams aligned along the x-axis pass through the HWP, the beams aligned along the y-axis pass faster by a phase π than when the beams aligned along the y-axis pass through the HWP.

Figure 40:
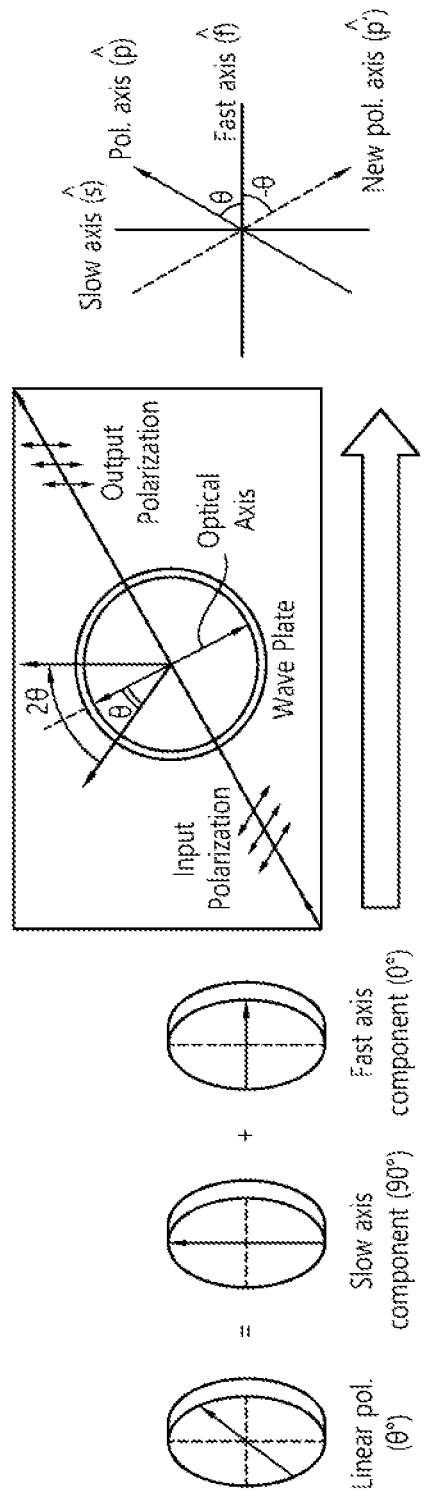
FIG. 40 schematically illustrates an example of a HWP material.

FIG. 40 schematically illustrates an example of a HWP material.

For example, when a linear polarized beam having a direction of p passes through the HWP, p may be expressed as the sum of the f component and the s component.

Since the f component passes faster than the s component by a phase of π, the E-field is analyzed as follows.

E-field before passing $HWP: E e^{i(kz-wt)} = E\hat{p} e^{i(kz-wt)} = E(\cos\theta \hat{f} + \sin\theta \hat{s}) e^{i(kz-wt)}$ E-field after passing through the $HWP$: When the slow component is multiplied by the delay component as much as $e^{i\pi}$, $E(\cos\theta\hat{f} - \sin\theta\hat{s}) e^{i(kz-wt)} = E[\cos(-\theta)\hat{f} + \sin(-\theta)\hat{s}] e^{i(kz-wt)}$ That is, when the linear polarization direction of the beam incident on the HWP is different from the fast axis by θ, the phase of the passing beam is shifted by 2θ. Based on the above concept, a meta lens can be configured by configuring a geometric phase by adjusting the orientation of the wave plate to adjust the incident beam and the phase θ of the fast axis. For example, geometric phase-based focus control is possible as follows.

Figure 41:
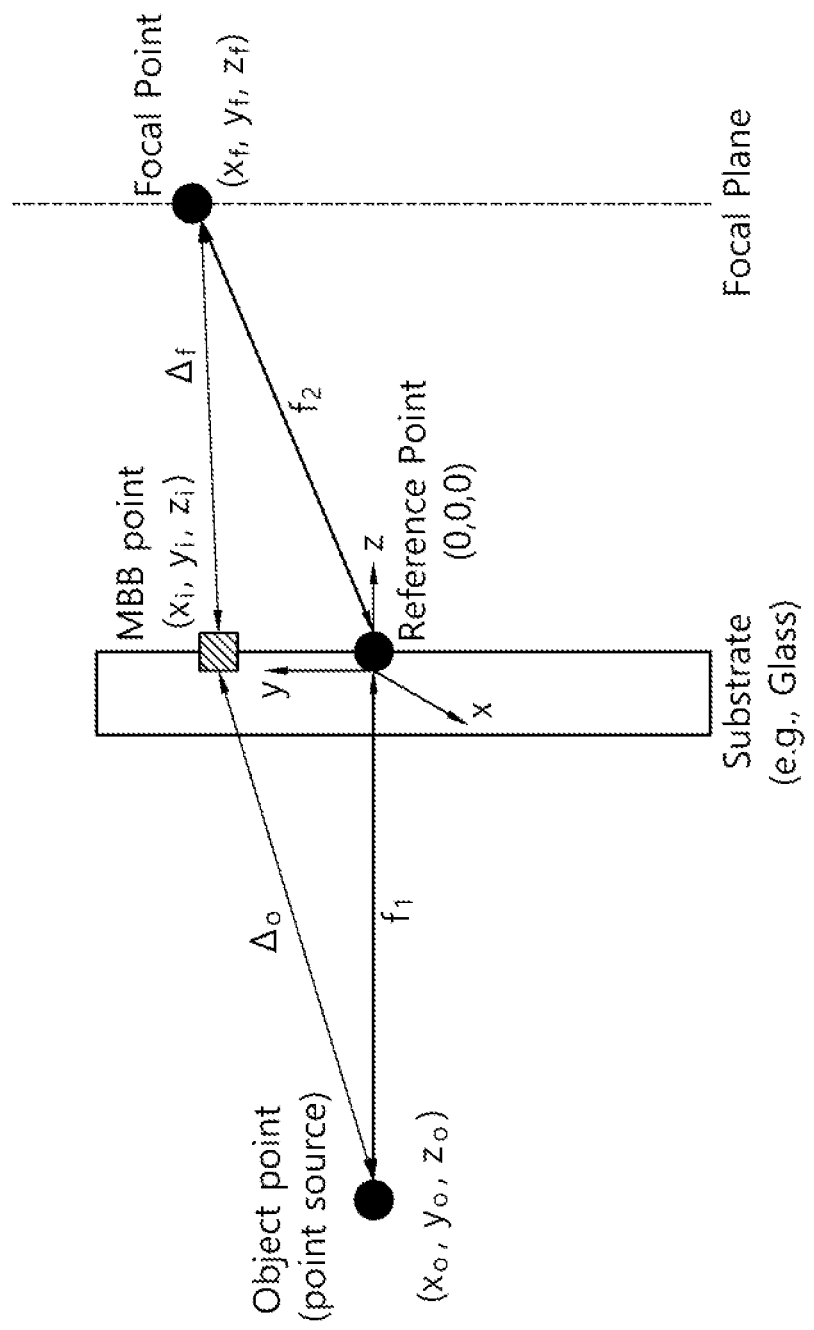
FIG. 41 schematically shows an example of focus control.

FIG. 41 schematically shows an example of focus control.

As described above, when a point source, which is a light source, is radiated toward a substrate from an object point where a signal is generated, the signal passes through the substrate and reaches a focal point. At this time, when it is assumed that a signal passes through a reference point, which is a reference point in a three-dimensional space, it can be expressed as a reference path f=f1+f2 through which a signal passes.

Here, $f1 = \sqrt{x_o^2 + y_o^2 + z_o^2}$ and $f2 = \sqrt{x_f^2 + y_f^2 + z_f^2}$. In the same way, a path through which a signal passes through an ith microstructure made of a dielectric or a conductor and the like proceeds to the focal point can be expressed as $\Delta\_o + \Delta\_f$.

where $\Delta\_o = \sqrt{(x_i - x_o)^2 + (y_i - y_o)^2 + (z_i - z_o)^2}$, $\Delta\_f = \sqrt{(x_i - x_f)^2 + (y_i - y_f)^2 + (z_i - z_f)^2}$. Then, the phase difference between the signal passing through the i-th fine structure and the signal passing through the reference point at the focus is caused by the difference in movement path, it can be expressed as $\varphi\_d(x\_i, y\_i, z\_i) = (2\pi/\lambda\_0) * (\Delta\_o + \Delta\_f - f)$. At this time, based on the operating principle of the wave plate, it is possible to compensate for the phase difference caused by the difference in movement path through the direction of the microstructure.

Figure 42:
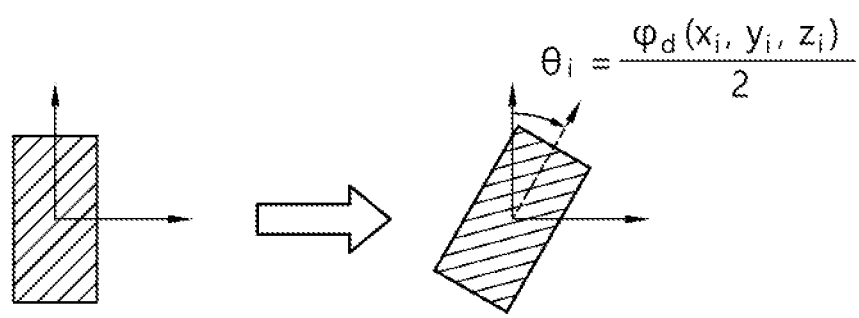
FIG. 42 schematically illustrates an example of phase difference compensation.

FIG. 42 schematically illustrates an example of phase difference compensation.

For example, by setting the orientation of the microstructure to be $\theta\_i = (\varphi\_d(x\_i, y\_i, z\_i))/2$ and compensating for the phase difference at the focus, a phase difference between the reference path and the path passing through the ith microstructure can be eliminated.

Figure 43:
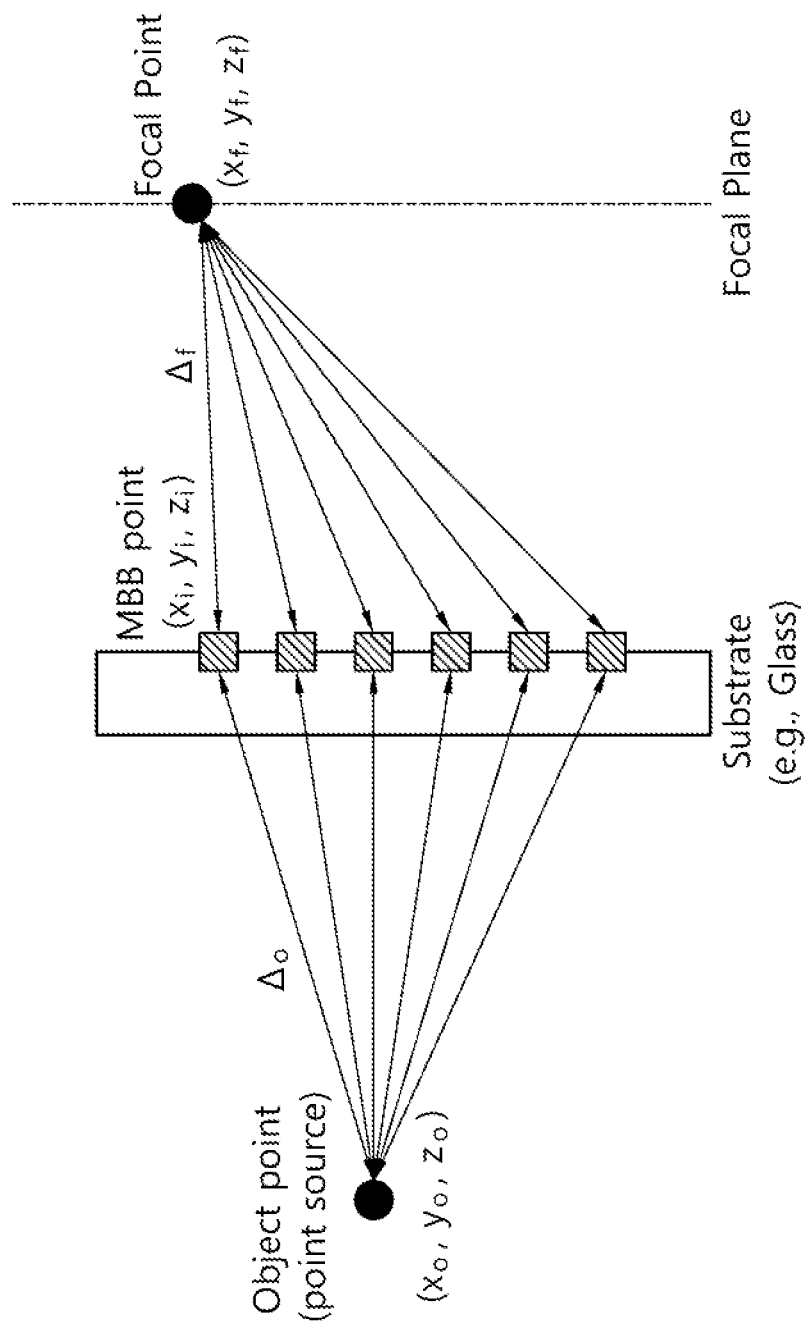
FIG. 43 schematically illustrates an example of a meta lens.

FIG. 43 schematically illustrates an example of a meta lens.

If a metasurface is constructed by applying this process to all microstructures, a metalens can be constructed.

By adjusting the directions (eg, rotation angles) of all microstructures through the above method, it is possible to control the focus of signals in three dimensions.

1.4. Frequency Gradient Array Antenna

Figure 44:
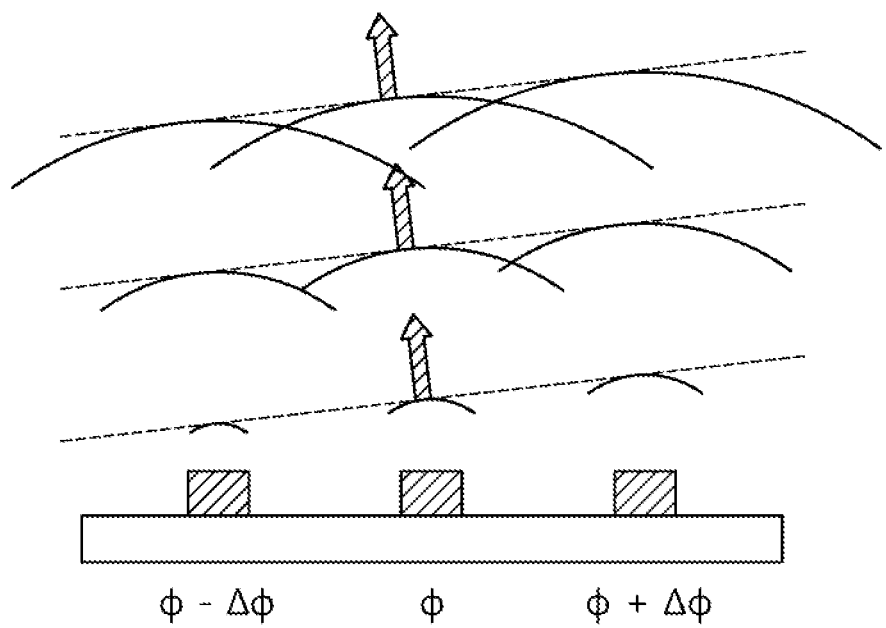
FIG. 44 schematically illustrates an example of a phased array antenna.

FIG. 44 schematically illustrates an example of a phased array antenna.

Phased array antennas generally used for beamforming have different phases of signals emitted from each antenna element, the phase determines the direction in which the signals overlap and cause constructive interference due to the difference in emission times of the signals. For example, when a phase difference of $\Delta\Phi$ exists between antennas, the beam direction of the radiated signal is formed by the difference.

Figure 45:
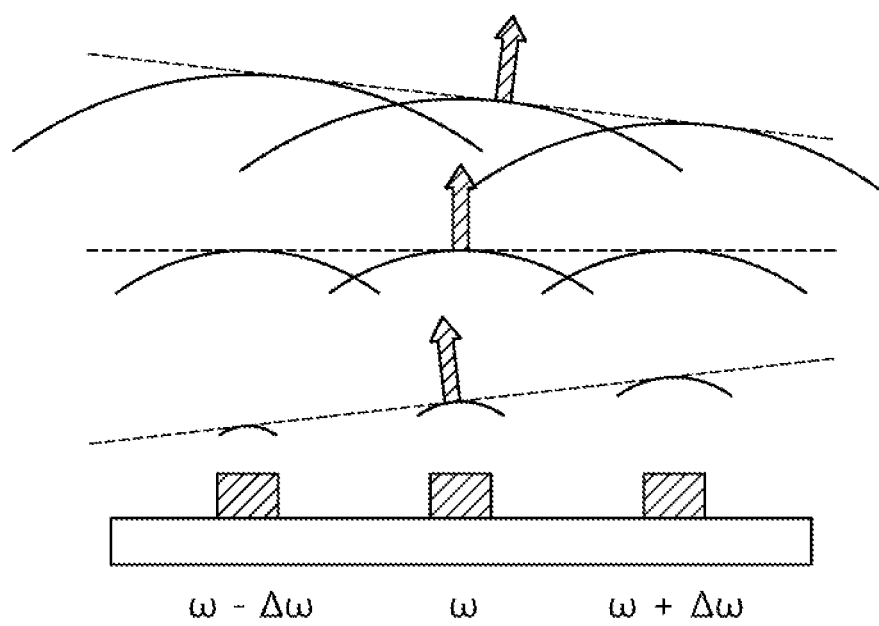
FIG. 45 schematically illustrates an example of a frequency gradient array antenna.

FIG. 45 schematically illustrates an example of a frequency gradient array antenna.

On the other hand, in the frequency gradient array antenna, the frequency (Here, $\omega=2\pi f$ means angular frequency, but expressed as frequency for convenience of description) of the signal radiated from each antenna element is different, due to the difference in frequency, the position where the signals overlap and cause constructive interference changes over time. For example, if there is a frequency difference of $\Delta\omega$ between the antennas, due to the difference, the beam direction of the radiated signal is formed differently according to time.

1.5. Frequency Gradient Metasurface

The frequency gradient metasurface is a metasurface that simultaneously performs the functions of the 1.2 meta grating and the 1.3 meta lens. The metasurface has a high degree of freedom by designing a combination of microstructures and can perform multiple functions in one metasurface.

If the signal source is a mode-locked laser source expressed as a sum of electromagnetic waves having various frequencies, the signal generated by the signal source becomes a pulsed laser having a specific repetition rate.

Figure 46:
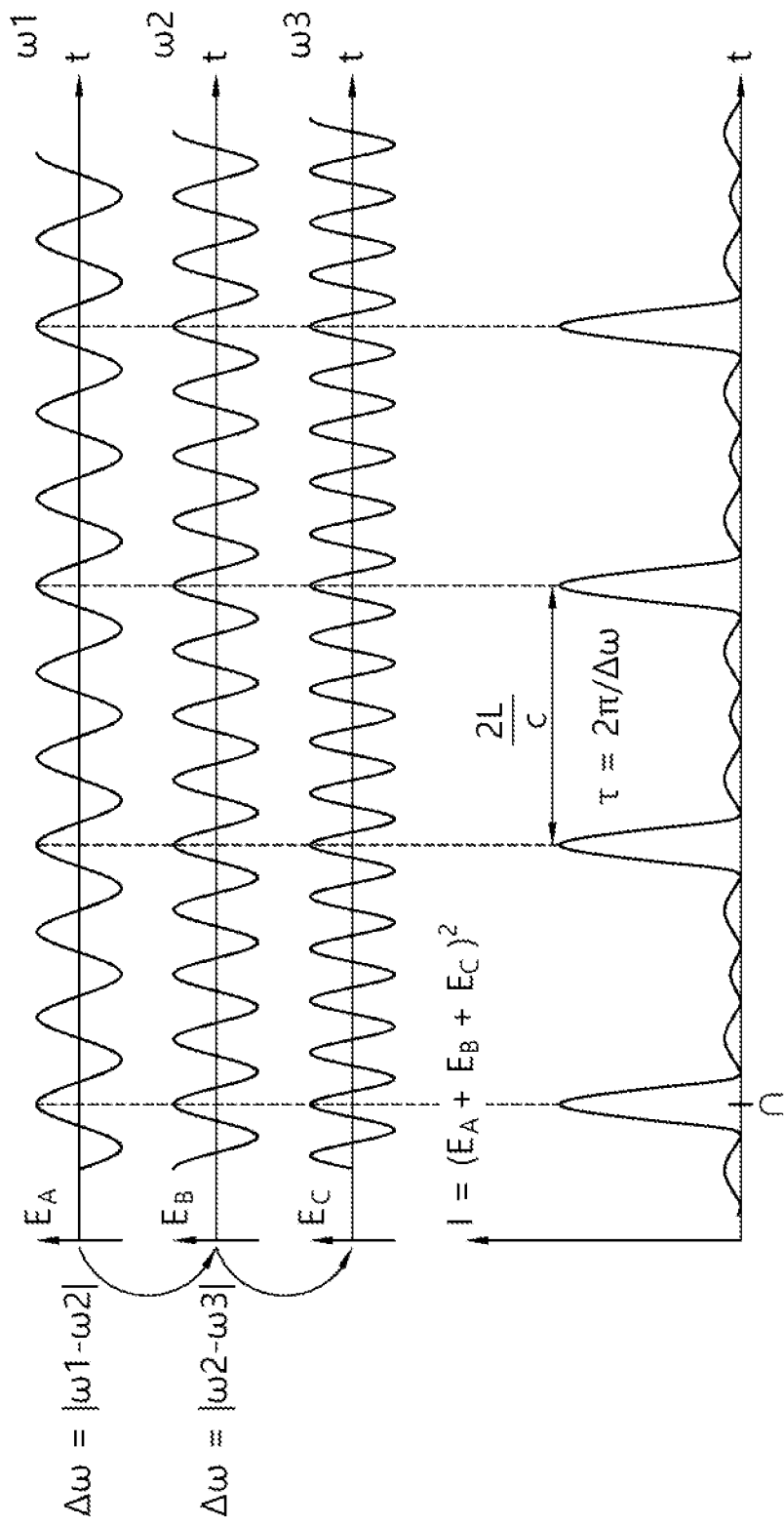
FIG. 46 schematically shows an example of synthesis of sine waves.

FIG. 46 schematically shows an example of synthesis of sine waves.

For example, a pulsed signal having a period r may be generated by synthesizing sine waves having three frequencies. At this time, when each frequency difference is $\Delta\omega$, the period $\tau=2\pi/\Delta\omega$.

Figure 47:
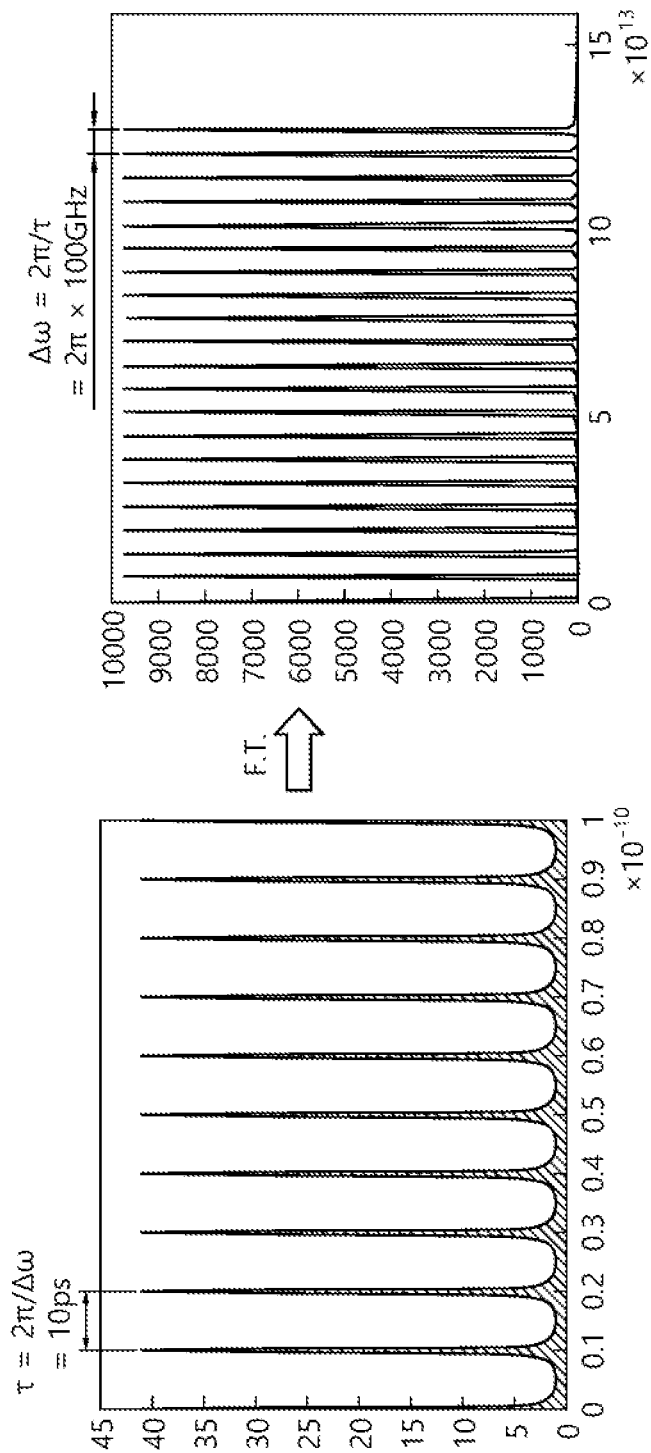
FIG. 47 schematically shows an example of Fourier transforming the signal in FIG. 46.

FIG. 47 schematically shows an example of Fourier transforming the signal in FIG. 46.

When the signal in FIG. 46 is subjected to Fourier Transform, it becomes a frequency comb with pulses on the frequency axis.

Figure 48:
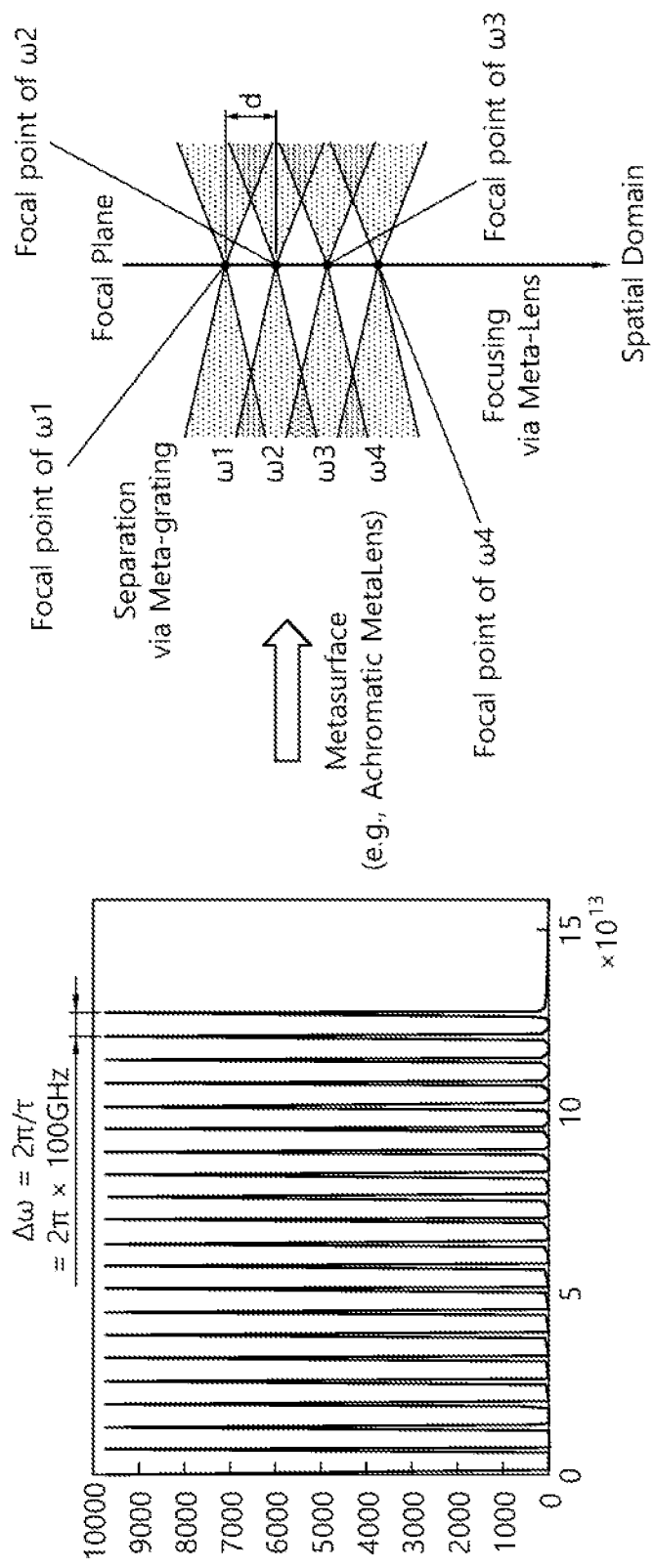
FIG. 48 schematically illustrates an example of focus per frequency.

FIG. 48 schematically illustrates an example of focus per frequency.

When the above signal is incident on the metasurface that simultaneously performs the functions of the meta grating of 1.2 and the meta lens of 1.3 mentioned above, the refraction direction is different for each frequency by meta grating, the focus is different for each frequency by the meta lens. If this concept is schematized, it is like the drawing.

That is, as a frequency comb laser signal passes through the metasurface, energy is focused at different focal points in the spatial domain by an achromatic metalens effect. Different focal points exist on the same focal plane, and each focal point has a slit-like shape. Different frequencies passing through each slit are synthesized again, the shape of a frequency gradient array antenna, in which the location where energy gathers changes over time, is virtually created. Therefore, each focal point on the focal plane described above becomes a virtual antenna existing in space, all foci are defined as virtual antenna arrays.

2. Tx Structure Design

Figure 49:
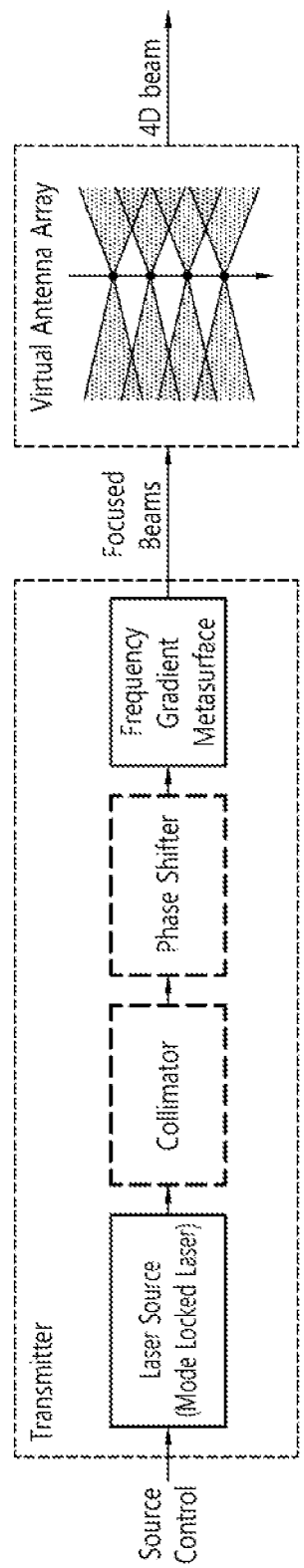
FIG. 49 schematically illustrates an example of a transmission device, according to an example herein.

FIG. 49 schematically illustrates an example of a transmission device, according to an example herein.

The specification proposes a transmitter structure for fast beam steering through control of a laser source and design of a frequency gradient metasurface. The overall structure of the transmitter for fast beam steering is as described in the drawings.

Figure 50:
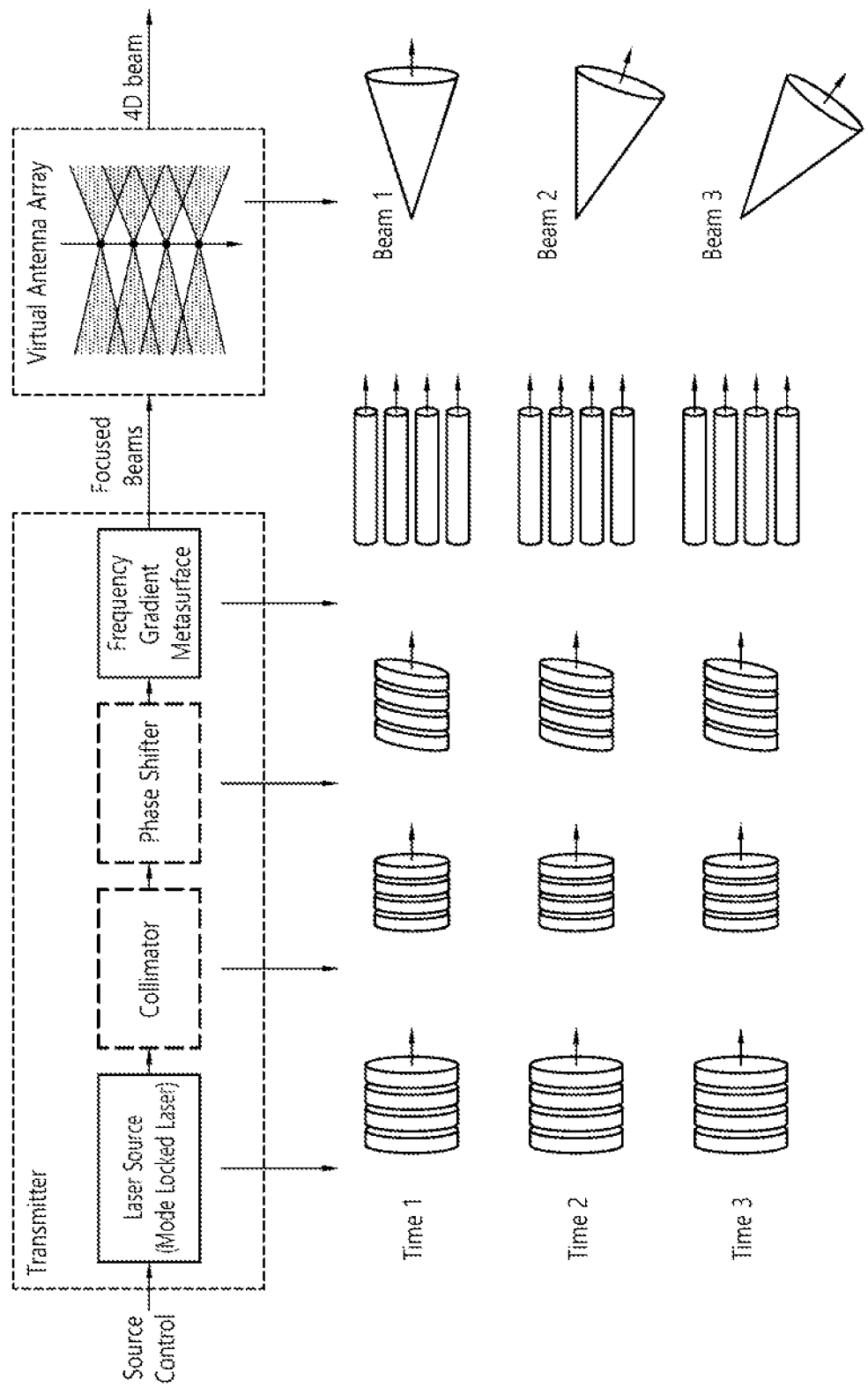
FIG. 50 schematically illustrates an example of a direction of a beam in a transmission device according to an example of the present specification.

FIG. 50 schematically illustrates an example of a direction of a beam in a transmission device according to an example of the present specification.

To control the laser source, receive source control information, generate a pulsed laser signal through the laser source, a plane wave characteristic is maintained while limiting the beam width through a collimator The signal passing through the collimator is incident on the metasurface as a frequency gradient at a pre-designed angle through the phase shifter. The signal is emitted after the beam is focused for each wavelength through a pre-designed frequency gradient metasurface. Then, a virtual antenna array is created in a space close to the transmitter, and signals are synthesized, and a 4D beam whose direction changes with time is transmitted toward the receiver. Here, the 4D beam means that the direction of the beam changes with time in a 3D space.

Figure 51:
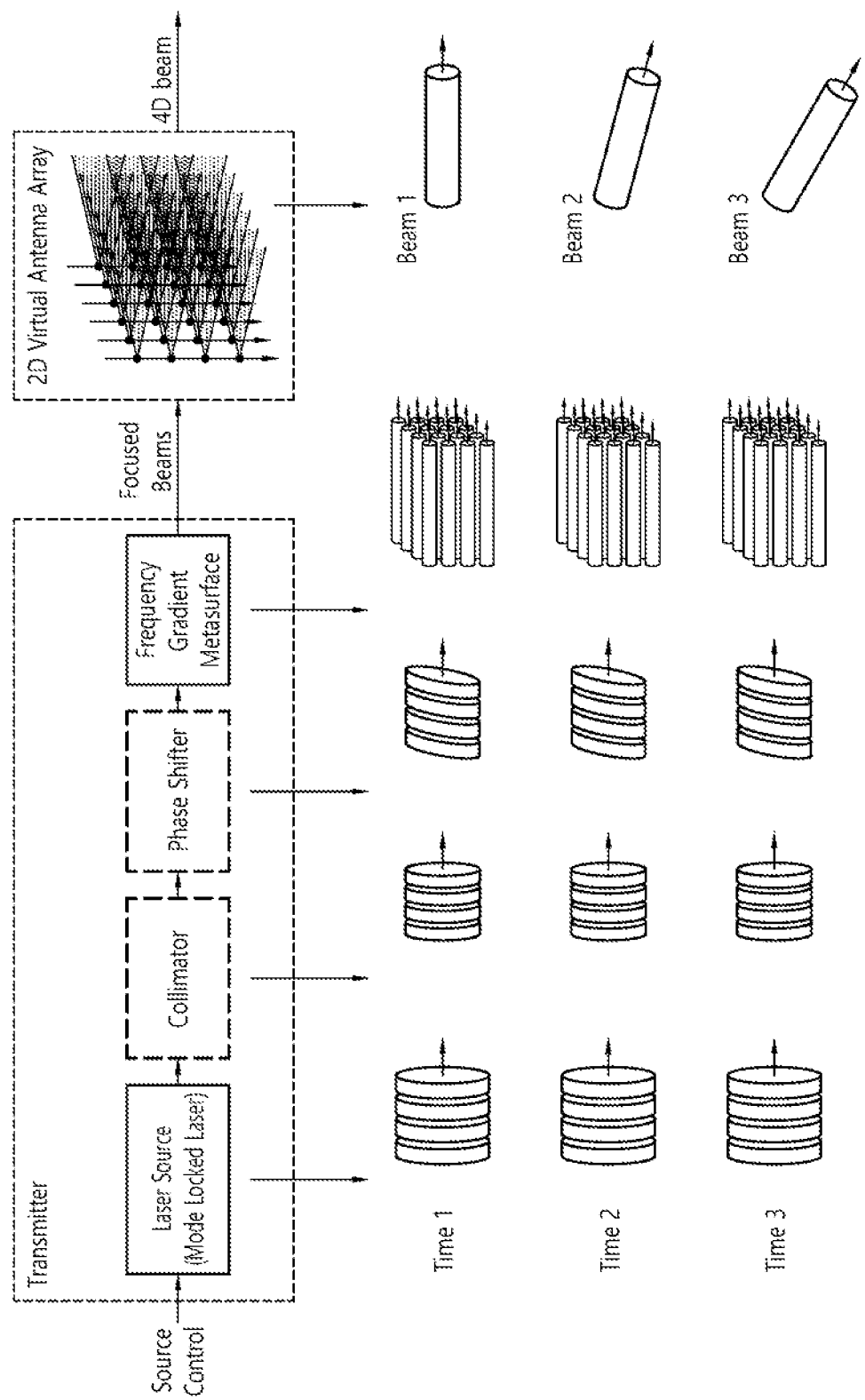
FIG. 51 schematically illustrates an example of a direction of a beam in a transmission device according to another example of the present specification.

FIG. 51 schematically illustrates an example of a direction of a beam in a transmission device according to another example of the present specification.

At this time, if the beam is focused and emitted in 2D for each wavelength in the frequency gradient metasurface, a two-dimensional (Dimensional) virtual antenna array is created in the space of the transmitter proximity, as the signals are synthesized, a 4D beam whose beam direction changes with time is transmitted toward the receiving end.

Details of each device are described below.

2.1. Laser Source

Figure 52:
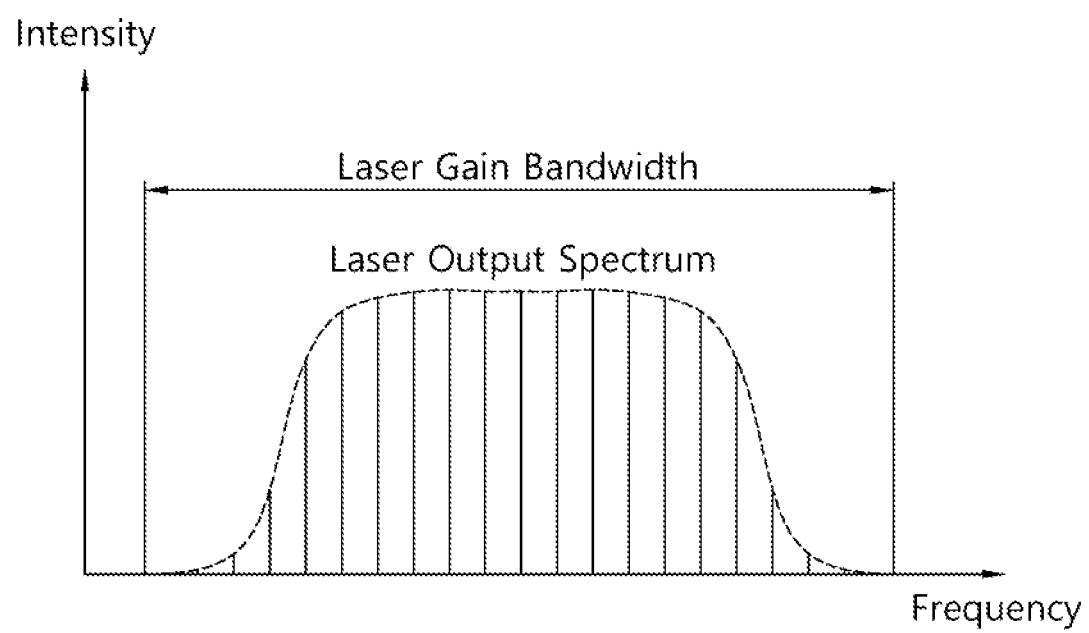
FIG. 52 schematically illustrates an example of a laser gain bandwidth.

FIG. 52 schematically illustrates an example of a laser gain bandwidth.

In the above structure, the laser source may be composed of a pulsed laser (e.g., a mode-locked laser) having a specific period. Since a pulsed laser cannot generate an ideal delta pulse, it has a laser gain bandwidth when observed in the frequency axis.

In the case of a laser source where the pulse duration, pulse repetition period $\tau$, and gain bandwidth B of the pulsed laser can be controlled (e.g., active mode locked laser, hybrid mode locked laser), the repetition rate of the beam emitted from the virtual antenna array and the number N of antennas can be controlled by the values of t and B. Therefore, the 4D beam can be controlled through source control information according to the system environment.

In the above design, it is described as a laser source, but it can be implemented as a device that generates electromagnetic waves (radio frequency, infrared rays, visible rays, ultraviolet rays, x-rays, gamma rays, etc.) having all time/frequency characteristics.

2.2. Collimator

In the above structure, the laser source and the frequency gradient metasurface are short-range, when the laser source generates a signal without a large beam divergence, it is possible to design without a collimator.

2.3. Phase Shifter

In the meta grating design of the frequency gradient metasurface in the above structure, depending on the design of the angle of incidence toward the metasurface, the transmitter can be configured through phase shifter design, optical system design, or metagrating design.

How to Utilize the Phase Shifter

Figure 53:
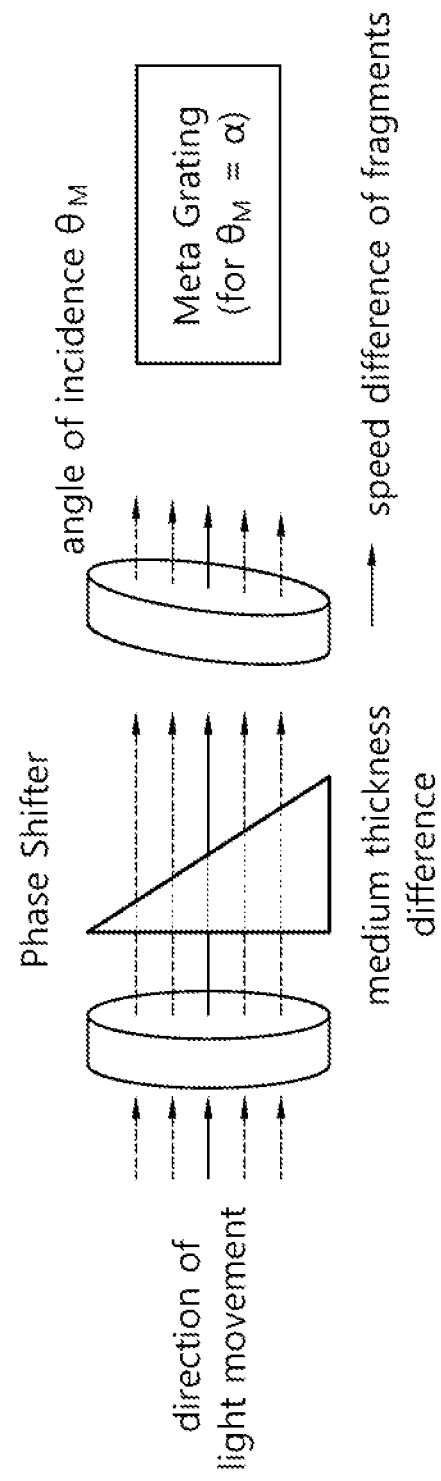
FIG. 53 schematically illustrates an example of utilizing a phase shifter.

FIG. 53 schematically illustrates an example of utilizing a phase shifter.

The incident angle is set to be $\theta\_M$ through the phase shifter design.

In the above, the phase shifter may be designed differently depending on the implementation.

Figure 54:
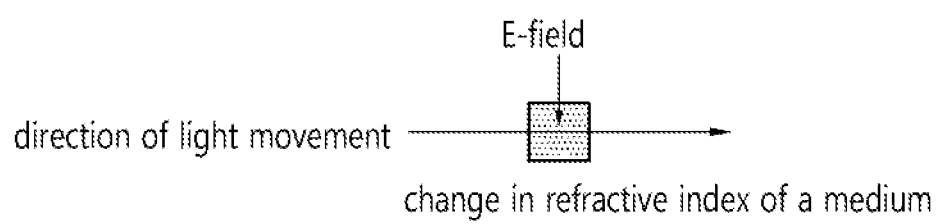
FIG. 54 schematically illustrates an example of a phase shifter.

FIG. 54 schematically illustrates an example of a phase shifter.

According to FIG. 54, an apparatus using a change in the refractive index of a medium by applying an E-field to a medium based on an electro-optic effect can be provided.

Figure 55:
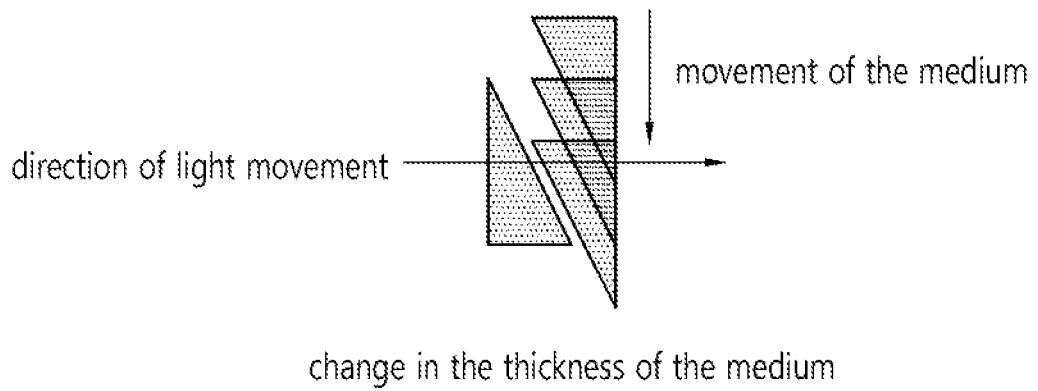
FIG. 55 schematically illustrates another example of a phase shifter.

FIG. 55 schematically illustrates another example of a phase shifter.

According to FIG. 55, a device for changing the thickness of a medium through which light passes may be provided by moving the medium based on a Babinet-Soleil compensator.

Figure 56:
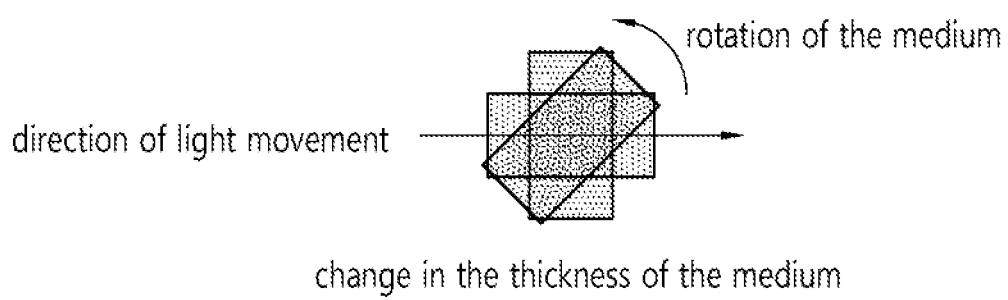
FIG. 56 schematically illustrates another example of a phase shifter.

FIG. 56 schematically illustrates another example of a phase shifter.

According to FIG. 56, a device for changing the thickness of a medium through which light passes can be provided by rotating the medium.

Figure 57:
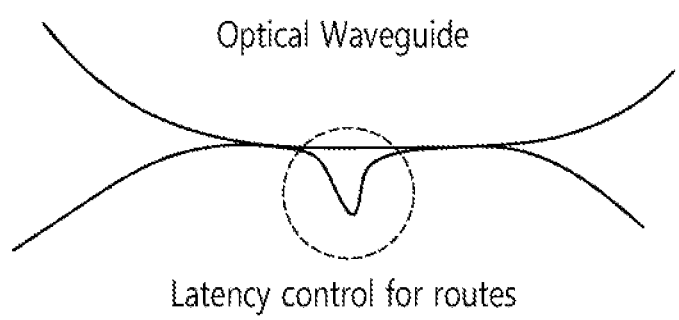
FIG. 57 schematically illustrates another example of a phase shifter.

FIG. 57 schematically illustrates another example of a phase shifter.

According to FIG. 57, an apparatus for controlling a delay time for a path along which light travels based on an optical waveguide may be provided.

How to Utilize Optical System Design

Figure 58:
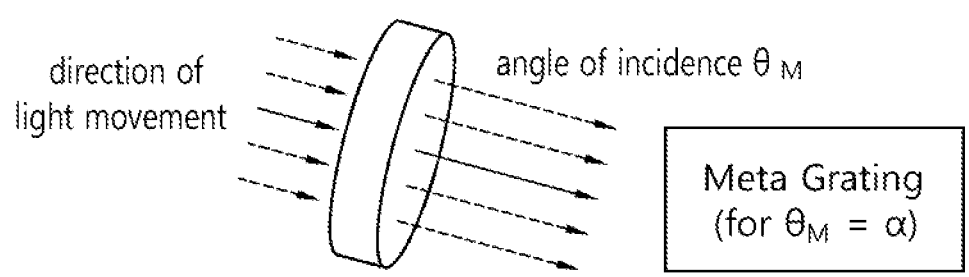
FIG. 58 schematically illustrates an example utilizing an optical system design.

FIG. 58 schematically illustrates an example utilizing an optical system design.

According to FIG. 58, the incident angle can be set to be θ_M through optical system design.

How to Utilize the Meta Grating Design

Figure 59:
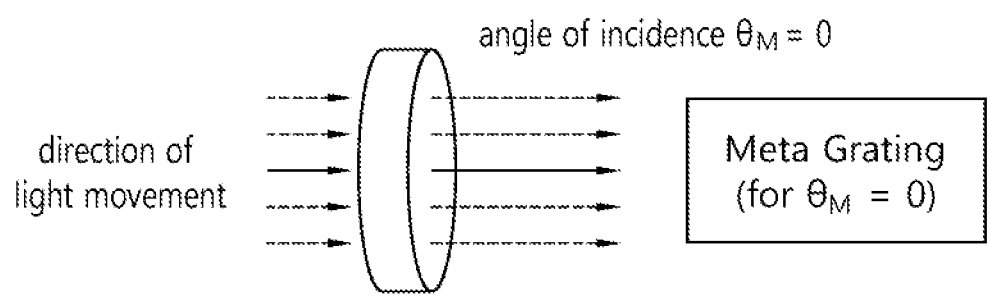
FIG. 59 schematically illustrates an example using a meta grating design.

FIG. 59 schematically illustrates an example using a meta grating design.

According to FIG. 59, in the meta grating design, the incident angle can be set so that θ_M is 0, and the incident angle of the signal can be maintained to be 0.

2.4. Frequency Gradient Metasurface

Figure 60:
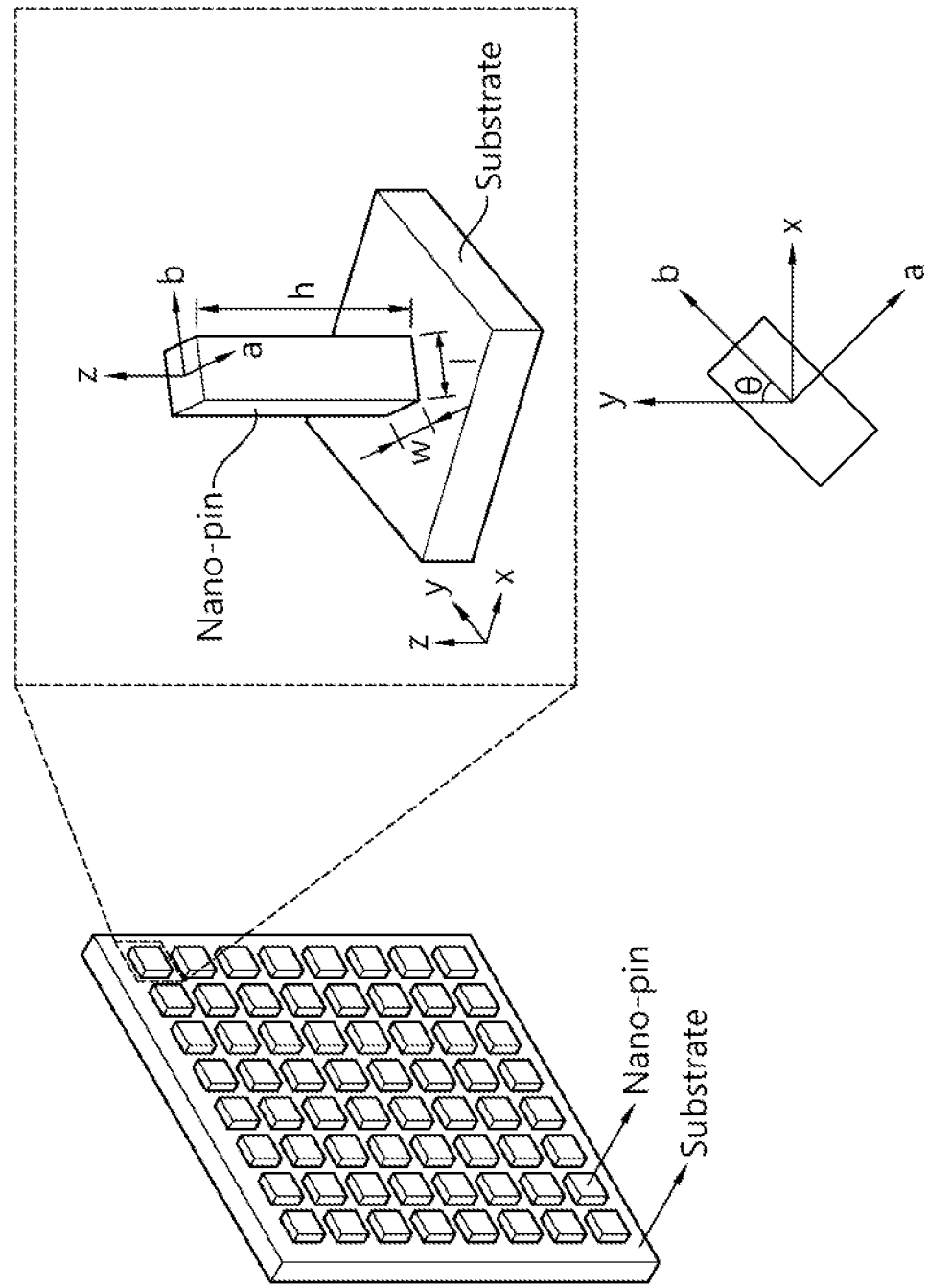
FIG. 60 schematically illustrates an example of a metasurface.

FIG. 60 schematically illustrates an example of a metasurface.

According to FIG. 60, the frequency gradient metasurface, as described in 1.5, in order to simultaneously perform the functions of the meta grating of 1.2 and the meta lens of 1.3, the length l, width w, and height h of the nano-pin and the relative angle θ with the substrate must be designed.

In the above design, the design of each nano fin may be designed differently according to the frequency within the gain bandwidth of the laser source. The relative angle θ of each nanofin and the substrate can be individually set differently, it is implemented in a way promised in advance to perform the functions of meta grating and meta lens. The substrate uses a highly permeable material, for example, silicon dioxide such as SiO2 may be used. The spacing between the nano fins in the substrate is set to be smaller than the wavelength corresponding to the frequency within the gain bandwidth of the laser source, the number of nano fins has a trade-off relationship between the performance of meta gratings and meta lenses and the size of the entire metasurface. For example, increasing the number of nano fins can focus a larger amount of signal energy, but the size of the entire metasurface may increase.

In the above design, the shape of the nano fins is described in the same way, but different types of nano fins (e.g., different types of l, w, and h for each nano fin) may be implemented in one metasurface.

In the above design, the shape of the nanofin is described as a rectangular parallelepiped, but it may be implemented as a polyhedron or curved body of another shape depending on the design method.

In the above design, a single metasurface is described, but functions of a meta grating and a meta lens may be implemented through a plurality of metasurfaces.

In the above design, although described as a metasurface, the function may be implemented through a diffraction grating element having the same function as a meta grating and an optical lens functioning as a meta lens.

In the above design, the metasurface may have nano fins fixed at the time of design (passive metasurface), nano fins can be designed to be dynamically controlled (Active Metasurface). For example, the relative angle θ of the nanofins may be dynamically changed by control.

In the above design, the physical form of the nanofin is described above, but it may be implemented to perform the corresponding function by applying an electric field based on a diode serving as a nanofin. At this time, by dynamically controlling the method of applying the electric field (or the degree of applying the electric field) or whether each diode operates, the metasurface's meta grating and meta lens functions can be dynamically controlled.

2.5. Virtual Antenna Array

Since the virtual antenna array exists in space by the transmitter, it is not implemented as a device. The structure of the virtual antenna array is determined by the design parameters of the transmitter. Accordingly, there must be no obstacles in the space between the transmitter device and the virtual antenna array, and the distance can be controlled according to the metasurface design.

2.6. Design Parameter(s)

A mathematical description of the operation through the transmitter is as follows. The pulsed signal of the laser source in 2.1 can be expressed as $$a(t) = \sum_{-N}^{N} a_n e^{-i\omega_n t} = e^{-i\omega_0 t} \sum_{-N}^{N} a_n e^{-in\Delta\omega t} = A(t)e^{-i\omega_0 t}.$$

Here, ω_0 is the angular frequency of the center frequency of the source signal, N is related to the number of frequency combs existing within the gain bandwidth based on the center frequency. That is, since frequency signals from −N to N are synthesized, the total number of frequency combs is 2N+1. a_n means the amplitude of the nth frequency signal, ω_n=ω_0+nΔω means the nth angular frequency signal. Here, Δω is the interval of the frequency comb.

Accordingly, the entire pulsed signal can be expressed in a Fourier transform form of the full frequency signals as described above. At this time, it can be expressed as the product of the phase change term e^(−i*ω_0*t) dominant to the center frequency and the envelope A(t) of the pulsed signal. That is, it can be understood as a form in which the peak of the pulse synthesized by Δω with time t as $$A(t) = \sum_{-N}^{N} a_n e^{-in\Delta\omega t}$$

is time-shifted.

Figure 61:
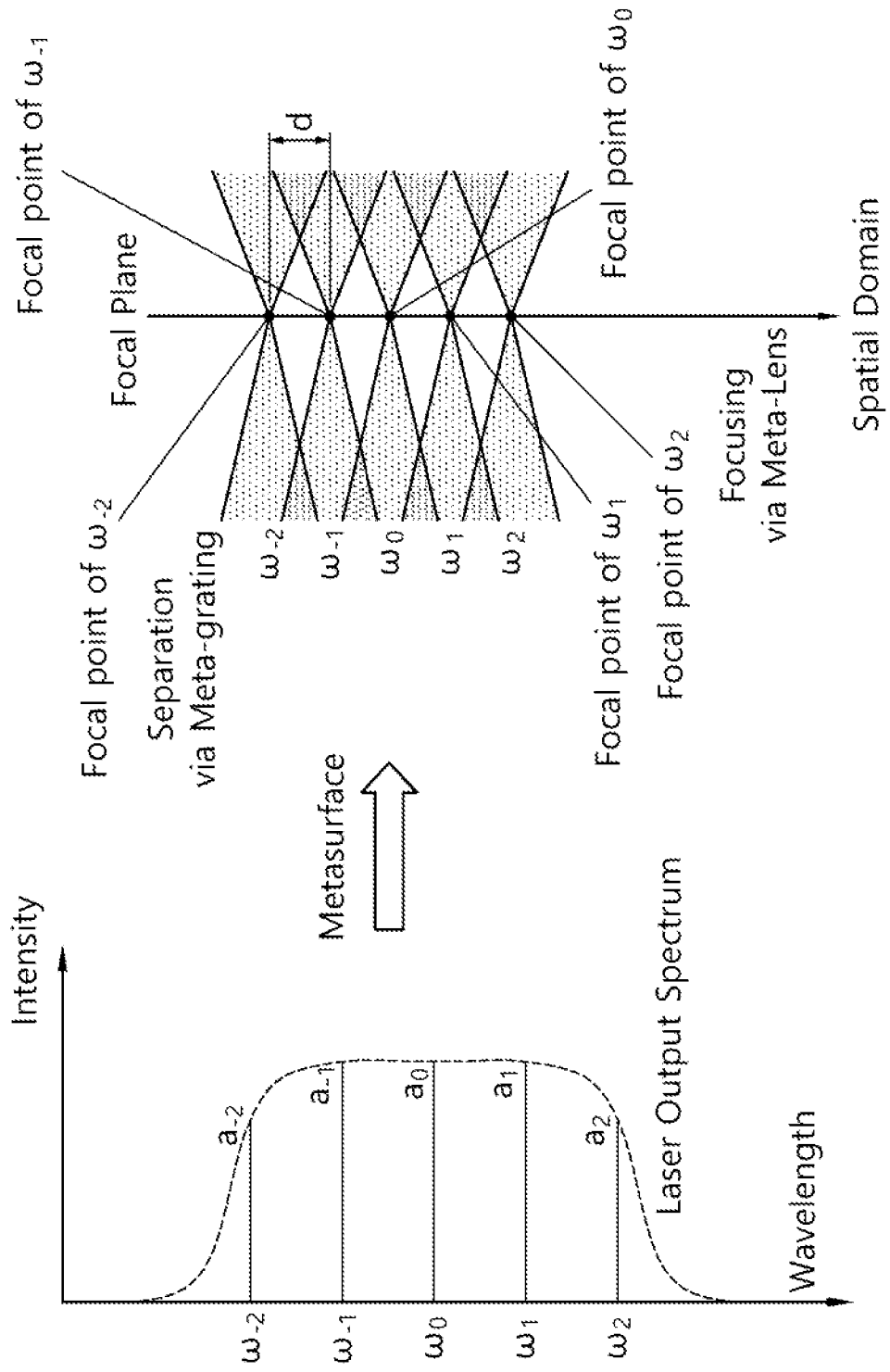
FIG. 61 schematically illustrates an example of a virtual antenna array.

FIG. 61 schematically illustrates an example of a virtual antenna array.

When the pulsed signal passes through 2.2 to 2.4 described above, by the meta grating and meta lens effect in the metasurface, form a virtual antenna array of 2.5. In the following, for convenience of description (N=2), a total of 5 frequency comb sources are described.

That is, different focal points are provided for each angular frequency within one focal plane in space, and the distance between each focal point is maintained as d. Each focal point becomes a virtual antenna through which only one angular frequency is passed. In the entire description below, an angular frequency is expressed as a frequency for convenience of explanation.

Figure 62:
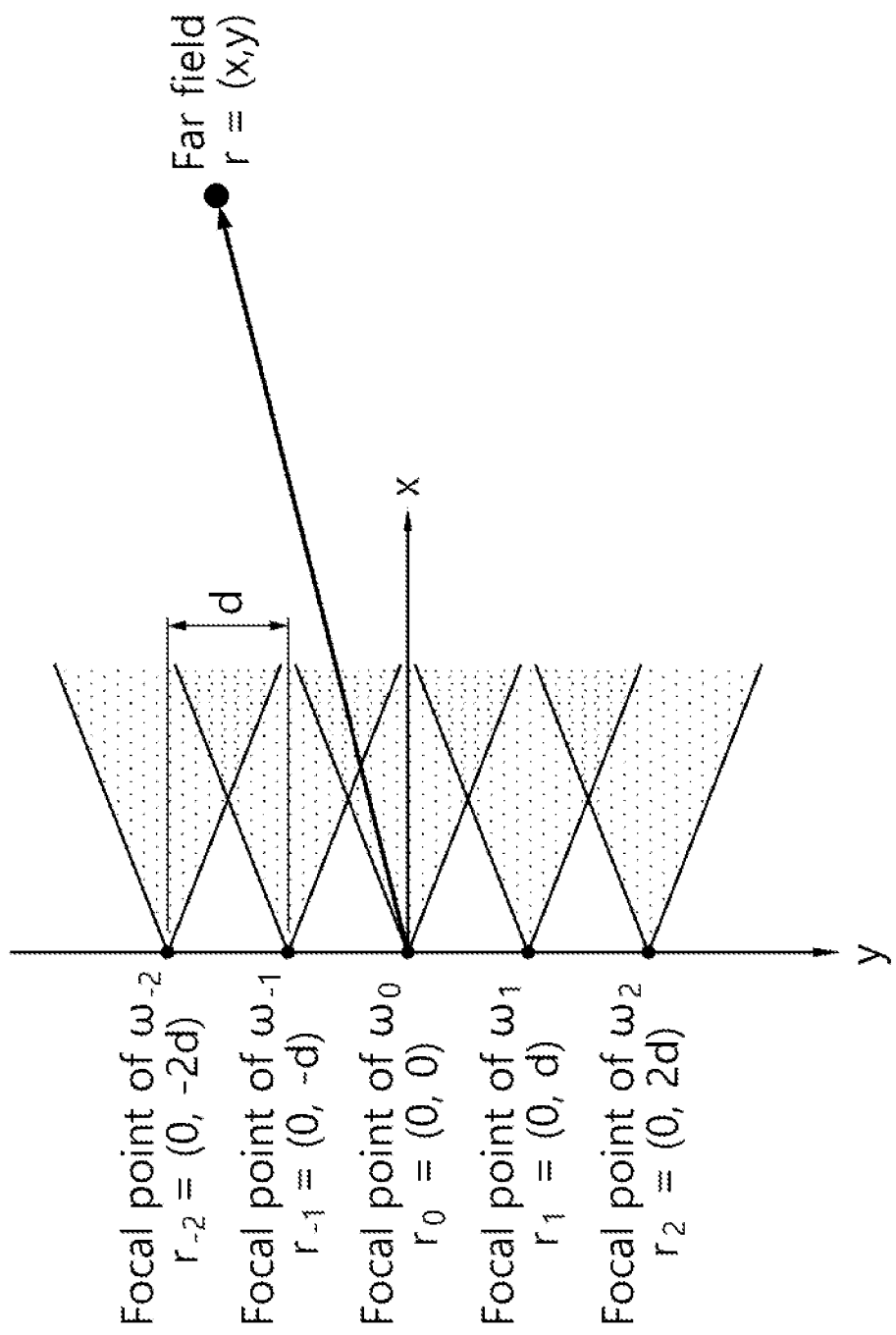
FIG. 62 schematically illustrates an example of signals passing through a virtual antenna.

FIG. 62 schematically illustrates an example of signals passing through a virtual antenna.

A signal passing through the virtual antenna and reaching an arbitrary Far field coordinate $r=(x,y)=(r\ \cos\theta, -r^*\sin\theta)$ may be expressed as $b\_n(r)=a\_n^*G(r-r\_n)e^{\wedge}(-i^*k\_n^*(|r-r\_n|))$. Here, $G(r-r\_n)$ means a gain change value due to propagation from the nth virtual antenna $r\_n=(0,nd)$ to coordinates $r=(x,y)$, $|r-r\_n|$ means the distance between the two coordinates, $k\_n=\omega\_n/c=k\_0+n^*\Delta k$. If the entire signal is received considering the time change t at coordinate r, it can be written as $$b(r,t) = \sum_{-N}^{N} b_n(r)e^{-\omega_n t} = \sum_{-N}^{N} a_n G(r-r_n)e^{-i(k_n|r-r_n|-\omega_n t)}.$$

That is, when each wave passing from each virtual antenna reaches r at time t at coordinate r, it represents the sum of gain and phase.

At this time, since $r \gg Nd$ in the Far-field, the difference between $|r|$ and $|r\_n|$ is relatively very small, so approximation with $G(r-r_n) \approx G(r)$ is possible, when expressed in circular coordinates, it can be approximated by $|r-r_n|=\sqrt{(r\sin\theta+nd)^2+r^2\cos^2\theta} \approx r+nd\sin\theta$. In summary, it can be expressed as $$b(r,t) \approx G(r)e^{-i(k_0 r-\omega_0 t)} \sum_{-N}^{N} a_n e^{-in(\Delta kr+k_0 d\sin\theta-\Delta\omega t)}.$$

If summarized in the expression form of the pulsed signal, the product of the phase change term $e^{\wedge}(-i^*\omega\_0^*t)$ and the envelope $A(t)$ of the pulsed signal over time, which is dominant to the center frequency, and the gain can be expressed as follows.

$$b(r,t) \approx A\left(t - \frac{k_0 d}{\Delta\omega}\sin\theta - \frac{r}{c}\right)G(r)e^{-i(k_0 r-\omega_0 t)}$$

Here, when $$A(t) = \sum_{-N}^{N} a_n e^{-in\Delta\omega t},$$

according to the relationship of $(k\_0^*d)/\Delta\omega$ at the position corresponding to the distance r and the angle θ for time t, it can be understood as a form in which the peak of a synthesized pulse of signals radiated from the virtual antenna array is time-shifted. Accordingly, the rotation speed and period of the beam are changed according to time by the time change reflection term k_0 by the center frequency, the virtual antenna spacing d, and the spacing Δω of the frequency comb. The characteristics are summarized as follows. In the following description, the scanning velocity means the speed at which the beam rotates relative to the reference rotation angle, the repetition time means the time required for the beam to rotate and return to its original position.

Effect of Δω

Regardless of the center frequency ω_0, we determine the repetition time τ=2π/Δω

Assuming that the central frequency ω_0 is fixed, the effect of d (in the following, the wavelength λ_0=c/f_0=2π·c/ω_0 and c is the speed of light, which is about 3x10^8 m/s.)

If d=λ_0/2, it has a standard scanning speed and rotates the entire radiation space by the virtual antenna during the repetition time.

If d<λ_0/2, the beam rotates faster than the reference scanning speed and rotates the entire radiation space in a shorter time than the repetition time, resulting in a blank beam time (a phenomenon in which the beam disappears)

If d>λ_0/2, the beam rotates slower than the reference scanning speed and rotates the entire radiation space for a longer time than the repetition time, while one beam rotates, the next beam appears as if it rotates, resulting in multiple beams existing in the entire radiation space.

In addition, as the size of 2N+1 corresponding to the number of frequency combs increases in the above design, a plurality of waves overlap, so the sharpness of the envelope $A(t)$ of the pulse increases and the beam width decreases.

Therefore, based on the above characteristics, the metasurface should be designed according to the central frequency ω_0, the virtual antenna spacing d, the frequency comb spacing Δω, and N determining the number of virtual antennas.

Metasurface Design for 4D Beamforming (l, w, h, θ, . . . )=f(ω_0, d, Δω, N).

In the above, l, w, h, θ, etc. are nanofin design parameters described in 2.4, and other parameters may be considered depending on the shape of the nanofin. Each parameter may be different for each nano fin.

In the above description, for convenience of description, it is described from a 2D perspective, but it is obvious that the same applies to 3D applications.

In the above, the laser source and the metasurface are described, but it is obvious that the same can be applied to a device capable of generating a pulsed signal and a device functioning as a meta grating and meta lens.

3.4D Beamforming Transmitter Design

Figure 63:
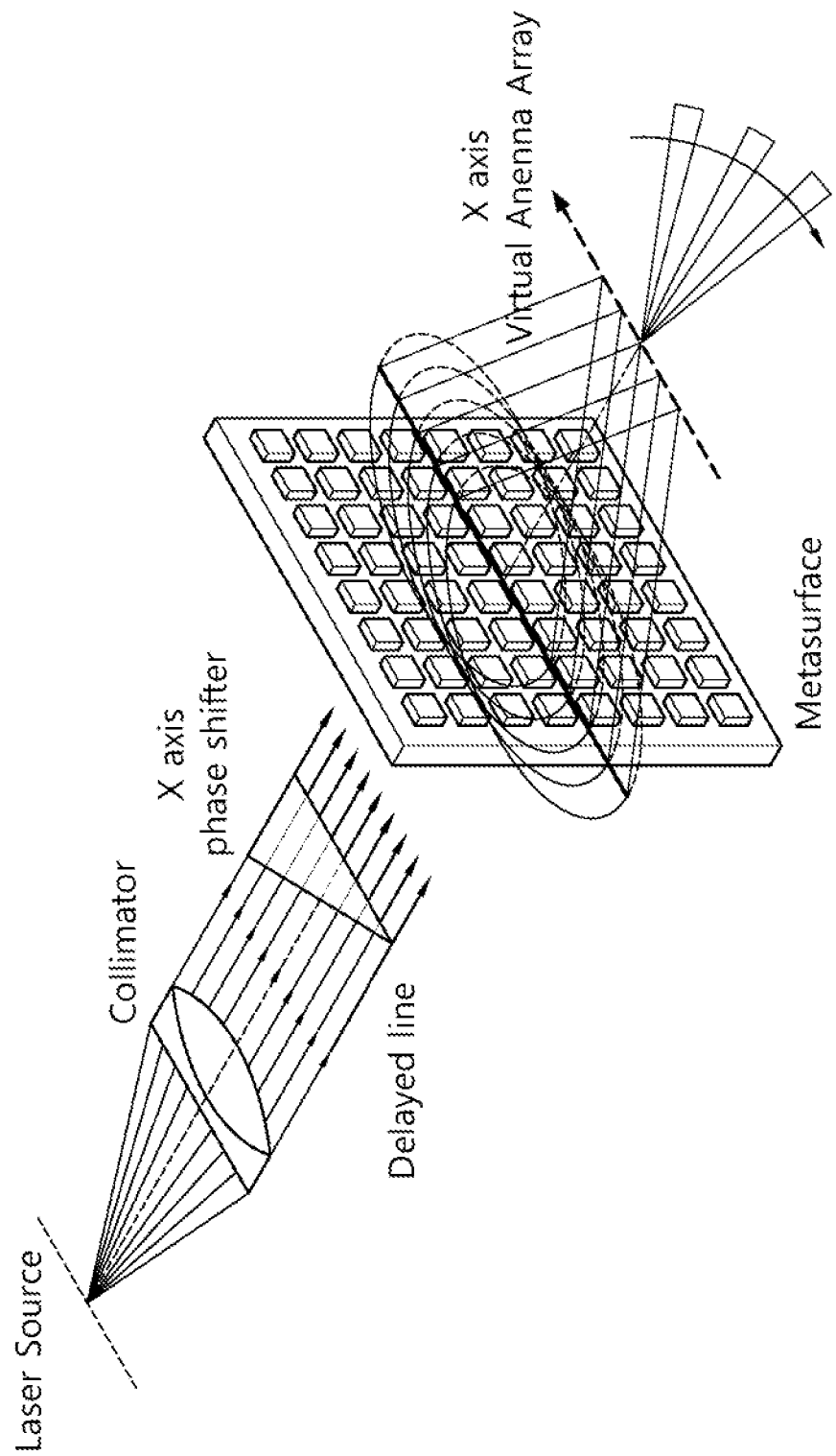
FIGS. 63 and 64 schematically illustrate an example of an axis of rotation of a beam.
Figure 64:
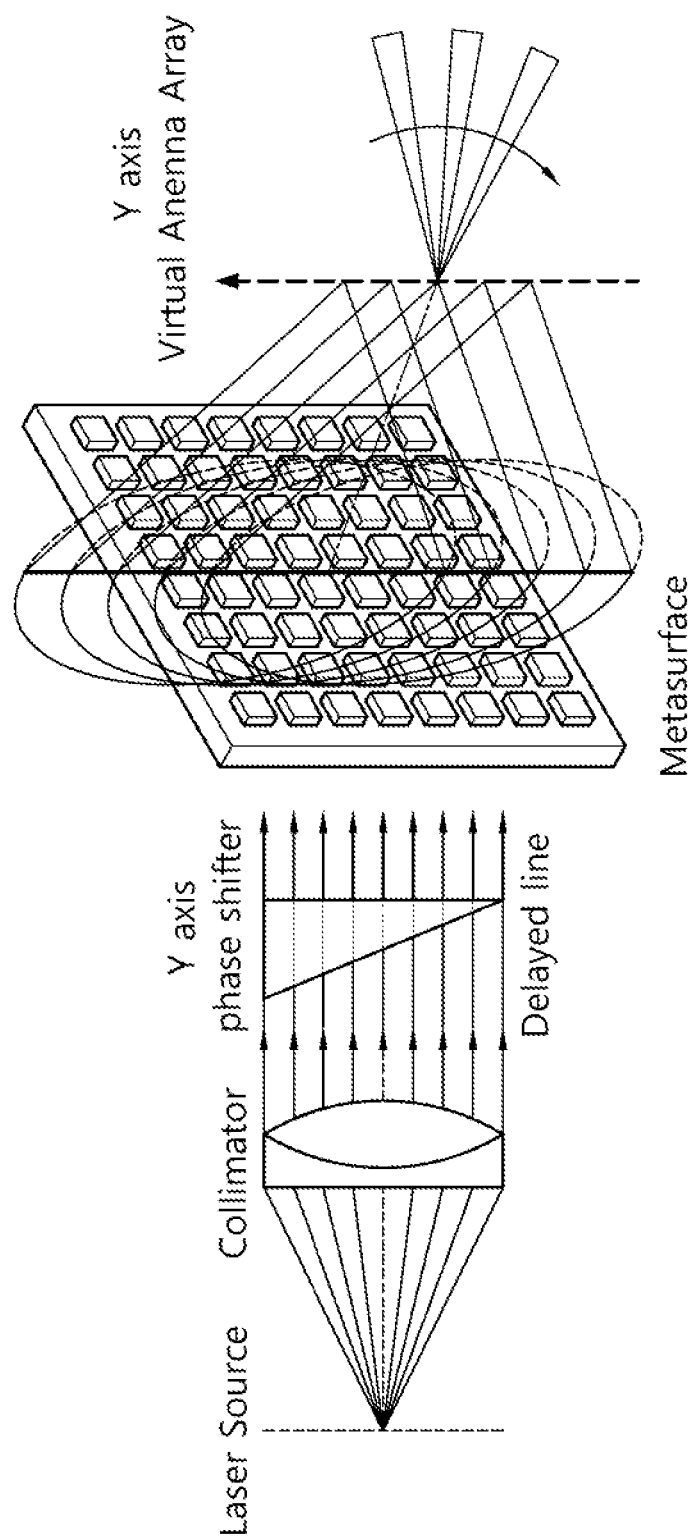

FIGS. 63 and 64 schematically illustrate an example of an axis of rotation of a beam.

When performing the Tx structure design in 2. based on the frequency gradient metasurface principle described in 1. above, when a beam is delivered to a target location in a 3-dimensional space while steering according to time, the rotational direction of the beam may have two rotational axes.

This is usually expressed as an azimuth angle and an elevation angle in 3D beamforming, each can be understood as x-axis rotation and y-axis rotation. Based on two axes of rotation in a three-dimensional space, beam steering by time axis is called 4D beamforming. Methods for supporting the above operation are proposed as follows.

3.1. Virtual Antenna Control Based on 4D Beamforming

Figure 65:
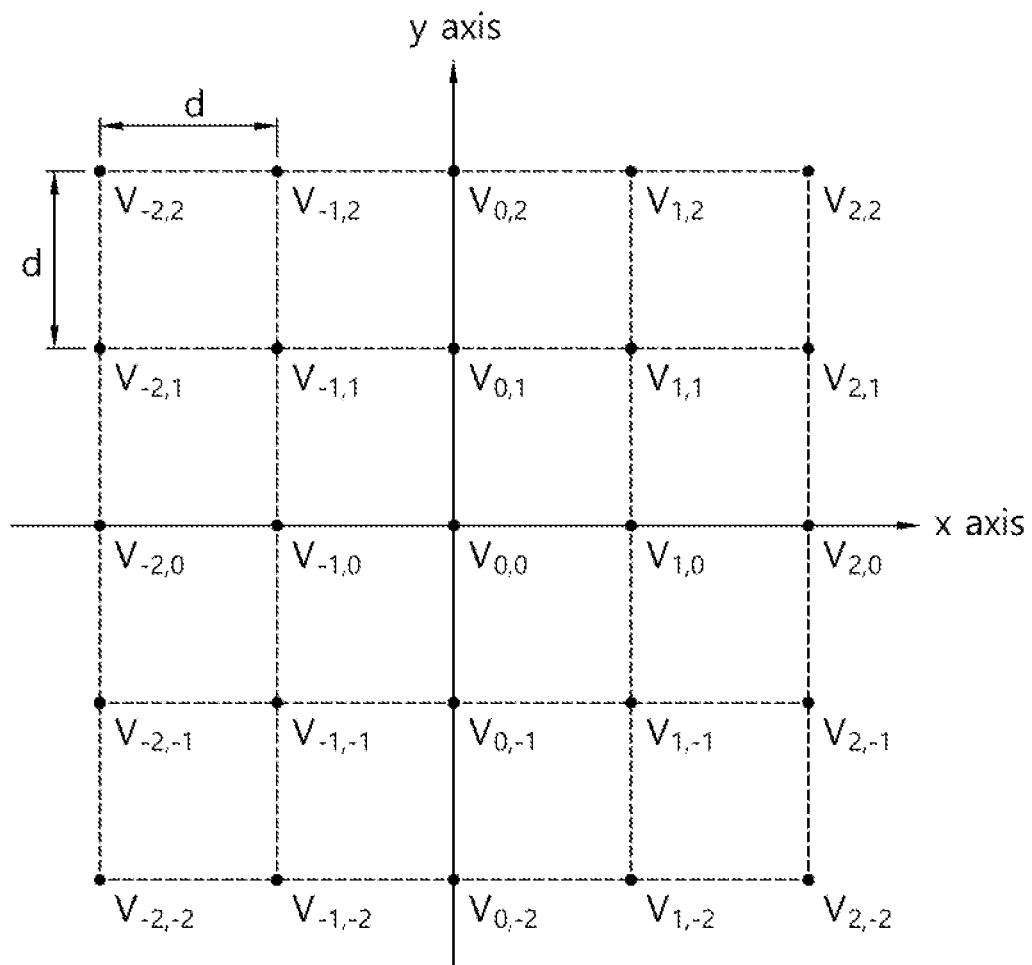
FIG. 65 schematically illustrates an example of a virtual antenna array space.

FIG. 65 schematically illustrates an example of a virtual antenna array space.

For 4D beam formation, if the virtual antenna array space (Space) is expressed as each virtual antenna V_(m,n), it is as shown in the figure. In the drawing, m=2 and n=2 are illustrated.

In the above, the signal radiated through each virtual antenna V_(m,n) can be defined as V_(m,n)(t)=a_(m,n)*e^(-i*(ω_(m,n)*t+φ_(m,n))). Here, for each virtual antenna, a_(m,n) means an amplitude, ω_(m,n) means an angular frequency, and φ_(m,n) means a phase. Here, each of the control variables a_(m,n), ω_(m,n), and φ_(m,n) must be supplied to the virtual antenna through the metasurface design. In addition, Δω_x and Δω_y corresponding to frequency intervals of pulsed signals constituting ω_(m,n)=ω_0+mΔω_x+nΔω_y must be provided by a laser source that performs signal generation.

3.1.1. 4D Beamforming Based on 1-Dimensional Frequency Gradient 3.1.1.1. The specification proposes 4D beamforming that sequentially repeats a 1-dimensional frequency gradient along the x-axis and the y-axis.

3.1.1.2. Single 1D-Array Based 4D Beamforming 3.1.1.2.1. For x-axis rotation, V_(m,0) is activated.

At this time, $$a_{m,n} = \begin{cases} a_{m,n} & \text{for } n = 0 \\ 0, & \text{for } n \neq 0 \end{cases},$$

ω_(m,n)=ω_0+m*Δω_x, and φ_(m,n)=0.

Figure 66:
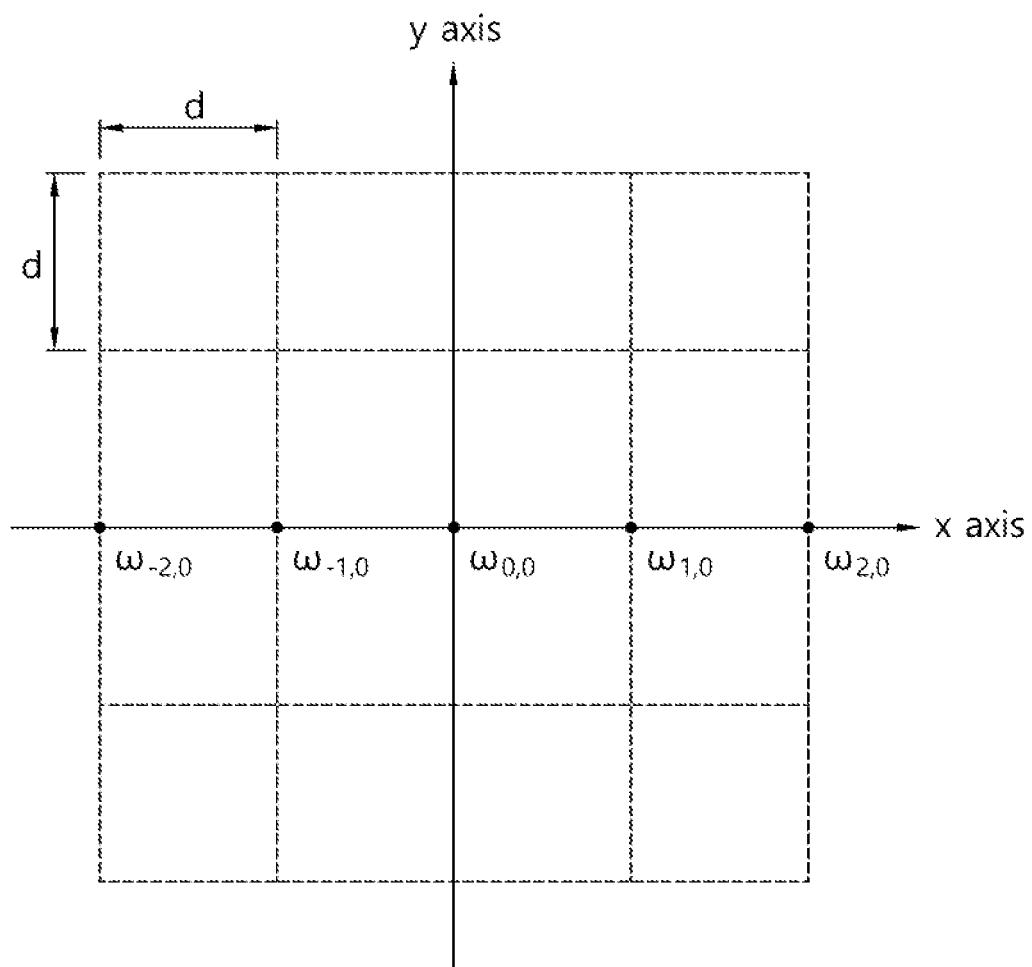
FIG. 66 schematically illustrates another example of a virtual antenna array space.

FIG. 66 schematically illustrates another example of a virtual antenna array space.

3.1.1.2.2. For example, a virtual antenna may be activated for a virtual antenna array in which m=2 and n=2.

Figure 67:
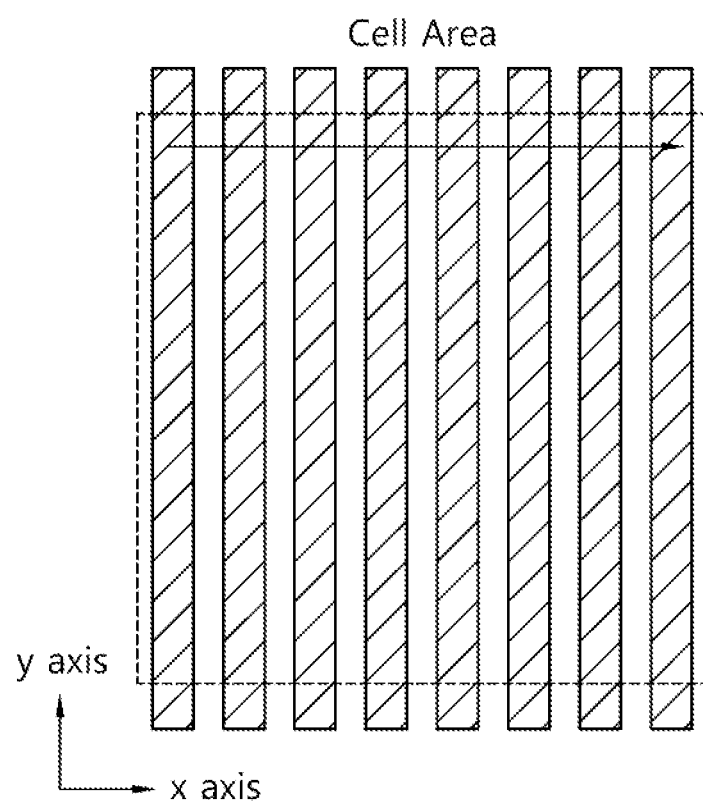
FIG. 67 schematically illustrates an example of beam transmission in the example of FIG. 66.

FIG. 67 schematically illustrates an example of beam transmission in the example of FIG. 66.

3.1.1.2.3. Through the above method, since there is only x-axis steering, the beam rotates and arrives in the x-axis according to time in the cell area where the receiving end is present, but spreads widely in the form of a line beam in the y-axis.

3.1.1.2.4. After the above procedure, V_(0,n) is activated for y-axis rotation.

At this time, $$a_{m,n} = \begin{cases} a_{m,n} & \text{for } m = 0 \\ 0, & \text{for } m \neq 0 \end{cases},$$

ω_(m,n)=ω_0+n*Δω_y, and φ_(m,n)=0.

Figure 68:
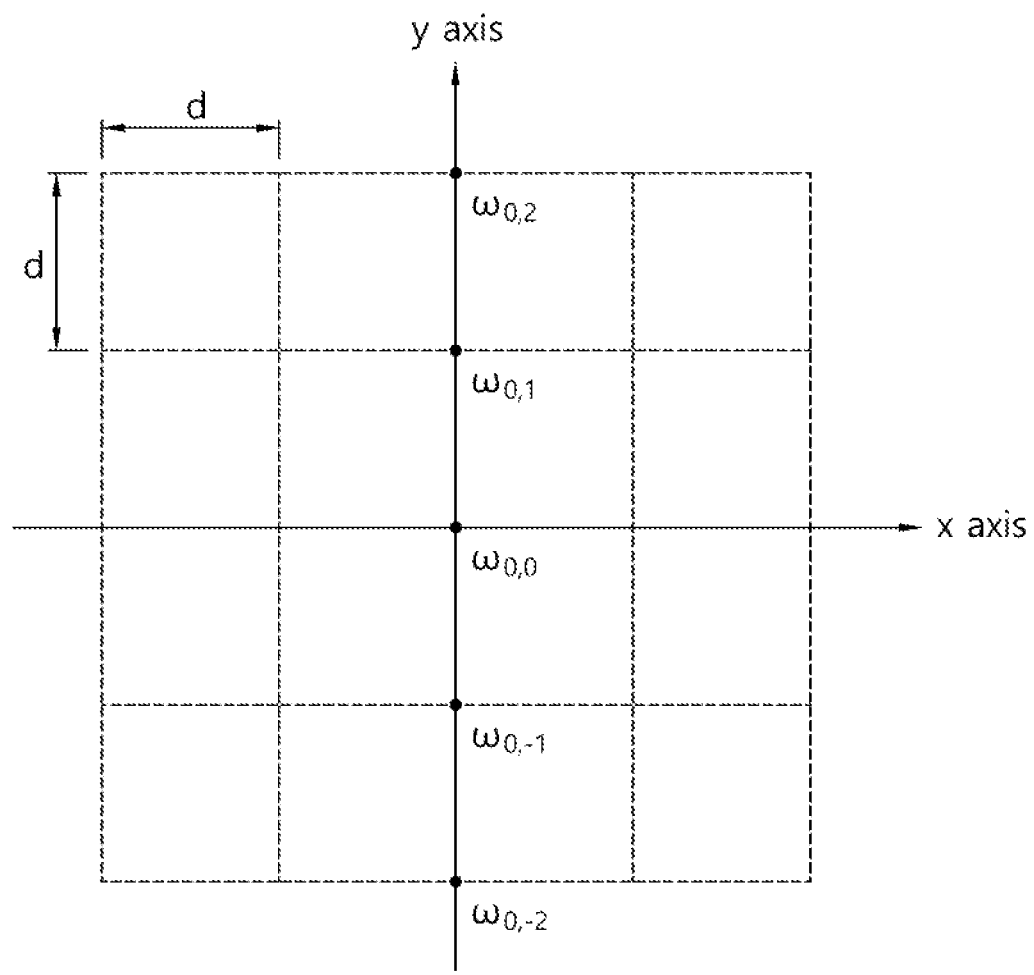
FIG. 68 schematically shows another example of a virtual antenna array space.

FIG. 68 schematically shows another example of a virtual antenna array space.

3.1.1.2.5. For example, a virtual antenna may be activated for a virtual antenna array where m=2 and n=2.

Figure 69:
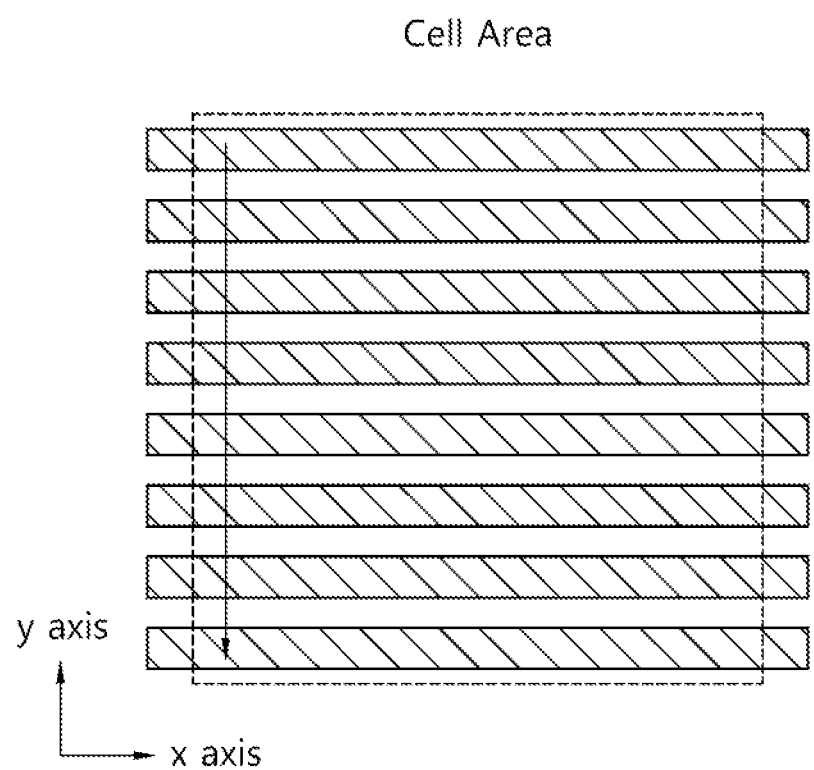
FIG. 69 schematically illustrates an example of beam transmission in the example of FIG. 68.

FIG. 69 schematically illustrates an example of beam transmission in the example of FIG. 68.

3.1.1.2.6. Through the above method, since there is only y-axis steering, the beam rotates and arrives in the y-axis according to time in the cell area where the receiving end is present, but spreads widely in the form of a line beam in the x-axis.

Figure 70:
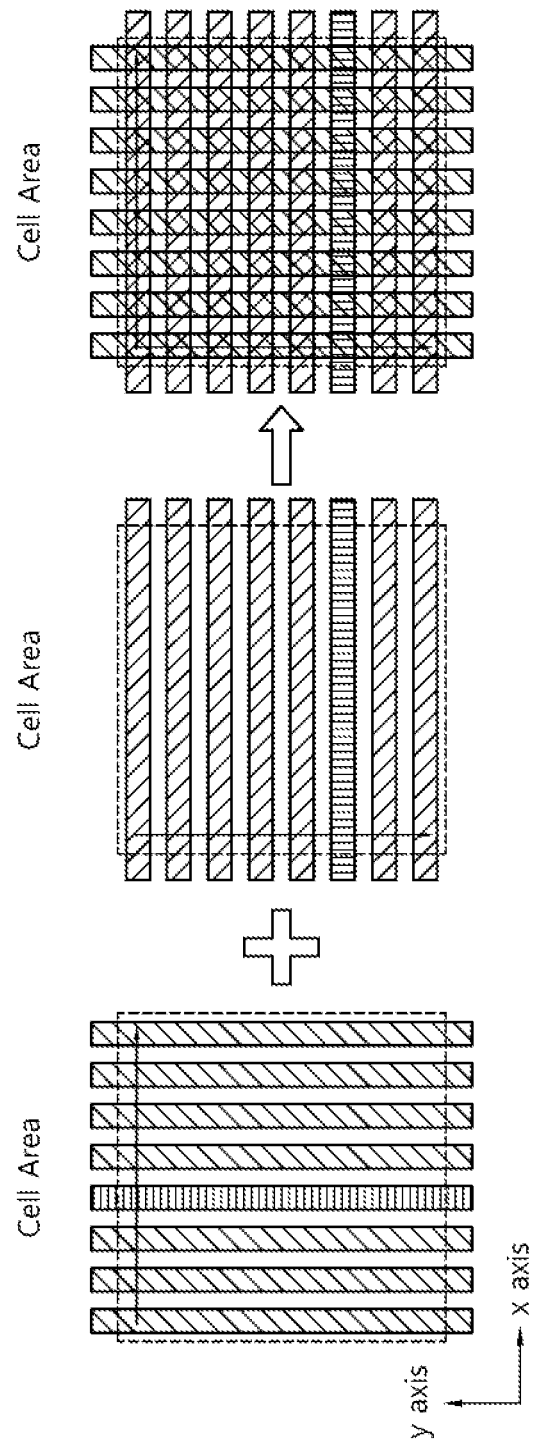
FIG. 70 schematically illustrates an example of beam transmission.

FIG. 70 schematically illustrates an example of beam transmission.

3.1.1.2.7. Through the above steering for each axis, the receiving end can recognize the x-axis beam and the y-axis beam, the beam direction can be recognized by the intersection of the x-axis and the y-axis.

3.1.1.2.8. Through the above method, beam tracking can be performed with the sum of the scanning time for x-axis rotation and the scanning time for y-axis rotation. However, due to the formation of a line beam, a single reception point may have a loss in terms of reception SNR.

Therefore, based on the above characteristics, the metasurface should be designed according to the central frequency ω_0, the virtual antenna spacing d, the frequency comb spacing Δω_x, and N determining the number of virtual antennas.

Metasurface Design for 4D Beamforming (l, w, h, θ, . . . )=f(ω_0, d, Δω_x, N).

At this time, the configuration of the virtual antenna array (Array) through the metaspace must be designed to satisfy ω_(m,n), a_(m,n), and φ_(m,n) described above.

3.1.1.3. Multiple 1D-Array Based 4D Beamforming 3.1.1.3.1. For x-axis rotation, all or multiple V_(m,n) are activated. At this time, a_(m,n)=a_(m,n), ω_(m,n)=ω_0+m*Δω_x, and φ_(m,n)=0.

3.1.1.3.2. That is, all or a plurality of V_(m,n) are activated, but since ω_(m,n)=ω_(m,0) for all n, the y-axis does not rotate and only the y-axis beam width decreases.

Figure 71:
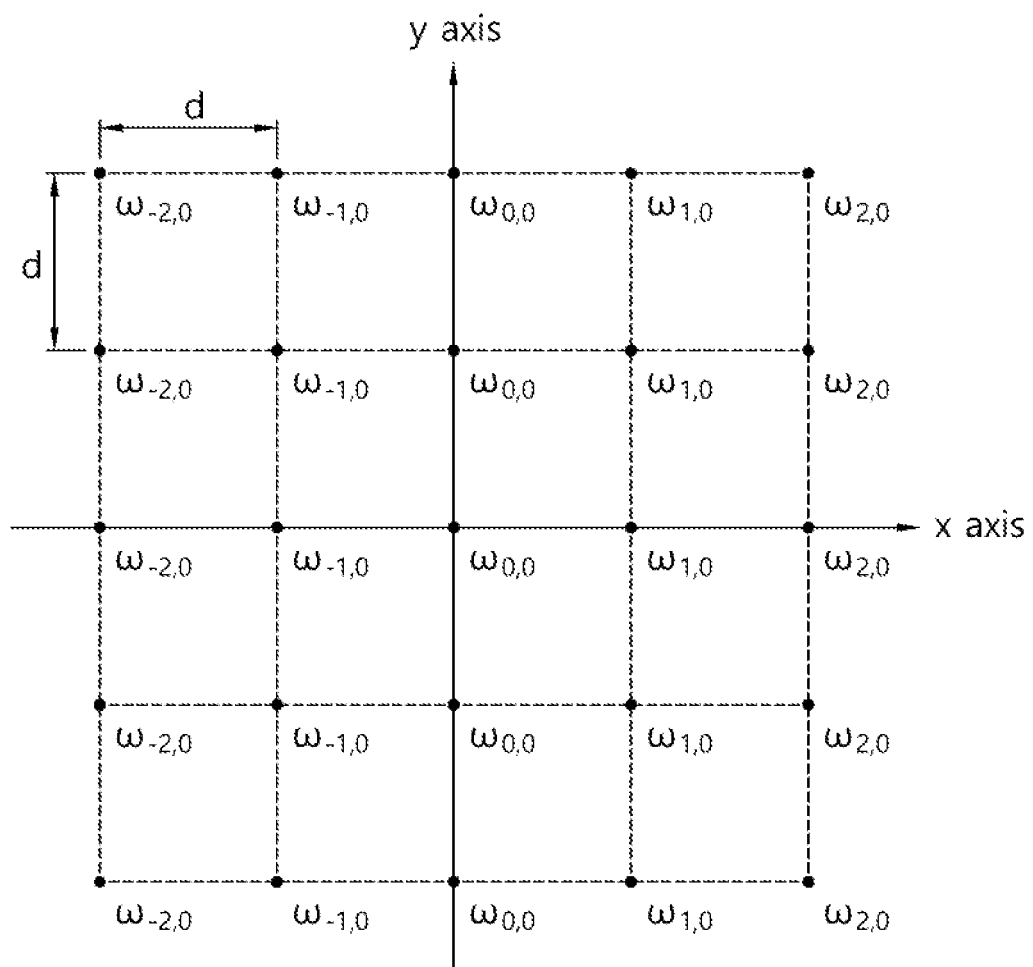
FIG. 71 schematically shows another example of a virtual antenna array space.

FIG. 71 schematically shows another example of a virtual antenna array space.

3.1.1.3.3. For example, a virtual antenna may be activated for a virtual antenna array where m=2 and n=2.

Figure 72:
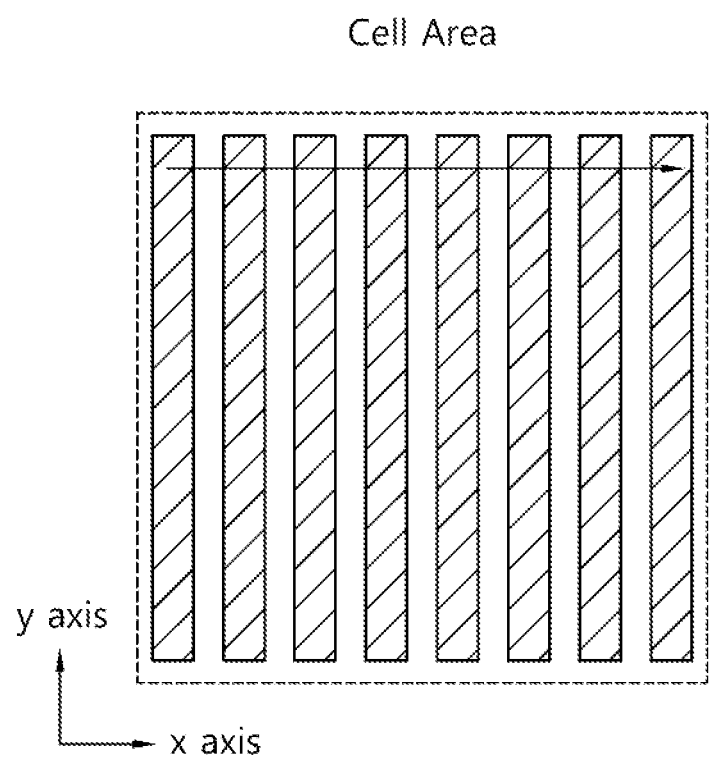
FIG. 72 schematically illustrates an example of beam transmission in the example of FIG. 71.

FIG. 72 schematically illustrates an example of beam transmission in the example of FIG. 71.

3.1.1.3.4. Through the above method, since there is only x-axis steering, the beam arrives while rotating along the x-axis in the cell area where the receiving end exists, in the y-axis, it spreads widely in the form of a line beam, but the width is controlled according to the number of activations of the v-axis virtual antenna.

3.1.1.3.5. The same can be done for the y-axis in the same way as the procedure in 3.1.1.2.

3.1.1.3.6. Through the above method, beam tracking can be performed with the sum of the scanning time for x-axis rotation and the scanning time for y-axis rotation. However, due to the formation of a line beam, a single reception point may have a loss in terms of reception SNR.

Therefore, based on the above characteristics, the metasurface should be designed according to the central frequency ω_0, the virtual antenna spacing d, the frequency comb spacing Δω_x, and N determining the number of virtual antennas.

Metasurface Design for 4D Beamforming (l, w, h, θ, . . . )=f(ω_0, d, Δω_x, N).

At this time, the configuration of the virtual antenna array through the metasurface should be designed to satisfy ω_(m,n), a_(m,n), and φ_(m,n) described above.

3.1.2. 4D Beamforming Based on 2-Dimensional Frequency Gradient 3.1.2.1. The specification proposes 4D beamforming that simultaneously steers the x-axis and the y-axis through a 2-dimensional frequency gradient.

3.1.2.2. For simultaneous rotation of the x and y axes, all or multiple V_(m,n) are activated. At this time, a_(m,n)=a_(m,n), ω_(m,n)=ω_0+m*Δω_x+n*Δω_y, and φ_(m,n)=0.

Figure 73:
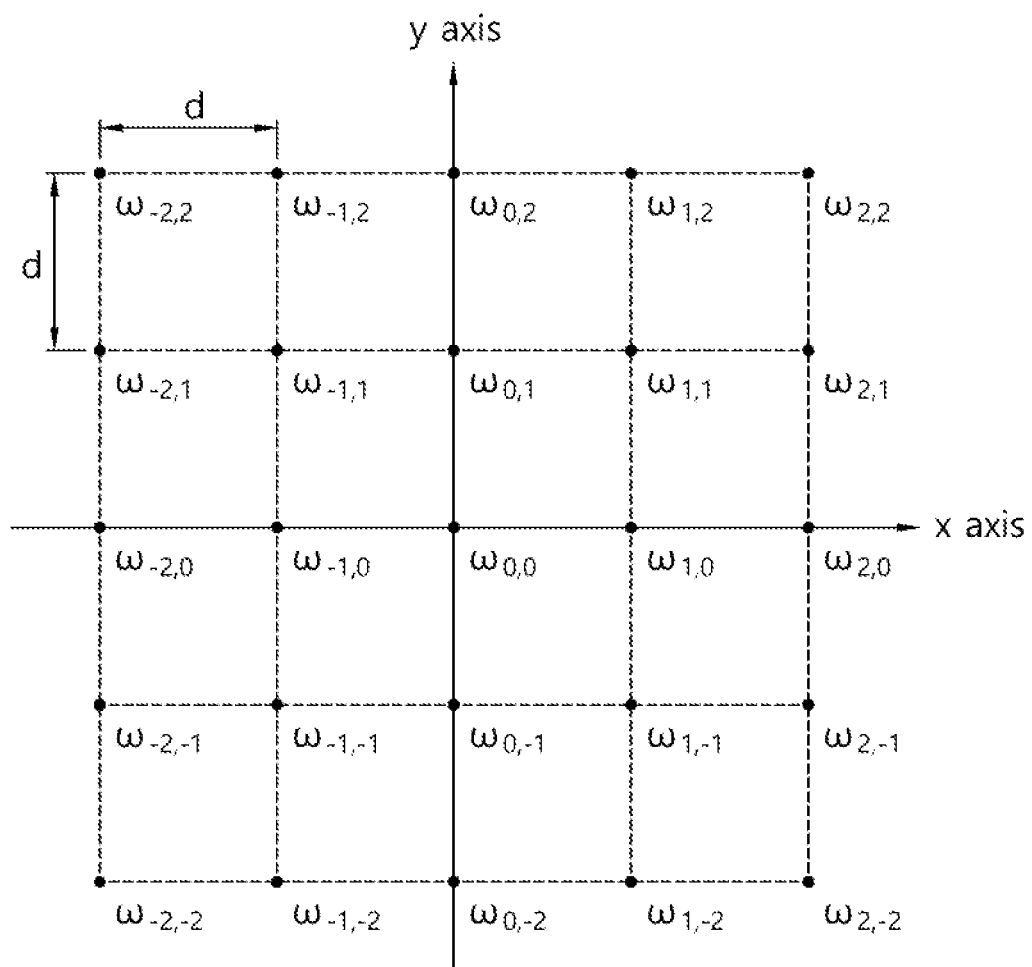
FIG. 73 schematically shows another example of a virtual antenna array space.

FIG. 73 schematically shows another example of a virtual antenna array space.

3.1.2.3. For example, a virtual antenna may be activated as shown in FIG. 73 for a virtual antenna array where m=2 and n=2.

Figure 74:
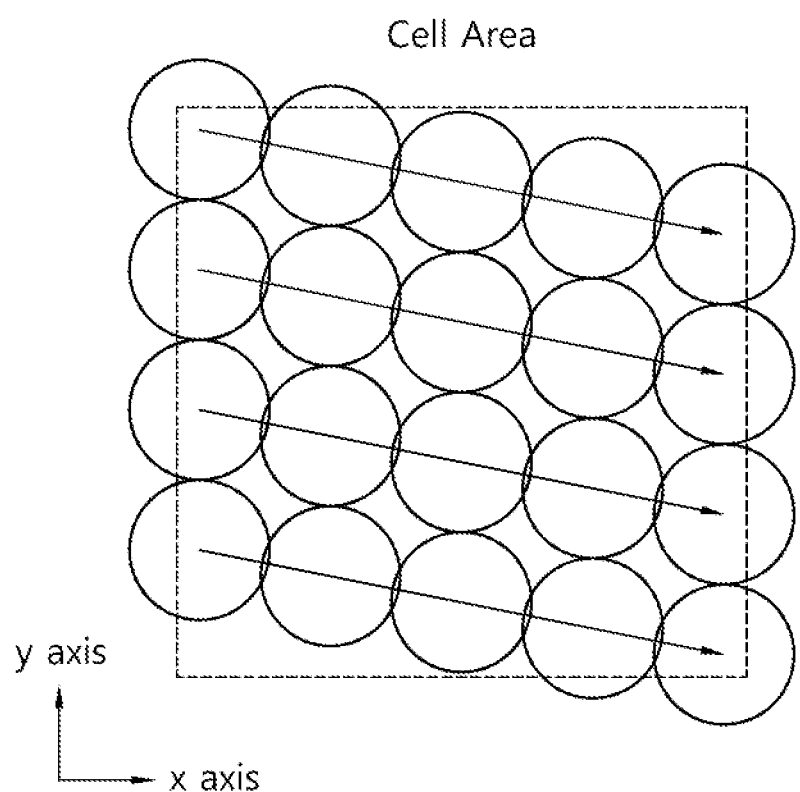
FIG. 74 schematically illustrates an example of beam transmission in the example of FIG. 73.

FIG. 74 schematically illustrates an example of beam transmission in the example of FIG. 73.

3.1.2.4. Through this method, since x-axis steering and y-axis steering exist simultaneously by Δω_x and Δω_y, in the cell area where the receiving end is present, the beam rotates along the x-axis with time and also rotates along the y-axis with time.

3.1.2.5. At this time, if the x-axis rotation time and the y-axis rotation time are set differently through the control of Δω_x and Δω_y, the cell area can be steered in 2 dimensions.

For example, if $\Delta\omega\_x = K * \Delta\omega\_y$, the iteration time for x-axis rotation is K times faster than the iteration time for y-axis rotation.

3.1.2.6. Through simultaneous steering on the two axes, the receiving end can recognize the target beam at once.

3.1.2.7. Through the above method, beam tracking can be performed with a scanning time of sweeping the entire cell area by x-axis rotation and y-axis rotation. At this time, the reception SNR can be maximized at a single reception point by forming a pencil beam.

Therefore, based on the above characteristics, the metasurface should be designed according to the central frequency $\omega\_0$, the virtual antenna spacing d, the frequency comb spacing $\Delta\omega\_x$ and $\Delta\omega\_y$, and N determining the number of virtual antennas.

Metasurface Design for 4D Beamforming (l, w, h, $\theta$, ...) = $f(\omega_0, d, \Delta\omega_x, \Delta\omega_y, N)$.

At this time, the configuration of the virtual antenna array through the metasurface should be designed to satisfy $\omega\_(m,n)$, $a\_(m,n)$, and $\varphi\_(m,n)$ described above.

3.1.3. 4D Beamforming Based on Frequency Gradient and Phase Gradient 3.1.3.1. The specification proposes 4D beamforming that performs x-axis steering and y-axis switching through a 1-dimensional frequency gradient and a 1-dimensional phase gradient.

3.1.3.1.1. It is obvious that the method of performing 4D beamforming by x-axis switching and y-axis steering is also the same.

For x-axis rotation and y-axis change, all or multiple $V\_(m,n)$ are activated. At this time, $a\_(m,n)=a\_(m,n)$, $\omega\_(m,n)=\omega\_0 + m*\Delta\omega\_x$, and $\varphi\_(m,n)=(n+t/\tau\_x)*\Delta\varphi\_y$. Here, $\tau\_x=2\pi/(\Delta\omega\_x)$, which is the repetition time of the x-axis beam steering.

3.1.3.2.1. That is, all or multiple $V\_(m,n)$ are activated, but since $\omega\_(m,n)=\omega\_(m,0)$ for all n, the y-axis does not rotate and only the y-axis beam width decreases.

3.1.3.2.2. At this time, since the y-axis has an array structure phased by $\varphi\_(m,n)=(n+t/\tau\_x)*\Delta\varphi\_y$, beam tilting occurs with $\Delta\varphi\_v$. That is, for y-axis tilting, a signal supplied to each virtual antenna must be phase-shifted.

3.1.3.2.3. That is, all or multiple $V\_(m,n)$ are activated, but since $\varphi\_(m,n)=\varphi\_(0,n)$ for all m, the y-axis tilt angle is determined by $\varphi\_(0,n)$.

Figure 75:
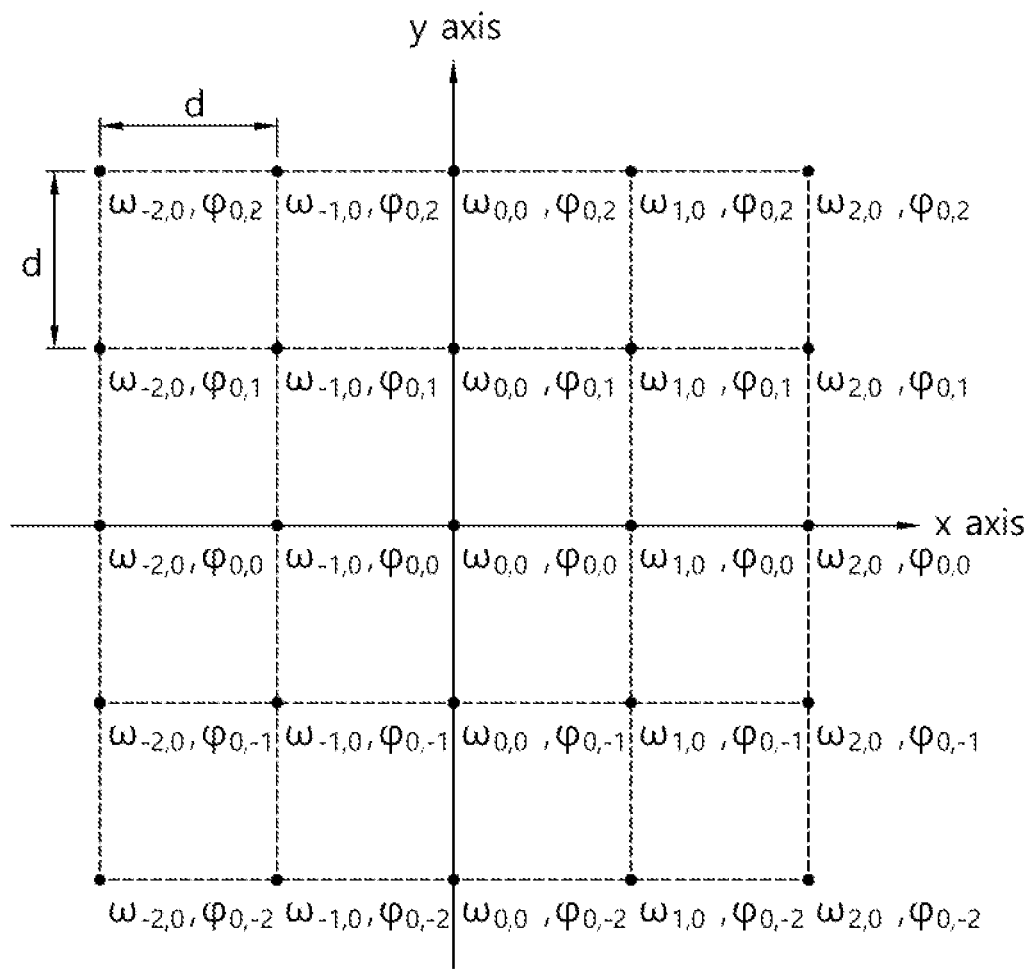
FIG. 75 schematically shows another example of a virtual antenna array space.

FIG. 75 schematically shows another example of a virtual antenna array space.

3.1.3.3. For example, a virtual antenna may be activated for a virtual antenna array in which m=2 and n=2.

3.1.3.4. Through this method, since x-axis steering and y-axis switching exist at the same time by $\Delta\omega\_x$ and $\Delta\varphi\_y$, the beam is switched (tilted) to the y-axis while rotating along the x-axis over time in the cell area where the receiving end exists.

Figure 76:
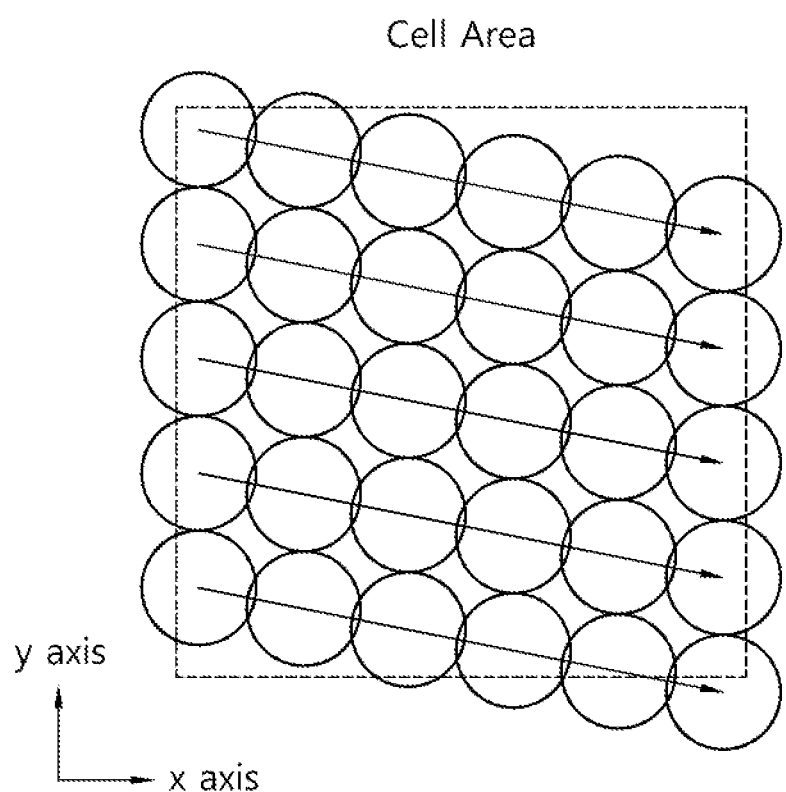
FIG. 76 schematically illustrates an example of beam transmission in the example of FIG. 75.

FIG. 76 schematically illustrates an example of beam transmission in the example of FIG. 75.

3.1.3.4.1. At this time, if the period for phase-shifting $\varphi\_(m,n)$ is infinite, continuous y-axis switching is possible like the 2-dimensional frequency gradient-based 4D beamforming of 3.1.2.

3.1.3.4.2. At this time, if the period for phase shifting $\varphi\_(m,n)$ is discrete with a specific period, y-axis switching is possible according to the period.

Figure 77:
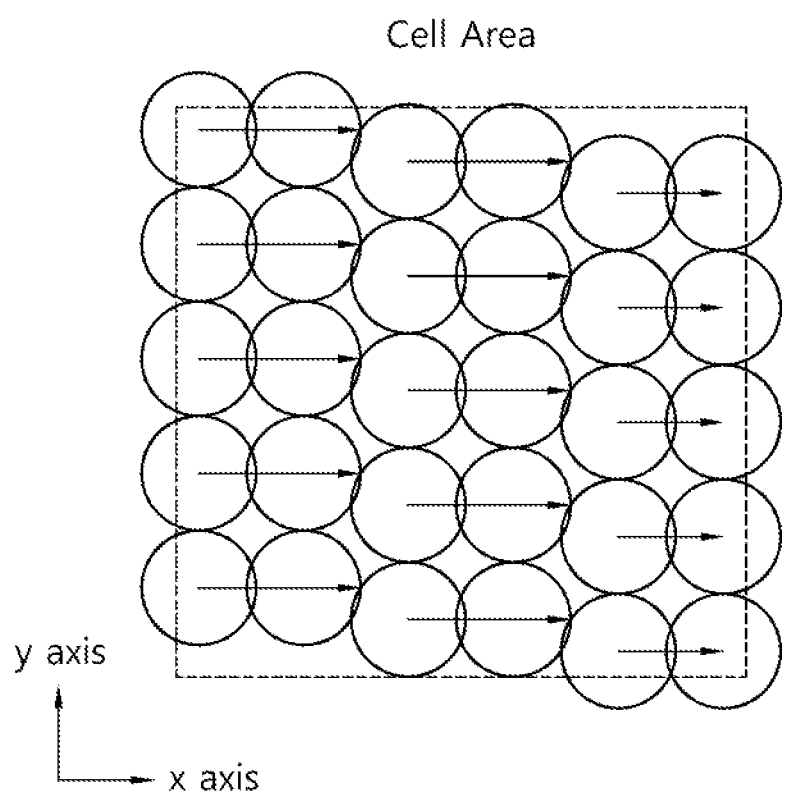
FIG. 77 schematically illustrates an example of beam transmission in the example of FIG. 75.

FIG. 77 schematically illustrates an example of beam transmission in the example of FIG. 75.

3.1.3.4.2.1. For example, if the period for phase shifting $\varphi\_(m,n)$ is 1/3 $\tau\_x$, the y-axis switching occurs three times while the x-axis rotates according to time.

Figure 78:
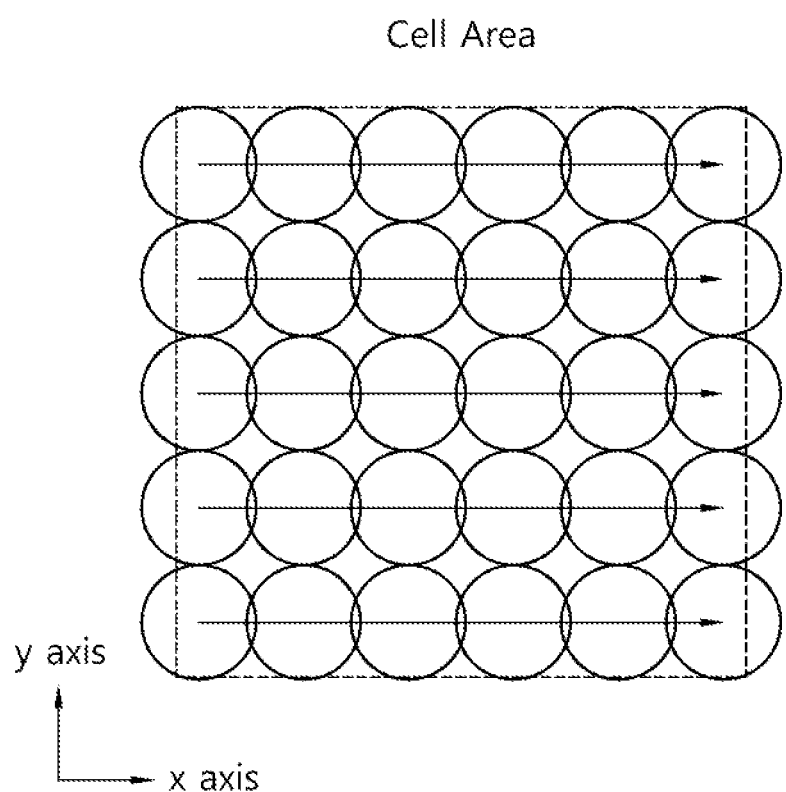
FIG. 78 schematically illustrates an example of beam transmission in the example of FIG. 75.

FIG. 78 schematically illustrates an example of beam transmission in the example of FIG. 75.

3.1.3.4.2.2. For example, if the period for phase shifting $\varphi\_(m,n)$ is $\tau\_x$, the y-axis switching occurs once while the x-axis rotates with time.

3.1.3.5. Through the steering and switching of the above two axes, the receiving end can recognize the target beam at once.

3.1.3.6. Through the above method, beam tracking can be performed with a scanning time of sweeping the entire cell area by x-axis rotation and y-axis tilt. At this time, the reception SNR can be maximized at a single reception point by forming a pencil beam.

Therefore, based on the above characteristics, the metasurface should be designed according to the central frequency $\omega\_0$, the virtual antenna spacing d, the frequency comb spacing $\Delta\omega\_x$, and N determining the number of virtual antennas.

Metasurface Design for 4D Beamforming (l, w, h, $\theta$, ...) = $f(\omega_0, d, \Delta\omega_x, N)$.

At this time, the configuration of the virtual antenna array through the metasurface should be designed to satisfy $\omega\_(m,n)$, $a\_(m,n)$, and $\varphi\_(m,n)$ described above.

Figure 79:
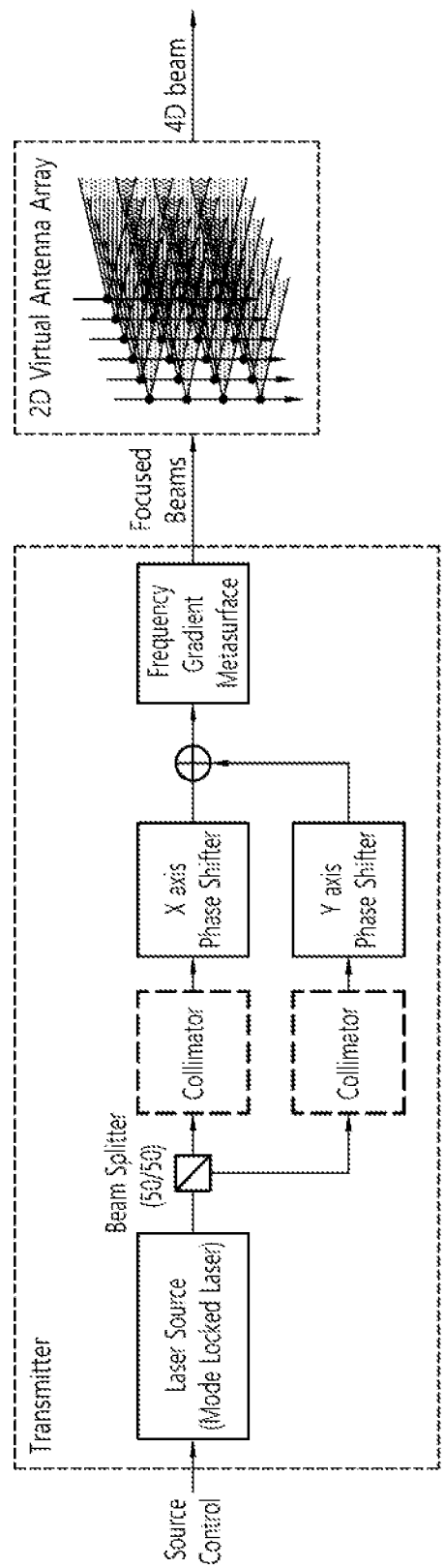
FIG. 79 schematically illustrates an example of a transmission device according to another example of the present specification.

3.2. 4D Beamforming Based on Source Signal Control 3.2.1. Beam Splitter-Based Multiple Source Generation and Superposition FIG. 79 schematically illustrates an example of a transmission device according to another example of the present specification.

3.2.1.1. Split the pulsed signal generated at the source stage into a beam splitter, by setting the incident angle $\theta\_M$ incident on the meta grating through the phase shifter described in 2.3 as the x-axis and y-axis, a focused beam passing through a frequency gradient metasurface forms a two-dimensional virtual antenna array.

3.2.2. Multiple Source Superposition

Figure 80:
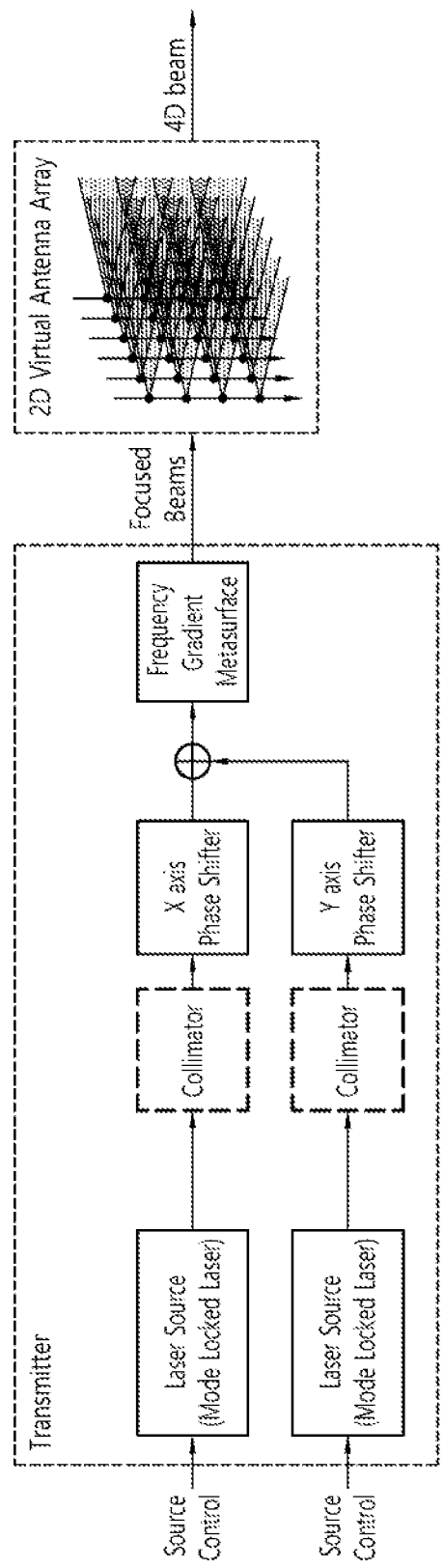
FIG. 80 schematically illustrates an example of a transmission device according to another example of the present specification.

FIG. 80 schematically illustrates an example of a transmission device according to another example of the present specification.

3.2.2.1. By generating two pulsed signals at the source stage, by setting the incident angle $\theta M$ incident on the meta grating through the phase shifter described in 2.3 as the x-axis and y-axis, a focused beam passing through a frequency gradient metasurface forms a two-dimensional virtual antenna array.

It is obvious that the same principle can be applied even if the center frequency is changed in the entire proposed structure.

In the above overall proposed structure, it is obvious that the same principle can be applied to other devices that perform signal generation (RF devices based on local oscillators, etc.).

In the above overall proposed structure, it is obvious that the same principle can be applied even when a 2D antenna array is configured in a device manner.

In the above overall proposed structure, it is obvious that the same principle can be applied to the RADAR device that receives the reflected wave of the radiated signal.

In the above overall proposed structure, it is obvious that the same principle can be applied to a device that performs communication by radiating a processed signal as a 4D beam for data transmission.

It is obvious that the entire proposed structure can be applied to unlicensed bands such as WiFi/LiFi and licensed bands such as LTE/NR using the same principle.

Embodiment. Simulation of Frequency-Gradient Beam Control

Figure 81:
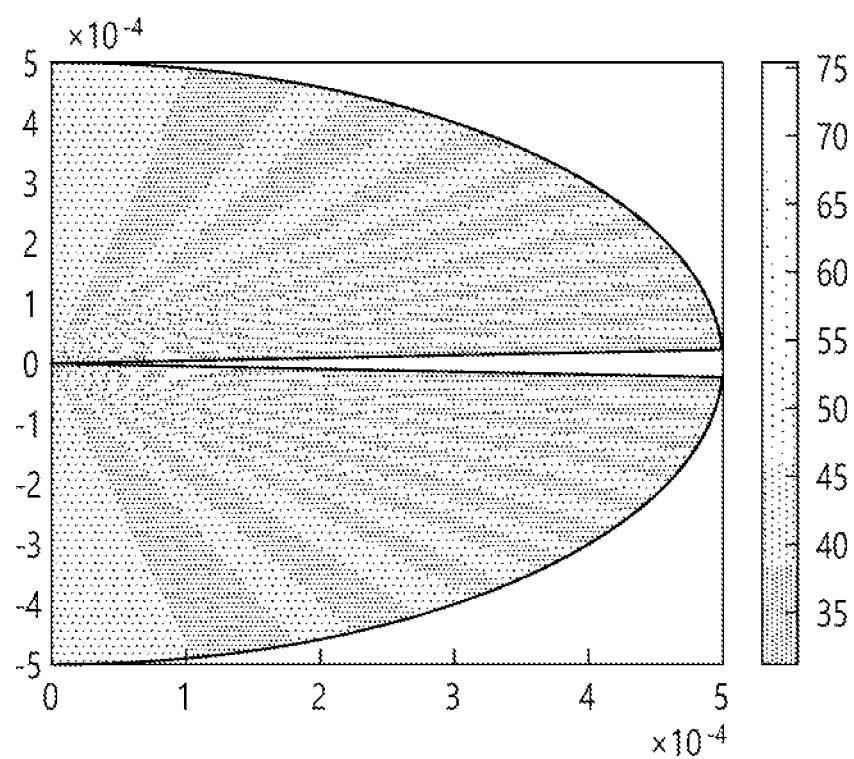
FIG. 81 shows an example of implementing an example of a 4D beam.

FIG. 81 shows an example of implementing an example of a 4D beam.

Theoretically implementing a 4D beam radiated from a virtual antenna array through the transmitter design proposed in the above specification is as follows. In the following, when the angular frequency ω0=2π×416.66 THz related to the central frequency, the frequency interval Δω=2π×100 MHz, the virtual antenna spacing d=360 nm, the number of virtual antennas N=20, if the change of the beam is measured in a space of 500 μm×500 μm, it is as shown in the drawing.

In the drawing, a white color is a point where energy is gathered by beamforming through a virtual antenna, and a black color can be interpreted as a point where energy is not relatively concentrated. For convenience of description, it is expressed in a space of 500 μm×500 μm, but the same can be applied at a long distance. Since the x-axis represents the shape of light traveling a distance of 500 μm, the leftmost side of the x-axis corresponds to 0 s, the rightmost corresponds to 1.67ps (=500 μm/c=500 μm/(3*10 ^8 m/s)).

Figure 82:
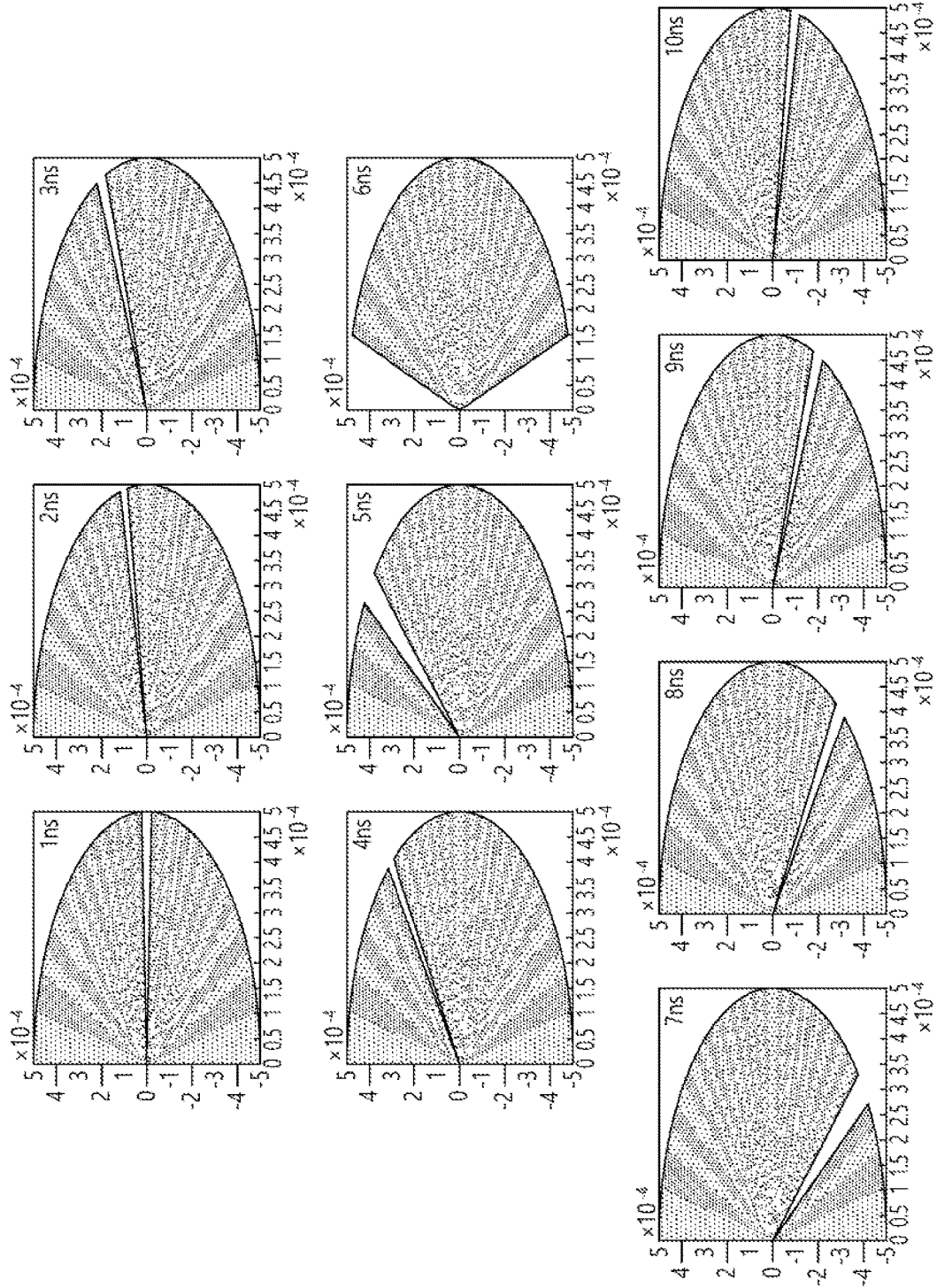
FIGS. 82 to 84 represent the rotation of the 4D beam according to the parameter control of the transmitter.
Figure 83:
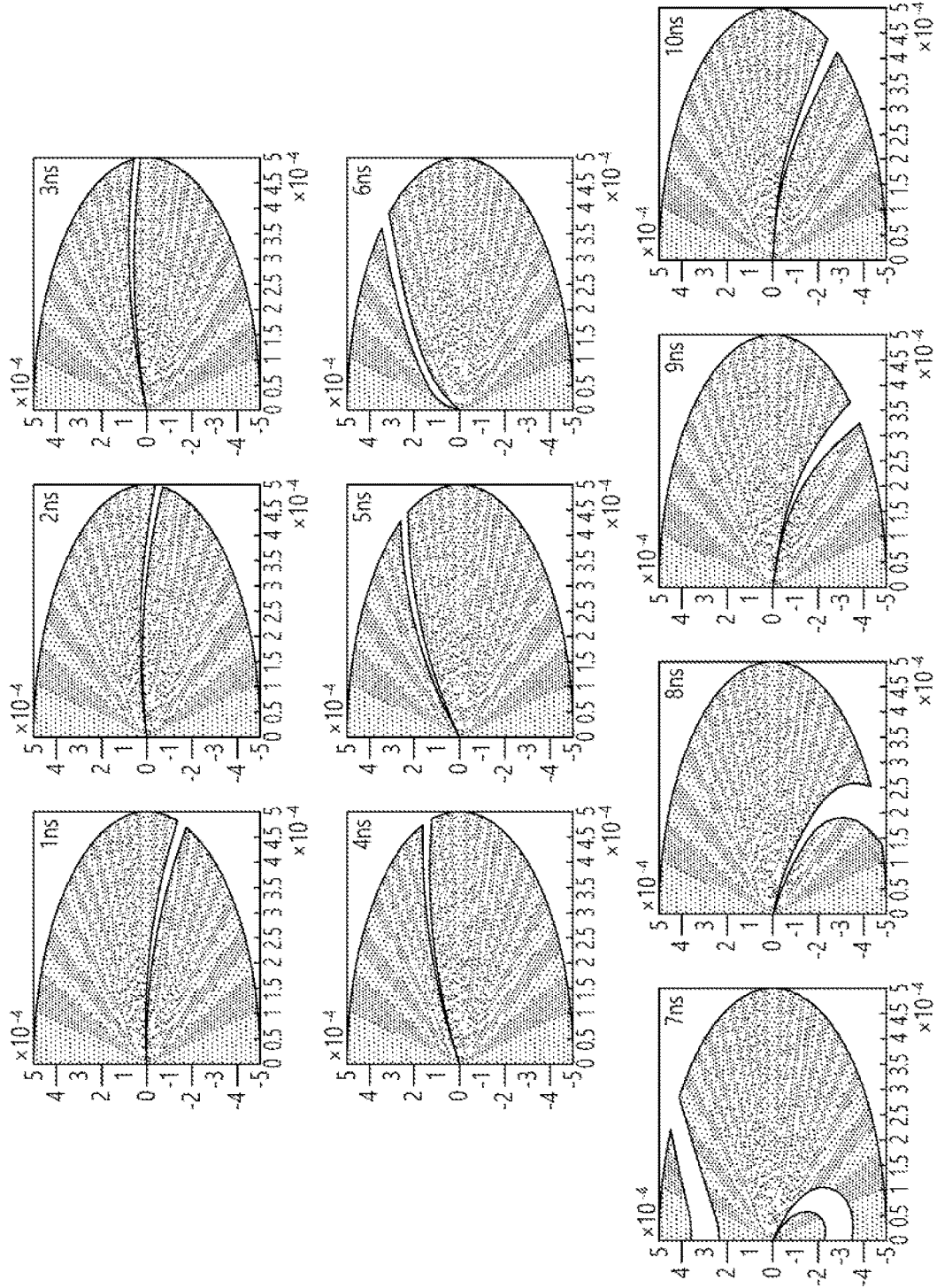
Figure 84:
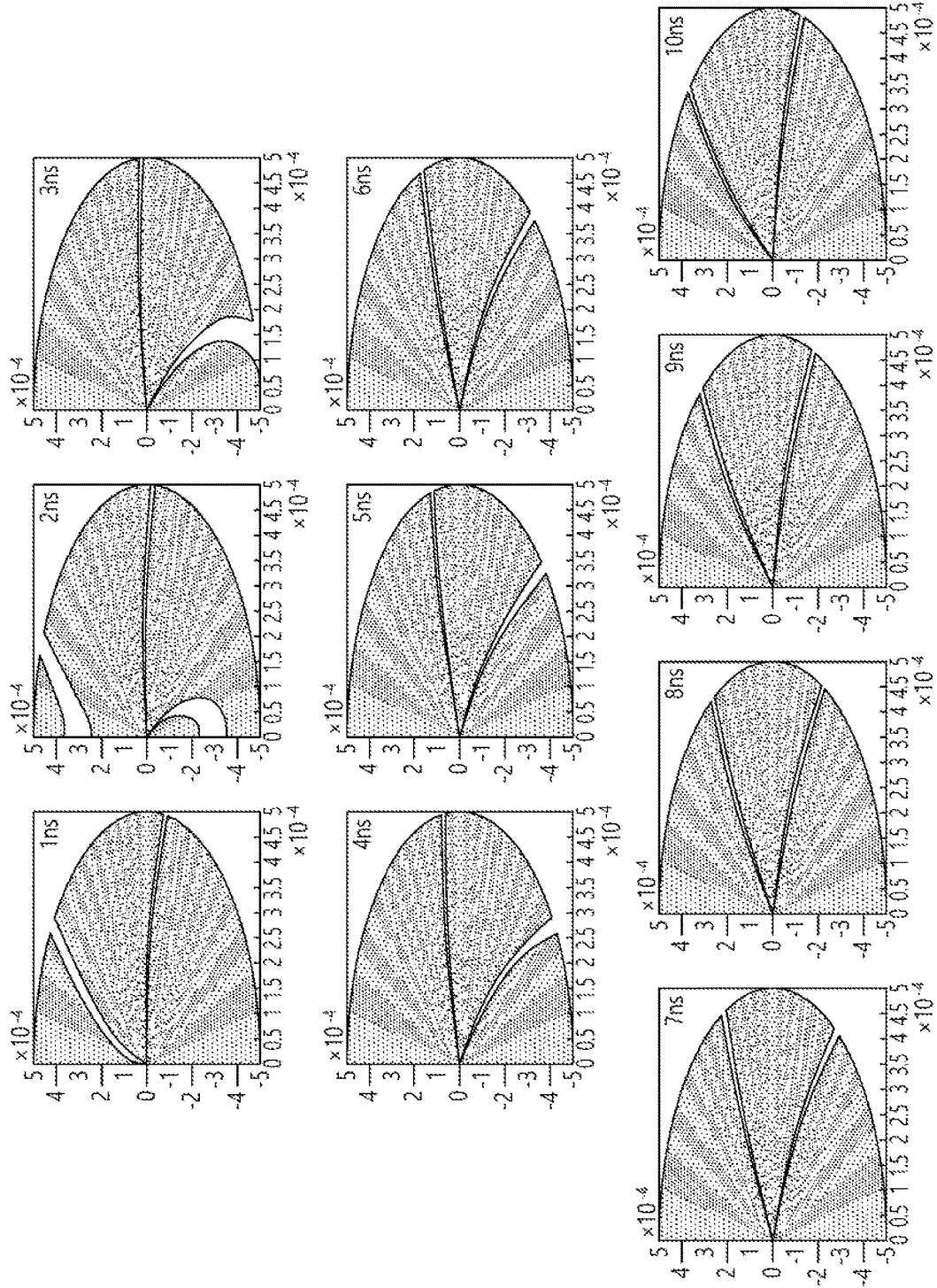

FIGS. 82 to 84 represent the rotation of the 4D beam according to the parameter control of the transmitter.

FIG. 82 corresponds to an example in which angular frequency: ω0=2π×416.66 THz, frequency interval: Δω=2π×100 MHz, virtual antenna interval: d=360 nm, number of virtual antennas: N=20.

FIG. 83 corresponds to an example in which angular frequency: ω0=2π×416.66 THz, frequency interval: Δω=2π×100 GHz, virtual antenna interval: d=360 nm, number of virtual antennas: N=20.

FIG. 84 corresponds to an example in which angular frequency: ω0=2π×416.66 THz, frequency interval: Δω=2π×100 GHz, virtual antenna interval: d=720 nm, number of virtual antennas: N=20.

Hereinafter, this specification will be described in more detail.

The present specification relates to an optical wireless communication (OWC) system. Specifically, it relates to direction recognition of a rapidly rotating signal beam based on an antenna design based on a frequency gradual metasurface in a wireless optical communication system and steering a beam in the recognition direction. The specification includes a method for passing and operating the direction of a perceived signal ray into a regression loop.

When the direction of a signal is rotated very quickly with the methods described above, the receiving end must be able to recognize the direction of the signal aligned with the transmitting end. Therefore, a method of recognizing the direction of a signal and providing feedback thereof may be required. Also, a method for transmitting data in a recognized direction may be needed.

Figure 85:
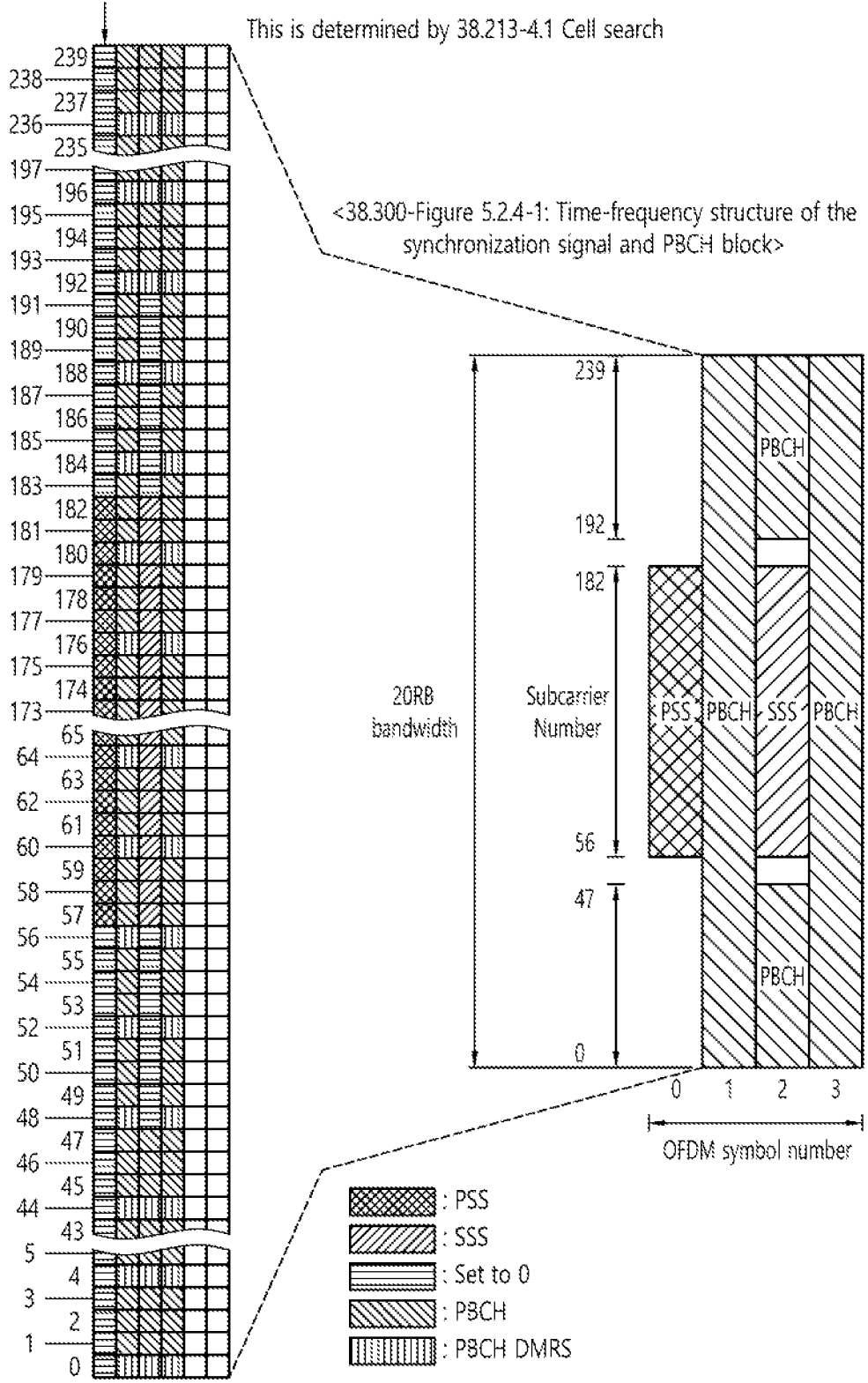
FIG. 85 is a flowchart of a method of transmitting a beam to a receiving device from the viewpoint of a transmitting device according to an embodiment of the present specification.

FIG. 85 schematically illustrates an example of one SSB (Synchronization Signal Block).

In order to recognize a beam in the operation of the existing 3GPP NR, the same structure as in FIG. 85 is used.

PSS and SSS are designed as M-sequences each having 127 hypotheses, so that the receiving end can obtain synchronization based on the sequence. Each of the SSBs may be arranged in a resource grid according to the system environment as follows.

Figure 86:
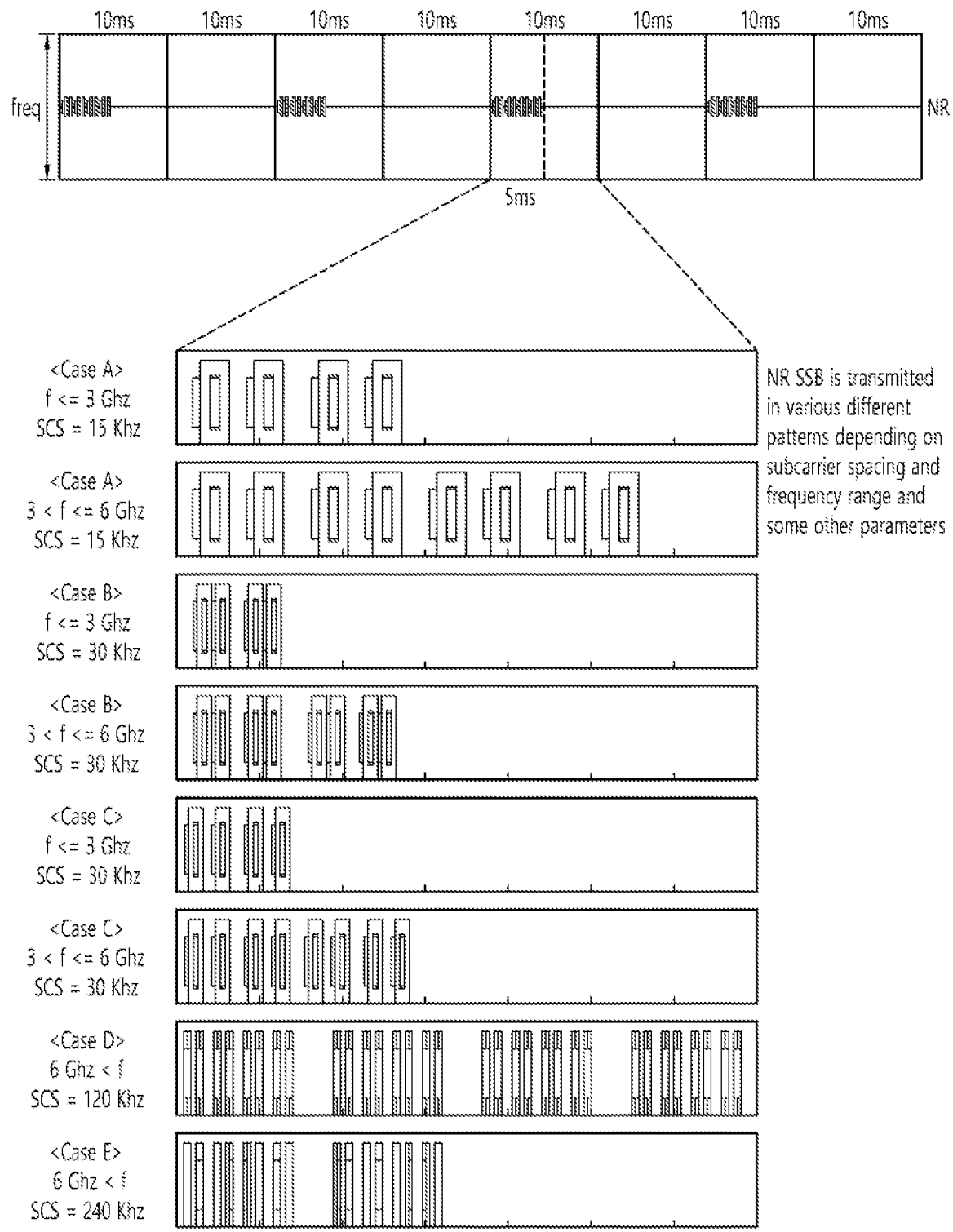
FIG. 86 schematically illustrates the correlation between SSB and resource grid.

FIG. 86 schematically illustrates the correlation between SSB and resource grid.

In the above, each SSB is mapped with a beam index (Index), so the transmitter transmits by switching the beam direction for each SSB, when the receiving end recognizes the SSB receiving the largest signal strength, beam index can be recognized. However, it is difficult to apply very fast beam rotation in the conventional method, when the number of beams is very large, as many search space (SS) blocks as the number of beams are required, there is a problem in that a beam search time becomes very long.

Accordingly, a method for recognizing the direction of a signal transmitted through a frequency gradient virtual antenna and feeding back the direction and a method for transmitting data in the recognized direction may be required.

In the present specification, when a 4D beam is radiated through a transmitter device using a metasurface as a transmitting antenna in wireless optical communication, the specification proposes a method for recognizing and feeding back the direction of a 4D beam at a receiving end. In addition, the specification proposes a method of selecting a 3D beam to transmit data based on a recognized 4D beam direction.

Hereinafter, for a better understanding of the examples of the present specification, the disclosure of the present specification will be described through drawings. The following drawings are made to explain a specific example of the present specification. Since the names of specific devices or names of specific signals/messages/fields described in the drawings are provided as examples, the technical features of the present specification are not limited to the specific names used in the drawings below.

Figure 87:
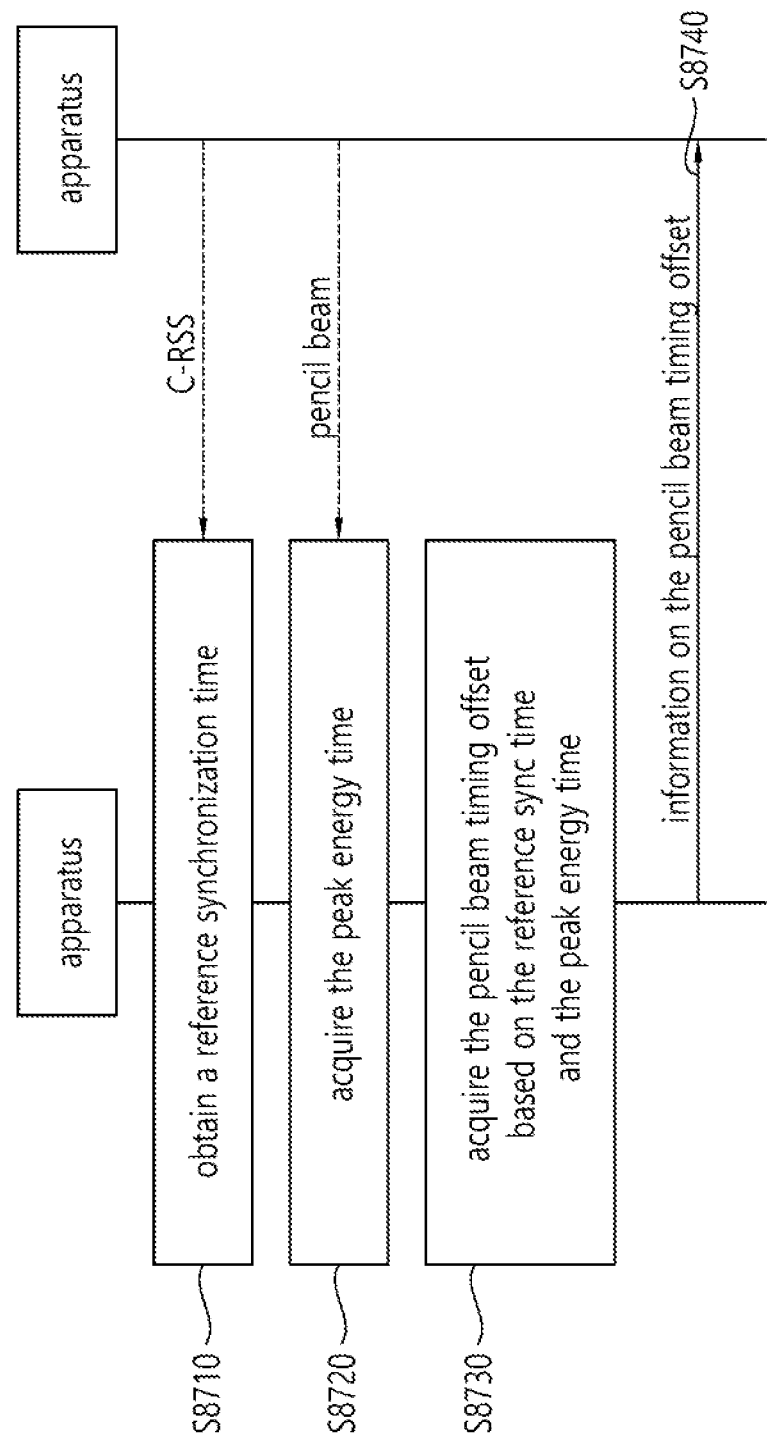
FIG. 87 is a flowchart of a method of transmitting information about a pencil beam timing offset by an apparatus according to an embodiment of the present specification.

FIG. 87 is a flowchart of a method of transmitting information about a pencil beam timing offset by an apparatus according to an embodiment of the present specification.

According to FIG. 87, the device may obtain a reference synchronization time (S8710). Here, the reference synchronization time may be obtained based on a cell-reference synchronization signal (C-RSS) received from another device.

Here, the above device may correspond to a receiving device (or receiver) described above and to be described later. In addition, the above other device may correspond to the transmission device (or transmitter) described above and to be described later.

Here, the device may correspond to a device that performs communication based on LTE/LTE-A, a device that performs NR-based communication described above, and/or a device that performs next-generation communication (e.g., 6G communication) described above. In addition, the above device may correspond to a device that performs a communication system of other series (e.g., IEEE series) rather than the 3GPP series.

In addition, the above device (i.e., a device that transmits information about a pencil beam timing offset) may correspond to the above-described terminal, in addition to this, (considering that a base station can also receive a pencil beam from a terminal), the above device (i.e., a device transmitting information on a pencil beam timing offset) may correspond to a base station.

Meanwhile, the above device may correspond to a device related to a vehicle. For example, the above device may correspond to a kind of V2X device. Here, V2X may be a communication technology applied to signal transmission and reception between vehicles by extending D2D communication, communication related to vehicles (VEHICLE) is specifically called V2X (VEHICLE-TO-EVERYTHING) communication. In V2X, the term 'X' is PEDESTRIAN (COMMUNICATION BETWEEN A VEHICLE AND A DEVICE CARRIED BY AN INDIVIDUAL (e.g. HAND-HELD TERMINAL CARRIED BY A PEDESTRIAN, CYCLIST, DRIVER OR PASSENGER), where V2X can be expressed as V2P), VEHICLE (COMMUNICATION BETWEEN VEHICLES) (V2V), INFRASTRUCTURE/NETWORK (COMMUNICATION BETWEEN A VEHICLE AND A ROADSIDE UNIT (RSU)/NETWORK (Ex) RSU IS A TRANSPORTATION INFRASTRUCTURE ENTITY (Ex) AN ENTITY TRANSMITTING SPEED NOTIFICATIONS) IMPLEMENTED IN AN eNB OR A STATIONARY UE)) (V2I/N). A device possessed by a pedestrian (or person) (related to V2P communication) is named "P-UE", and a device installed in a vehicle (VEHICLE) (related to V2X communication) is named "V-UE". In this specification, the term 'entity' may be interpreted as at least one of P-UE, V-UE, and RSU (/NETWORK/INFRASTRUCTURE).

As an example, the V2X communication mode may be, for example, (A) a mode operating based on the base station indication, for example, in the case of following LTE (A), ((from the base station (/ network)) on a pre-set (/ signaling) V2X resource pool) it may be a mode in which the base station signals (/ controls) scheduling information related to V2X message transmission (/ reception) (e.g., a terminal located within the base station communication coverage (and/or in the RRC_CONNECTED state) is the main target).

And/or, the V2X communication mode, for example, (B) may be a mode in which the terminal operates based on sensing with a degree of freedom, for example, in the case of following LTE (A), ((from the base station (/ network)) on a pre-set (/ signaling) V2X resource pool) it may be a mode in which the UE (independently) determines (/ controls) scheduling information related to V2X message transmission (/ reception) (For example, the main target is a terminal located within/outside the communication coverage of the base station (and/or in the RRC_CONNECTED/IDLE state)).

Hereinafter, a more detailed description of this content will be described later.

The device may acquire the peak energy time (S8720). Hereinafter, a more detailed description of this content will be described later.

The device may acquire the pencil beam timing offset based on the reference sync time and the peak energy time (S8730). Hereinafter, a more detailed description of this content will be described later.

The device may transmit information on the pencil beam timing offset to the other device (S8730). Hereinafter, a more detailed description of this content will be described later.

For example, the peak energy time may be determined based on a pencil beam received from the other device. A more detailed description of this content will be described later for convenience of description.

Also, for example, the peak energy time may be obtained within a beam tracking time. A more detailed description of this content will be described later for convenience of description.

Also, for example, the C-RSS and the pencil beam may be transmitted within a beam search block (BSB) by the other device. Here, for example, an area where the C-RSS is transmitted and an area where the pencil beam is transmitted may be time division multiplexed (TDM). Here, for example, the area where the C-RSS is transmitted and the area where the pencil beam is transmitted may be frequency division multiplexed (FDM). Here, for example, the BSB may be periodically repeated based on a preset period. A more detailed description of this content will be described later for convenience of description.

Also, for example, the pencil beam may be a signal having a beam width corresponding to a narrow area within a cell. A more detailed description of this content will be described later for convenience of description.

For example, the pencil beam timing offset may be obtained based on a difference between the reference synchronization time and the peak energy time. A more detailed description of this content will be described later for convenience of description.

For example, the device may receive data from the other device in response to transmission of the information on the pencil beam timing offset. A more detailed description of this content will be described later for convenience of description.

Hereinafter, the embodiment in FIG. 87 will be described in more detail.

4. Beam Tracking Design for 4D Beamforming

When the transmitter performs 4D beamforming of Method 3 with the structure of Method 2, a method for the receiver to recognize the 4D beam is proposed.

Figure 88:
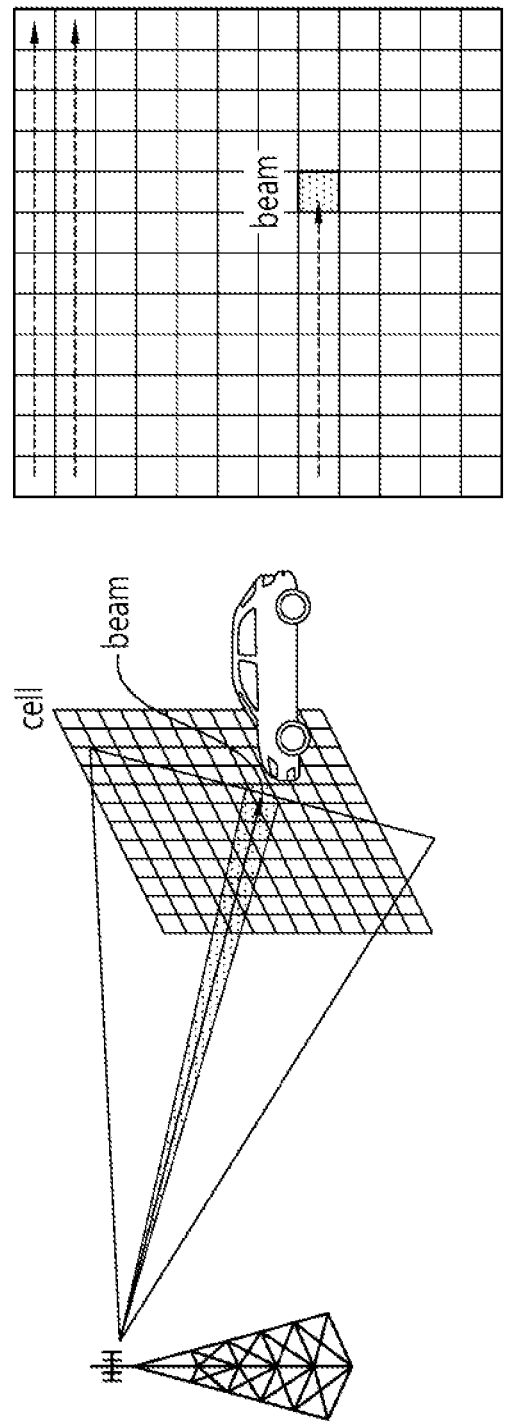
FIG. 88 schematically illustrates an example of a cell area and a unit space in which a pencil beam is received.

FIG. 88 schematically illustrates an example of a cell area and a unit space in which a pencil beam is received.

According to FIG. 88, it is assumed that one cell at the receiving end is a space in which a plurality of pencil beams exist. Then, as shown in the drawing, the entire cell area and the unit space in which the pencil beam is received can be expressed.

In the above, the size of the cell and the unit space where the pencil beam is received may be set according to the system environment. Through 4D beamforming of Method 3, a pencil beam moves over the entire cell area over time. At this time, the unit space of the pencil beam is expressed in a lattice shape for convenience of explanation, the resolution of the movement of the actual pencil beam may be infinite. Therefore, in this specification, a pencil beam is a space where a beam formed by 4D beamforming stays at a specific time, a cell may be defined as an entire space in which a pencil beam steers according to time by 4D beamforming.

4.1. Reference Synchronization (Sync.) Signal Based Beam Detection for Sequential Transmission (TDM)

By sequentially transmitting the cell-reference synchronization signal (C-RSS) and the pencil beam at the transmitter, at the receiving end, the reference synchronization time and the peak energy beam time are obtained, a method of measuring a pencil beam timing offset is proposed.

First, the transmitting end can transmit with the following structure.

Figure 89:
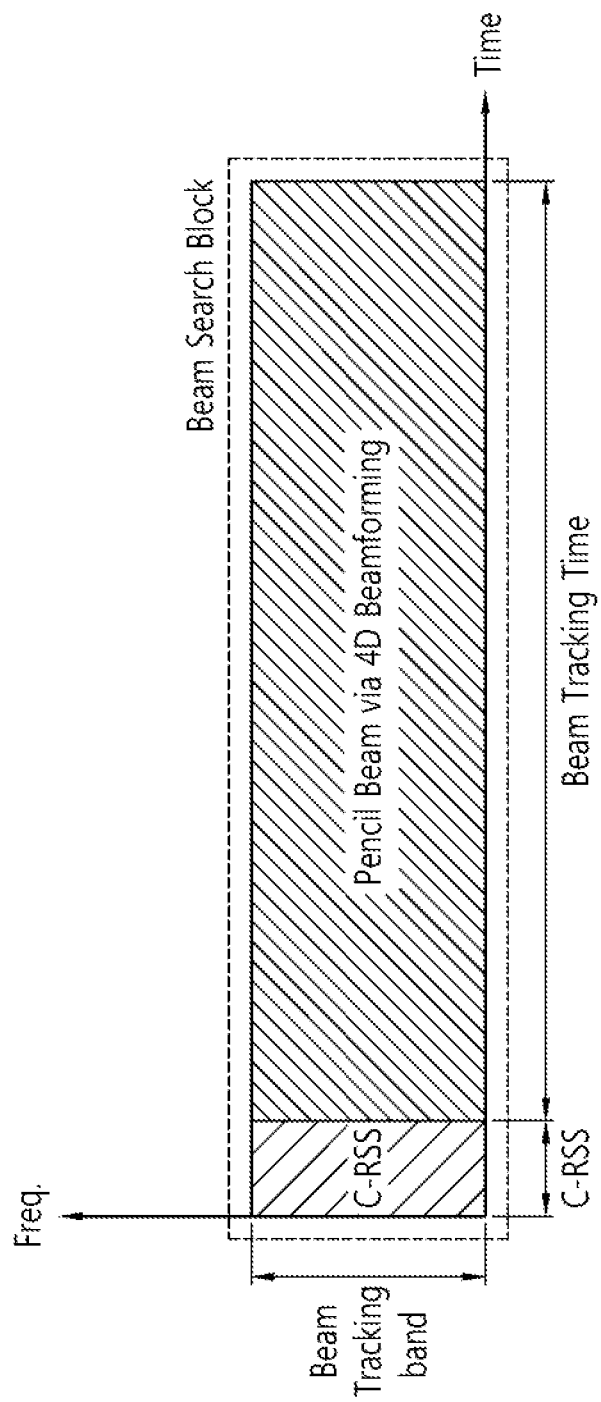
FIG. 89 schematically illustrates a structure in which C-RSS and pencil beams are transmitted.

FIG. 89 schematically illustrates a structure in which C-RSS and pencil beams are transmitted.

According to FIG. 89, the transmitting device can transmit C-RSS and pencil beams on a beam search block (BSB). Here, the C-RSS and pencil beams may be transmitted within a beam tracking band in terms of frequency. In addition, in terms of time, C-RSS can be transmitted in the transmission period of C-RSS, and the pencil beam can be transmitted within the beam tracking time.

In other words, a pencil beam formed by C-RSS and 4D beamforming may be sequentially TDM-transmitted in the beam search block (BSB), which is transmitted at a predetermined period.

Also, at the receiving end, it may be received in the following structure.

Figure 90:
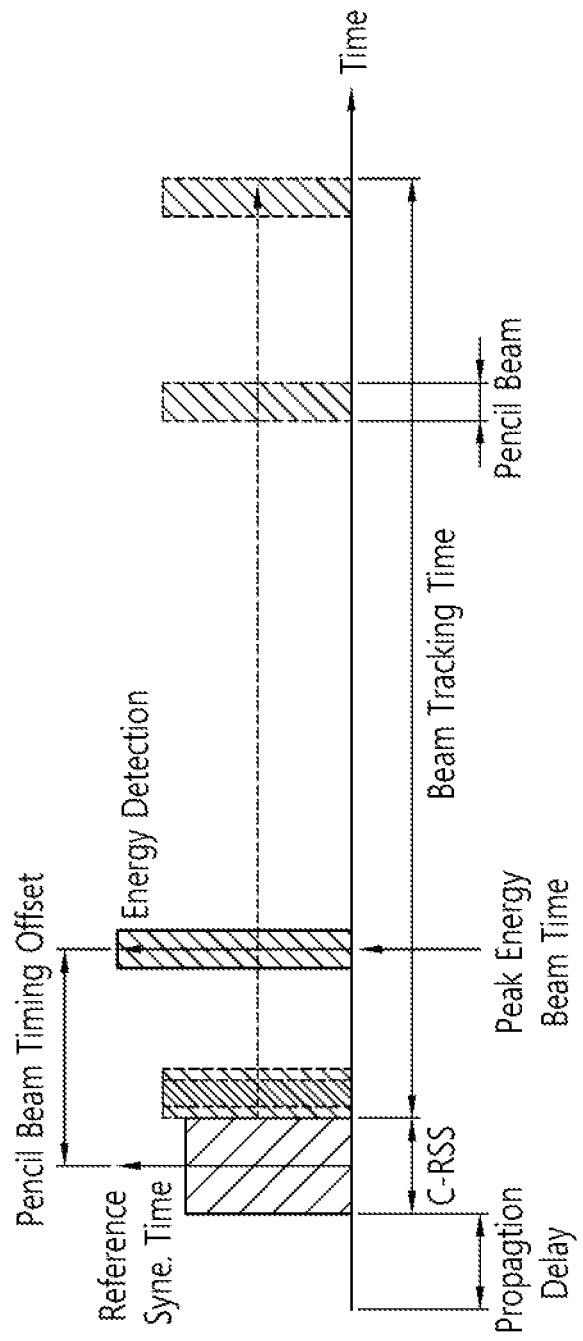
FIG. 90 schematically illustrates an example of pencil beam timing offset acquisition.

FIG. 90 schematically illustrates an example of pencil beam timing offset acquisition.

According to FIG. 90, after a propagation delay according to the distance between the transmitter and the receiver, C-RSS and pencil beams are received, depending on the location of the receiving end, the time at which peak energy is obtained within the beam tracking time is different. The receiving end acquires a reference synchronization time and peak energy beam time by C-RSS, and obtains a pencil beam timing offset.

More specifically, the configurations described above may be described as follows.

Cell-Reference Synchronization Signal (C-RSS)

In the above, a cell-reference synchronization signal (C-RSS) having a beam width covering the entire cell space is proposed. C-RSS is a signal having a center frequency $\omega\_r$ and can be designed based on a sequence (e.g., M-sequence, Zadoff-chu sequence, etc.) having a signal magnitude $P\_r$. For example, C-RSS may be configured in the same way as PSS or SSS of 3GPP LTE or NR. C-RSS may be transmitted periodically based on a pre-agreed period. When the transmitting end transmits the C-RSS, the receiving end obtains a reference synchronization time based on auto-correlation of the sequence. If the C-RSS is designed based on a sequence, the cell-ID can be obtained through sequence detection. This can be perceived in the same way as the PSS or SSS of 3GPP LTE or NR.

Pencil Beam

In the above, the pencil beam is a signal having a beam width corresponding to a narrow area within a cell and may be formed by 4D beamforming. A pencil beam is a signal having a center frequency $\omega\_0$ and may be designed as a pulsed signal having the same magnitude $P\_0$. For example, a pencil beam may be configured by passing a pulsed signal generated by a laser source of method 2 through a virtual antenna array through method 3. When the transmitting end transmits a pencil beam, the receiving end obtains a peak energy beam time at which peak energy is obtained based on energy detection.

Pencil Beam Timing Offset

In the above, the receiving end obtains a pencil beam timing offset through a difference from the peak energy beam time based on the reference synchronization time. Here, the accuracy of the pencil beam timing offset may be determined by a sampling resolution of a receiving end for obtaining a reference synchronization time and a sampling resolution of a receiving end for obtaining a peak energy beam time.

Power Allocation and Pencil Beam of C-RSS

In the above, the transmission power $P\_r$ of the C-RSS and the transmission power $P\_0$ of the pencil beam have a predetermined size ratio. The two powers may be determined by $P\_r = K \cdot P\_0$. Here, K is a constant. For example, when it is assumed that the beam radius at the receiving end is $R\_r$ due to a divergence half angle that determines the beam width of C-RSS, assume that the area of the beam at the receiving end is $A\_r$. In addition, when the beam radius at the receiving end is assumed to be $R\_0$ by the divergence half angle that determines the beam width of the pencil beam, it can be referred to as the area $A\_0$ of the beam at the receiving end.

FIG. 91 schematically illustrates an example of a radius according to a beam generation method.

For example, if the minimum width of the beam and the divergence half angle are determined according to the beam generation method, the radius may appear as shown in the drawing.

Then, with respect to the transmission power $P\_0$ and $P\_r$, the reception power has a relationship of $S\_r \propto (P\_r/A\_r)$ and $S\_0 \propto (P\_0/A\_0)$, respectively. In addition, when the time at which C-RSS is received at the receiving end is $T\_r$ and the time at which the pencil beam is received at the receiving end is $T\_0$, for the transmission powers $P\_0$ and $P\_r$, the reception powers have a relationship of $S\_r \propto P\_r \cdot T\_r$ and $S\_0 \propto P\_0 \cdot T\_0$, respectively. Here, $T\_0$ is not a total beam tracking time, but a pencil beam reception time at which an effective signal strength exceeding a specific threshold is received from the perspective of a single receiving end.

Therefore, for stable Adaptive Gain Control (AGC) of the receiving end, it may be necessary to set transmission powers $P\_0$ and $P\_r$ to equalize the sizes of $S\_r$ and $S\_0$. Therefore, the constant K should be determined by $K = a \cdot (A\_0/A\_r) \cdot (T\_r/T\_0)$. In this case, a is a weight parameter that is a constant that can be set according to the system environment. The constant K can be promised between the transmitting and receiving ends, depending on the system environment, it may be notified to the receiving end through control signaling or broadcasting message.

FIG. 92 schematically illustrates an example of abeam area environment.

For example, when a loss according to a channel environment is the same for C-RSS and a pencil beam, $a=1$ may be set. At this time, in a beam area environment of $A\_r=100 \ast A\_0$, $K=1$ may be set in a frame structure in which $T\_r$ is received for a time 100 times longer than $T\_0$. For example, it is like a drawing.

However, here, the transmit power $P\_0$ of the pencil beam is the signal strength of the beam emitted through the virtual antenna array, the signal strength applied from the front end of the virtual antenna may be designed to be higher in consideration of signal attenuation by the virtual antenna array or metasurface.

In the above procedure, since C-RSS and Pencil beams are composed of TDM, $\omega\_r = \omega\_0$ may also be used.

In the above procedure, if a connection is already maintained between the transmitting and receiving end, a pencil beam timing offset may be estimated based on the existing synchronization timing. For example, if downlink synchronization is secured in cellular communication, the reference synchronization time is set based on the symbol boundary, a pencil beam can be detected at a given beam tracking time. In this case, the BSB may be composed of only pencil beams without C-RSS.

In the above procedure, C-RSS and Pencil beams may be transmitted after a pre-scheduled time. For example, even if the beam tracking time starts after a predetermined time after C-RSS transmission and the peak energy beam time is obtained, a direction of a pencil beam may be calculated based on a pencil beam timing offset in consideration of a time difference promised in advance. That is, if the transmission start point of C-RSS and Pencil beam is promised in advance, C-RSS and Pencil beams may not be sequentially transmitted in the same frame/slot/symbol.

4.2. Beam Detection Based on Reference Synchronization Signal for Simultaneous Transmission (FDM)

By simultaneously transmitting the cell-reference synchronization signal (C-RSS) and the pencil beam in different frequency bands at the transmitter, at the receiving end, the reference synchronization time and the peak energy beam time are obtained, the specification proposes a method for measuring the Pencil beam timing offset.

For example, the transmitting end may transmit with the following structure.

Figure 93:
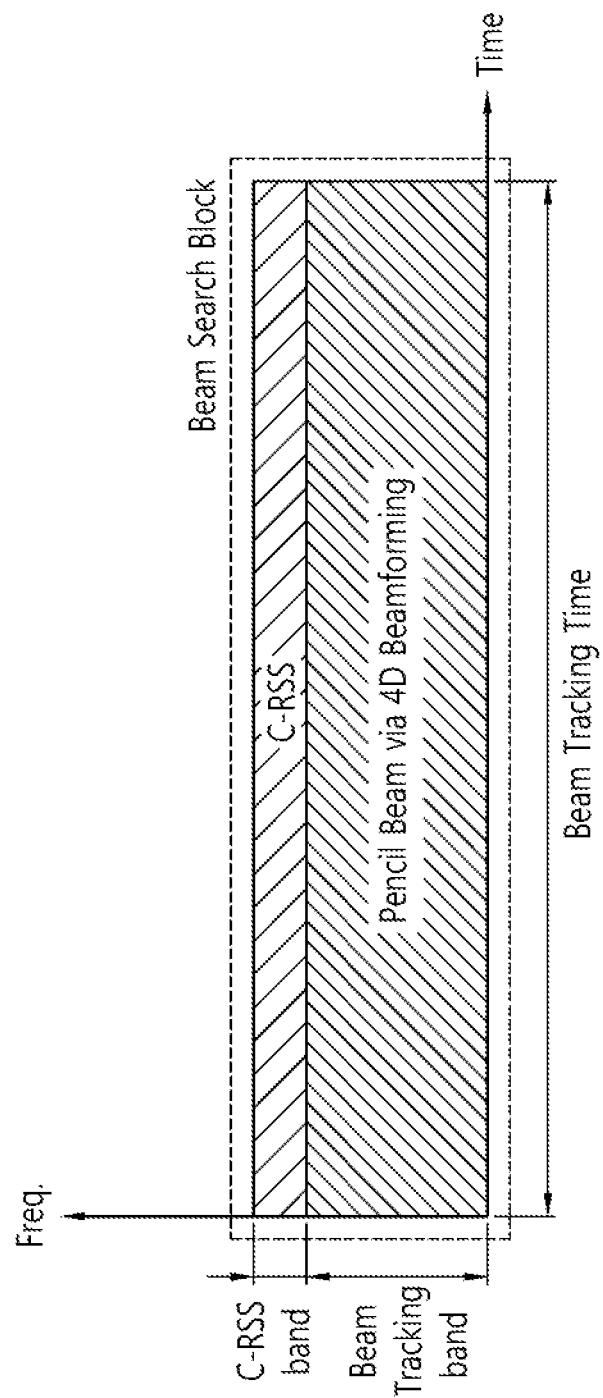
FIG. 93 schematically illustrates a structure in which C-RSS and pencil beams are transmitted.

FIG. 93 schematically illustrates a structure in which C-RSS and pencil beams are transmitted.

According to FIG. 93, the transmitting device can transmit C-RSS and pencil beams on a BSB (beam search block). Here, C-RSS may be transmitted on the C-RSS band in terms of frequency, and the pencil beam may be transmitted in a beam tracking band in terms of frequency. In addition, in terms of time, C-RSS and pencil beams can be transmitted within the beam tracking time.

In other words, a pencil beam formed by C-RSS and 4D beamforming may be simultaneously FDMed and transmitted in the beam search block (BSB), which is transmitted at a predetermined period.

Also, at the receiving end, it may be received in the following structure.

Figure 94:
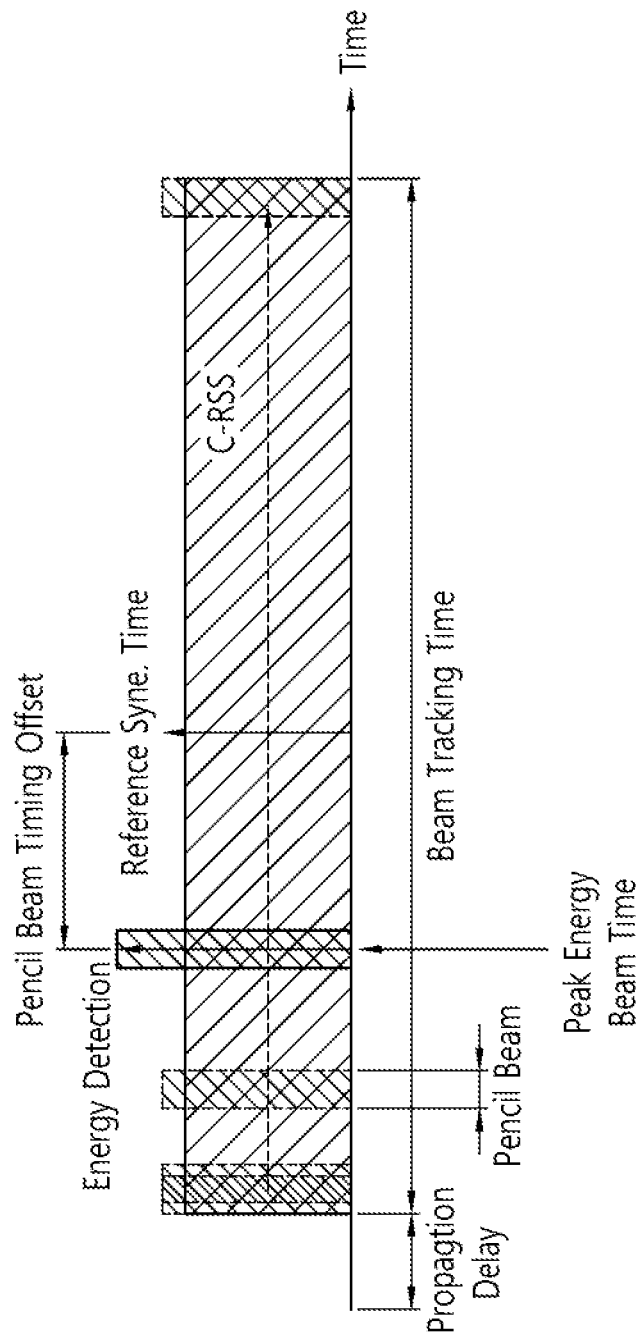
FIG. 94 schematically illustrates an example of pencil beam timing offset acquisition.

FIG. 94 schematically illustrates an example of pencil beam timing offset acquisition.

After propagation delay according to the distance between the transmitter and the receiver, C-RSS and Pencil beams are received, depending on the location of the receiving end, the time at which peak energy is obtained within the beam tracking time is different. The receiving end acquires a reference synchronization time and peak energy beam time by C-RSS, and obtains a pencil beam timing offset.

Detailed features can be the same as the procedure in 4.1.

In the above procedure, C-RSS and Pencil beams are composed of FDM, so $\omega\_r \neq \omega\_0$.

In the above procedure, when a connection is already maintained between the transmitting and receiving terminals, a pencil beam timing offset may be estimated based on an existing synchronization timing. For example, when downlink synchronization is secured in cellular communication, a reference synchronization time is set based on a corresponding symbol boundary, a pencil beam can be detected at a given beam tracking time. In this case, the BSB may be composed of only pencil beams without C-RSS.

In the above procedure, C-RSS and Pencil beams may be transmitted after a pre-scheduled time. For example, even if the beam tracking time starts after a predetermined time after C-RSS transmission and the peak energy beam time is obtained, taking into account the time difference promised in advance, the direction of the pencil beam can be calculated based on the pencil beam timing offset. That is, if the transmission start point of C-RSS and Pencil beam is promised in advance, C-RSS and Pencil beams may not need to be transmitted simultaneously in the same frame/slot/symbol.

In the above procedure, C-RSS and pencil beams can be transmitted at the same time and at the same frequency. That is, by simultaneously transmitting C-RSS and Pencil beams during the same beam tracking time within the same beam tracking bandwidth, beam tracking can be performed by minimizing resources. However, in this case, C-RSS detection performance may deteriorate due to an instantaneous power difference between a pencil beam and C-RSS in an AGC operation of a receiving end.

Figure 95:
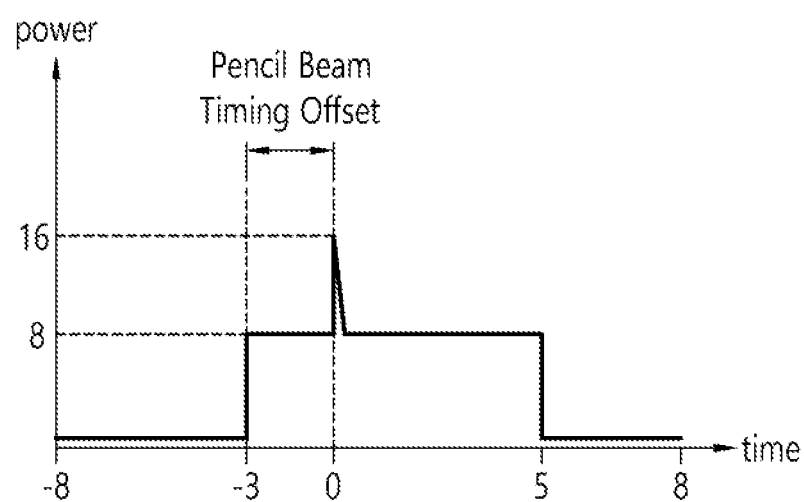
FIG. 95 schematically illustrates an example of a pencil beam timing offset estimation method.

FIG. 95 schematically illustrates an example of a pencil beam timing offset estimation method.

For example, it is designed as a sequence of C-RSS=[1 −1 1 −1 −1 1 −1 1], from the point of view of the receiver of the pencil beam, if the energy is [0 0 8 0 0 0 0 0] and is received at the third sample, since the received signal comes in at the same time, in the form of [1−1 9 −1 −1 1 −1 1], when cross-correlation is performed for C-RSS, it may be in the same form as the drawing.

That is, through simultaneous transmission, a pencil beam timing offset can be estimated.

In the procedures of 4.1 and 4.2, detection of the 4D beam is described as energy detection in order to reduce the beam tracking time, but a signal for recognizing the 4D beam may be configured in a sequence form. For example, through repetitive transmission of the sequence, the receiving end can obtain the peak beam time through autocorrelation of the sequence. At this time, the time for which the 4D beam stays at the receiving end must be longer than the length of the sequence to detect the sequence. Therefore, there is a disadvantage that the beam tracking time for the 4D beam must be long. On the other hand, a beam group-ID or beam-ID can be obtained through sequence detection. In addition, the beam-ID may be acquired jointly based on the acquisition of the beam group-ID through sequence detection and the acquisition of the partial beam ID through the acquisition of the peak beam time.

Figure 96:
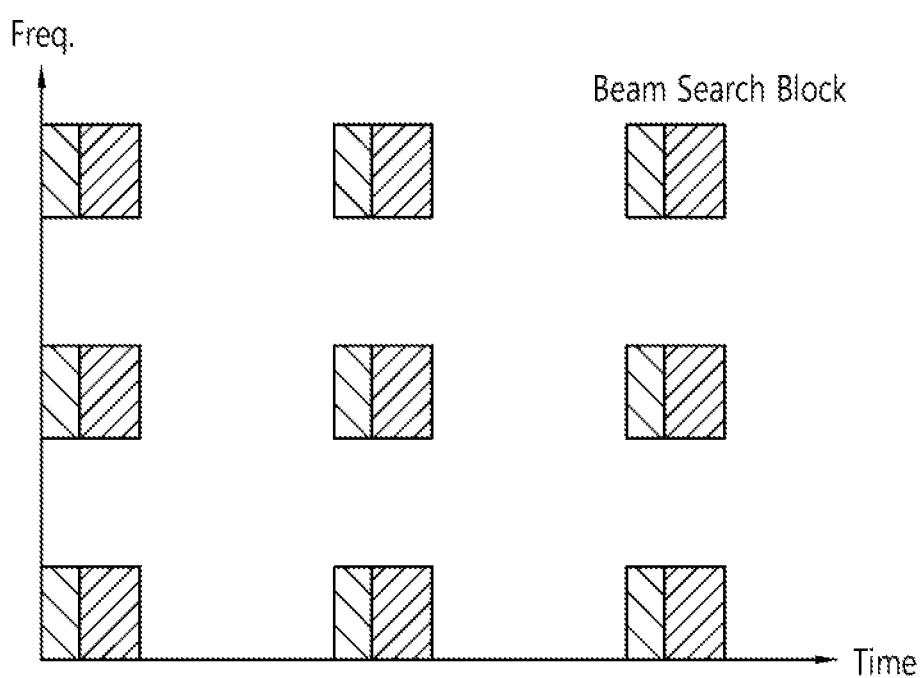
FIGS. 96 and 97 schematically show an example in which the BSB is periodically transmitted.
Figure 97:
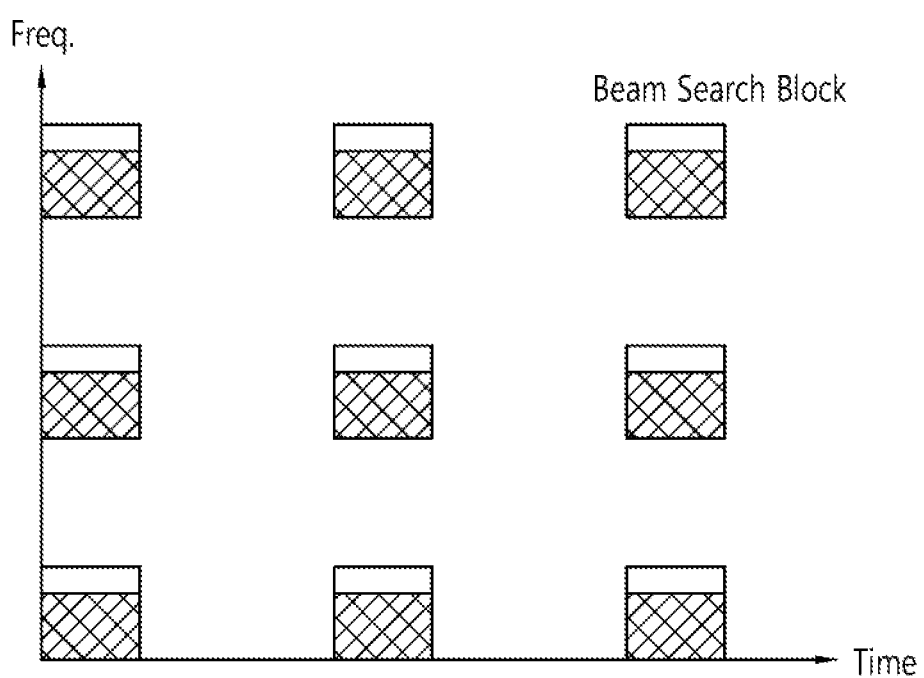

FIGS. 96 and 97 schematically show an example in which the BSB is periodically transmitted.

In the procedures of 4.1 and 4.2, the BSB may be periodically transmitted on the resource grid at a predetermined period. In the procedures of 4.1 and 4.2, the BSB may be transmitted in a single or multiple frequency bands prearranged on the resource grid.

For example, as shown in the figure, TDM and FDM-based BSBs may be repeatedly transmitted.

In the procedures of 4.1 and 4.2, the period of transmitting the C-RSS and the period of transmitting the pencil beam through the 4D beam may be different. For example, transmission of C-RSS is transmitted in a cycle of 5 ms, but a pencil beam through a 4D beam is transmitted in a cycle of 10 ms, it is possible to improve the accuracy of C-RSS and perform 4D beam energy detection based on C-RSS.

4.3. Feedback Signaling and Beam Selection

The specification proposes a procedure for feeding back pencil beam detection information through 4.1 and 4.2 and selecting a beam at the transmitter.

Figure 98:
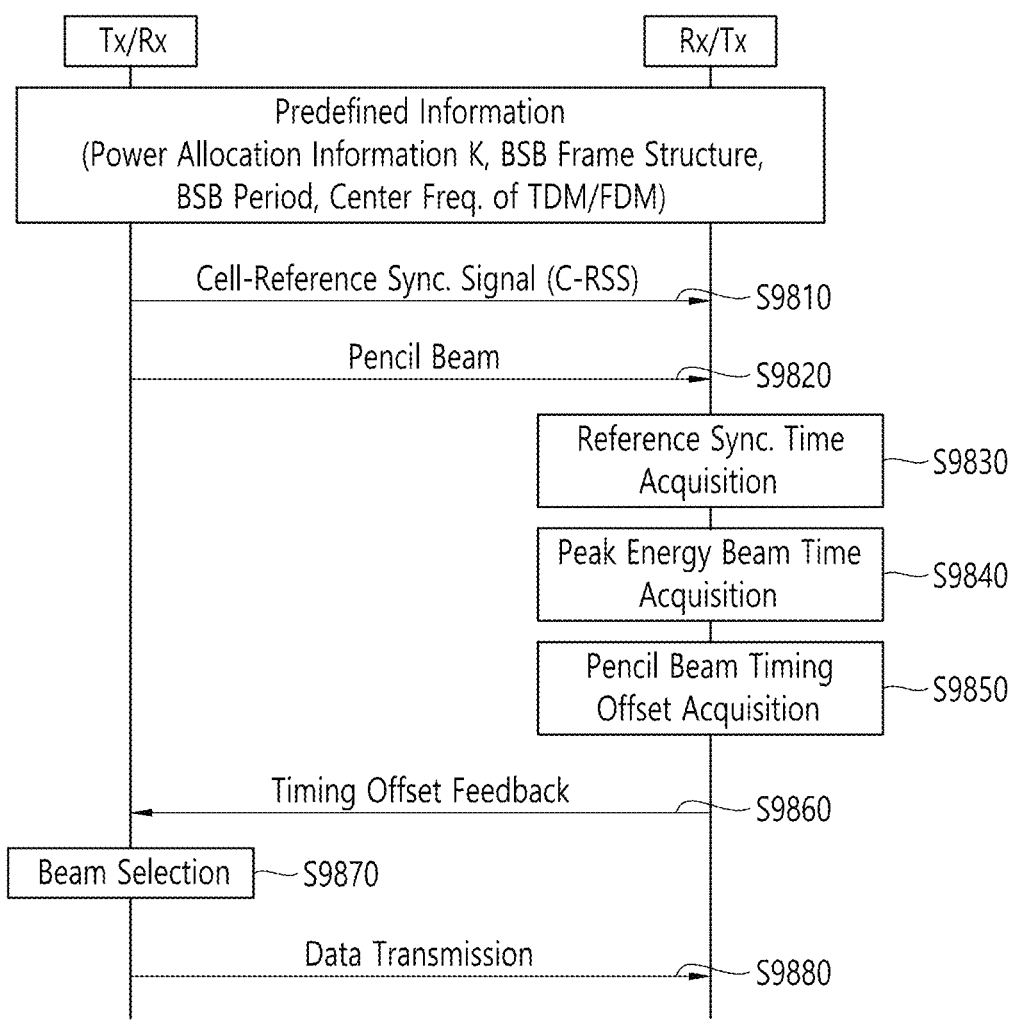
FIG. 98 is a flowchart illustrating a method of transmitting information on a pencil beam timing offset by a device according to an embodiment of the present specification in another form.

FIG. 98 is a flowchart illustrating a method of transmitting information on a pencil beam timing offset by a device according to an embodiment of the present specification in another form.

According to FIG. 98, a transmitter (Tx) may transmit a C-RSS (cell-reference sync. signal) to a receiver (Rx) (S9810). Since more specific examples of the present content have been described above and below, unnecessary repetition will be omitted for convenience of description below.

The transmitting end may transmit a pencil beam to the receiving end (S9820). Since more specific examples of the present content have been described above and below, unnecessary repetition will be omitted for convenience of description below.

The receiving end may obtain a reference synchronization time (S9830). Since more specific examples of the present content have been described above and below, unnecessary repetition will be omitted for convenience of description below.

The receiving end may obtain a peak energy beam time (S9840). Since more specific examples of the present content have been described above and below, unnecessary repetition will be omitted for convenience of description below.

The receiving end may obtain a pencil beam timing offset (S9850). Since more specific examples of the present content have been described above and below, unnecessary repetition will be omitted for convenience of description below.

The transmitter may receive feedback of the timing offset from the receiver (S9860). Since more specific examples of the present content have been described above and below, unnecessary repetition will be omitted for convenience of description below.

The transmitter may select a beam based on the timing offset received as feedback (S9870). Since more specific examples of the present content have been described above and below, unnecessary repetition will be omitted for convenience of description below.

The transmitting end may transmit data to the receiving end (S9880). Since more specific examples of the present content have been described above and below, unnecessary repetition will be omitted for convenience of description below.

If this example is explained in another way, it may be as follows.

The transceiver has prearranged information, power allocation information K, BSB frame structure, BSB period, and TDM/FDM center frequency. Information promised in advance may be defined in advance from an implementation point of view, or may be delivered to a receiving end through a broadcasting message.

The transmitter transmits C-RSS and pencil beams to all users in the cell through 4.1 or 4.2 procedures.

The receiving end obtains the reference synchronization time and peak energy beam time for C-RSS and pencil beam through the procedure of 4.1 or 4.2.

The receiving end obtains a pencil beam timing offset based on the obtained reference synchronization time and peak energy beam time.

The receiving end feeds back pencil beam timing offset information to the transmitting end through a feedback link. A feedback link can be fed back through a control channel or a data channel.

The transmitting end can recognize the azimuth angle and elevation angle of the optimal pencil beam toward the receiving end based on the pencil beam timing offset information that has been fed back. The direction of the optimal pencil beam can be recognized by inversely calculating the operation of the virtual antenna array designed in Method 3.

The transmitting end may then perform data transmission in the recognized optimal pencil beam direction.

4.4. Receiver Structure for 4D Beam Tracking

The structure of the receiver performing the operations of 4.1 and 4.2 is proposed as follows.

Figure 99:
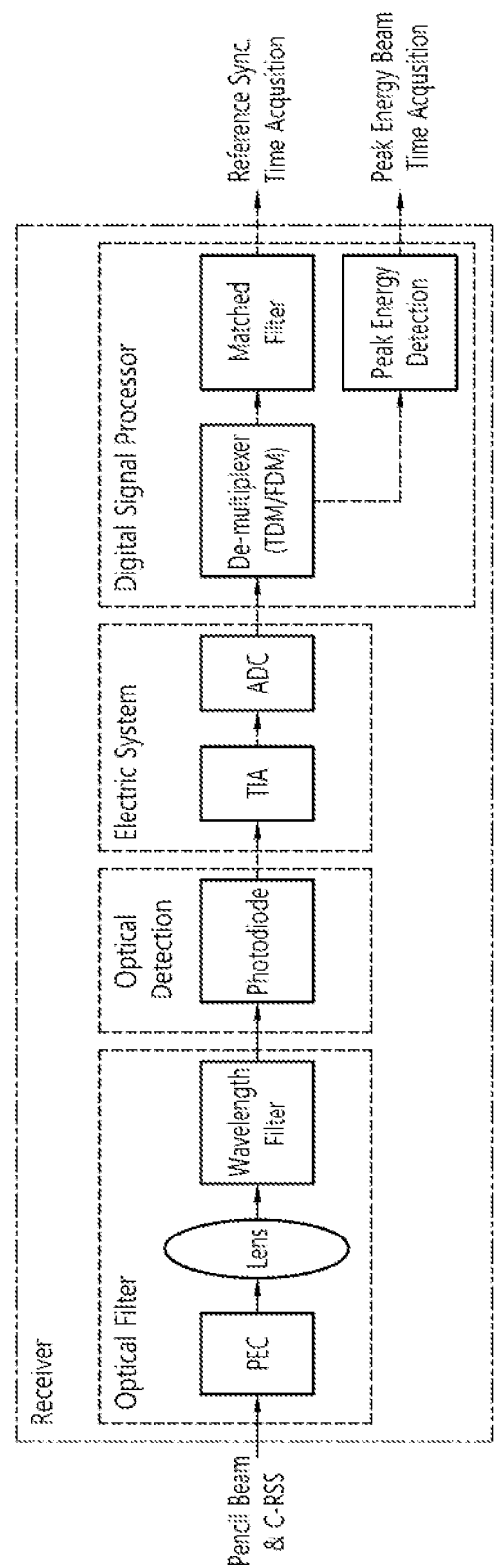
FIG. 99 schematically illustrates an example of a structure of a receiving end.

FIG. 99 schematically illustrates an example of a structure of a receiving end.

In the drawing, a solid arrow indicates a state of an optical signal, and a dotted arrow indicates a state of an electrical signal. Receivers are largely divided into an optical filter that directly receives an optical beam and an optical detector that converts the received optical beam into an electrical signal, electric system that converts into digital signal, and a digital signal processor unit that acquires target information based on electrical digital signals.

In the above, the optical filter performs the following operation.

PEC (Phase Error Correction): Compensation device for wavefront change at the receiving end In a wireless channel, there may be a change in phase characteristics due to the diffraction/reflection/refraction of photons in the air. The change in the phase characteristics of the desired signal within the wavefront reduces the energy acquisition and decoding performance of the receiving end.

Therefore, PEC may be required to compensate for a wavefront change of a desired signal in order to obtain the maximum signal energy.

Figure 100:
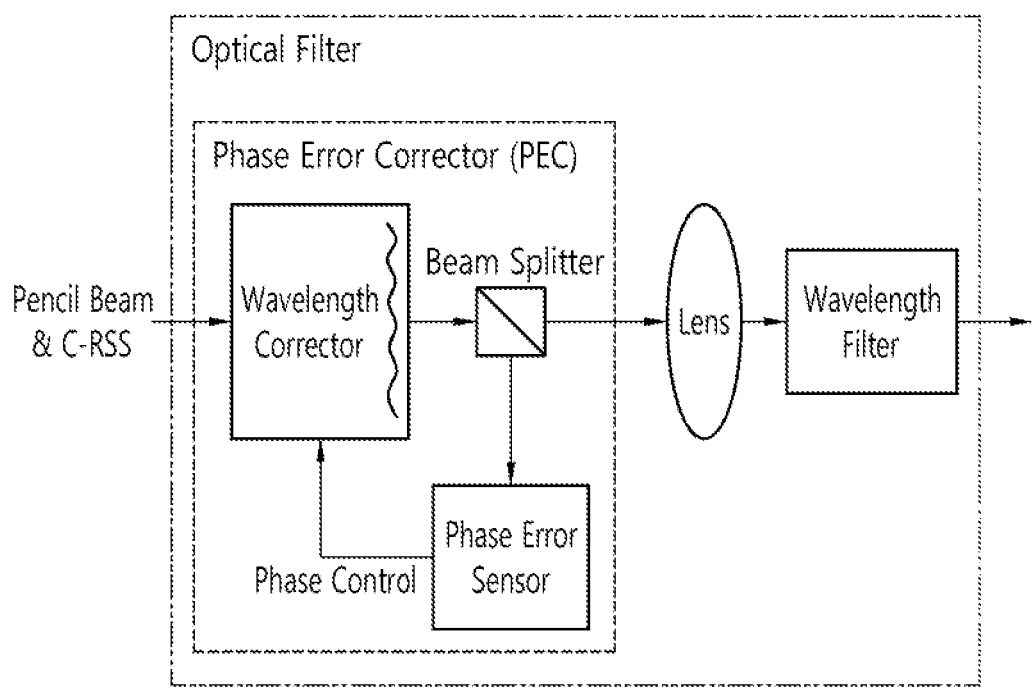
FIG. 100 schematically illustrates an example of an optical filter.

FIG. 100 schematically illustrates an example of an optical filter.

As shown in the figure, the PEC at the receiving end may exist before focusing through the lens. In this case, the sensing area for PEC is large and the number of micro mirrors constituting the wavefront corrector is large, although it is possible to precisely control the phase error existing in the wavefront, the size and cost of the receiving end may increase.

Figure 101:
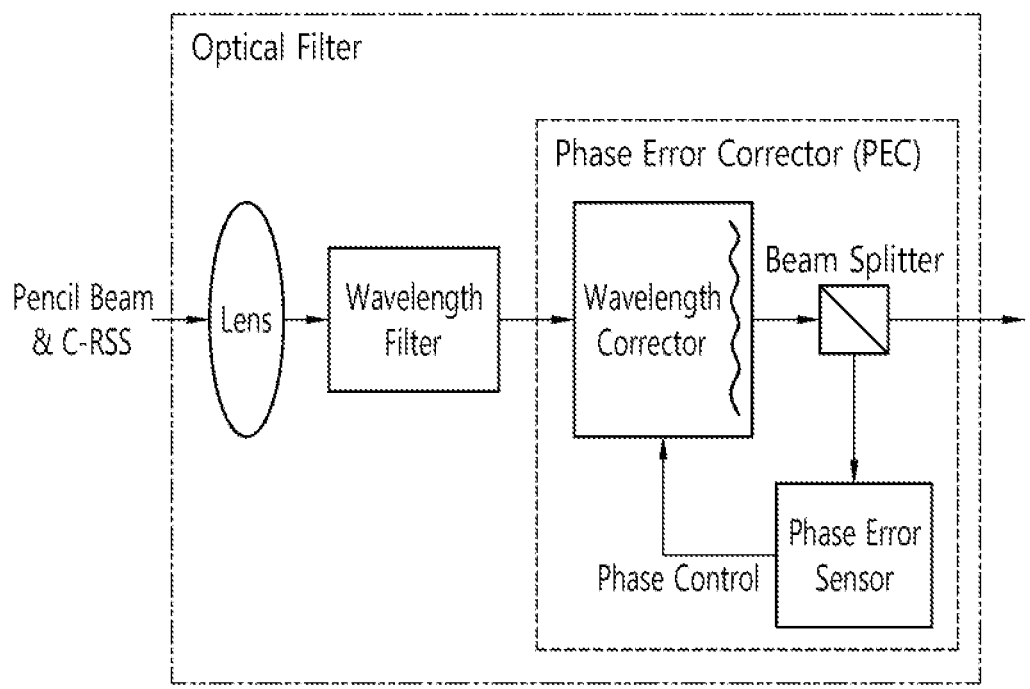
FIG. 101 schematically shows another example of an optical filter.

FIG. 101 schematically shows another example of an optical filter.

As shown in the drawing, at the receiving end, the PEC may exist after focusing through the lens. In this case, by reducing the wavefront of the desired beam through focusing through the lens, the sensing area for PEC is small and the number of micromirrors constituting the wavefront corrector is small, although it is not possible to precisely control the phase error existing in the wavefront, the size and cost of the receiving end can be reduced.

Since PEC is used to increase reception performance, it can be selectively used. That is, it may be obvious that the operation of the present specification is possible even when operating without PEC.

Lens: a device for focusing the received optical beam

Wavelength filter: A device for passing only the wavelength corresponding to the desired optical beam For each detailed operation in the receiver, the pencil beam and C-RSS received by TDM or FDM according to 4.1 and 4.2 can be converted into electrical signals (current) in a photodiode through an optical filter. The converted electrical signal is converted into voltage through TIA, it can be converted into a digital signal through an ADC. Based on the converted digital signal, according to TDM/FDM in the de-multiplexer, C-RSS and Pencil beam signals are distinguished, C-RSS obtains a reference synchronization time by performing matched filtering (e.g., auto-correlation) based on an agreed sequence, a pencil beam obtains a peak energy beam time through energy detection.

Figure 102:
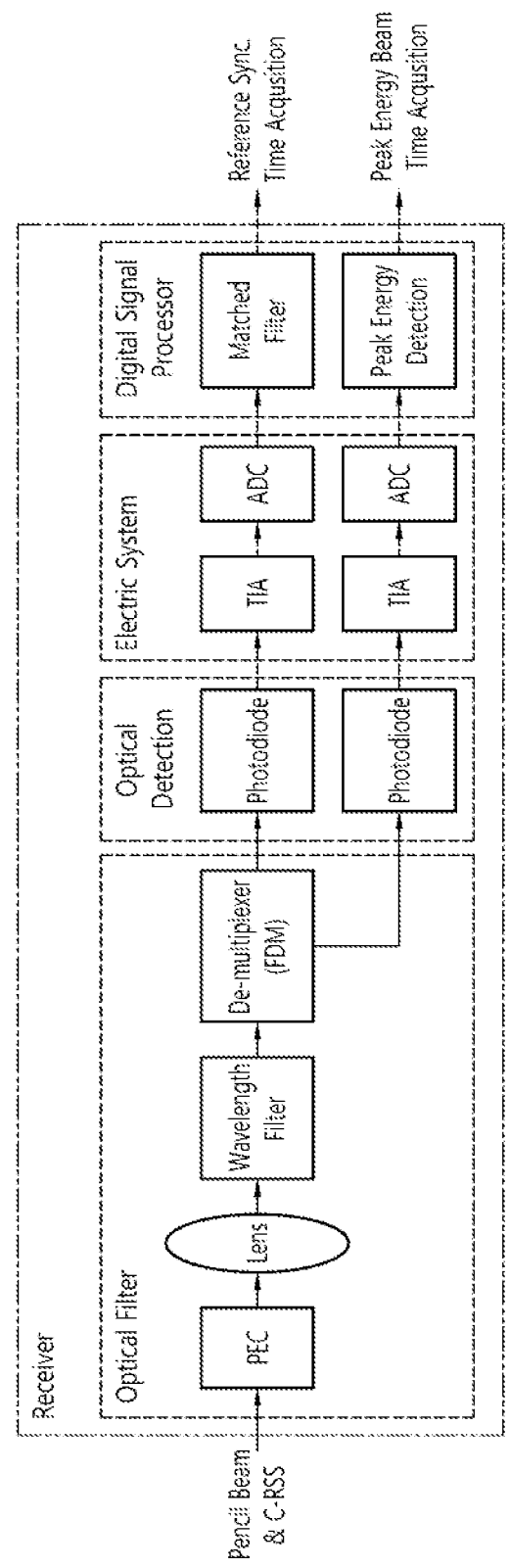
FIG. 102 schematically shows another example of a structure of a receiving end.

FIG. 102 schematically shows another example of a structure of a receiving end.

In the case where the pencil beam and C-RSS are composed of FDM, a pencil beam and C-RSS are split at the wavelength filter stage of the optical filter, so that a peak energy beam time and a reference synchronization time may be respectively obtained. For example, it may have a structure as shown in the drawing.

5. Data Transmission Through a Tracked 4D Beam (3D Data Beam Tied 4D Tracking Beam)

In the case of performing the 4D beamforming proposed in Method 3 with the transmitter proposed in Method 2, since the beam rotates with time, for continuous signal (data) transmission, after recognizing the direction of the beam toward the receiving end, it is necessary to maintain a fixed beam direction. Therefore, a signal must be transmitted to a receiving end by 3D beamforming having a fixed direction with respect to time based on a phase gradient metasurface (or a phase gradient antenna array).

Therefore, the specification proposes a look-up matrix that ties timing offset for 4D beamforming that changes over time and 3D beamforming (Azimuth angle $\theta$, elevation angle $\varphi$) information with a fixed direction over time.

Figure 103:
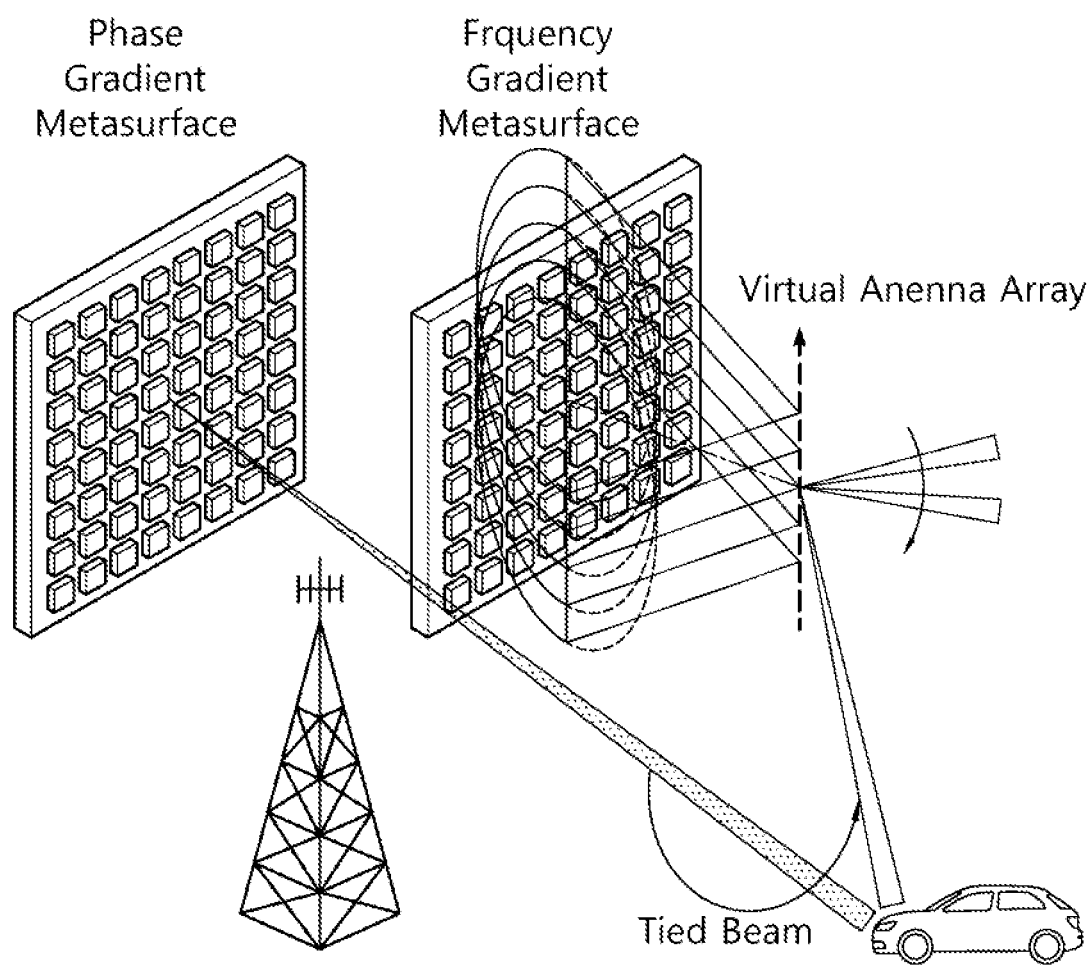
FIG. 103 schematically illustrates an example of an LOS link at a transmitting/receiving end.

FIG. 103 schematically illustrates an example of an LOS link at a transmitting/receiving end.

Assume that a phase gradient metasurface (or phase gradient antenna array) generating a 3D beam for data transmission and a frequency gradient metasurface generating a 4D beam for beam tracking exist in different spaces. Then, an LOS link of a transmission/reception terminal as shown in the drawing may be formed.

Figure 104:
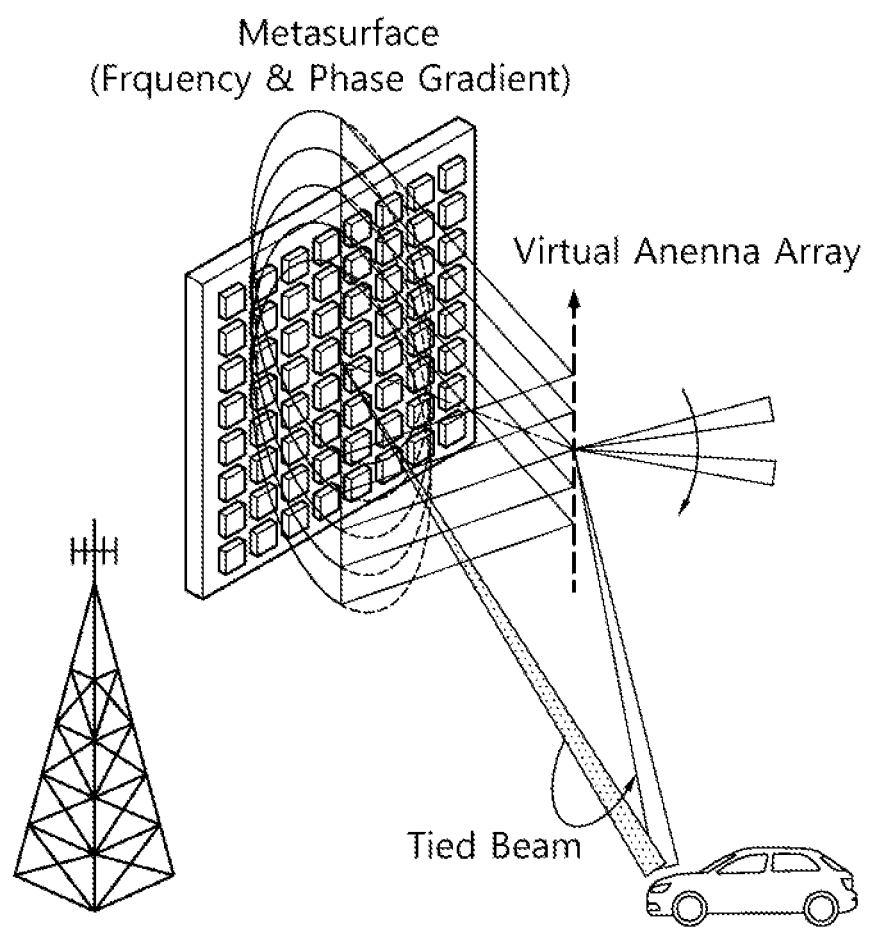
FIG. 104 schematically illustrates another example of an LOS link at a transmitting/receiving end.

FIG. 104 schematically illustrates another example of an LOS link at a transmitting/receiving end.

On the other hand, when a 3D beam for data transmission and a 4D beam for beam tracking can be generated in one metasurface (or antenna array), the following transceiver link can be formed. (For example, since it has a high degree of freedom by combining MBB configurations of metasurfaces, two functions can be implemented in one metasurface. Alternatively, through an active metasurface, the two functions can be implemented to operate adaptively.)

Figure 105:
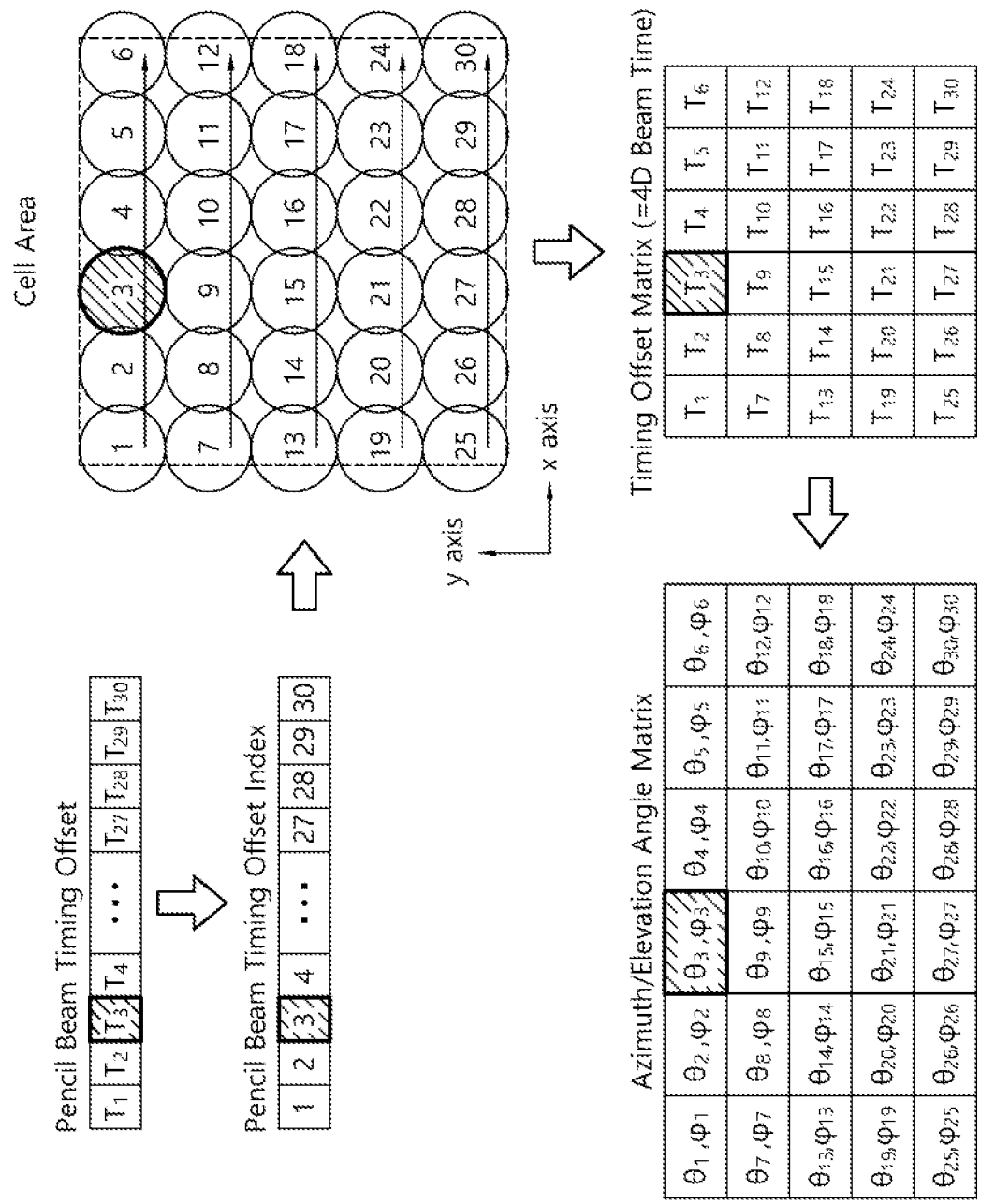
FIG. 105 schematically illustrates an example of tying pencil beam offsets.

FIG. 105 schematically illustrates an example of tying pencil beam offsets.

According to FIG. 105, the pencil beam timing offset T fed back by the pencil beam detection procedure of method 4 can be tied with the Azimuth angle θ_T and the elevation angle φ_T in the following procedure.

In the above, when the receiving end measures the pencil beam timing offset, the pencil beam timing offset is indexed and fed back to the transmitting end. A pencil beam timing offset index may be mapped with beams in an actual cell area space. Therefore, the transmitter may have a timing offset matrix that maps a beam emitted on the actual cell area space and a timing offset (T_i) based on the rotation time of the 4D beam, based on this, it is possible to tie the Azimuth angle (θ_i) and the Elevation angle (φ_i) of the beam emitted in real space. At this time, the relational expression is f(T_i)=(θ_i, φ_i).

That is, when the transmitter performs 4D beamforming through the frequency gradient metasurface, the receiver measures the pencil beam timing offset, and when feedback is given to the transmitter, the transmitter obtains the feedback timing offset and the tilted Azimuth/Elevation angle, 3D beamforming is performed through a phased gradient metasurface (or a phased array antenna) to transmit data.

Here, since the timing offset is quantized and indexed for feedback (T_i), it can be quantized into an azimuth angle (θ_i) and an elevation angle (φ_i) according to the corresponding resolution. The quantization resolution is determined by the sampling resolution of the receiver that measures the timing offset and the container of the feedback link for feeding it back, and may vary depending on the system environment. It can be agreed between the transmitting and receiving end in advance. The configuration of the look-up table can derive f (timing offset T_i)=(Azimuth angle θ_i, elevation angle φ_i) through cell planning or theoretical analysis.

Figure 106:
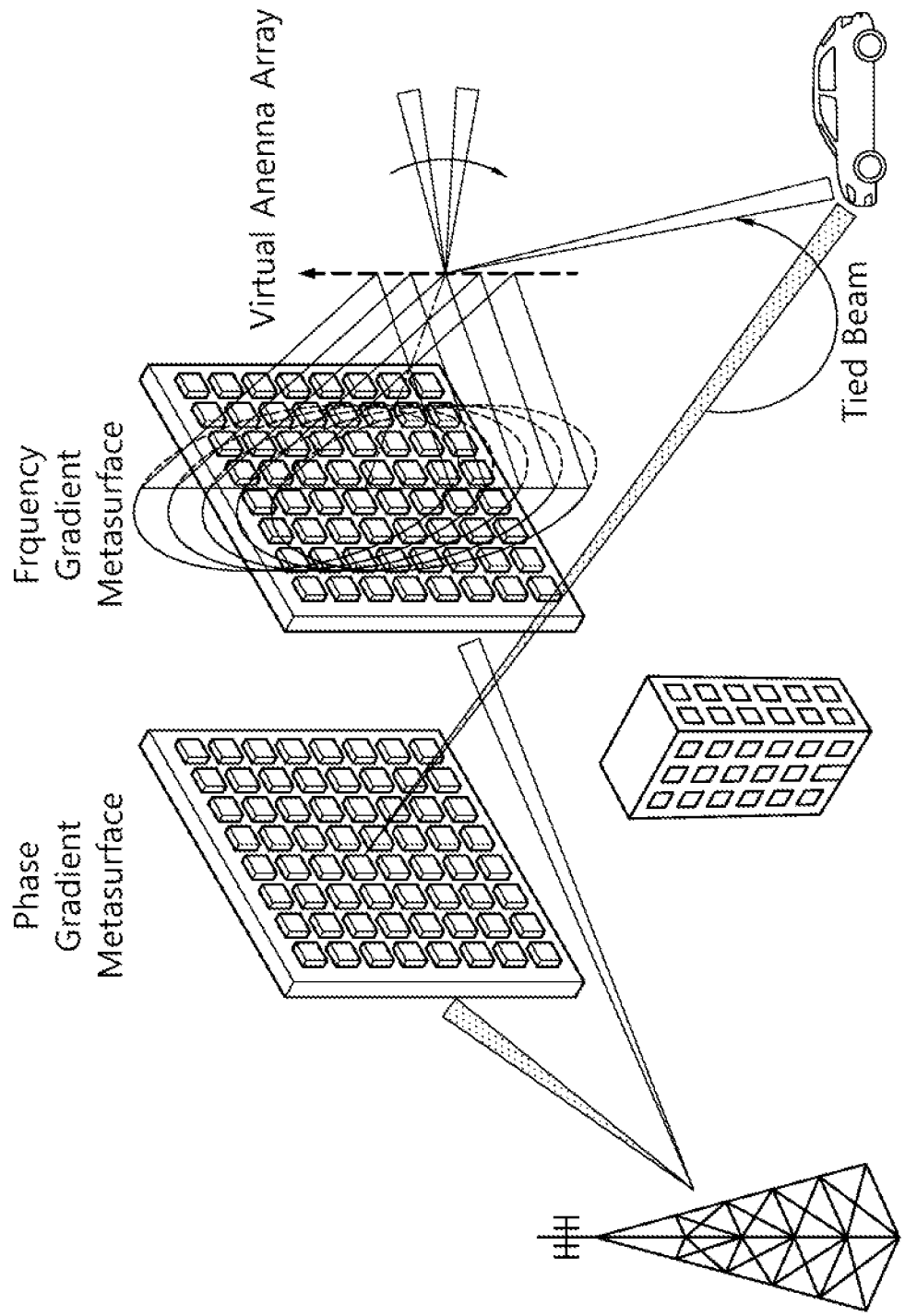
FIG. 106 schematically illustrates an example of a relay link of a transmitter/receiver terminal.

FIG. 106 schematically illustrates an example of a relay link of a transmitter/receiver terminal.

When the link of the transmitting/receiving end does not assume LOS, a signal may be relayed through the metasurface. In this case, the transmitter and the metasurface may exist in different spaces. At this time, assume that a phase gradient metasurface (or phase gradient antenna array) generating a 3D beam for data transmission and a frequency gradient metasurface generating a 4D beam for beam tracking exist in different spaces. Then, a transmission/reception terminal relay link of the form shown in the drawing may be formed.\

Figure 107:
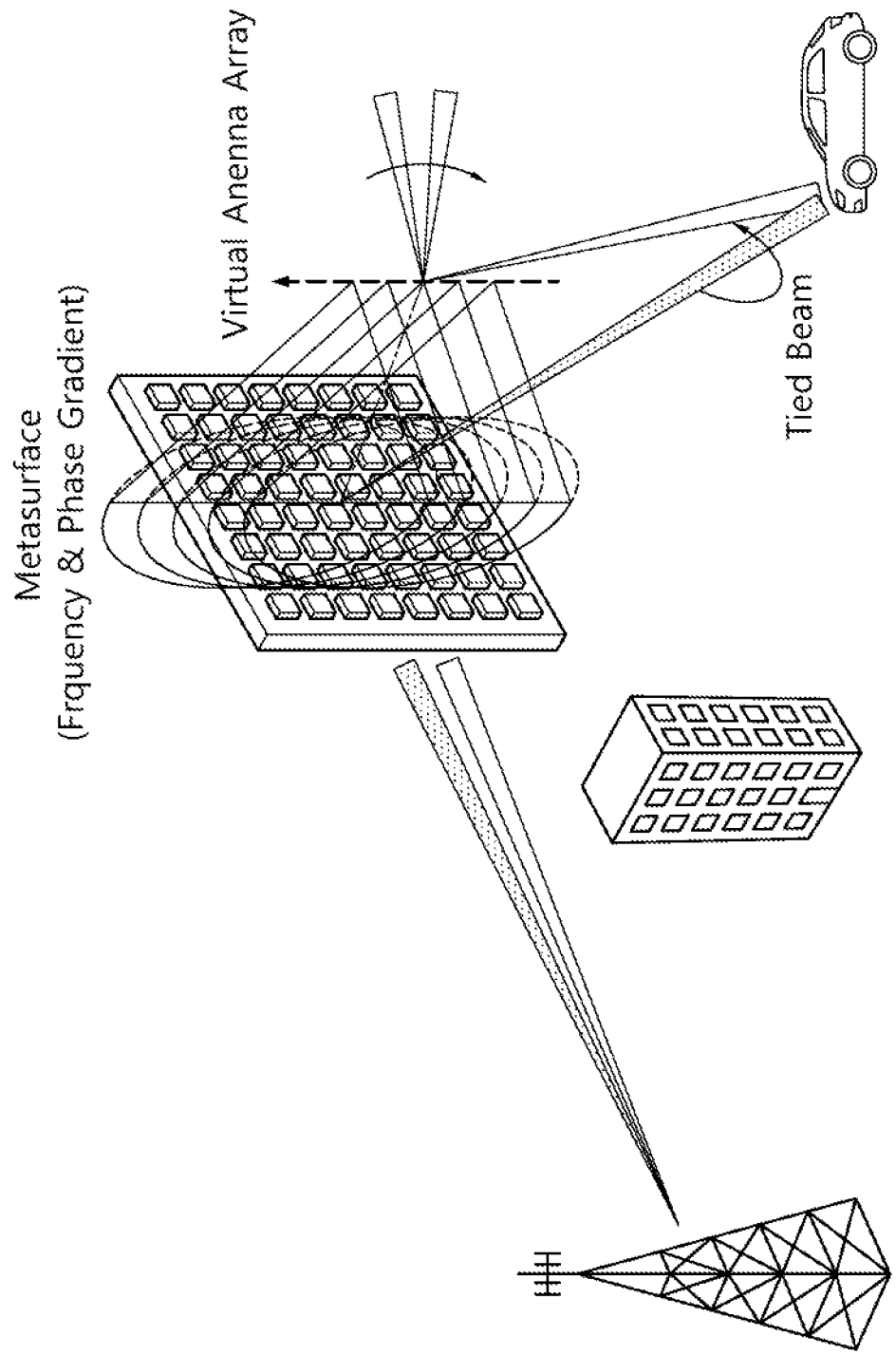
FIG. 107 schematically illustrates another example of a transmission/reception end relay link.

FIG. 107 schematically illustrates another example of a transmission/reception end relay link.

On the other hand, when a 3D beam for data transmission and a 4D beam for beam tracking can be generated in one metasurface (or antenna array), a relay link between transmitting and receiving terminals as shown in the figure can be formed. (For example, since it has a high degree of freedom by combining MBB configurations of metasurfaces, two functions can be implemented in one metasurface. Alternatively, the two functions can be implemented adaptively through an active metasurface.)

When relaying based on the metasurface for the above NLOS link, in the same way as for the LOS link, a timing offset for 4D beamforming that changes over time and a look-up matrix for tying (Azimuth angle θ, elevation angle φ) information of 3D beamforming having a fixed direction over time can be configured. It may be obvious that the detailed procedure is the same as the description of the LOS link. At this time, a feedback link for transmitting feedback information may also be relayed or may be transmitted through another network.

Meanwhile, according to the present specification, a target beam may be selected by acquiring a 4D beam transmitted through a frequency gradient virtual antenna based on reference synchronization and feeding back the 4D beam to the transmitter. In addition, data transmission may be transmitted as a 3D beam through the selected target beam.

The examples of FIG. 87 have been described so far. Hereinafter, in order to help a broader understanding of the configuration to be provided in this specification, the above-described examples will be described in various forms.

Hereinafter, for a better understanding of the examples of the present specification, the disclosure of the present specification will be described through drawings. The following drawings are made to explain a specific example of the present specification. Since the names of specific devices or names of specific signals/messages/fields described in the drawings are provided as examples, the technical features of the present specification are not limited to the specific names used in the drawings below.

Figure 108:
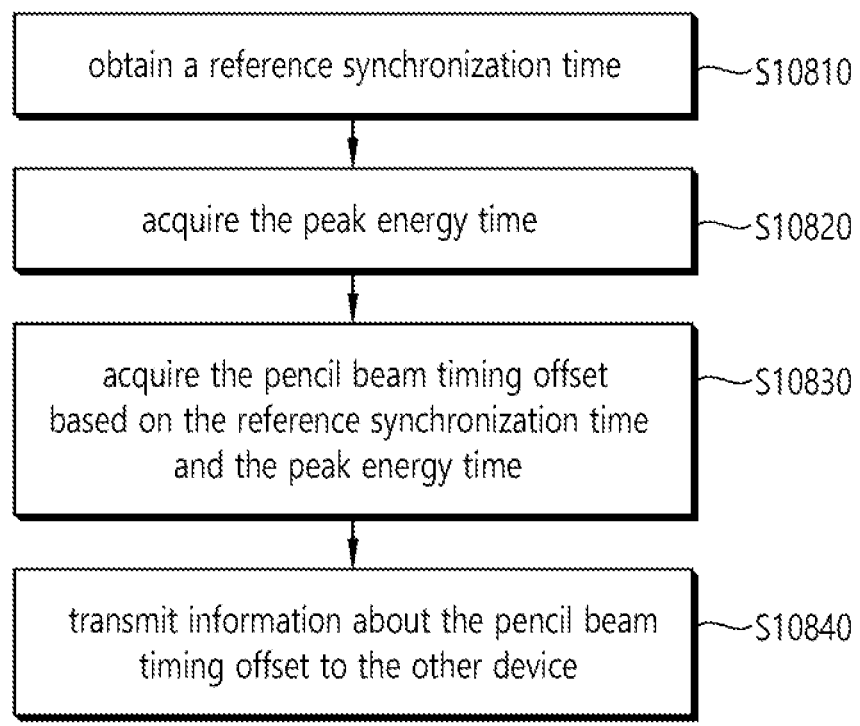
FIG. 108 is a flowchart of a method of transmitting information on a pencil beam timing offset by a (pencil beam) receiving apparatus according to an embodiment of the present specification.

FIG. 108 is a flowchart of a method of transmitting information on a pencil beam timing offset by a (pencil beam) receiving apparatus according to an embodiment of the present specification.

The device may obtain a reference synchronization time (S10810). Here, the reference synchronization time may be obtained based on a cell-reference synchronization signal (C-RSS) received from another device. Here, since a more detailed description of the present content is as described above, repeated description of overlapping content will be omitted for convenience of description.

The device may acquire the peak energy time (S10820). Here, since a more detailed description of the present content is as described above, repeated description of overlapping content will be omitted for convenience of description.

The device may acquire the pencil beam timing offset based on the reference synchronization time and the peak energy time (S10830). Here, since a more detailed description of the present content is as described above, repeated description of overlapping content will be omitted for convenience of description.

The device may transmit information about the pencil beam timing offset to the other device (S10840). Here, since a more detailed description of the present content is as described above, repeated description of overlapping content will be omitted for convenience of

DESCRIPTION

Figure 109:
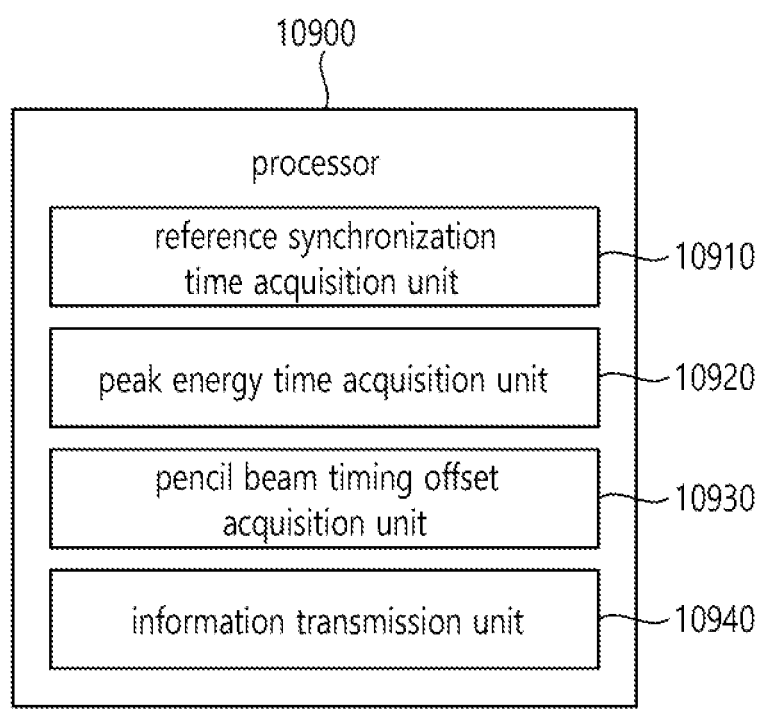
FIG. 109 is an example of a block diagram of a device for transmitting information on a pencil beam timing offset by a (pencil beam) receiving device according to an embodiment of the present specification.

FIG. 109 is an example of a block diagram of a device for transmitting information on a pencil beam timing offset by a (pencil beam) receiving device according to an embodiment of the present specification.

According to FIG. 109, a processor 10900 may include a reference synchronization time acquisition unit 10910, a peak energy time acquisition unit 10920, a pencil beam timing offset acquisition unit 10930, and an information transmission unit 10940. Here, the receiving device and the processor 10900 are merely examples of the configuration to be provided in this specification.

Features provided in this specification may be implemented not only by the receiving device and processor 10900, but also by the receiving device and processors described above.

In addition to this, the present processor 10900 may correspond to the processors in FIGS. 112 to 122 to be described later.

The reference synchronization time acquisition unit 10910 may be configured to obtain a reference synchronization time. Here, the reference synchronization time may be obtained based on a cell-reference synchronization signal (C-RSS) received from another device. Here, since a more detailed description of the present content is as described above, repeated description of overlapping content will be omitted for convenience of description.

The peak energy time acquisition unit 10920 may be configured to acquire the peak energy time. Here, since a more detailed description of the present content is as described above, repeated description of overlapping content will be omitted for convenience of description.

The pencil beam timing offset acquiring unit 10930 may be configured to acquire the pencil beam timing offset based on the reference synchronization time and the peak energy time. Here, since a more detailed description of the present content is as described above, repeated description of overlapping content will be omitted for convenience of description.

The information transmitter 10940 may be configured to transmit information about the pencil beam timing offset to the other device. Here, since a more detailed description of the present content is as described above, repeated description of overlapping content will be omitted for convenience of description.

In addition to this, the features provided in this specification may be expressed as follows.

For example, an apparatus comprises at least one memory and at least one processor operably coupled with the at least one memory, wherein the at least one processor is configured to acquire a reference synchronization time, wherein the reference synchronization time is acquired based on a cell-reference synchronization signal (C-RSS) received from another apparatus, acquire a peak energy time, acquire a pencil beam timing offset based on the reference synchronization time and the peak energy time and control a transceiver to transmit information for the pencil beam timing offset to the another apparatus.

As another example, at least one computer readable medium containing instructions based on being executed by at least one processor, wherein the at least one processor is configured to acquire a reference synchronization time, wherein the reference synchronization time is acquired based on a cell-reference synchronization signal (C-RSS) received from another apparatus, acquire a peak energy time, acquire a pencil beam timing offset based on the reference synchronization time and the peak energy time and control a transceiver to transmit information for the pencil beam timing offset to the another apparatus.

Figure 110:
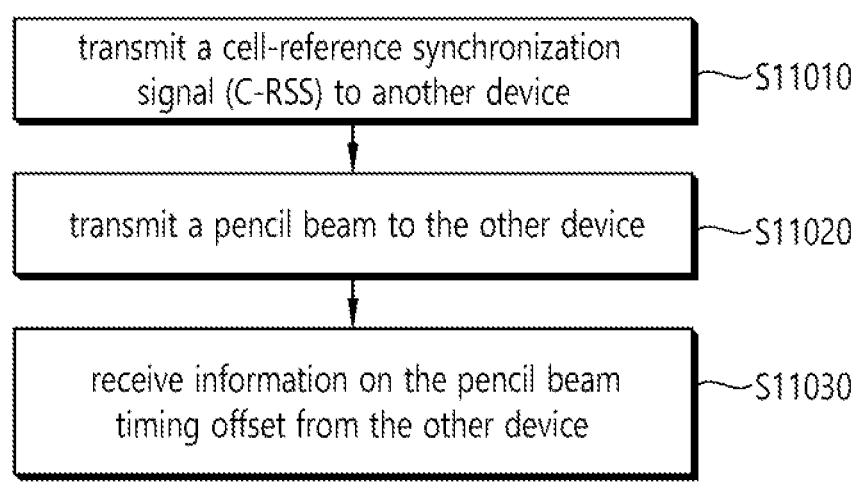
FIG. 110 is a flowchart of a method of receiving information on a pencil beam timing offset by a (pencil beam) transmitting apparatus according to an embodiment of the present specification.

FIG. 110 is a flowchart of a method of receiving information on a pencil beam timing offset by a (pencil beam) transmitting apparatus according to an embodiment of the present specification.

The device may transmit a cell-reference synchronization signal (C-RSS) to another device (S11010). Here, since a more detailed description of the present content is as described above, repeated description of overlapping content will be omitted for convenience of description.

The device may transmit a pencil beam to the other device (S11020). Here, since a more detailed description of the present content is as described above, repeated description of overlapping content will be omitted for convenience of description.

The device may receive information on the pencil beam timing offset from the other device (S11030). Here, since a more detailed description of the present content is as described above, repeated description of overlapping content will be omitted for convenience of description.

Figure 111:
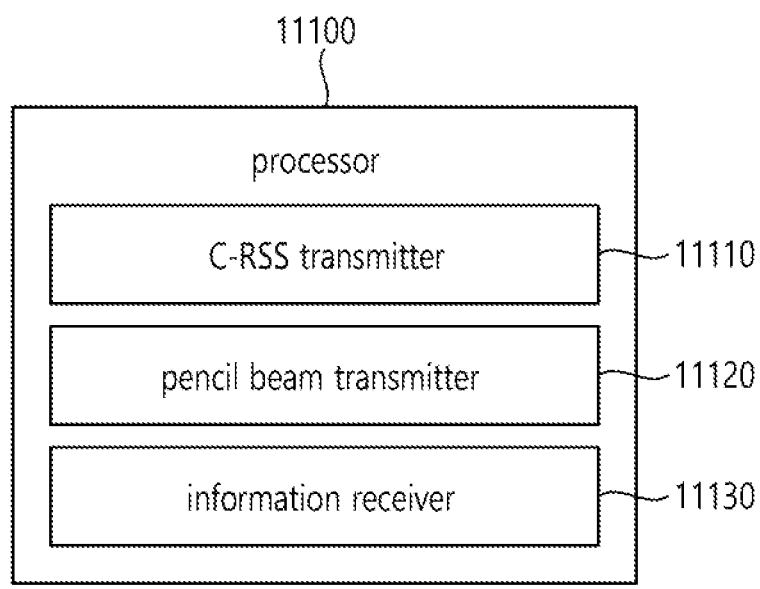
FIG. 111 is an example of a block diagram of a device for receiving information on a pencil beam timing offset by a (pencil beam) transmission device according to an embodiment of the present specification.

FIG. 111 is an example of a block diagram of a device for receiving information on a pencil beam timing offset by a (pencil beam) transmission device according to an embodiment of the present specification.

According to FIG. 111, a processor 11100 may include a C-RSS transmitter 11110, a pencil beam transmitter 11120, and an information receiver 11130. Here, the present transmission device and processor 11100 are merely examples of the configuration to be provided in this specification.

Configurations provided in this specification may be implemented not only by the transmission device and processor 11100, but also by the transmission device and processors described above.

In addition to this, the present processor 11100 may correspond to the processors in FIGS. 112 to 122 to be described later.

The C-RSS transmitter 11110 may be configured to transmit a cell-reference synchronization signal (C-RSS) to another device. Here, since a more detailed description of the present content is as described above, repeated description of overlapping content will be omitted for convenience of description.

The pencil beam transmitter 11120 may be configured to transmit a pencil beam to the other device. Here, since a more detailed description of the present content is as described above, repeated description of overlapping content will be omitted for convenience of description.

The information receiving unit 11130 may be configured to receive information about the pencil beam timing offset from the other device. Here, since a more detailed description of the present content is as described above, repeated description of overlapping content will be omitted for convenience of description.

Figure 112:
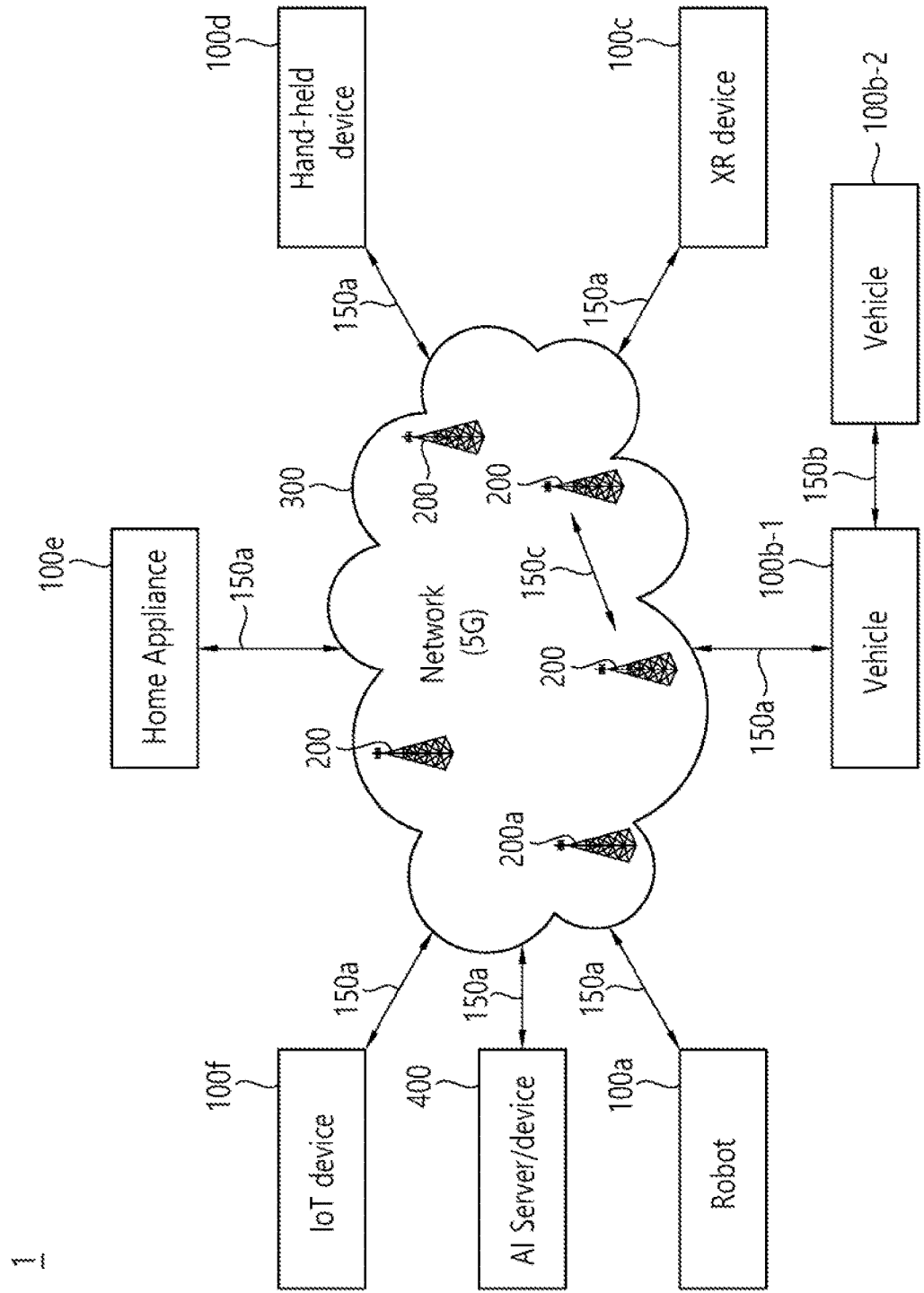
FIG. 112 shows a communication system (1), in accordance with an embodiment of the present disclosure.

FIG. 112 shows a communication system (1), in accordance with an embodiment of the present disclosure.

Referring to FIG. 112, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, NR supports a number of numerologies (or subcarrier spacing (SCS)) to support various 5G services. For example, when the SCS is 15 kHz, it supports a wide area in traditional cellular bands, when SCS is 30 kHz/60 kHz, it supports dense-urban, lower latency and wider carrier bandwidth, for SCS of 60 kHz or higher, bandwidths greater than 24.25 GHz are supported to overcome phase noise.

The NR frequency band may be defined as a frequency range of two types (FR1 and FR2). The number of frequency ranges may be changed, and for example, the frequency ranges of the two types (FR1 and FR2) may be shown in Table 3 below. For convenience of explanation, among the frequency ranges used in the NR system, FR1 may mean "sub 6 GHz range" and FR2 may mean "above 6 GHz range" and may be called millimeter wave (mmW).

TABLE 3

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the number of frequency ranges of the NR system can be changed. For example, FR1 may include a band of 410 MHz to 7125 MHz as shown in Table 4 below. That is, FR1 may include a frequency band of 6 GHz (or 5850, 5900, 5925 MHz, etc.) or higher. For example, a frequency band of 6 GHz (or 5850, 5900, 5925 MHz, etc.) or higher included in FR1 may include an unlicensed band. The unlicensed band may be used for various purposes, and may be used, for example, for vehicle communication (eg, autonomous driving).

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, an example of a wireless device to which the present specification is applied will be described.

Figure 113:
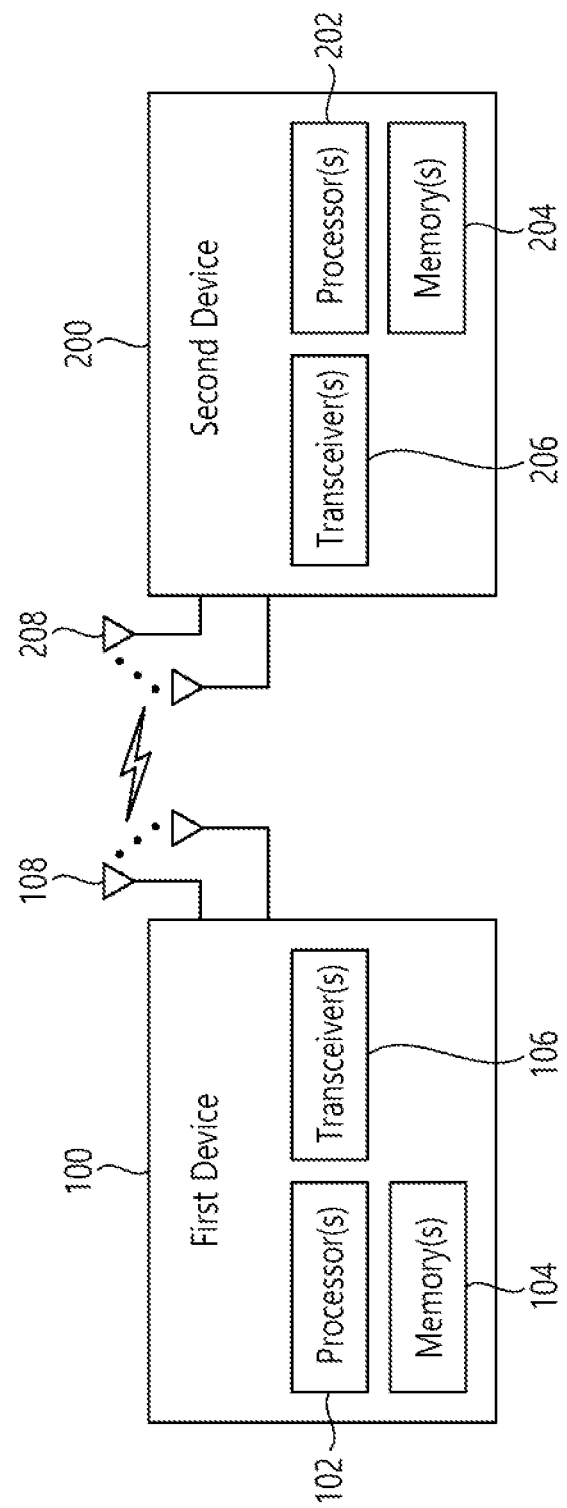
FIG. 113 shows wireless devices, in accordance with an embodiment of the present disclosure.

FIG. 113 shows wireless devices, in accordance with an embodiment of the present disclosure.

Referring to FIG. 113, a first wireless device (100) and a second wireless device (200) may transmit radio signals through a variety of RATs (e.g., LTE and NR). Herein, {the first wireless device (100) and the second wireless device (200)} may correspond to {the wireless device (100x), the BS (200)} and/or {the wireless device (100x), the wireless device (100x)} of FIG. 112.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102. 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 114:
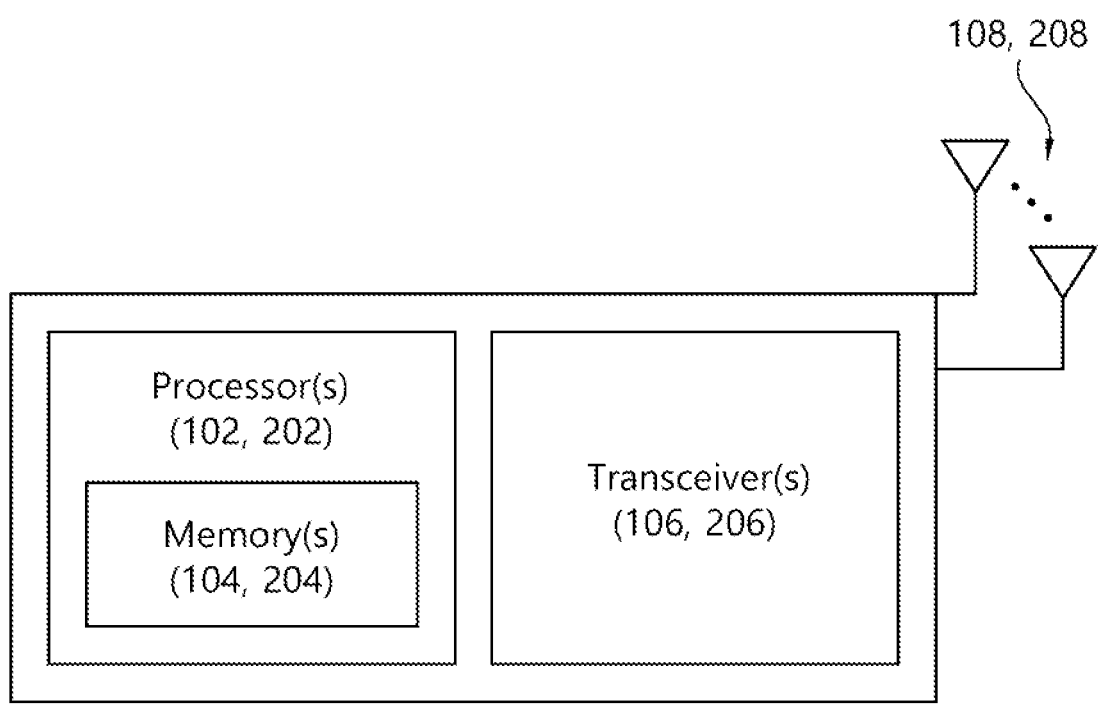
FIG. 114 shows another example of a wireless device that can be applied to this specification.

FIG. 114 shows another example of a wireless device that can be applied to this specification.

According to FIG. 114, a wireless device may include at least one processor (102, 202), at least one memory (104, 204), at least one transceiver (106, 206), and one or more antennas (108, 208).

As a difference between the example of the wireless device described above in FIG. 113 and the example of the wireless device in FIG. 114, in FIG. 113, the processors 102 and 202 and the memories 104 and 204 are separated, but in the example of FIG. 114, the memory 104, 204 is included in the processor 102, 202.

Here, the detailed description of the processors 102 and 202, the memories 104 and 204, the transceivers 106 and 206, and one or more antennas 108 and 208 is as described above, in order to avoid unnecessary repetition of description, description of repeated description is omitted.

Hereinafter, an example of a signal processing circuit to which the present specification is applied will be described.

Figure 115:
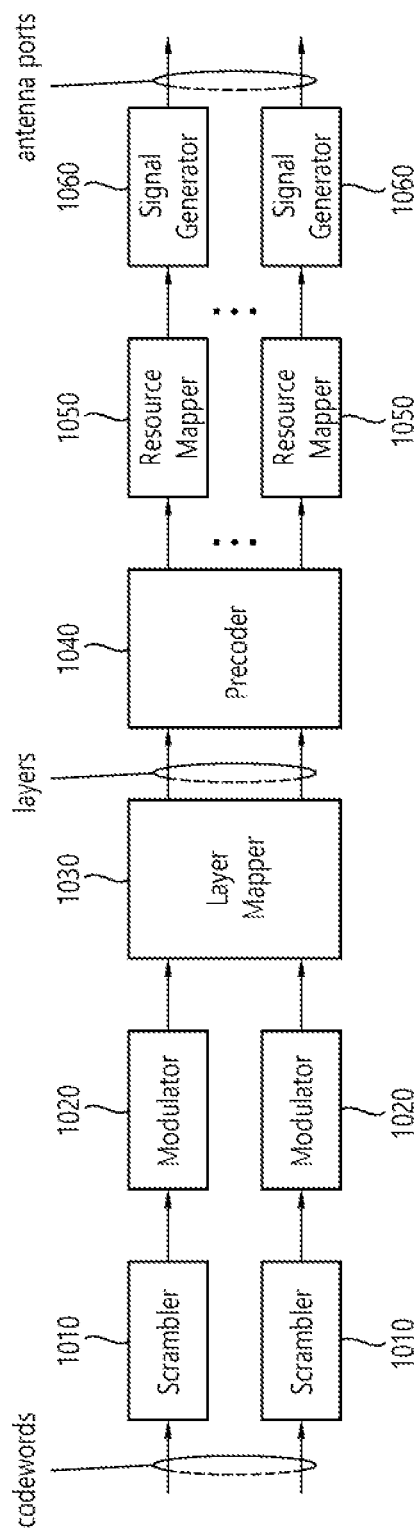
FIG. 115 shows a signal process circuit for a transmission signal, in accordance with an embodiment of the present disclosure.

FIG. 115 shows a signal process circuit for a transmission signal, in accordance with an embodiment of the present disclosure.

Referring to FIG. 115, a signal processing circuit (1000) may include scramblers (1010), modulators (1020), a layer mapper (1030), a precoder (1040), resource mappers (1050), and signal generators (1060). An operation/function of FIG. 115 may be performed, without being limited to, the processors (102, 202) and/or the transceivers (106, 206) of FIG. 113. Hardware elements of FIG. 115 may be implemented by the processors (102, 202) and/or the transceivers (106, 206) of FIG. 113. For example, blocks 1010-1060 may be implemented by the processors (102, 202) of FIG. 113. Alternatively, the blocks 1010-1050 may be implemented by the processors (102, 202) of FIG. 113 and the block 1060 may be implemented by the transceivers (106, 206) of FIG. 113.

Codewords may be converted into radio signals via the signal processing circuit (1000) of FIG. 115. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 115. For example, the wireless devices (e.g., 100, 200 of FIG. 113) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Hereinafter, an example of using a wireless device to which the present specification is applied will be described.

Figure 116:
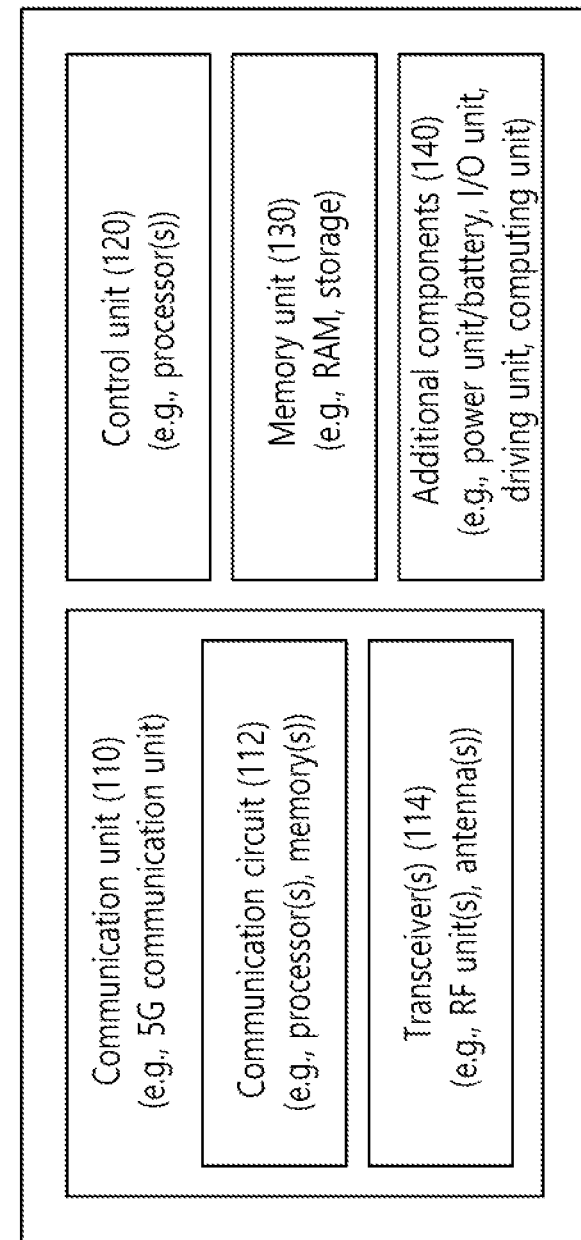
FIG. 116 shows another example of a wireless device, in accordance with an embodiment of the present disclosure.

FIG. 116 shows another example of a wireless device, in accordance with an embodiment of the present disclosure. The wireless device may be implemented in various forms according to a use-case/service (refer to FIG. 112).

Referring to FIG. 116, wireless devices (100, 200) may correspond to the wireless devices (100, 200) of FIG. 113 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 113. For example, the transceiver(s) (114) may include the one or more transceivers (106, 206) and/or the one or more antennas (108, 208) of FIG. 113. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 112), the vehicles (100b-1, 100b-2 of FIG. 112), the XR device (100c of FIG. 112), the hand-held device (100d of FIG. 112), the home appliance (100e of FIG. 112), the IoT device (100f of FIG. 112), a digital broadcast terminal, a hologram device, a public safety device, an MTC device, a medicine device, a fintech device (or a finance device), a security device, a climate/environment device, the AI server/device (400 of FIG. 112), the BSs (200 of FIG. 112), a network node, and so on. The wireless device may be used in a mobile or fixed place according to a use-example/service.

In FIG. 116, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 116 will be described in detail with reference to the drawings.

Figure 117:
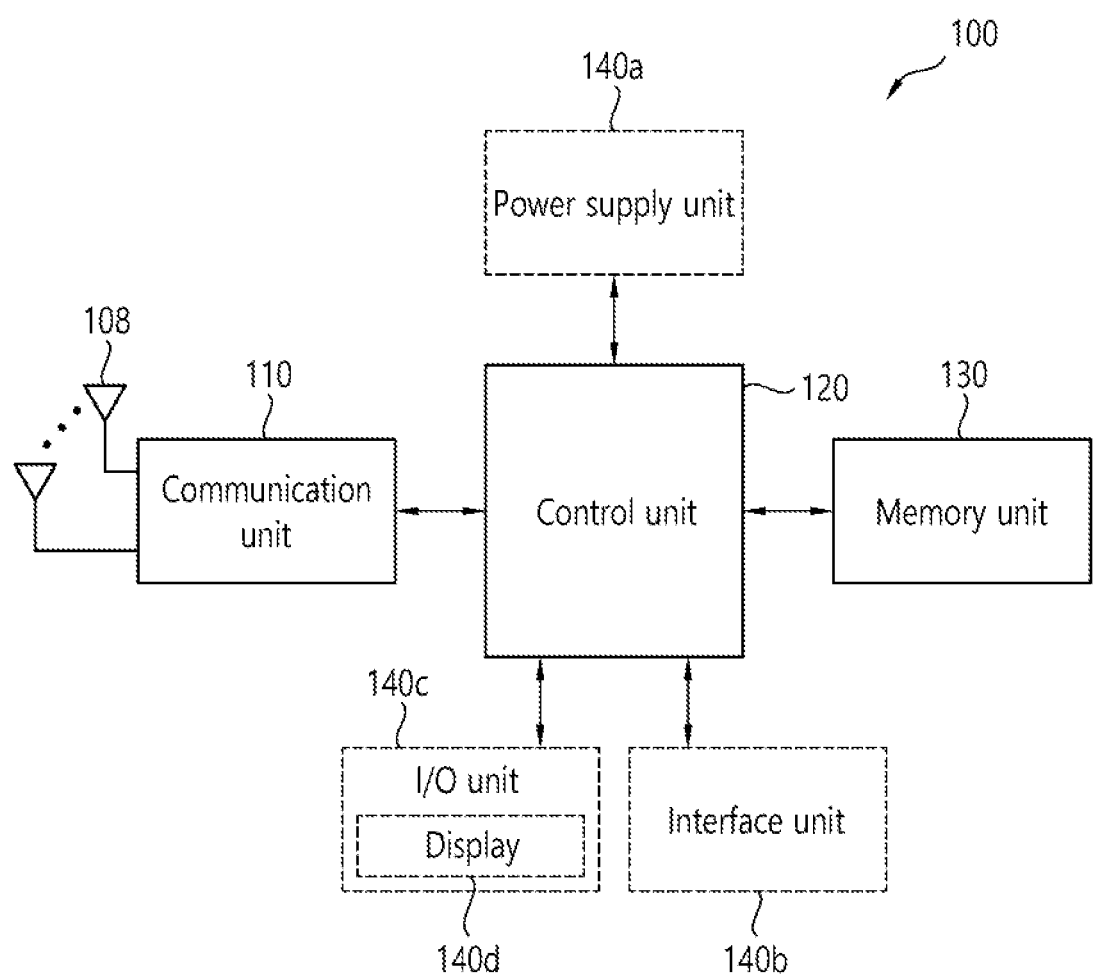
FIG. 117 shows a hand-held device, in accordance with an embodiment of the present disclosure.

FIG. 117 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 117, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110-130/140a-140c correspond to the blocks 110-130/140 of FIG. 116, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 118:
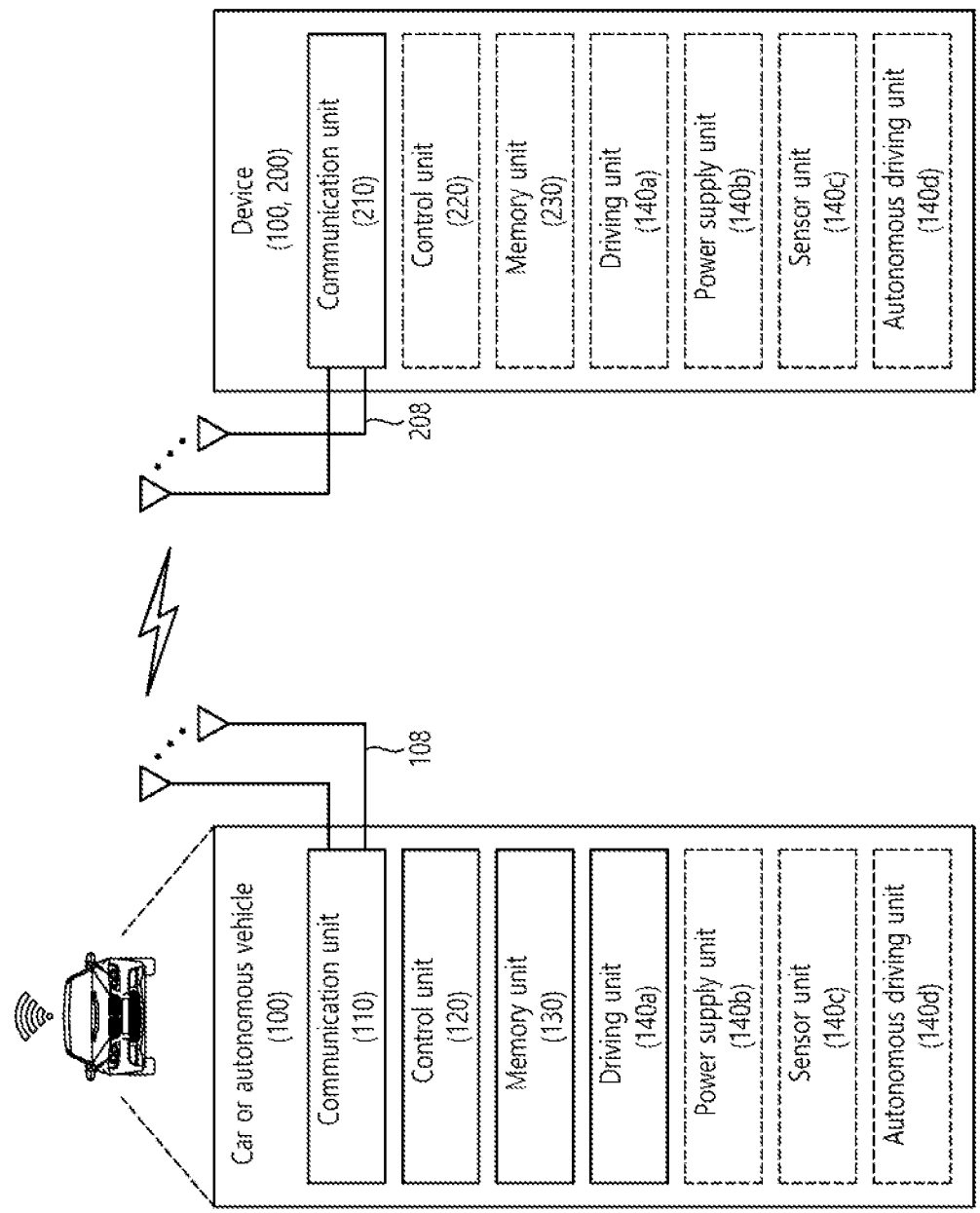
FIG. 118 shows a vehicle or an autonomous vehicle, in accordance with an embodiment of the present disclosure.

FIG. 118 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, and so on.

Referring to FIG. 118, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 116, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 119:
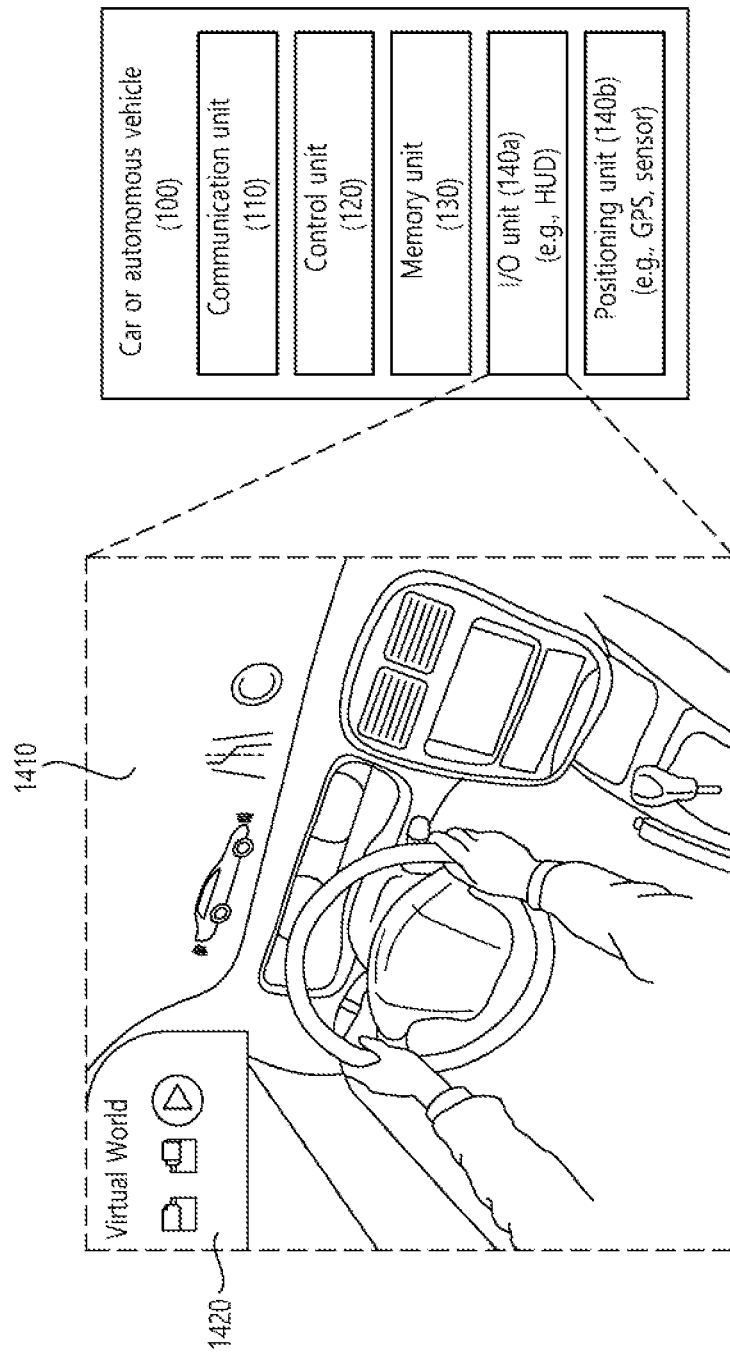
FIG. 119 shows a vehicle, in accordance with an embodiment of the present disclosure.

FIG. 119 shows a vehicle, in accordance with an embodiment of the present disclosure. The vehicle may be implemented as a transport means, an aerial vehicle, a ship, and so on.

Referring to FIG. 119, a vehicle (100) may include a communication unit (110), a control unit (120), a memory unit (130), an I/O unit (140a), and a positioning unit (140b). Herein, the blocks 110-130/140a-140b correspond to blocks 110-130/140 of FIG. 116.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include an HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Figure 120:
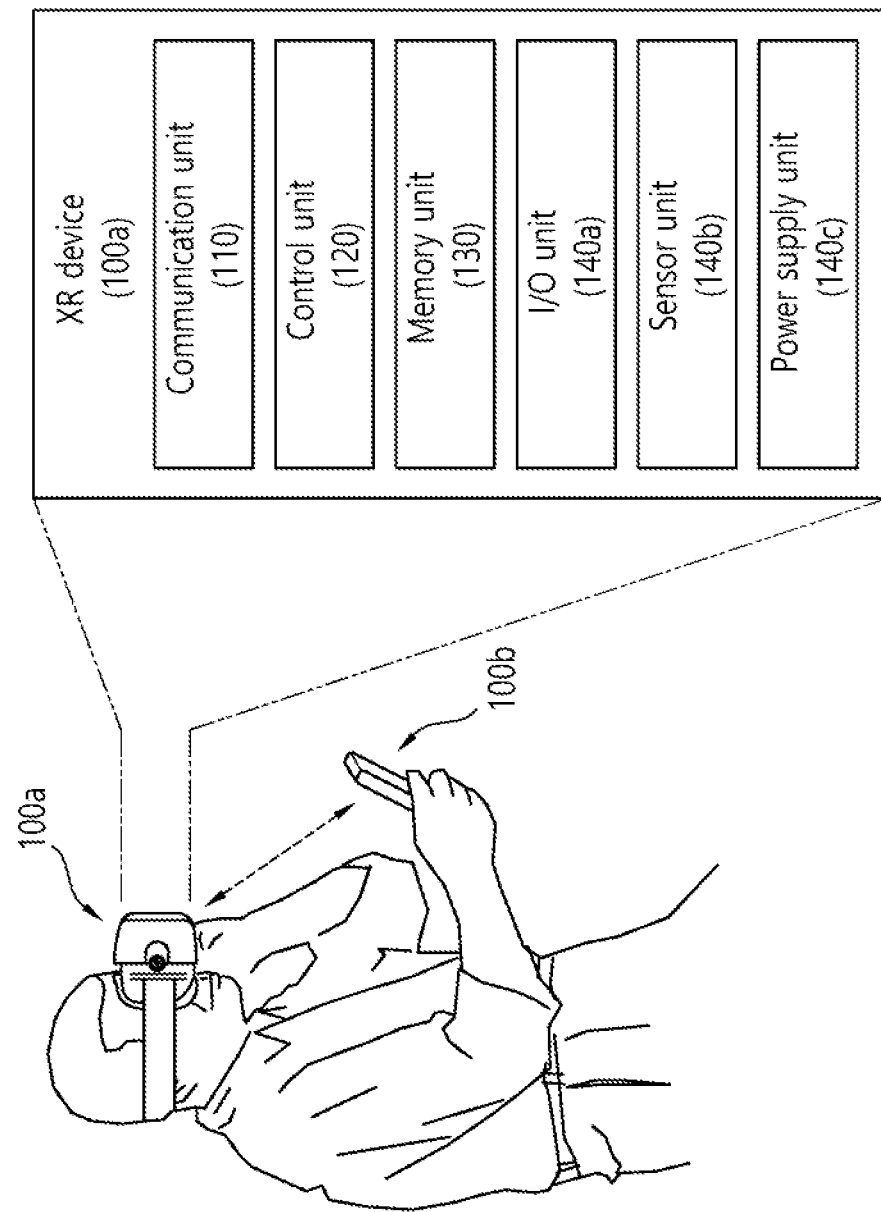
FIG. 120 shows an XR device, in accordance with an embodiment of the present disclosure.

FIG. 120 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 120, an XR device (100a) may include a communication unit (110), a control unit (120), a memory unit (130), an I/O unit (140a), a sensor unit (140b), and a power supply unit (140c). Herein, the blocks 110~130/140a~140c correspond to the blocks 110~130/140 of FIG. 116, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, and so on. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, and so on.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device 100b) or a media server through the communication unit (130). The communication unit (130) may download/stream content such as films or news from another device (e.g., the hand-held device 100b) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 121:
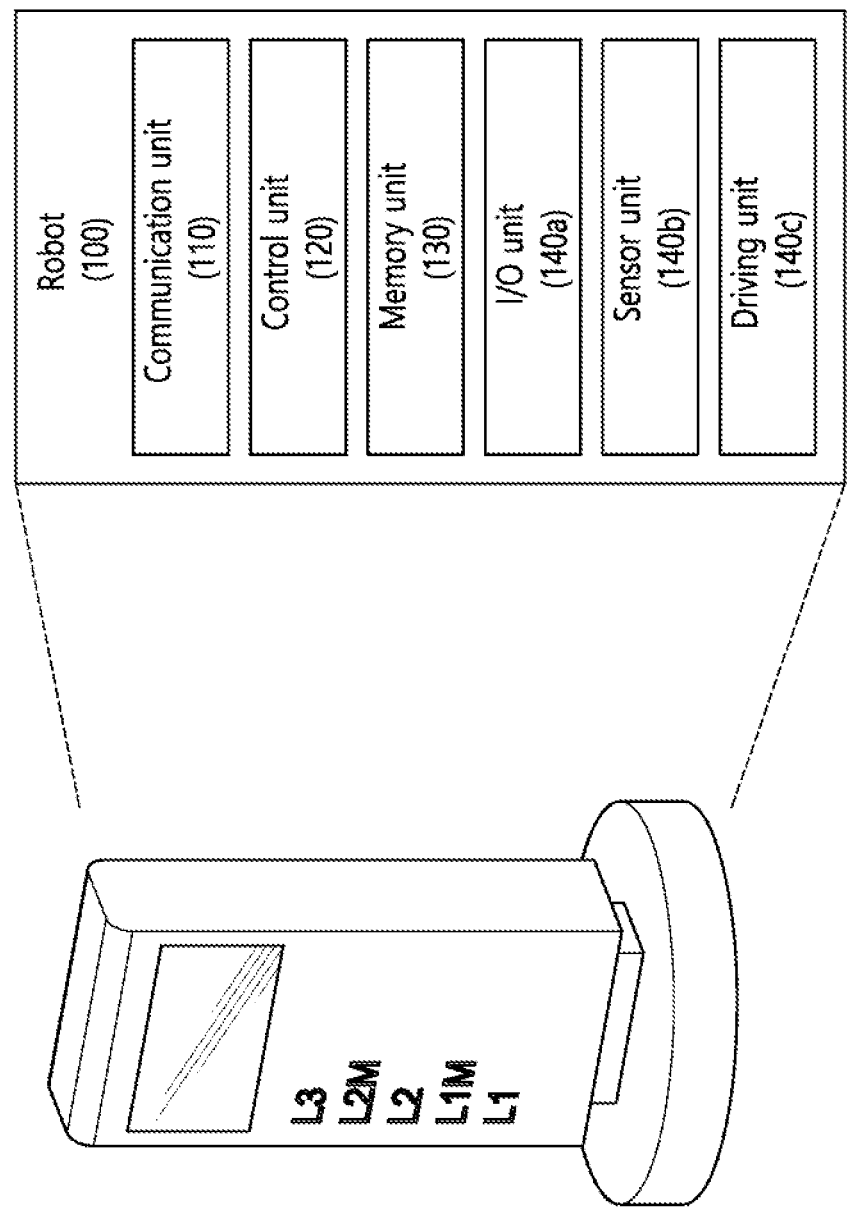
FIG. 121 shows a robot, in accordance with an embodiment of the present disclosure.

FIG. 121 shows a robot, in accordance with an embodiment of the present disclosure. The robot may be categorized into an industrial robot, a medical robot, a household robot, a military robot, and so on, according to a used purpose or field.

Referring to FIG. 121, a robot (100) may include a communication unit (110), a control unit (120), a memory unit (130), an I/O unit (140a), a sensor unit (140b), and a driving unit (140c). Herein, the blocks 110~130/140a~140c correspond to the blocks 110~130/140 of FIG. 116, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, and so on. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, alight sensor, a microphone, a radar, and so on. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, and so on.

Figure 122:
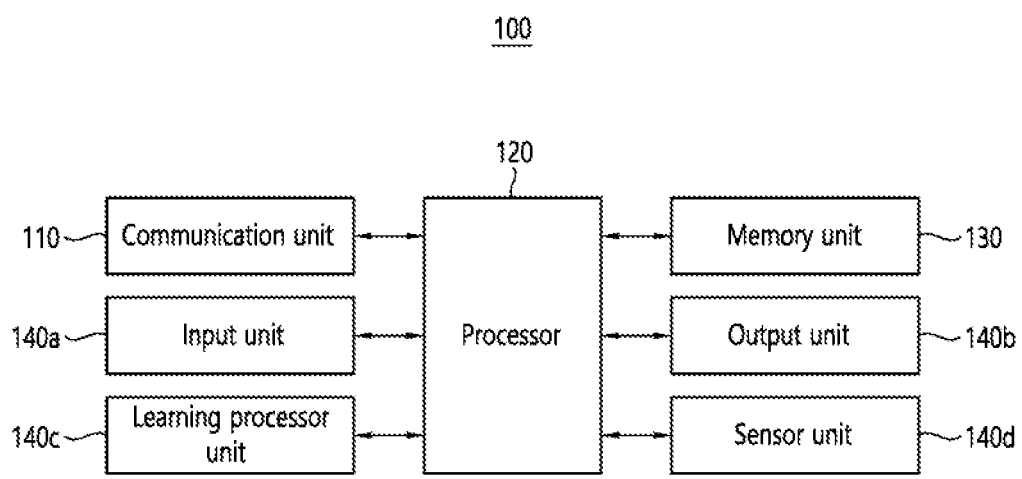
FIG. 122 shows an AI device, in accordance with an embodiment of the present disclosure.

FIG. 122 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 122, an AI device (100) may include a communication unit (110), a control unit (120), a memory unit (130), an I/O unit (140a/140b), a learning processor unit (140c), and a sensor unit (140d). The blocks 110~130/140a~140d correspond to blocks 110~130/140 of FIG. 116, respectively.

The communication unit (110) may transmit and receive wired/radio signals (e.g., sensor information, user input, learning models, or control signals) to and from external devices such as other AI devices (e.g., 100x, 200, 400 of FIG. 112) or an AI server (e.g., 400 of FIG. 112) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 112). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 113). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method of transmitting information for a pencil beam timing offset in a wireless optical communication system, the method performed by an apparatus and comprising:
   receiving a cell-reference synchronization signal (C-RSS) which is a sequence-based signal from a specific apparatus;
   receiving a pencil beam which is a pulsed signal having a specific magnitude from the specific apparatus;
   acquiring a reference synchronization time based on the C-RSS;
   acquiring a peak energy time by energy detection of the pencil beam;
   acquiring the pencil beam timing offset based on a difference between the reference synchronization time and the peak energy time among a plurality of pencil beam timing offsets; and
   transmitting information for the pencil beam timing offset to the specific apparatus,
   wherein each of the plurality of pencil beam timing offsets is related to a beam emitted on one of cell area spaces.

2. The method of claim 1, wherein the peak energy time is acquired within a beam tracking time.

3. The method of claim 1, wherein the C-RSS and the pencil beam are transmitted within a beam search block (BSB) by the specific apparatus.

4. The method of claim 3, wherein an area where the C-RSS is transmitted and an area where the pencil beam is transmitted are time division multiplexed (TDM).

5. The method of claim 3, wherein an area where the C-RSS is transmitted and an area where the pencil beam is transmitted are frequency division multiplexed (FDM).

6. The method of claim 3, wherein the BSB is periodically repeated based on a predetermined period.

7. The method of claim 1, wherein the apparatus receives data from the specific apparatus in response to the transmission of the information for the pencil beam timing offset.

8. An apparatus comprising:
   at least one transceiver;
   at least one memory; and
   at least one processor operably coupled with the at least one memory and the at least one transceiver, wherein the at least one memory stores instructions that, based on being executed by the at least one processor, cause the at least one processor to perform operations comprising:
   receiving a cell-reference synchronization signal (C-RSS) which is a sequence-based signal from a specific apparatus;
   receiving a pencil beam which is a pulsed signal having a specific magnitude from the specific apparatus;
   acquiring a reference synchronization time based on the C-RSS;
   acquiring a peak energy time by energy detection of the pencil beam;
   acquiring a pencil beam timing offset based on a difference between the reference synchronization time and the peak energy time among a plurality of pencil beam timing offsets; and
   controlling the transceiver to transmit information for the pencil beam timing offset to the specific apparatus,
   wherein each of the plurality of pencil beam timing offsets is related to a beam emitted on one of cell area spaces.

* * * * *